(12) United States Patent  
Venkatesan

(10) Patent No.: US 12,222,566 B2  
(45) Date of Patent: Feb. 11, 2025

(54) SELF-ALIGNED STRUCTURE AND METHOD ON INTERPOSER-BASED PIC

(71) Applicant: POET Technologies, Inc., Allentown, PA (US)

(72) Inventor: Suresh Venkatesan, Los Gatos, CA (US)

(73) Assignee: POET Technologies, Inc., Allentown, PA (US)

( * ) Notice: Subject to any disclaimer, the term of this patent is extended or adjusted under 35 U.S.C. 154(b) by 42 days.

(21) Appl. No.: 18/214,076

(22) Filed: Jun. 26, 2023

(65) Prior Publication Data

US 2023/0333333 A1 Oct. 19, 2023

Related U.S. Application Data

(63) Continuation of application No. 17/499,323, filed on Oct. 12, 2021, now Pat. No. 11,686,906.

(60) Provisional application No. 63/090,692, filed on Oct. 12, 2020.

(51) Int. Cl.
*H04B 10/00* (2013.01)
*G02B 6/42* (2006.01)

(52) U.S. Cl.
CPC ......... *G02B 6/4234* (2013.01); *G02B 6/4203* (2013.01); *G02B 6/423* (2013.01); *G02B 6/4238* (2013.01)

(58) Field of Classification Search
CPC .... G02B 6/4234; G02B 6/4203; G02B 6/423; G02B 6/4238
See application file for complete search history.

(56) References Cited

U.S. PATENT DOCUMENTS

| 5,319,725 | A | * | 6/1994 | Buchmann | G02B 6/43 385/14 |
| 5,404,417 | A | * | 4/1995 | Johnson | G02B 6/4202 385/65 |
| 5,742,720 | A | * | 4/1998 | Kobayashi | G02B 6/4249 385/83 |
| 6,112,002 | A | * | 8/2000 | Tabuchi | G02B 6/4245 385/124 |
| 6,454,468 | B1 | * | 9/2002 | Yoon | G02B 6/423 385/88 |
| 7,050,678 | B1 | * | 5/2006 | Isono | G02B 6/4255 385/39 |
| 10,061,084 | B1 | * | 8/2018 | Takayama | G02B 6/30 |
| 10,107,975 | B1 | * | 10/2018 | Lam | G02B 6/4206 |
| 10,156,688 | B1 | * | 12/2018 | Wang | G02B 6/423 |
| 10,620,377 | B1 | * | 4/2020 | Burckel | H01S 5/22 |
| 2002/0114577 | A1 | * | 8/2002 | Kondo | G02B 6/4239 385/88 |

(Continued)

*Primary Examiner* — Agustin Bello
(74) *Attorney, Agent, or Firm* — Tue Nguyen

(57) ABSTRACT

Alignment aid structures and the method of formation of these structures on an interposer comprised of a planar waveguide layer and a base structure, facilitate the alignment of the optical axes of optical and optoelectrical devices formed from and mounted to the interposer. Alignment aids formed from a common hard mask on the planar waveguide layer of the interposer structure include vertical and lateral alignment structures and fiducials. Optical losses for signals propagating in interposer-based photonic integrated circuits are reduced with effective alignment structures and methods.

20 Claims, 86 Drawing Sheets

(56) References Cited

U.S. PATENT DOCUMENTS

| | | | | |
|---|---|---|---|---|
| 2003/0081914 A1* | 5/2003 | Steinberg | G02B 6/4245 | 385/94 |
| 2003/0128907 A1* | 7/2003 | Kikuchi | G02B 6/42 | 264/1.24 |
| 2003/0228109 A1* | 12/2003 | Uekawa | G02B 6/423 | 385/33 |
| 2004/0033032 A1* | 2/2004 | Nakanishi | G02B 6/421 | 385/92 |
| 2004/0184811 A1* | 9/2004 | Takamori | H04B 10/2589 | 398/141 |
| 2004/0218874 A1* | 11/2004 | Kondo | G02B 6/125 | 385/88 |
| 2005/0058400 A1* | 3/2005 | Fukuoka | G02B 6/3636 | 385/88 |
| 2005/0111797 A1* | 5/2005 | Sherrer | G02B 6/421 | 385/93 |
| 2006/0115207 A1* | 6/2006 | Uekawa | G02B 6/4246 | 385/33 |
| 2007/0058904 A1* | 3/2007 | Ban | G02B 6/4204 | 385/52 |
| 2009/0087155 A1* | 4/2009 | Watanabe | G02B 6/4219 | 385/131 |
| 2009/0214157 A1* | 8/2009 | Okubo | G02B 6/4214 | 385/14 |
| 2010/0008622 A1* | 1/2010 | Watanabe | G02B 6/12004 | 385/14 |
| 2016/0062063 A1* | 3/2016 | Ogura | G02B 6/305 | 264/1.27 |
| 2016/0077291 A1* | 3/2016 | Hoeltke | G02B 6/423 | 385/40 |
| 2016/0116695 A1* | 4/2016 | Nekado | G02B 6/4249 | 385/14 |
| 2016/0209607 A1* | 7/2016 | Hoeltke | G02B 6/4255 | |
| 2016/0291265 A1* | 10/2016 | Kinghorn | G02B 6/4238 | |
| 2016/0306120 A1* | 10/2016 | Matsumoto | G02B 6/12004 | |
| 2018/0180826 A1* | 6/2018 | Merget | G02B 6/136 | |
| 2018/0239095 A1* | 8/2018 | Wade | G02B 6/423 | |
| 2018/0331493 A1* | 11/2018 | Lin | H01S 5/0234 | |
| 2019/0033127 A1* | 1/2019 | Kim | G02B 6/423 | |
| 2019/0250335 A1* | 8/2019 | Kulick | G02B 6/43 | |
| 2019/0271820 A1* | 9/2019 | Tanooka | G02B 6/4292 | |
| 2019/0317284 A1* | 10/2019 | Matsuoka | G02B 6/4214 | |
| 2019/0384020 A1* | 12/2019 | Fini | G02B 6/4243 | |
| 2019/0391350 A1* | 12/2019 | Evans | G02B 6/4292 | |
| 2021/0333473 A1* | 10/2021 | Venkatesan | G02B 6/12016 | |
| 2023/0333333 A1* | 10/2023 | Venkatesan | G02B 6/4224 | |

* cited by examiner (i)

(ii)

(i) No offset between optical plane and the z-pillar (ii) With offset between optical plane and the z-pillar (i) Interposer substrate (ii) Planar Waveguide Structure (iii) EIL Structure Top-down view Section B-B'

(i) Top-down view (ii) Side view in cavity (i) Cross section view (one or two pillars)

(ii) Top-down view (one pillar)

(iii) Top-down view (two pillars)

(i) Cross section view (ii) Top-down view (six pillars)

(iii) Top-down view (seven pillars)

(i) Placement position (ii) After Positioning to WG (i) Placement position (ii) After Positioning to WG (i) Placement position (ii) After Positioning to WG 1. Form a base structure

| 1301 |

2. Deposit planar waveguide layer

| 1305 |
| 1301 |

3. Form a first patterned hard mask and deposit first dielectric layer and optionally planarize

| 1338a | | | 1316-1 |
| 1305 | | | |
| 1301 | | | |

4. Deposit second hard mask and deposit second dielectric layer and optionally planarize

| 1338b | 1316-2 | |
| 1338a | | 1316-1 |
| 1305 | | |
| 1301 | | |

5. Deposit third hard mask and deposit third dielectric layer and optionally planarize

| 1338c | 1316-3 | | |
| 1338b | | 1316-2 | |
| 1338a | | | 1316-1 |
| 1305 | | | |
| 1301 | | | |

6. Deposit an nth hard mask and deposit nth dielectric layer and optionally planarize

| 1338n | 1316-n | | |
| ⋮ | | | |
| 1338c | 1316-3 | | |
| 1338b | | 1316-2 | |
| 1338a | | | 1316-1 |
| 1305 | | | |
| 1301 | | | |

Figure 13C

1. Form a base structure

| 1301 |

2. Form a planar waveguide layer

| 1305 |
| 1301 |

3. Form a first patterned hard mask 1316-1

| 1305 |
| 1301 |

4. Selectively etch the second dielectric layer 1316-1
1305

| 1301 |

Figure 13D (i) Top-down view (ii) Side view (i)

(ii)

(i)

(ii)

(i) With z-pillar and fiducials formed in cavities (ii) With z-pillar and fiducials formed without cavities (i) With z-pillar and fiducials formed in cavities (ii) With z-pillar and fiducials formed without cavities (i) Cross-section view (ii) Top-down view (i) Cross-section view (ii) Top-down view (i) Cross section view (ii) Top-down view (i)

(ii)

(iii)

(i)

(ii)

SELF-ALIGNED STRUCTURE AND METHOD ON INTERPOSER-BASED PIC

The present patent application is continuation from U.S. Utility application Ser. No. 17/499,323, which claims priority from U.S. Provisional application Ser. No. 63/090,692, filed on Oct. 12, 2020, entitled "Self-Aligned Structure and Method on Interposer-based PIC", hereby incorporated by reference in its entirety.

This application relates to U.S. patent application entitle Self-Aligned Structure and Method on Interposer-based PIC, filed on Oct. 12, 2021, hereby incorporated by reference in its entirety.

FIELD OF THE INVENTION

The present invention relates to photonic integrated circuits and to the formation and method of use of alignment features that are formed on an interposer-based optical planar waveguide structure. Alignment features include the formation of vertical and lateral reference structures that facilitate the alignment of optical components formed from the planar waveguide layer of an interposer structure and to the alignment of optical components that are mounted onto the interposer. Such alignment features provide improvements in the manufacturability of photonic integrated circuits (PICs) that use optical components formed from a planar waveguide layer of an interposer structure and that to which die can be mounted.

BACKGROUND

Developments in methods of manufacturing of photonic integrated circuits (PICs) have enabled the fabrication and integration of electrical, optoelectrical, and optical devices on the same substrate. In some applications, pre-formed optoelectrical die are integrated within the PICs to provide functionality that may not be easily obtainable with similar devices formed directly on or within the substrate. Semiconductor lasers that emit signals at specific optical wavelengths suited for optical communications, for example, are readily fabricated from gallium arsenide and indium phosphide materials. The fabrication of devices that emit at these telecommunications wavelengths is not practical or achievable using silicon or insulating substrates, and thus requires the integration of pre-formed lasers into PIC mounting structures. The integration of the optoelectrical die into PICs, however, requires precise placement and subsequent alignment after placement of optical and electrical features on the die with optical and electrical features on the mounting substrate. Optical output from an integrated laser die, for example, must align with optical planar waveguides or other optical devices on the substrate to enable effective integration of the laser with other devices in optoelectrical or optical circuits on the PIC substrate.

Effective alignment methodologies require the formation of alignment structures and strategies for which the alignment structures on mounted die are compatible with alignment structures on the substrate or mounting structure and this compatibility can provide both technical and economic benefits in the manufacturing of PICs. Methodologies, for example, that enable the implementation of passive alignment techniques that do not require direct feedback during the alignment process are preferable over techniques and integration schemes that require potentially time-consuming active alignment steps. Effective integration strategies can also reduce coupling losses between devices, for example. The formation of the alignment structures or mechanical alignment aids should also be compatible with PIC fabrication techniques and methods, and suitable for high-volume production.

Thus, a need in the art exists for device structures and methods that allow for passive integration of optoelectrical devices such as semiconductor lasers and photodiodes that provide suitable referencing schemes to enable effective alignment of integrated optoelectrical die with waveguides and other features on the substrate during the fabrication of PICs.

SUMMARY

Embodiments of structures and methodologies are described herein for the formation and utilization of mechanical alignment aids that facilitate the alignment of the optical planes of optical and optoelectrical devices that are combined to form photonic integrated circuits (PICs) and the like. The alignment of the optical planes in these devices is required to facilitate the transference of optical signals between the devices utilized in, or otherwise coupled to the PICs.

Alignment features are described in embodiments, herein, that include mechanical alignment aids formed on a substrate of a first optical or optoelectrical device and on a mating device to vertically align a common optical plane between two optical devices. Mechanical alignment aids, as described herein, include vertical alignment pillars, fiducials, lateral constraints, and other alignment aids that are formed on a substrate to facilitate the alignment of the optical pathways of two or more optical devices. Alignment of the optical pathways, in general, is required in PICs to facilitate the transfer of optical signals between devices in an optical circuit.

In an embodiment, a z-pillar is formed on a first optical or optoelectrical device and brought into contact with a mechanical reference surface that is formed on a second optical or optoelectrical die to form and align a common horizontal optical signal plane between the two optical devices. As used herein, the term "z-pillar" is used to describe a structural pillar formed on a substrate or device that is used to establish a reference in "z" direction, a direction normal to the flat surface plane of the substrate or device as described and referenced herein. The reference height established by a z-pillar, in some embodiments, is the top surface of the z-pillar. In other embodiments, other portions of the z-pillar are used to establish a reference height of the z-pillar.

In embodiments described herein, the reference height of the z-pillar is formed with the use of a patterned first hard mask layer, wherein the first hard mask layer is formed from a material that is more resistive to an etch or removal process than the surrounding material. A layer of aluminum is formed over a material suitable for the formation of a planar waveguide, such as one or more of silicon dioxide, silicon nitride, silicon oxynitride, or a combination of layers of these materials, for example, and is patterned to form the first hard mask for the formation of a portion of z-pillars. A hard mask as used herein refers to a non-polymer-based material that is used to protect underlying portions of a layer during a patterning process, for example. The patterned aluminum first hard mask layer, for example, protects the underlying planar waveguide material in areas in which the aluminum is present, and allows the planar waveguide material to be removed from areas in which the aluminum is not present. A selective etch process is used, for example, to remove the planar waveguide material that does not substantially etch the aluminum hard mask or other mask material. The selective removal of the planar waveguide layer between the masked aluminum areas results in the formation of a portion of the z-pillars and other alignment aids as described herein. Aluminum is an effective mask material for the formation of z-pillars when used in combination with fluorine-containing plasma etch chemistries such as those containing $SF_6$, $CHF_3$, $CF_4$, $C_xF_y$, among others. Other mask materials can also be used that provide a high selectivity for removal of the planar waveguide material relative to the more slowly etched first mask material. Additional portions of the z-pillars can be formed in subsequent processes as described herein, in which the first patterned hard mask is buried in a layer of insulating dielectric material, that is then patterned with a second hard mask layer. The second hard mask is used in some embodiments to form a pattern for the formation of cavities, for example, that allow for the removal of the insulating dielectric material layer and re-exposure of the buried z-pillars that further allow for the formation of z-pillars that extend into the layers below the planar waveguide layer.

In embodiments, a fiducial alignment feature is formed on a first optical or optoelectrical device and is used to establish a lateral alignment reference to facilitate the alignment of a second optical device that is brought into proximity with, or mounted to, the first optical device. Formation of the fiducial and the z-pillars, in some embodiments, using the same hard mask patterning process, provides a common focal plane to further facilitate alignment methods using these features. The hard mask, in some embodiments, is formed over the planar waveguide layer of an interposer structure to further facilitate alignment of devices formed from the planar waveguide layer using the z-pillars and the fiducials.

In embodiments described herein, fiducial alignment features are illustrated as specific features formed for the purpose of providing lateral alignment reference. Embodiments in which a fiducial feature has a secondary purpose within the structure of the PIC are also within the scope of embodiments. A fiducial, for example, formed from the hard mask layer may be a conductive element in the circuit, or may be a structural feature in the formation of the circuit.

In other embodiments, one or more z-pillar alignment features are combined with one or more lateral fiducial features to form alignment references in both the vertical and the lateral dimensions of two optical or optoelectrical devices for which the vertical and lateral optical planes are brought into alignment to enable the efficient transfer of optical signals between the two aligned devices. And in yet other embodiments, the one or more z-pillar alignment features that are combined with one or more lateral fiducial features are further combined with lateral constraints that are formed on one or both of the optical devices for which the vertical and lateral optical planes are brought into alignment to enable the transfer of optical signals between the two aligned devices. The lateral constraints, in embodiments, restrict the lateral movement of the two combined optical or optoelectrical die and maintain the lateral alignment of the optical pathways between the two devices. These lateral constraints, in combination with the vertical alignment constraint that is provided by the one or more z-pillars, provide an effective structure for three-dimensional alignment of the optical pathways between two or more optical devices.

Other aspects and features of embodiments will become apparent to those skilled in the art upon review of the following detailed description in conjunction with the accompanying figures.

DESCRIPTION OF THE DRAWINGS

FIG. 12D (continued). (iii) Perspective drawing of an embodiment showing four discrete devices mounted in a cavity on an interposer and aligned with exposed facets of multiple planar waveguides. Four optical devices are mounted over the alignment pillars in the interposer cavity with the optoelectrical devices in substantial alignment with the planar waveguides of the interposer (the interposer and cavity are shown in solid lines and the optoelectrical die is shown in dotted lines).

FIG. 12E (continued). Perspective drawing of an embodiment showing a die with four optical devices and with patterned alignment pillars that is mounted in an interposer cavity. The emitting or receiving facets of the die containing four optoelectrical devices are shown aligned with exposed facets of planar waveguides embedded in the interposer structure (the interposer and cavity are shown in solid lines and the optoelectrical die is shown in dotted lines).

FIG. 13D. Embodiment of a process flow for forming a z-pillar in an embodiment without a cavity.

FIG. 15B (continued). Embodiments of two optical devices with aligned optical signal planes shown with z-pillar mechanical alignment aids formed on surface pillars to facilitate alignment: (iii) optical devices formed on a substrate with multiple offsets between the optical axis and the top of the z-pillars, and (iv) optical devices formed on a substrate with a single offset between the optical axis and the top of the z-pillars for a device and multiple offsets between the optical axis and the top of the z-pillars for another device.

FIG. 15C (continued). Embodiments of two optical devices with aligned optical signal planes shown with z-pillar mechanical alignment aids formed in cavities in substrate to facilitate alignment: (iii) optical devices formed with an intermediate waveguide within the substrate with an offset between the optical axis and the top of the z-pillars, and (iv) optical devices formed with an intermediate waveguide within the substrate with multiple offsets between the optical axis and the top of the z-pillars FIG. 15D. Embodiments of two optical devices with aligned optical signal planes shown with z-pillar mechanical alignment aids in which the aligned devices are mounted over the pillars to form a contact with the bottom surface of a cavity formed in the substrate with (i) waveguide formed on the surface, and (ii) with waveguide formed in the substrate.

FIG. 15E (continued). Embodiments of two optical devices with aligned optical signal planes shown with z-pillar alignment aids for an edge mounted device in which (iv)

Figure 15A:
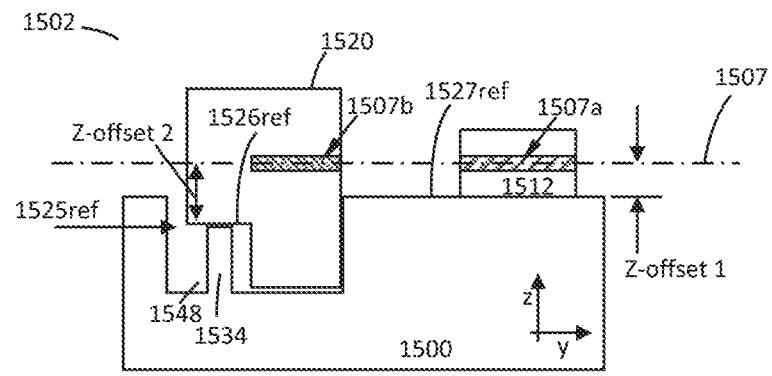
FIG. 15A. Embodiments of two optical devices with aligned optical signal planes shown with mechanical alignment aid, a z-pillar, to facilitate alignment in the vertical direction: (i) optical device formed on a substrate with an offset between the optical axis and the top of the substrate and with an offset between the top of the z-pillar and the optical axis, and (ii) with an offset between the optical axis and the top of the z-pillar, the top of the substrate, and a reference plane in device.
Figure 15A:
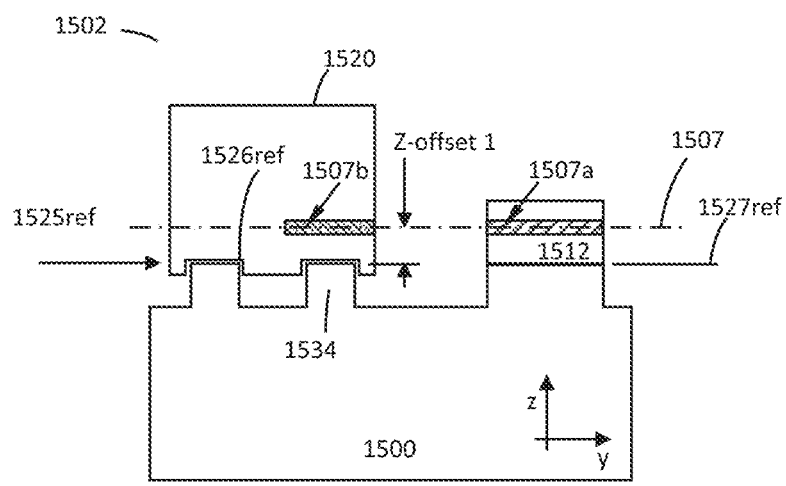
Figure 15B:
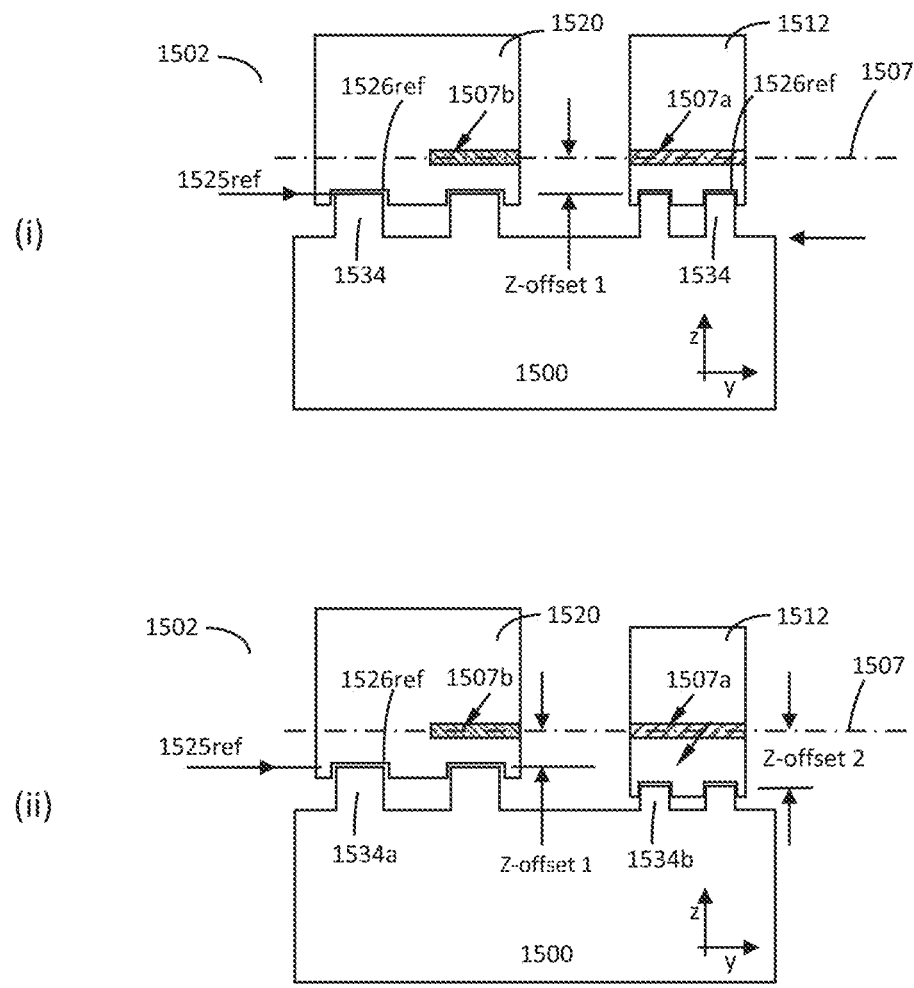
FIG. 15B. Embodiments of two optical devices with aligned optical signal planes shown with z-pillar mechanical alignment aids formed on surface pillars to facilitate alignment: (i) optical devices formed on a substrate with an offset between the optical axis and the top of the z-pillars, (ii) optical devices formed on a substrate with differing offsets between the optical axis and the top of the z-pillars.
Figure 15B:
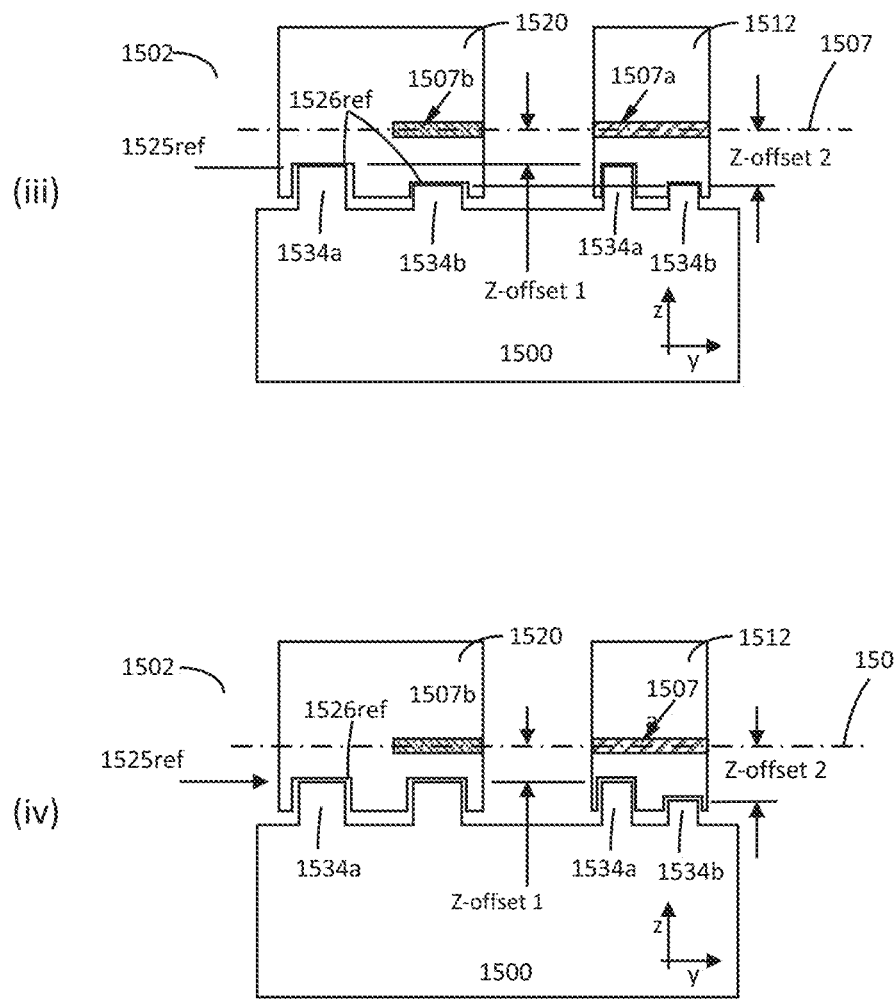
Figure 15C:
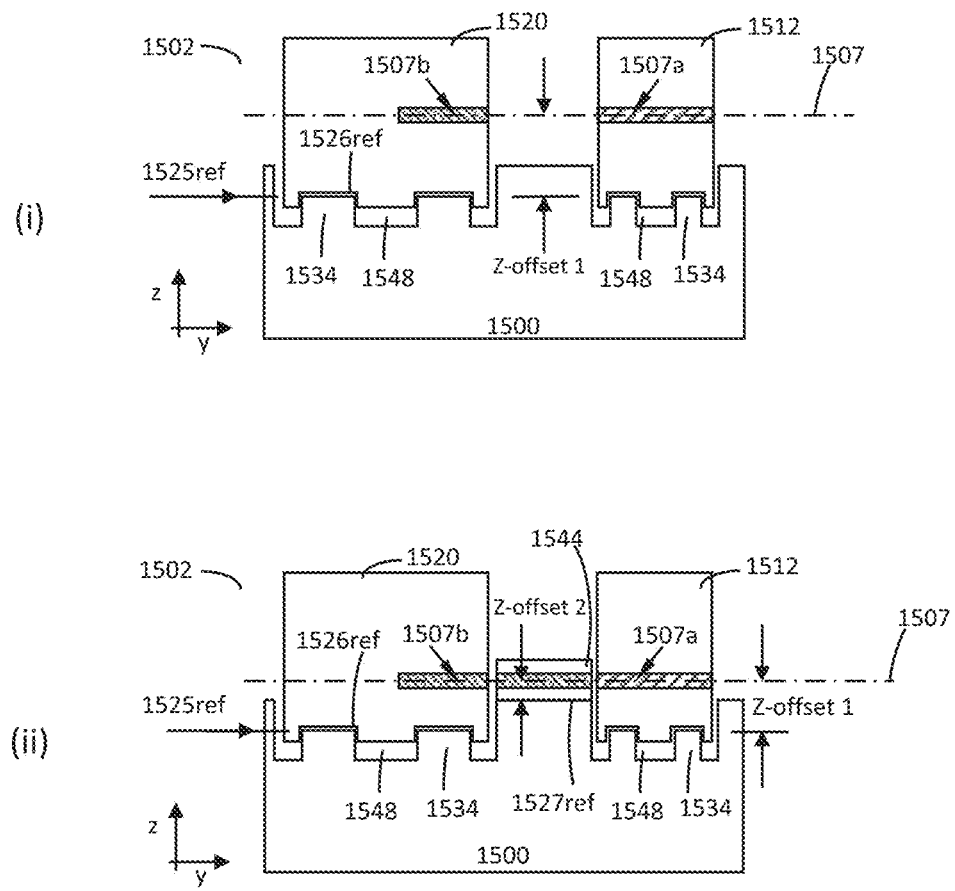
FIG. 15C. Embodiments of two optical devices with aligned optical signal planes shown with z-pillar mechanical alignment aids formed in cavities in substrate to facilitate alignment: (i) optical devices formed with an offset between the optical axis of the PIC and the top of the z-pillars, (ii) optical devices formed with an intermediate waveguide on the substrate between the devices with an offset between the PIC optical axis and the top of the z-pillars.
Figure 15C:
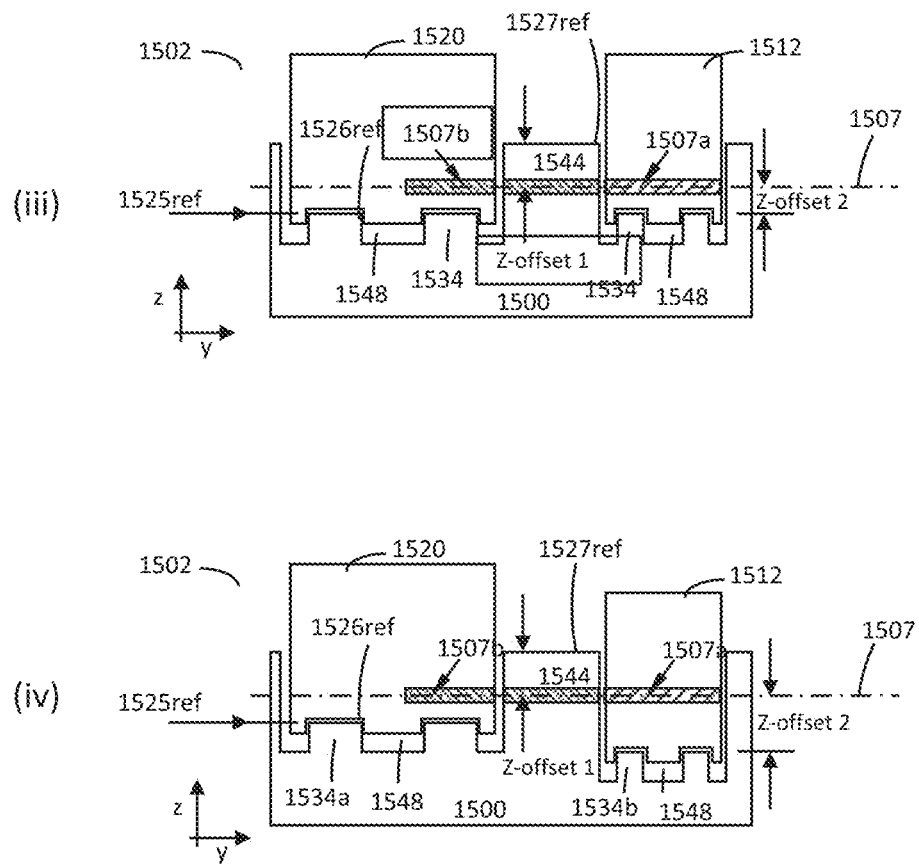
Figure 15D:
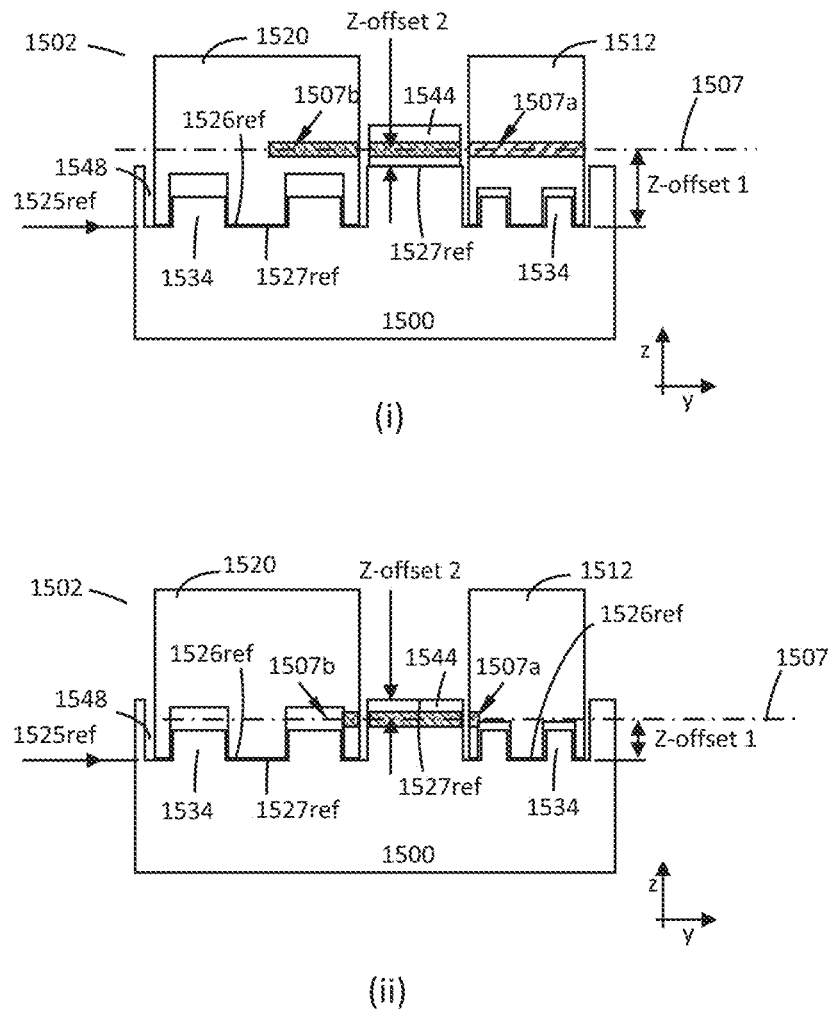
FIG. 15E. (i) Embodiments of two optical devices with aligned optical signal planes shown with z-pillar alignment aids and with an edge mounted device, and (ii) edge mounted device aligned on z-pillar shown in alignment with a planar waveguide, and (iii) an example of a type of edge mounted fiber optic cable mounting block.
Figure 15E:
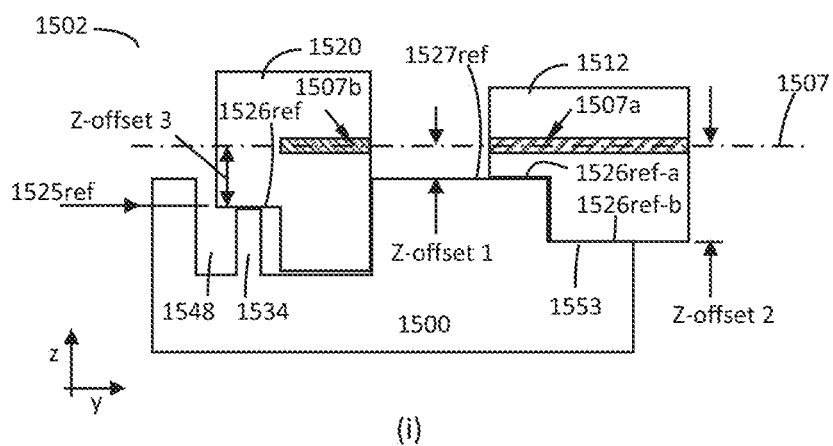
Figure 15E:
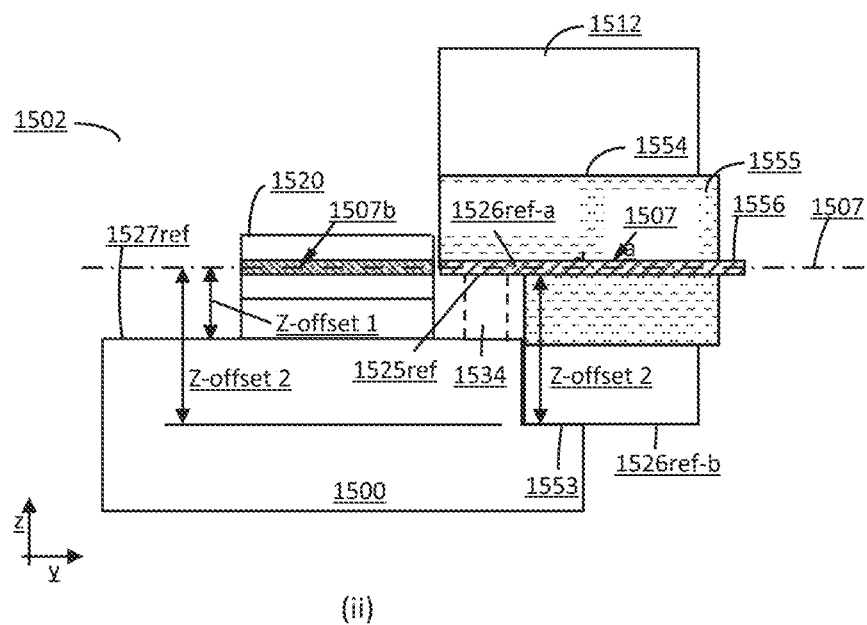
Figure 15E:
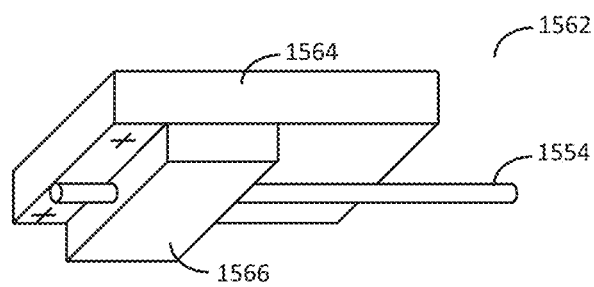
Figure 15E:
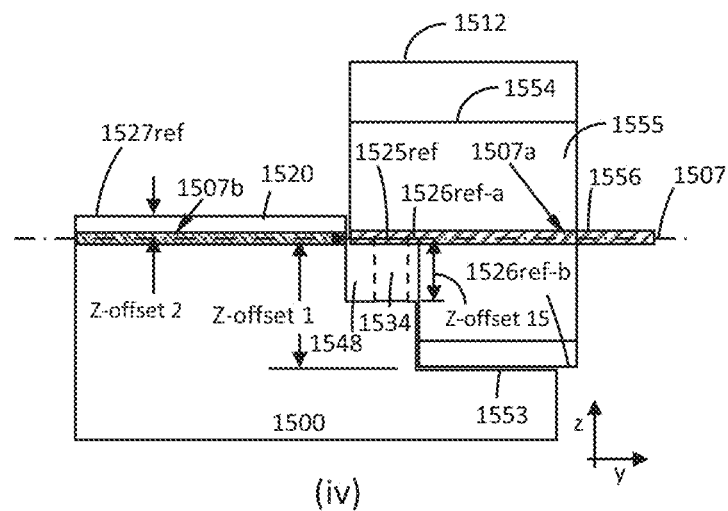
Figure 15E:
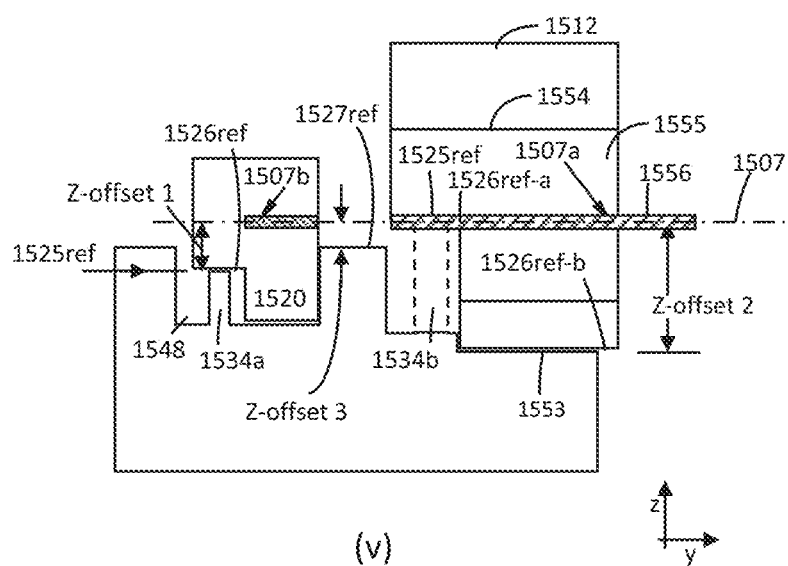
Figure 15F:
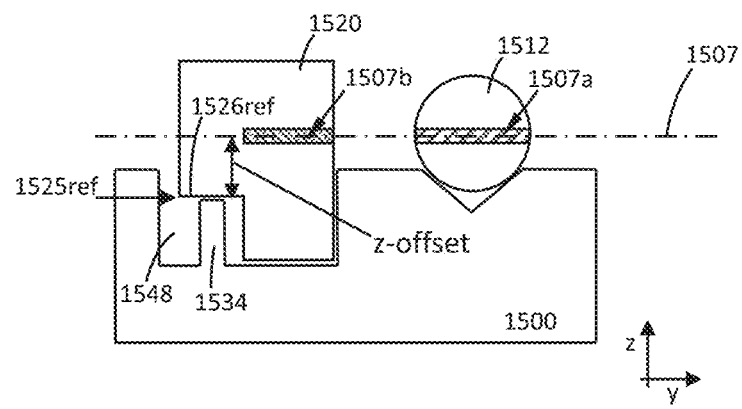
Figure 15F:
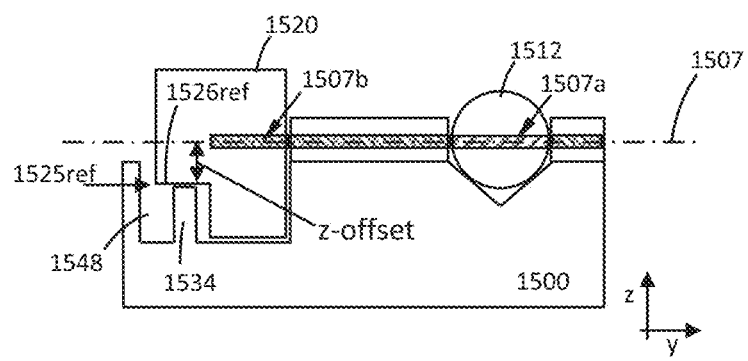

the z-pillar of the edge mounted device is formed in a cavity, and in which (v) both devices are mounted on z-pillars formed in cavities FIG. 15F. Embodiments of two optical devices with aligned optical signal planes shown with z-pillar mechanical alignment aids in which one of the devices is a ball lens in alignment with (i) a device mounted over a z-pillar formed in a cavity, and (ii) a device mounted over a z-pillar formed in a cavity and with a planar waveguide between the two optical devices.

Figure 16:
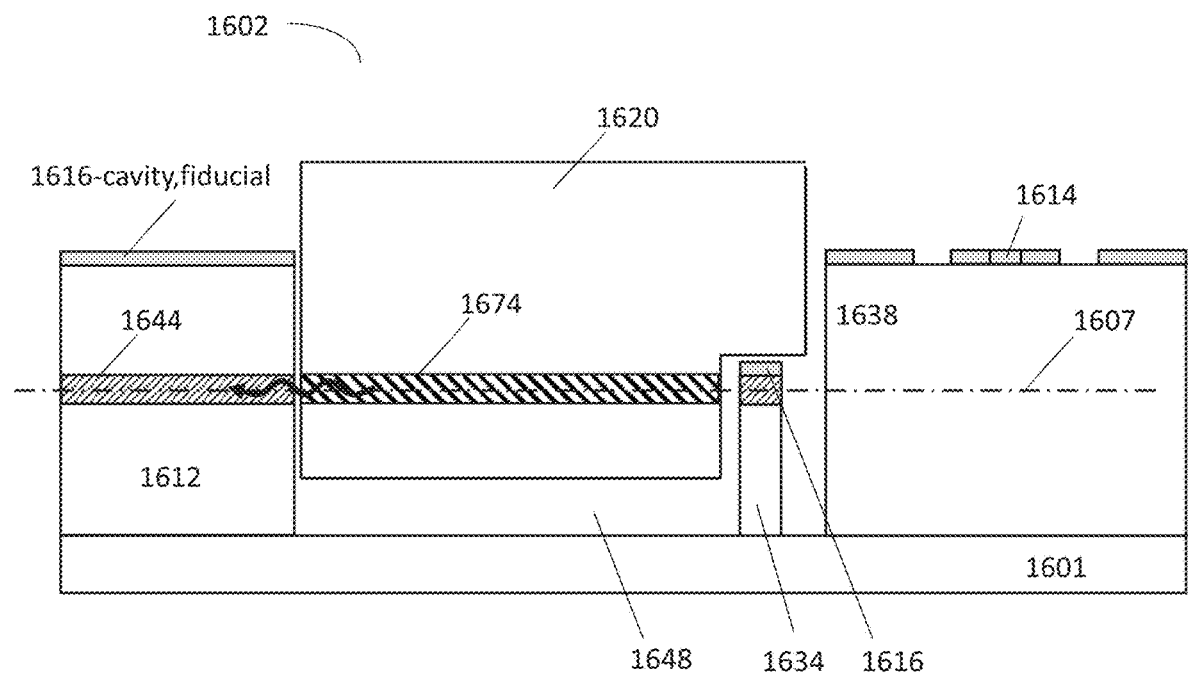

FIG. 16. Embodiment of alignment aids for which z-pillars to provide z-alignment of the optical plane of two optical devices, namely, a mounted die and a planar waveguide are formed concurrently.

Figure 17:
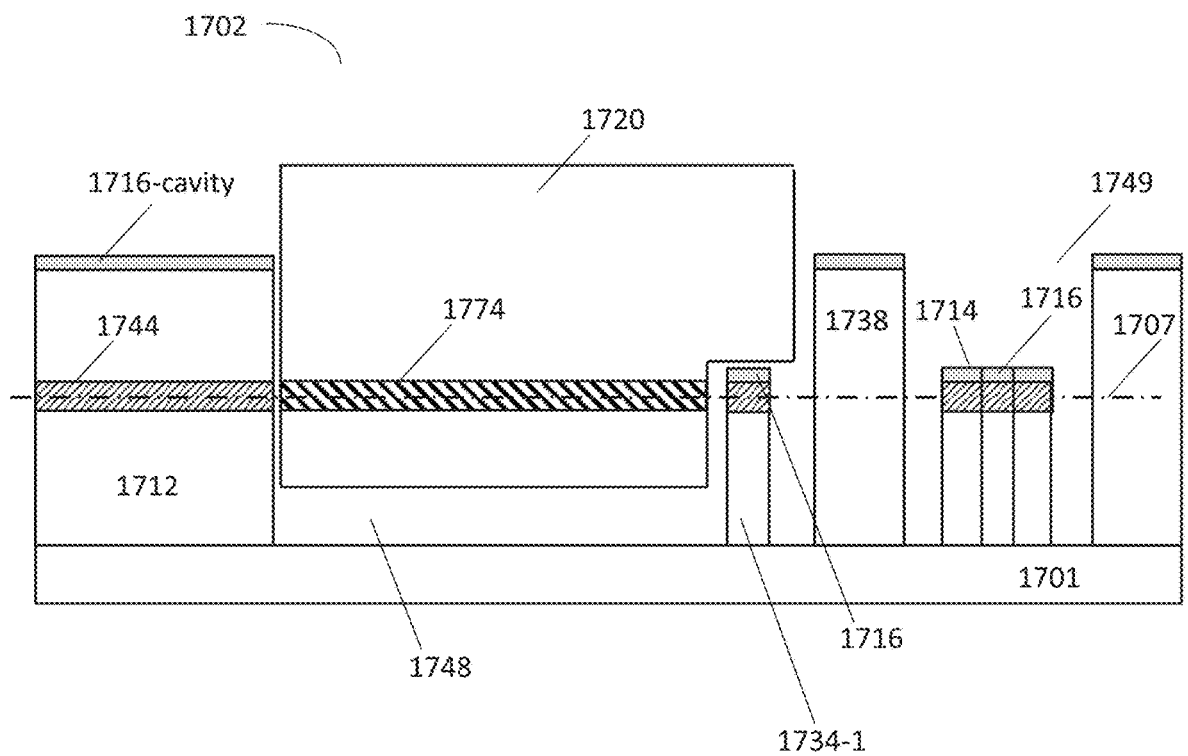

FIG. 17. Embodiment in which the z-pillar, a planar waveguide layer, and a fiducial are formed concurrently (hard mask for the planar waveguide 1744 in the interposer is not shown) to provide z-alignment of the optical plane of two optical devices, namely, a mounted device and an waveguide in an interposer. Co-formation of the fiducial is used in this embodiment for precision alignment in the lateral directions (x & y).

Figure 18A:
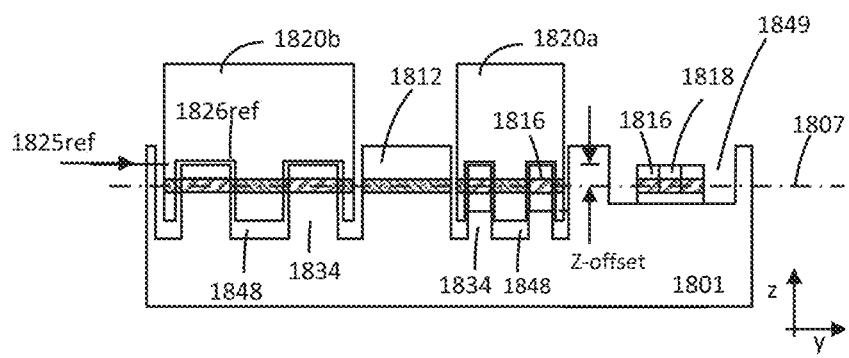
Figure 18A:
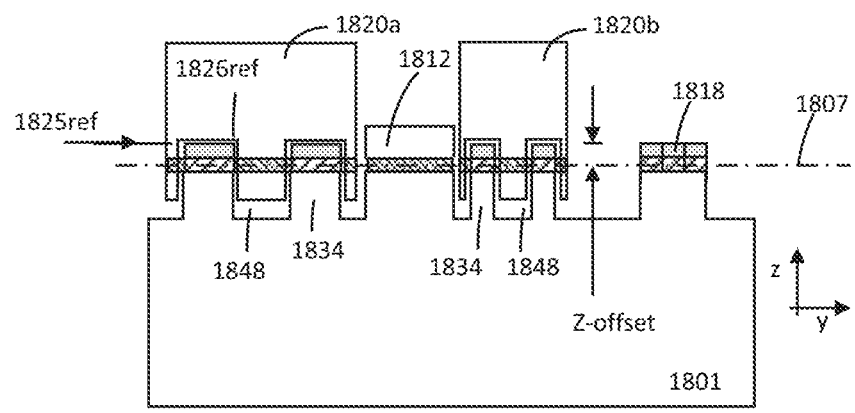

FIG. 18A. Two mounted optical devices with planar waveguide shown with aligned optical signal planes. Alignment aids to facilitate alignment include the co-formed planar waveguide, z-pillars, and fiducial. Z-pillars in the embodiment shown are at a common height. (i) with z-pillars and fiducial formed in cavities, and (ii) with z-pillars and fiducial formed without cavities.

Figure 18B:
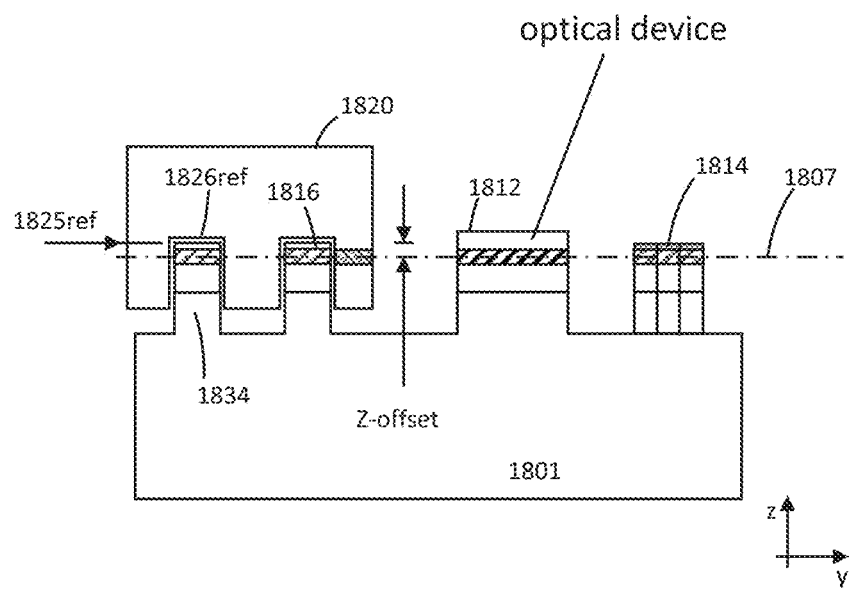

FIG. 18B. A mounted optical device shown in optical alignment with an optical device formed on the interposer. The planar waveguide layer is used in the formation of the z-pillars, the optical device, and the fiducial. Alignment aids to facilitate alignment include the z-pillars and the fiducial formed with the optical device. The z-pillars in the embodiment shown are at a common height.

Figure 18C:
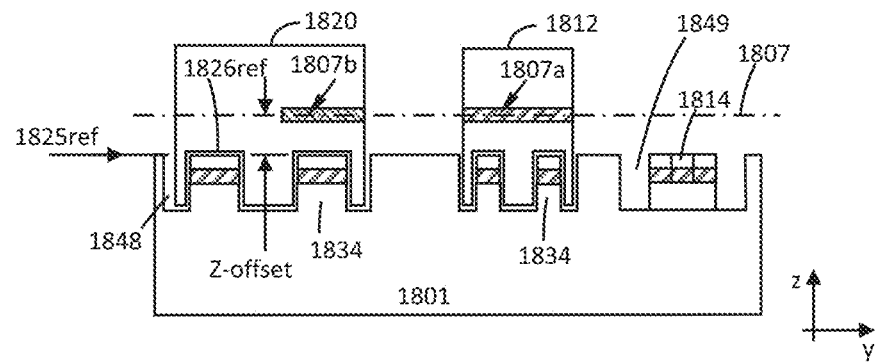
Figure 18C:
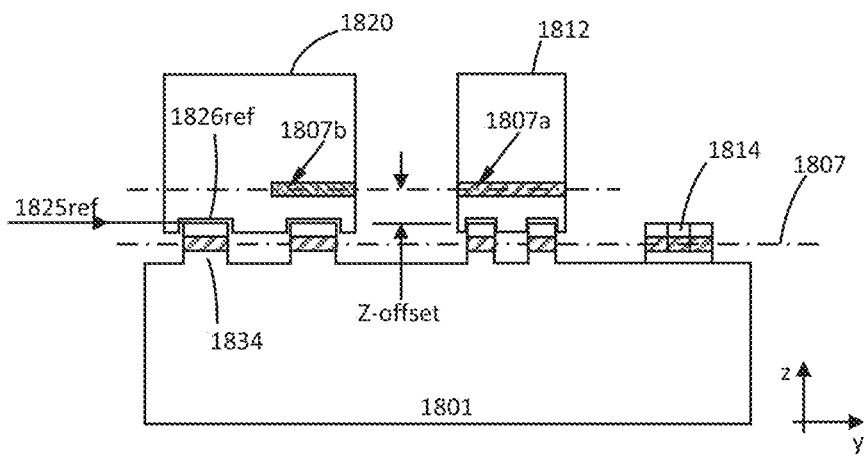

FIG. 18C. Two mounted optical devices shown with aligned optical signal planes. Alignment aids to facilitate alignment include the co-formed z-pillars and fiducial. Z-pillars in the embodiment shown are at a common height. (i) with z-pillars and fiducial formed in cavities, and (ii) with z-pillars and fiducial formed without cavities.

Figure 18D:
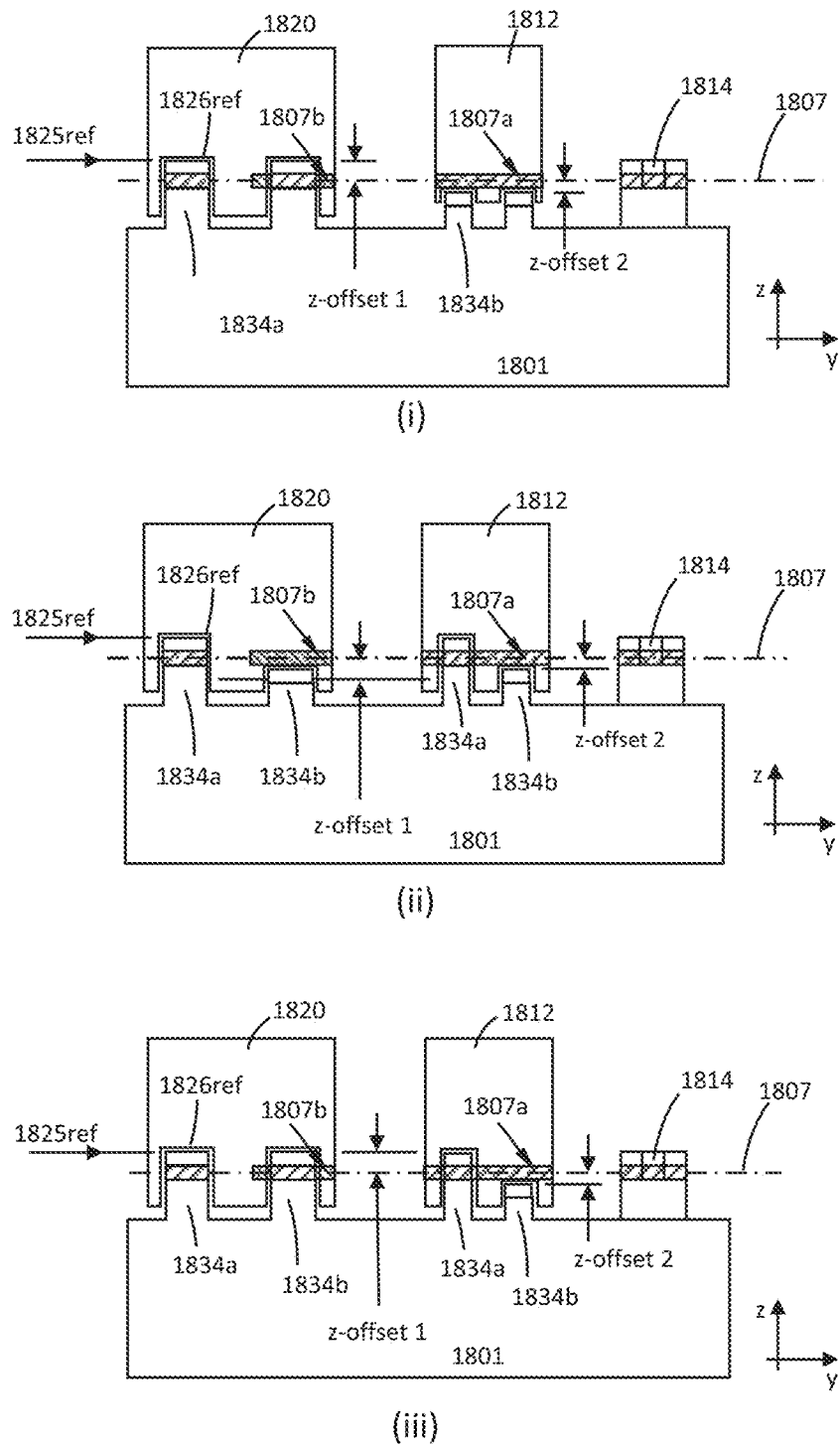

FIG. 18D. Two mounted optical devices shown with aligned optical signal planes. Alignment aids to facilitate alignment include the co-formed z-pillars and fiducial. (i) z-pillars are at different heights for the two devices, (ii) z-pillars are at multiple heights within each of the two devices, and (iii) z-pillars are at the same height for one of the devices and at multiple heights for another of the devices.

Figure 18E:
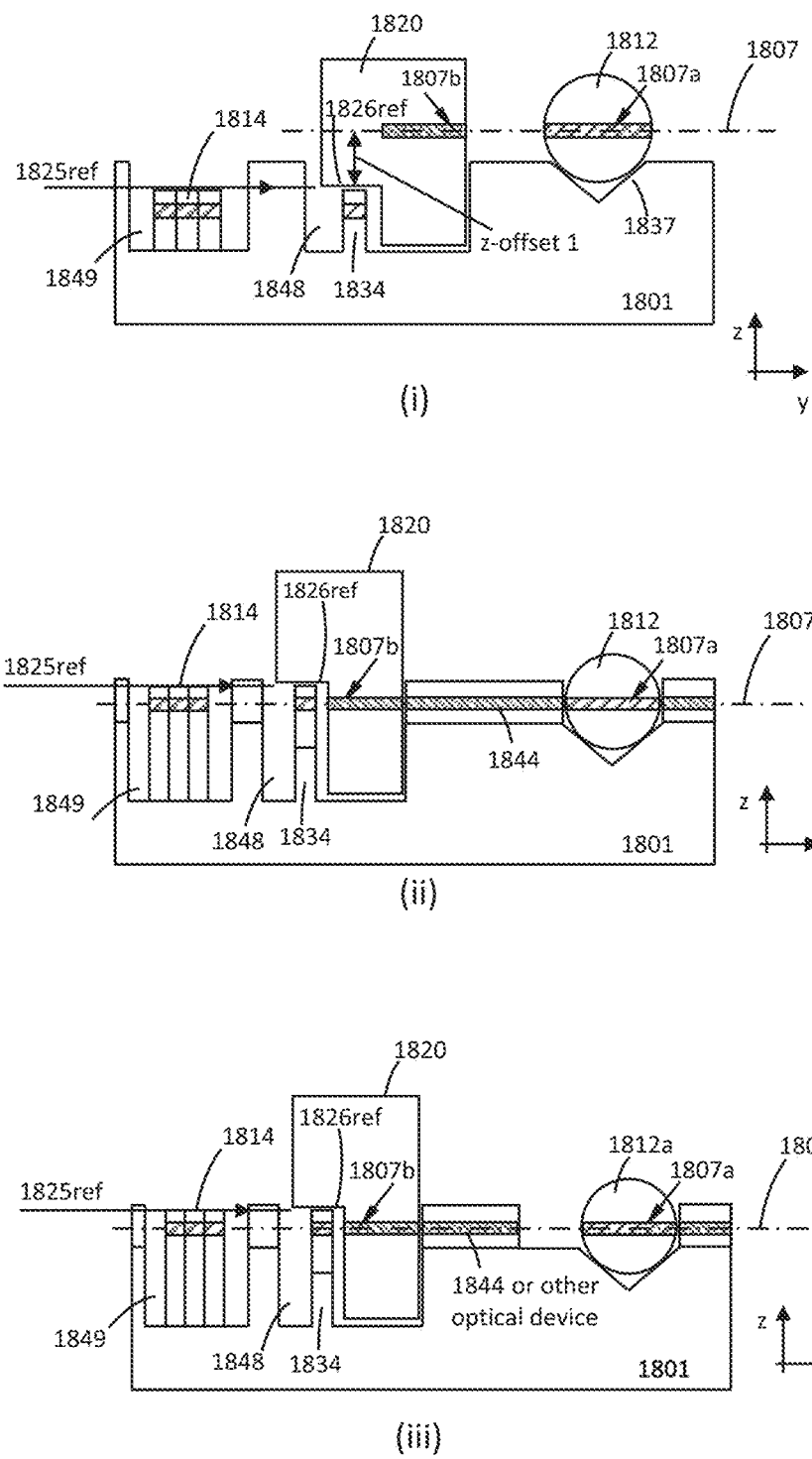

FIG. 18E. Two mounted optical devices shown with aligned optical signal planes for which one of the devices is a ball lens. Alignment aids to facilitate alignment include the co-formed z-pillars and fiducial. (i) co-formed z-pillars and fiducial are at a different height than the optical plane, (ii) co-formed z-pillar and fiducial are at the same height as the optical plane and shown with a planar waveguide also with aligned optical plane, and (iii) co-formed z-pillar and fiducial are at the same height as the optical plane and shown with a third device also with aligned optical plane.

Figure 19:
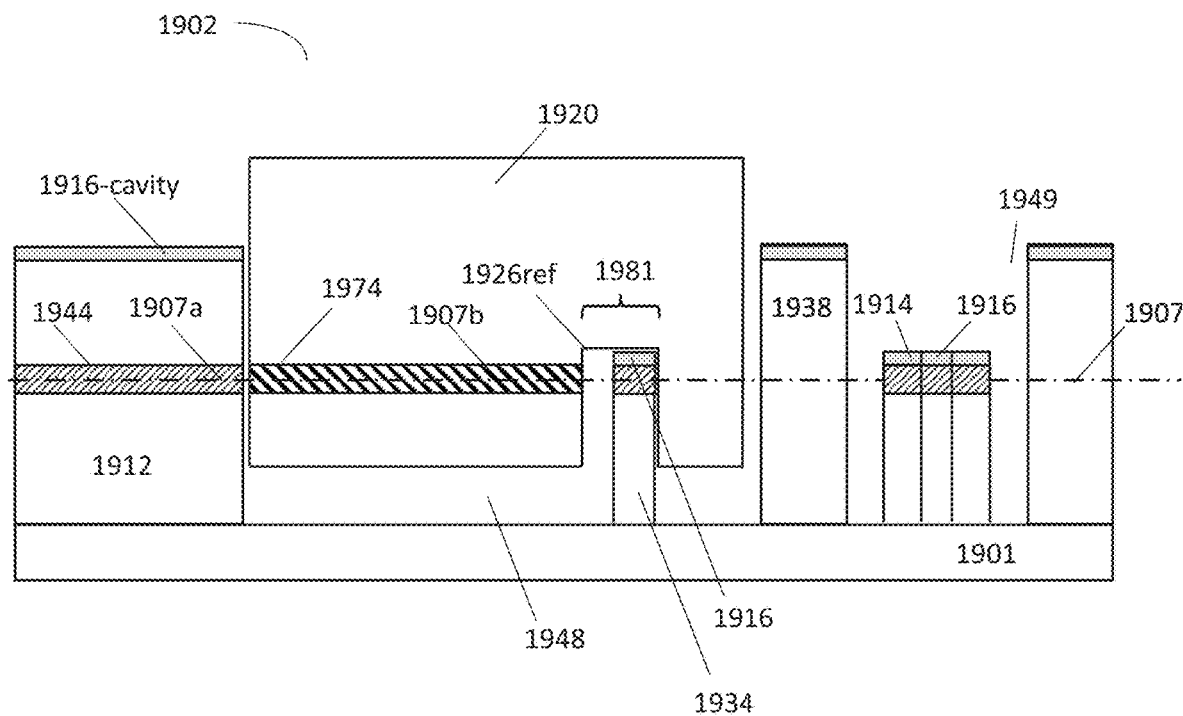

FIG. 19. Embodiment in which the z-pillar, a planar waveguide layer, and a fiducial are formed concurrently to provide z-alignment of the optical plane of two optical devices, namely, a mounted device and a waveguide in an interposer. Co-formation of the fiducial is used in this embodiment for precision placement and alignment in the lateral directions (x & y). Also shown is a lateral constraint feature in the mounted device to constrain movement in the lateral directions (x & y). The lateral constraint feature is a capturing feature.

Figure 20:
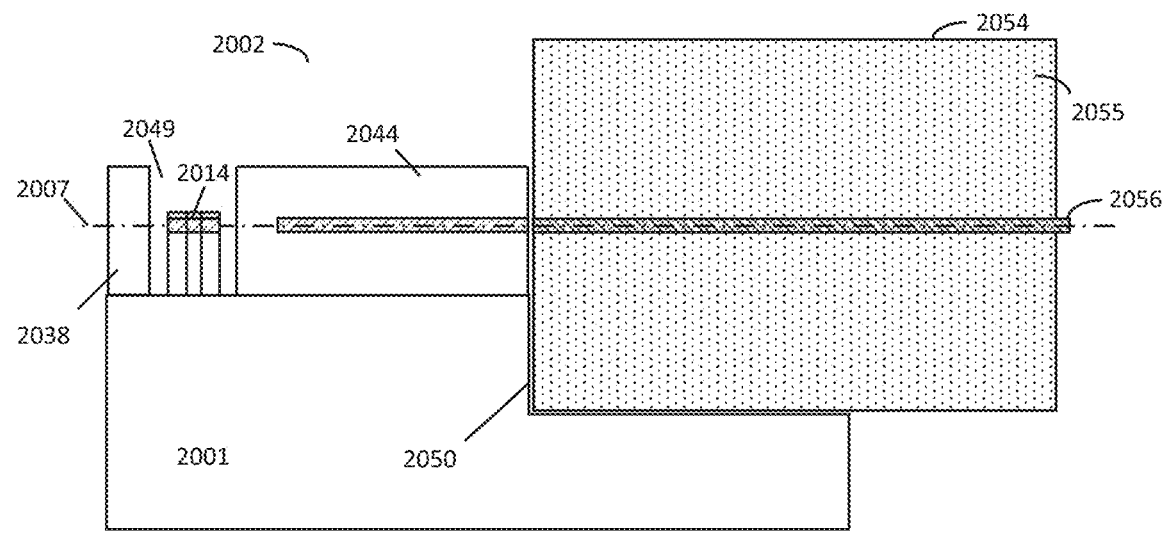
Figure 20:
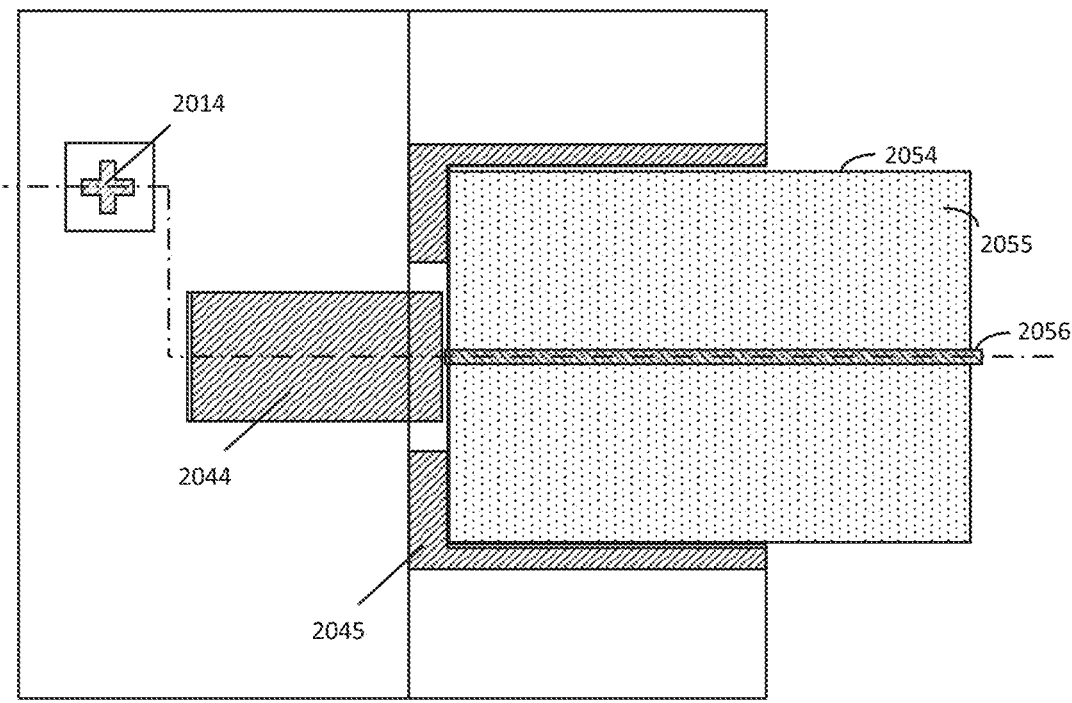

FIG. 20. (i) Section view and (ii) top-down view of an embodiment of an alignment aid co-formed with the fiducial and the planar waveguide layer for alignment of a v-groove for mounting a fiber optic cable to a PIC. The co-formation of the v-groove alignment aid provides lithographic level positioning accuracy between the v-groove and the planar waveguide to which the core of the fiber cable is aligned.

Figure 21:
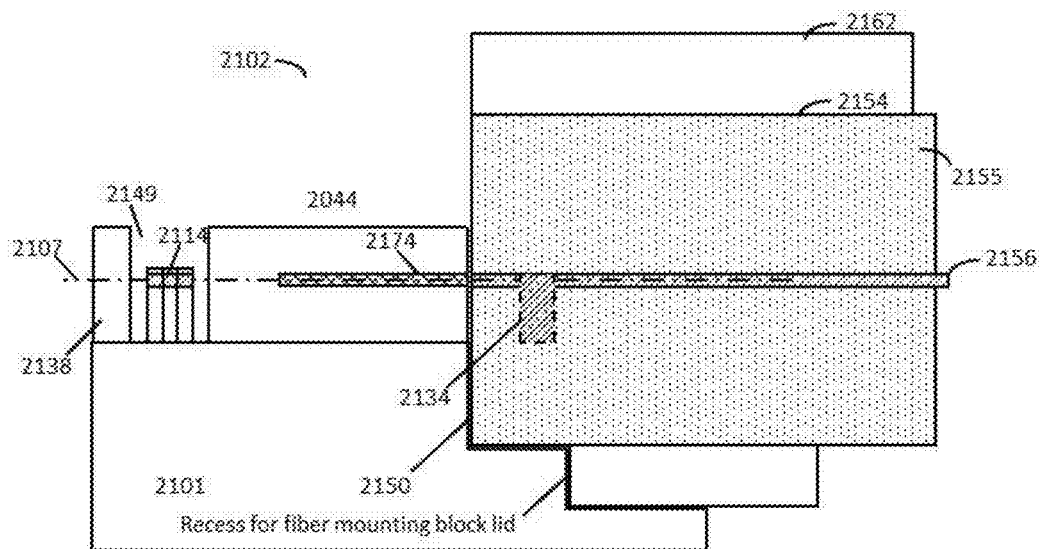
Figure 21:
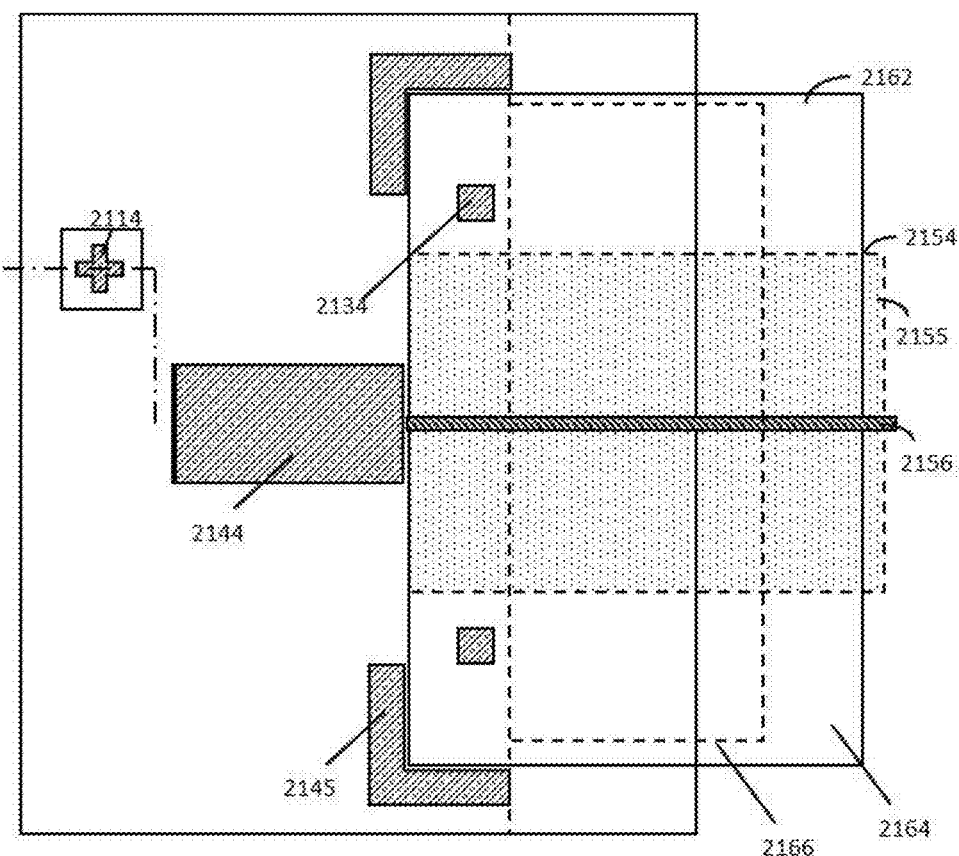

FIG. 21. Co-formed fiducial, z-pillars, planar waveguide, and alignment aid for an embodiment with a fiber optic cable mounting block. The co-formation of the fiber block alignment aid provides lithographic level positioning accuracy between the fiber block and the planar waveguide to which the core of the fiber cable is aligned. The z-pillars shown in the embodiment provide reference for the fiber mounting block.

Figure 22:
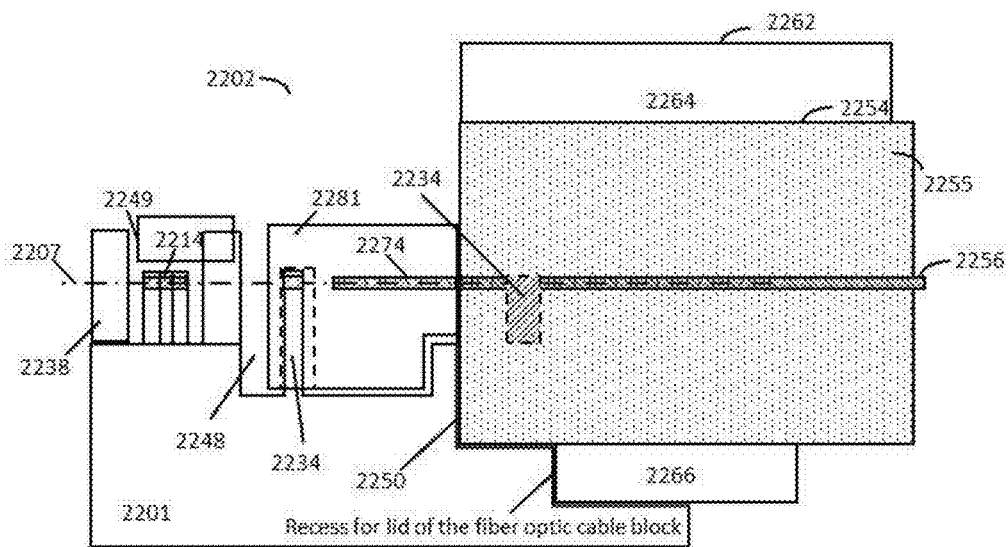
Figure 22:
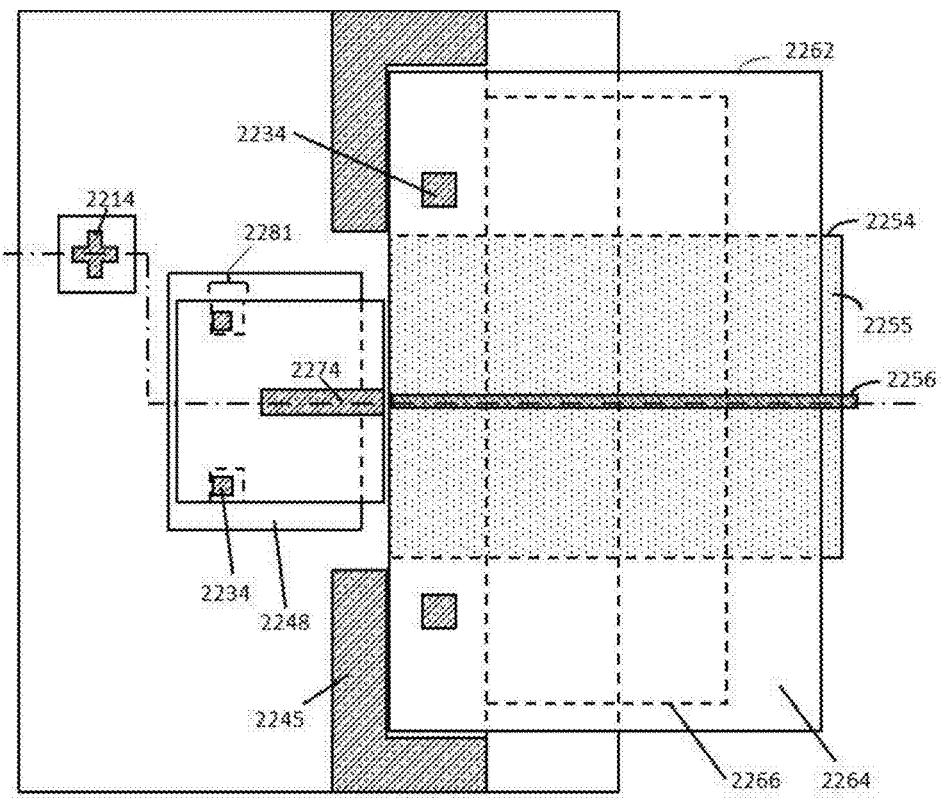

FIG. 22. Co-formed fiducial, z-pillars, and alignment aid for an embodiment with a fiber optic cable mounting block. Z-pillars shown in the embodiment provide reference for a mounted die and other z-pillars shown in the embodiment provide reference for the fiber mounting block. The co-formation of the fiber block alignment aid provides lithographic level positioning between the core of the fiber in the fiber mounting block and the optical axis of the mounted device.

Figure 23:
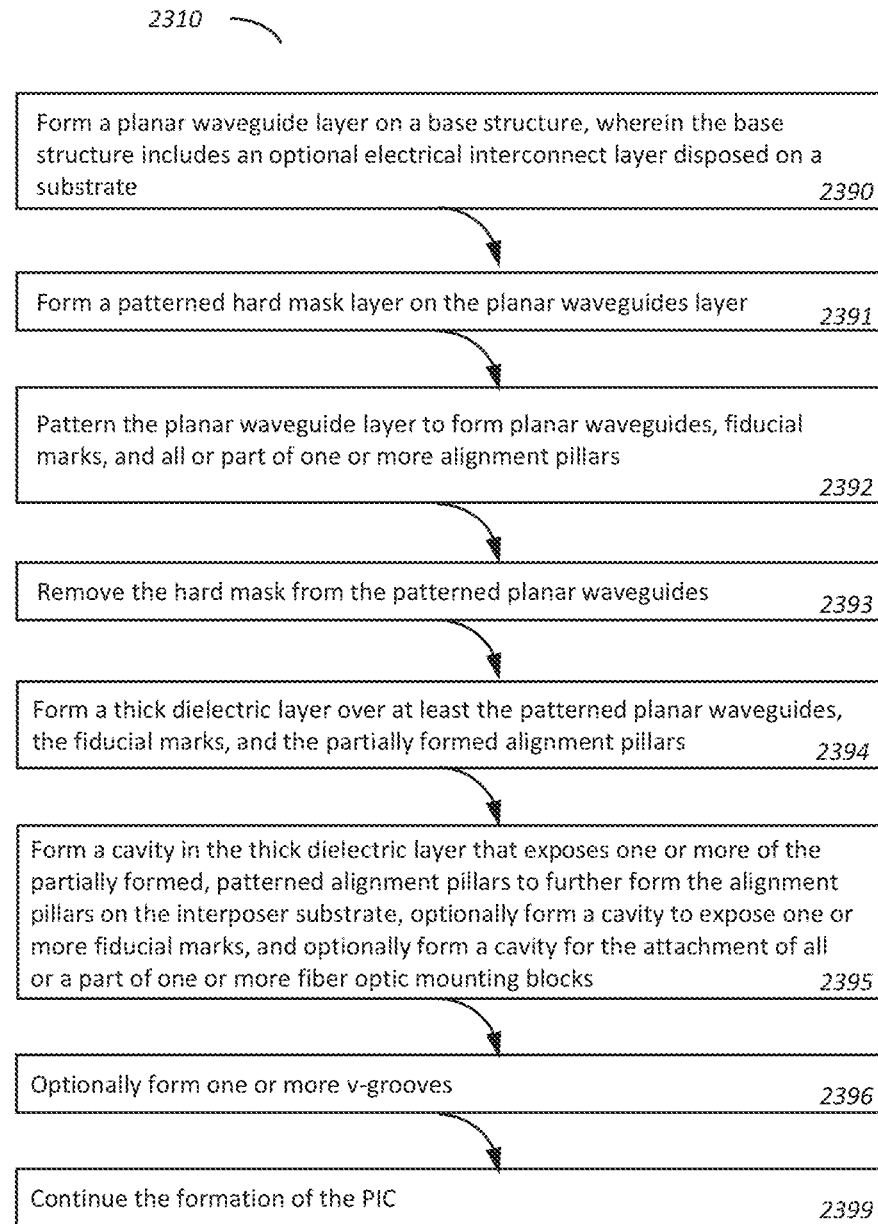

FIG. 23. Embodiment of a method for forming and utilizing patterned alignment features on interposer substrate with mounted device and that includes v-grooves that can be used in embodiments with and without a fiber optic mounting block.

Figure 24A:
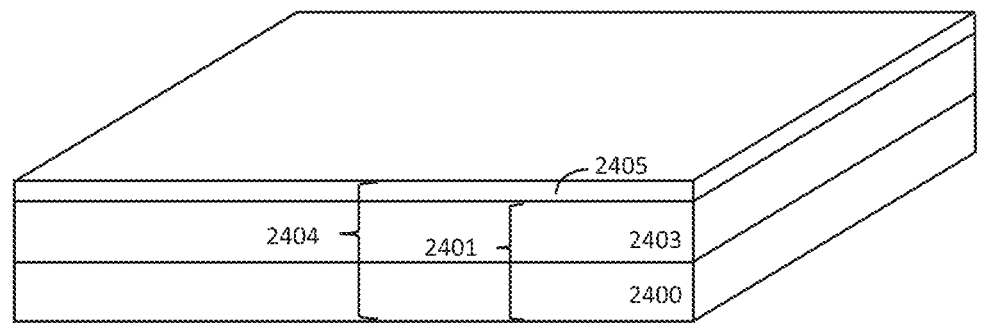

FIG. 24A. Embodiment of a step of forming an interposer substrate.

Figure 24B:
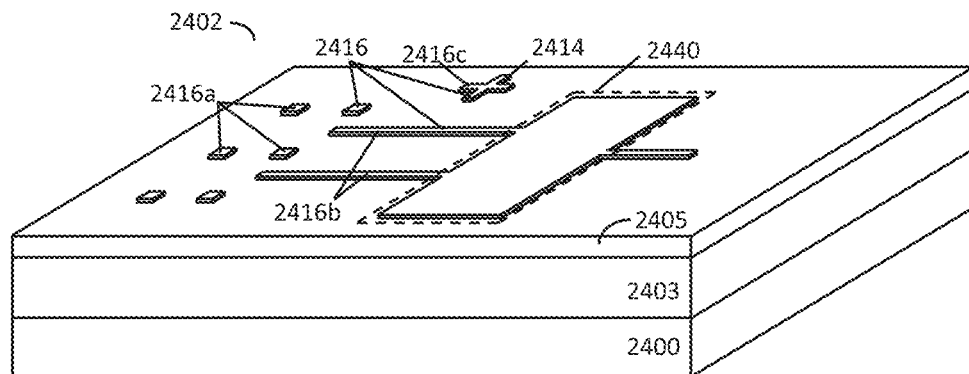

FIG. 24B. Embodiment of a step of forming a patterned hard mask for the formation of planar waveguides, fiducial marks, and pillars on an interposer structure.

Figure 24C:
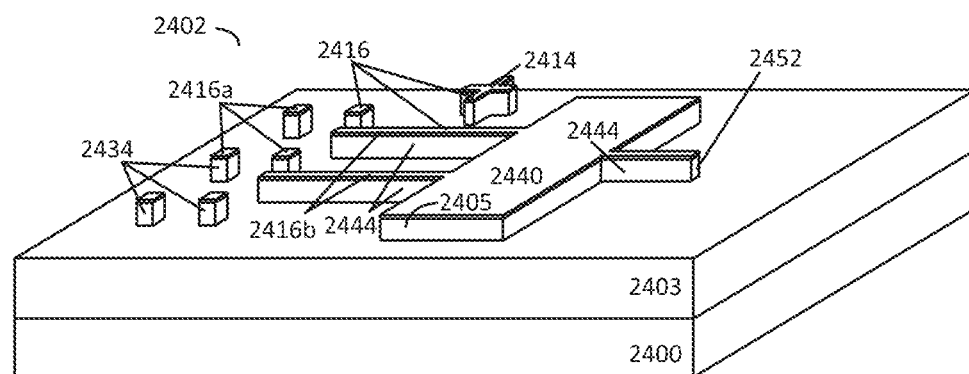

FIG. 24C. Embodiment of a step of patterning planar waveguides, fiducial marks, v-groove alignment aids, and pillars on an interposer structure.

Figure 24D:
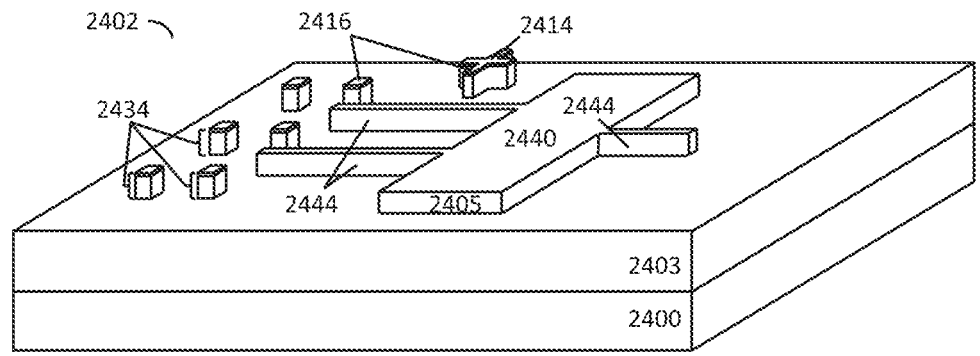

FIG. 24D. Embodiment of a step of removing a hard mask layer from the planar waveguides and optionally from features in the optical device.

Figure 24E:
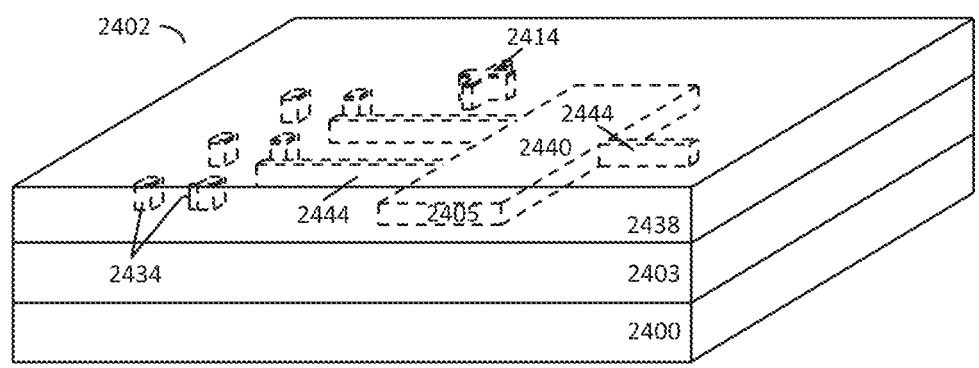

FIG. 24E. Embodiment of a step of forming an insulating layer.

Figure 24F:
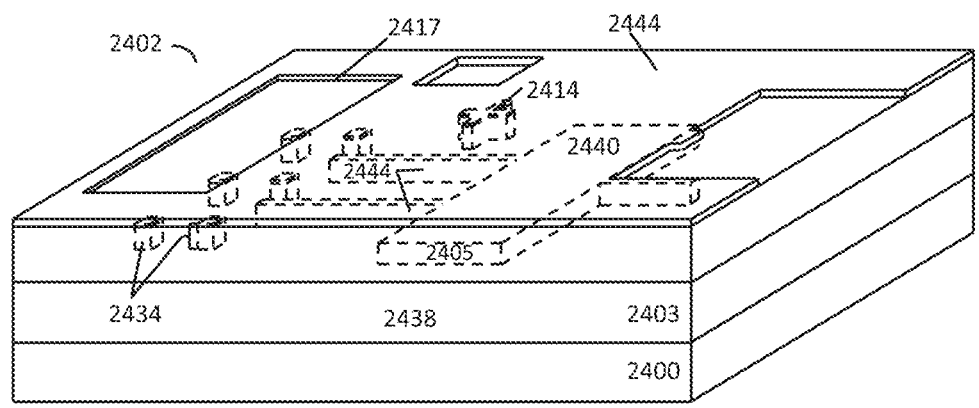

FIG. 24F. Embodiment of a step of forming a patterned hard mask to facilitate the formation of cavities with z-pillars for the mounted die, the fiducials, and the fiber cable mounting block.

Figure 24G:
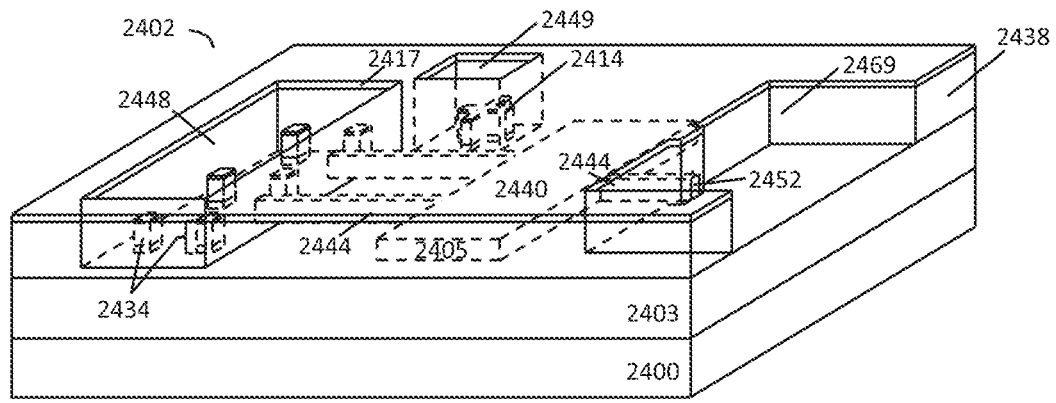

FIG. 24G. Embodiment of a step of forming cavities for mounted devices, for fiducial, and for fiber optic cable mounting block.

Figure 24H:
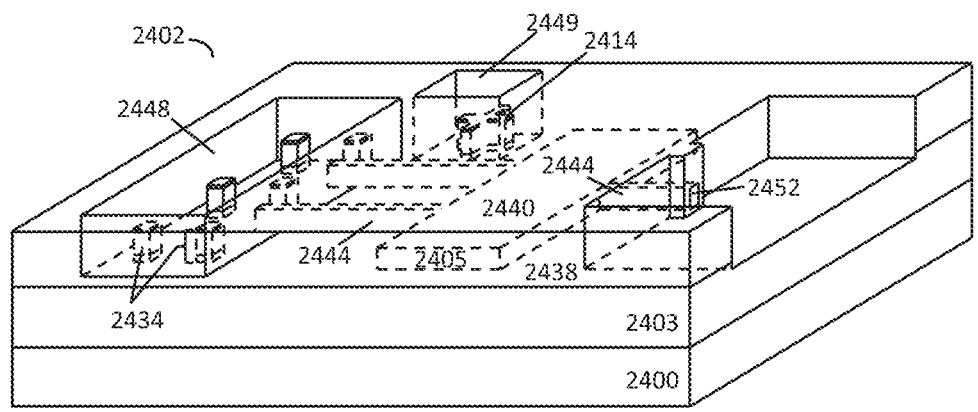

FIG. 24H. Embodiment of a step of removing hard mask after formation of the cavities.

Figure 24I:
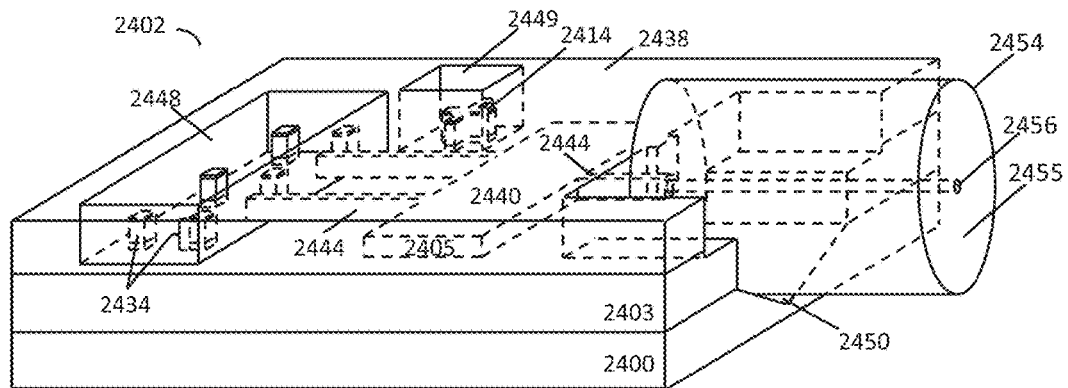

FIG. 24I. Embodiment of a step of forming a v-groove on the interposer. (Figure shows a portion of a fiber optic cable positioned in the formed v-groove.)

Figure 24J:
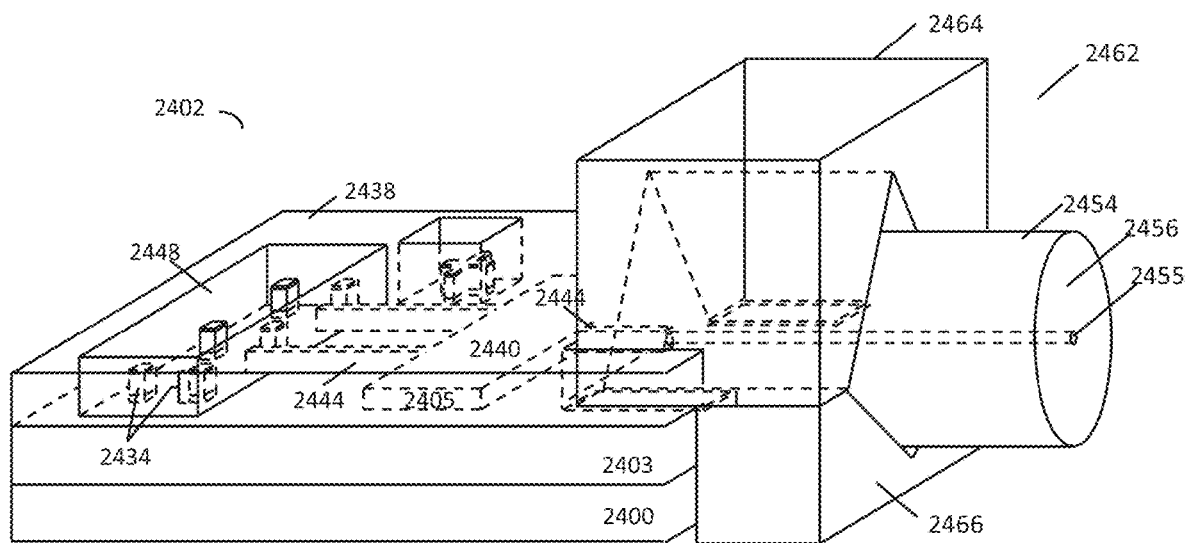

FIG. 24J. Perspective view of an embodiment that includes a portion of a fiber optic cable mounted in a fiber optic cable mounting block and with fiber optic cable mounting block positioned on the PIC.

Figure 25:
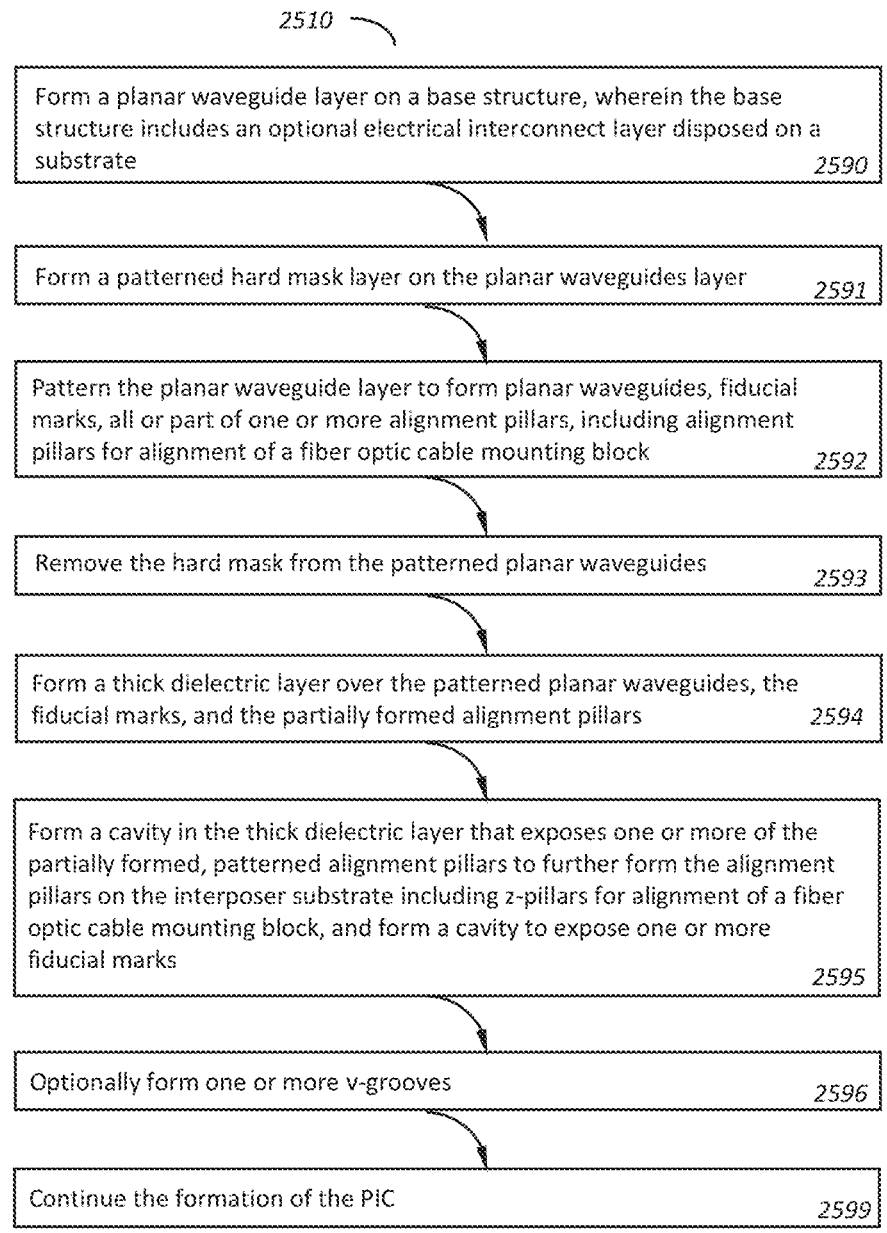

FIG. 25. An embodiment of a method for forming and utilizing patterned alignment features on an interposer substrate with mounted device and with fiber optic mounting block. In these embodiments, z-pillar alignment features are formed on the interposer for alignment of the core of the fiber optic cable in the fiber mounting block to waveguides or other optical devices on the interposer.

Figure 26A:
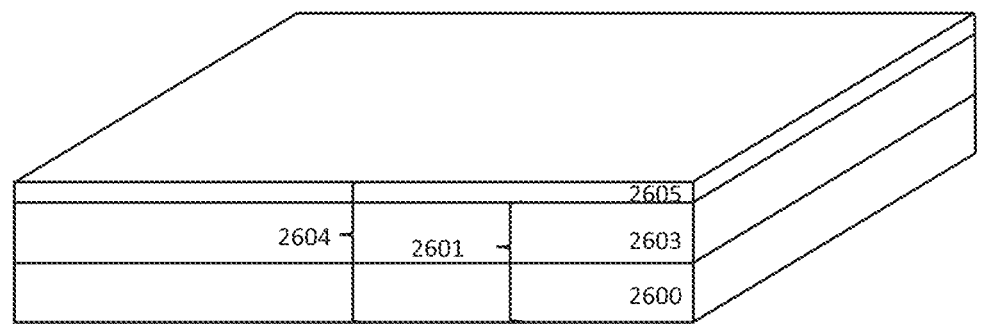

FIG. 26A. Embodiment of a step of forming an interposer substrate.

Figure 26B:
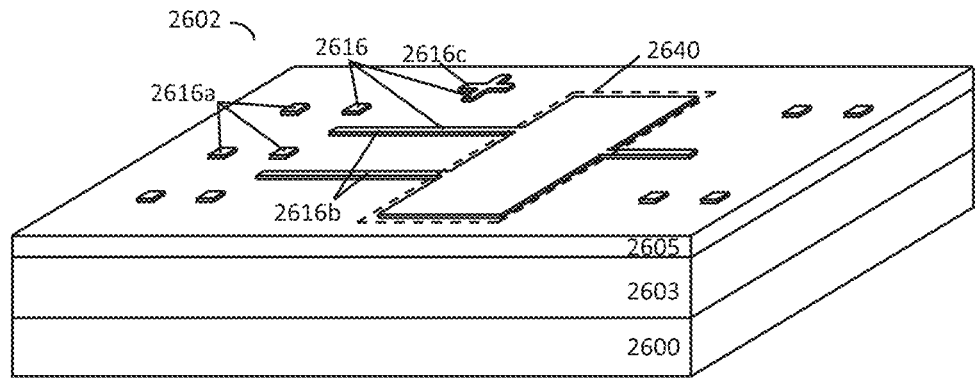

FIG. 26B. Embodiment of a step of forming a patterned hard mask for the formation of planar waveguides, fiducial marks, z-pillars for die mounting and alignment, and z-pillars for fiber block mounting and alignment on an interposer structure.

Figure 26C:
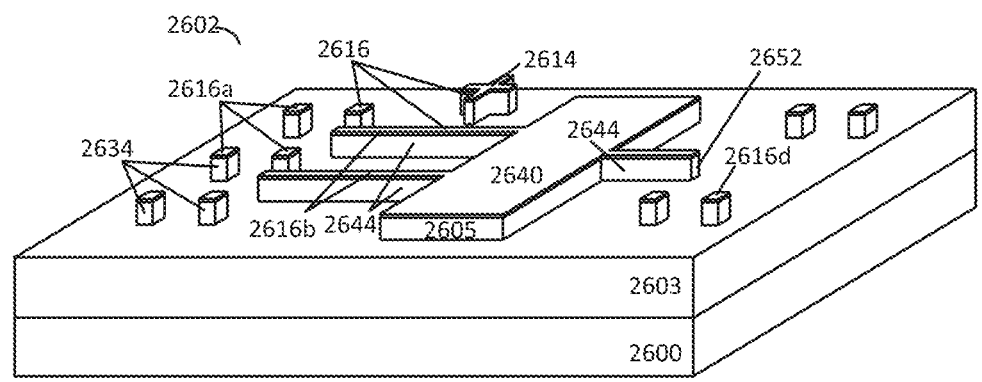

FIG. 26C. Embodiment of a step of patterning the planar waveguides, fiducial marks, z-pillars for the die mounting, and z-pillars for the fiber block mounting on an interposer structure.

Figure 26D:
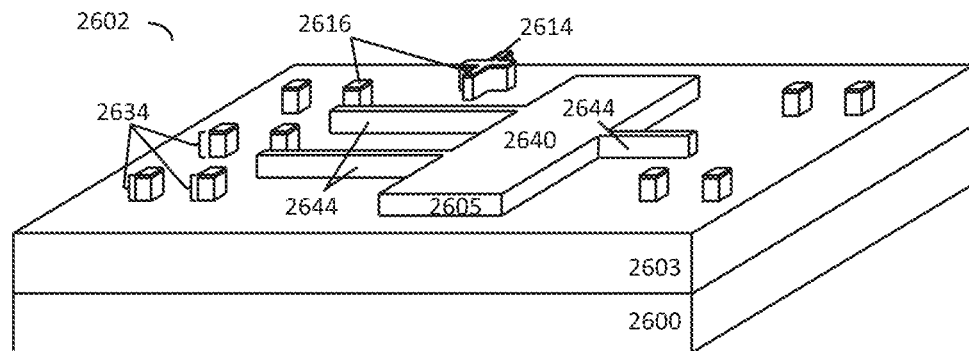

FIG. 26D. Embodiment of a step of removing the hard mask layer from the planar waveguides and optionally from features in the optical device.

Figure 26E:
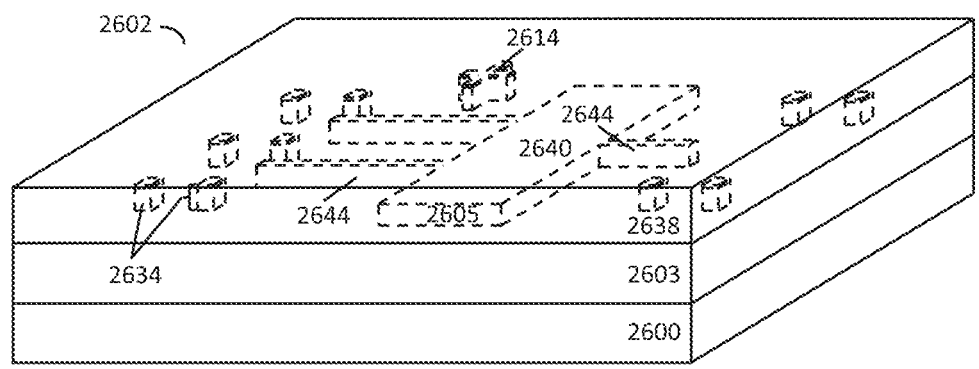

FIG. 26E. Embodiment of a step of forming an insulating layer.

Figure 26F:
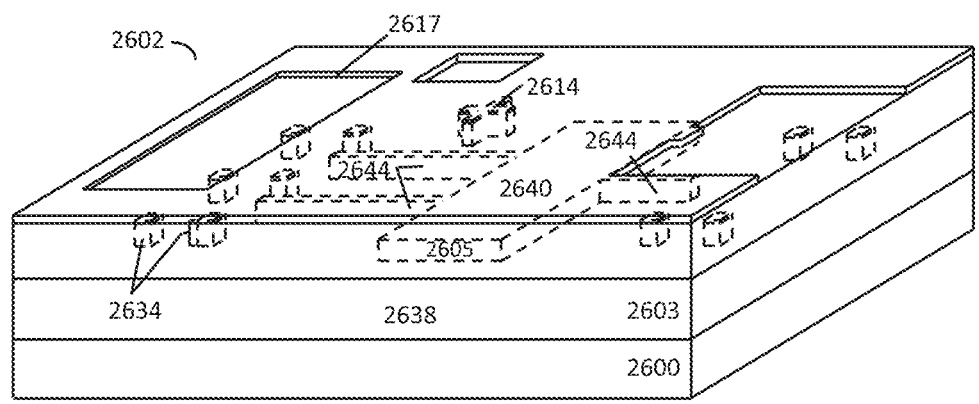

FIG. 26F. Embodiment of a step of forming a patterned hard mask for the formation of cavities with z-pillars for the mounted die and for exposing the z-pillars for mounting and alignment of the fiber cable mounting block.

Figure 26G:
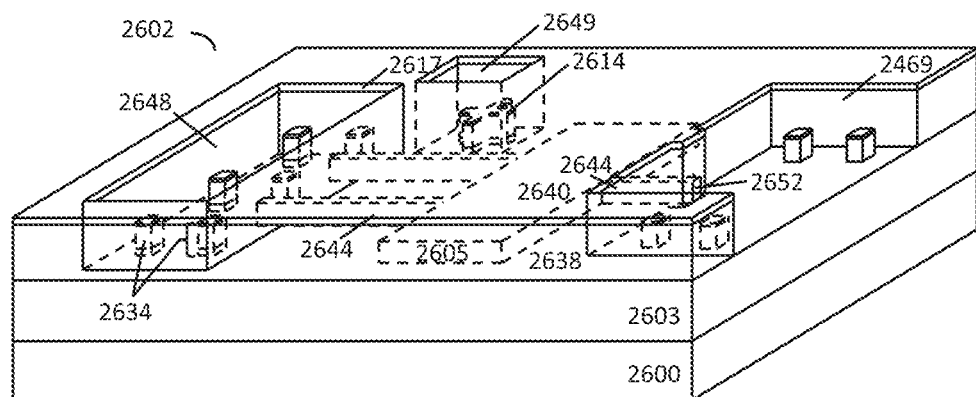

FIG. 26G. Embodiment of the step of forming cavities with z-pillars, cavities for the fiducials, and for exposing the z-pillars for mounting and alignment of the fiber cable mounting block.

Figure 26H:
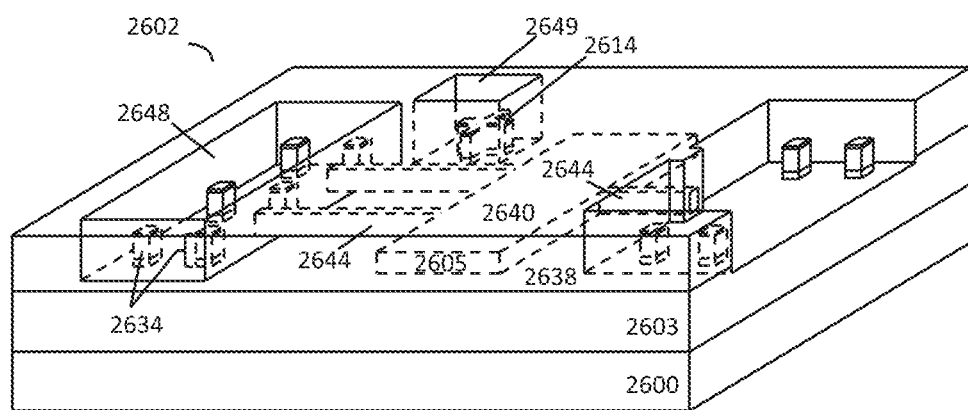

FIG. 26H. Embodiment of the step of removing the hard mask after formation of the cavities.

Figure 26I:
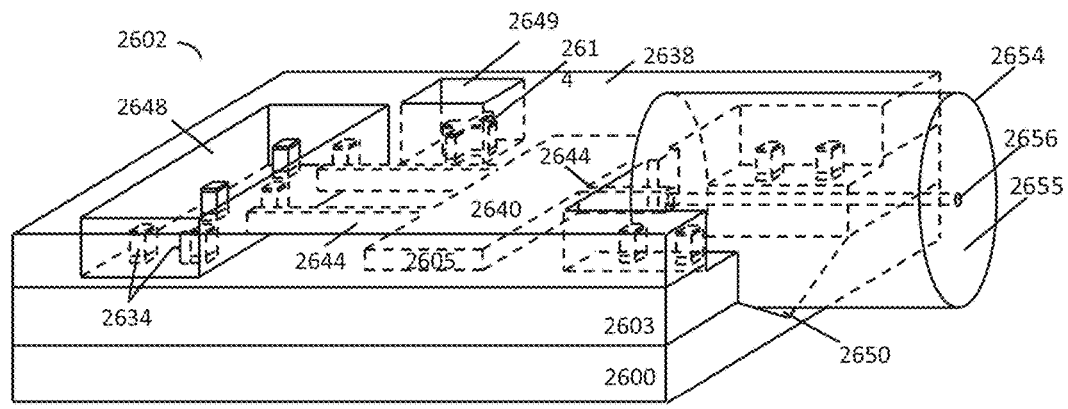

FIG. 26I. Perspective view of an embodiment of an interposer formed with z-pillar alignment aids in proximity to a v-groove shown with a portion of fiber optic cable placed in the v-groove but without the fiber mounting block.

Figure 26J:
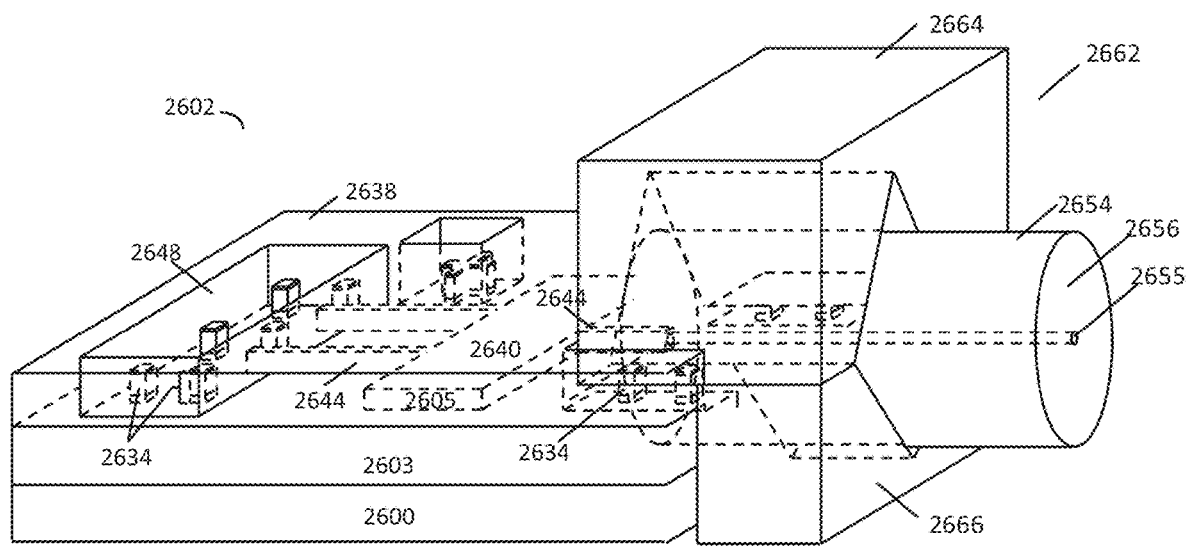

FIG. 26J. Perspective view of an embodiment of an interposer with a portion of fiber optic cable mounted in a fiber optic cable mounting block and with fiber optic cable mounting block positioned on the interposer with the core of the mounted fiber optic cable in alignment with a planar waveguide formed in the planar waveguide layer of the interposer structure.

Figure 26K:
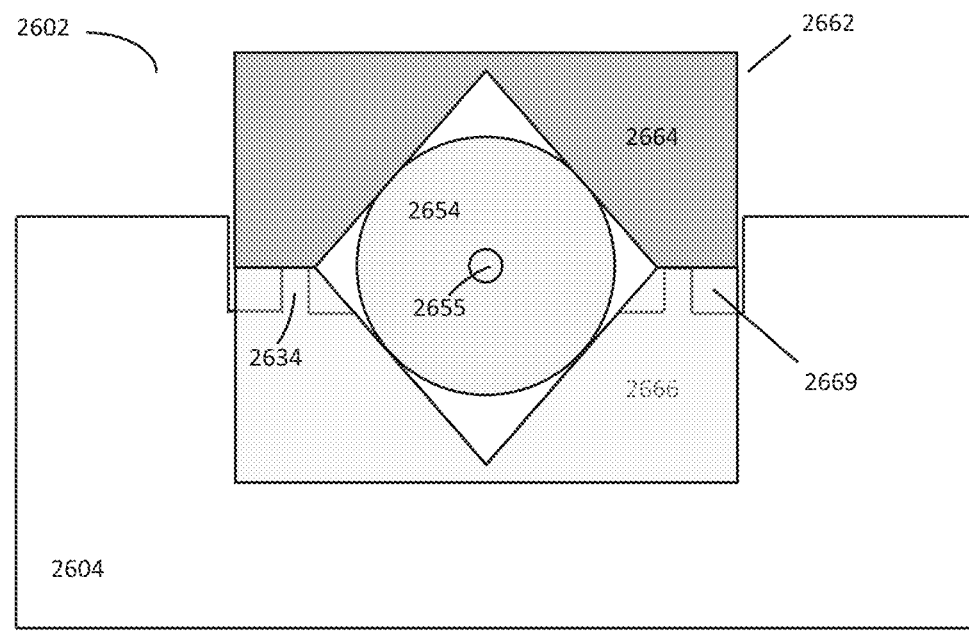
Figure 26K:
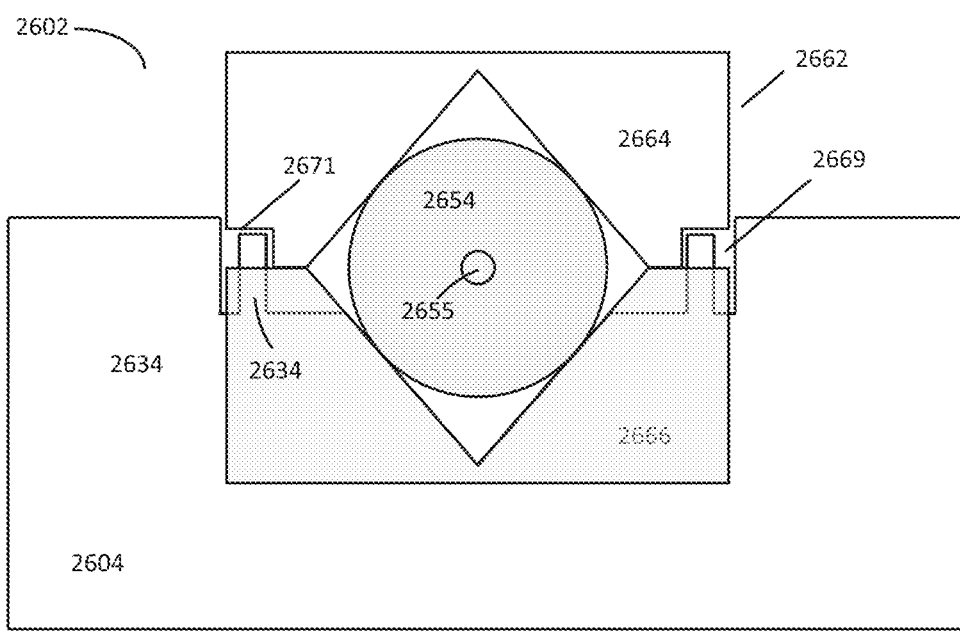

FIG. 26K. End view of a fiber optic cable mounting block on an interposer with embodiments of z-pillar alignment aids: (i) z-pillar used for alignment in z-direction, and (ii) z-pillar configured for alignment in the z-direction and the lateral x-direction.

Figure 27:
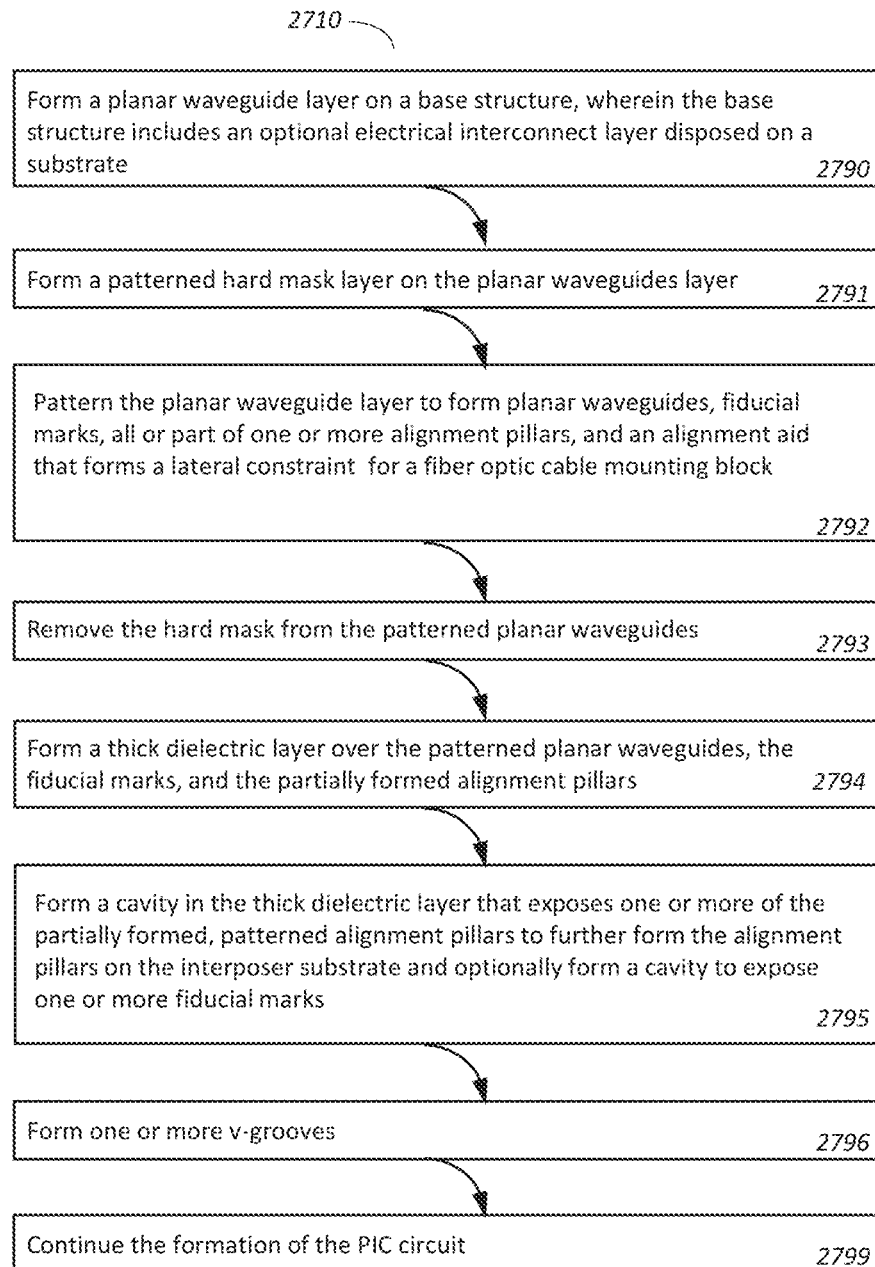

FIG. 27. Embodiment of a method for forming and utilizing patterned alignment features on interposer substrate with mounted device and with fiber optic mounting block that includes an alignment aid used to position the v-groove formed from the planar waveguide layer.

Figure 28A:
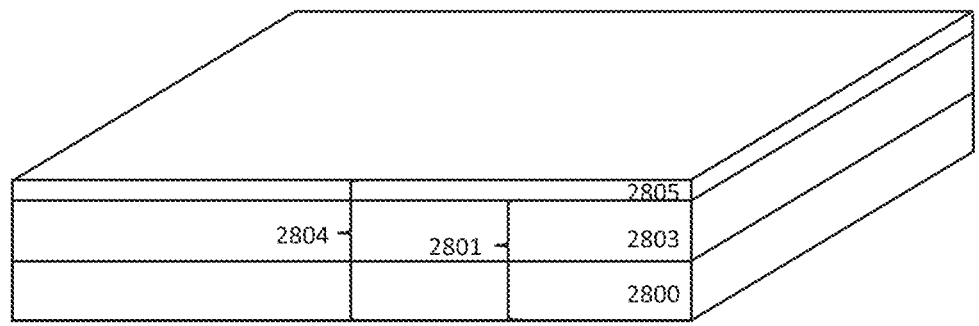

FIG. 28A. Embodiment of a step of forming an interposer substrate.

Figure 28B:
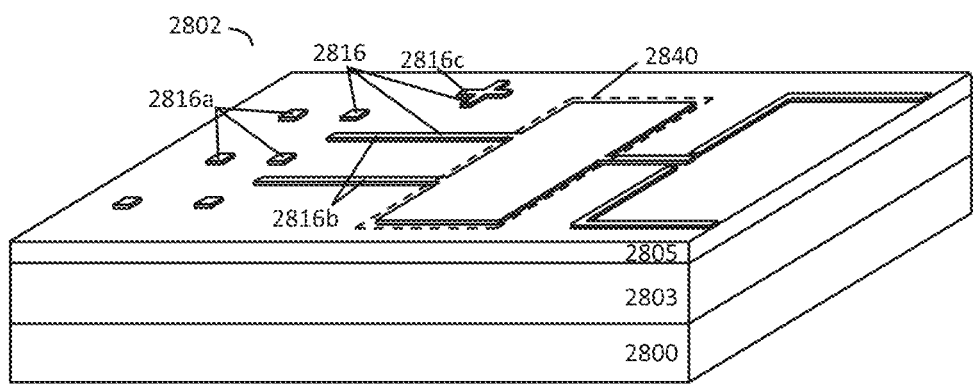

FIG. 28B. Embodiment of a step of forming a patterned hard mask for the formation of planar waveguides, fiducial marks, z-pillars, and lateral alignment aids for a fiber optic mounting block on an interposer structure.

Figure 28C:
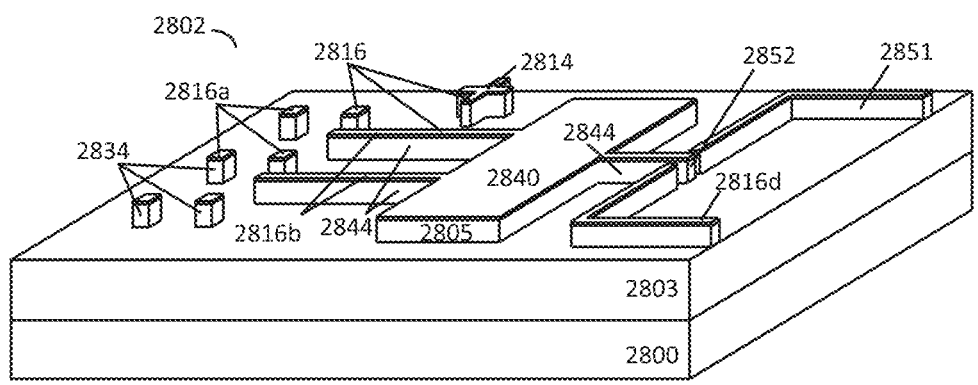

FIG. 28C. Embodiment of a step of patterning the planar waveguides, fiducial marks, z-pillars, and lateral alignment aids for a fiber optic mounting block on an interposer structure.

Figure 28D:
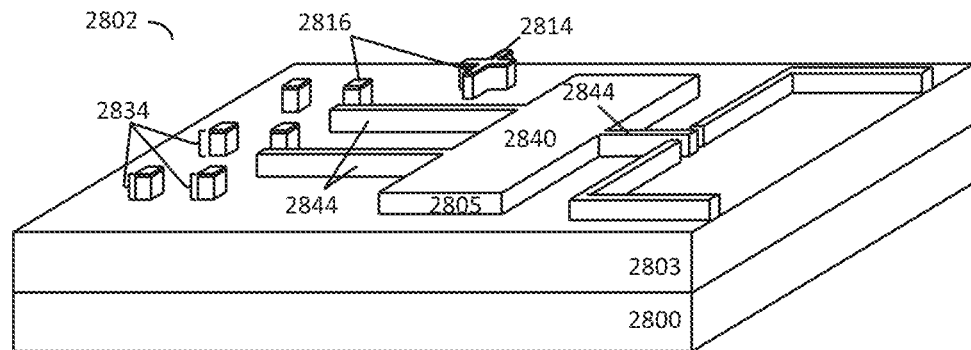

FIG. 28D. Embodiment of a step of removing the hard mask layer from the planar waveguides and optionally from other features in the optical device.

Figure 28E:
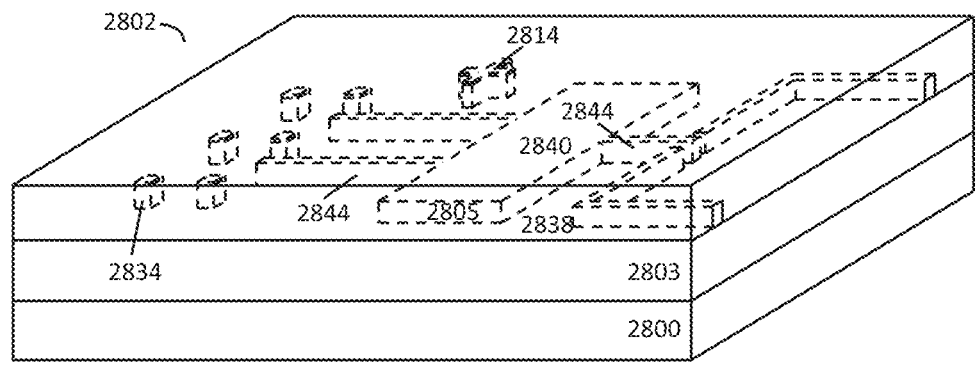

FIG. 28E. Embodiment of a step of forming an insulating layer.

Figure 28F:
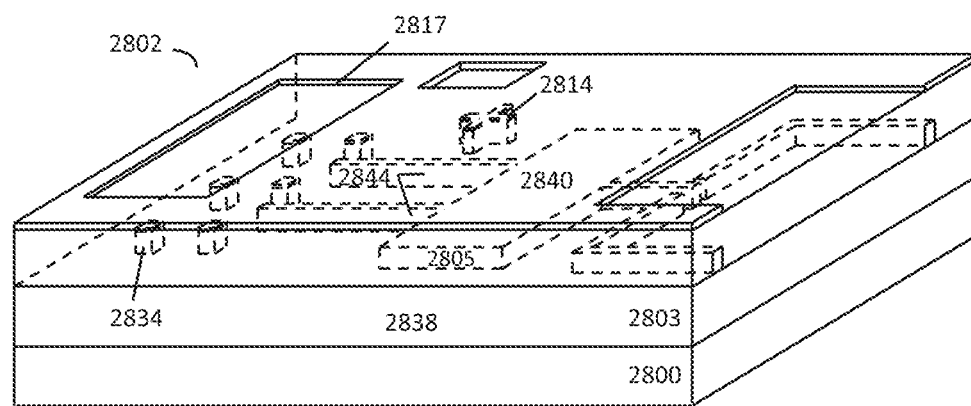

FIG. 28F. Embodiment of a step of forming a patterned hard mask for the formation of a cavity with z-pillars and the fiber mounting block alignment aids.

Figure 28G:
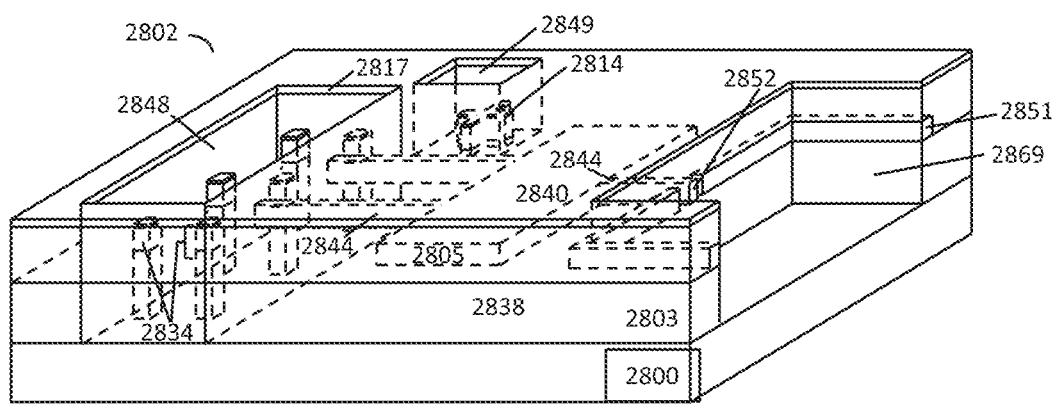

FIG. 28G. Embodiment of a step of forming cavities for the z-pillars, the fiducials, and for the fiber mounting block.

Figure 28H:
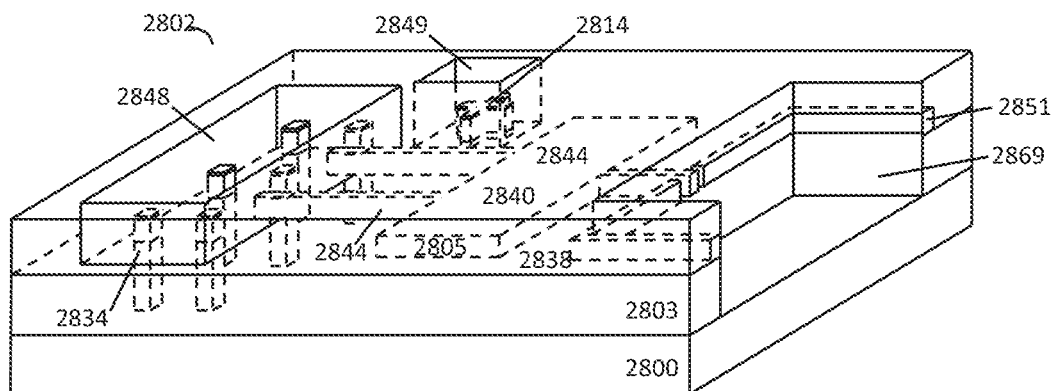

FIG. 28H. Embodiment of a step of removing the hard mask after formation of the cavities.

Figure 28I:
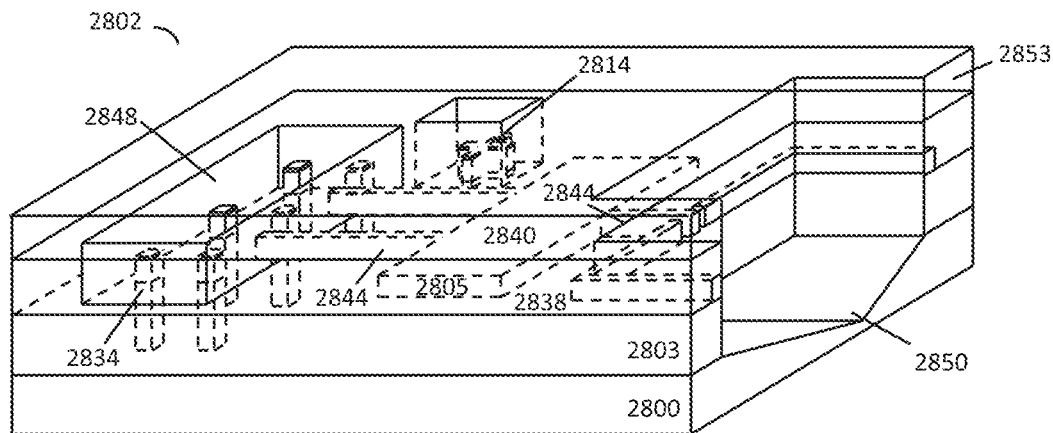

FIG. 28I. Embodiment of a step of forming a mask layer to facilitate formation of one or more optional v-grooves.

Figure 28J:
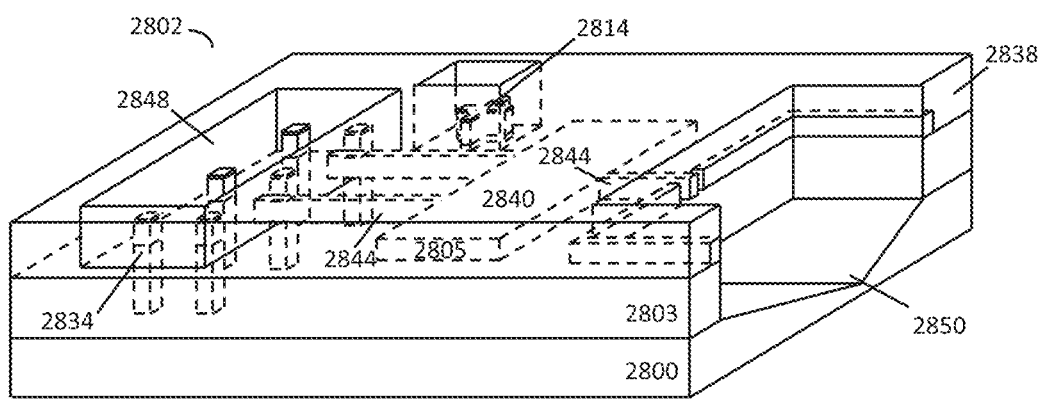

FIG. 28J. Embodiment of a step of removing the mask layer used to facilitate formation of one or more optional v-grooves.

Figure 28K:
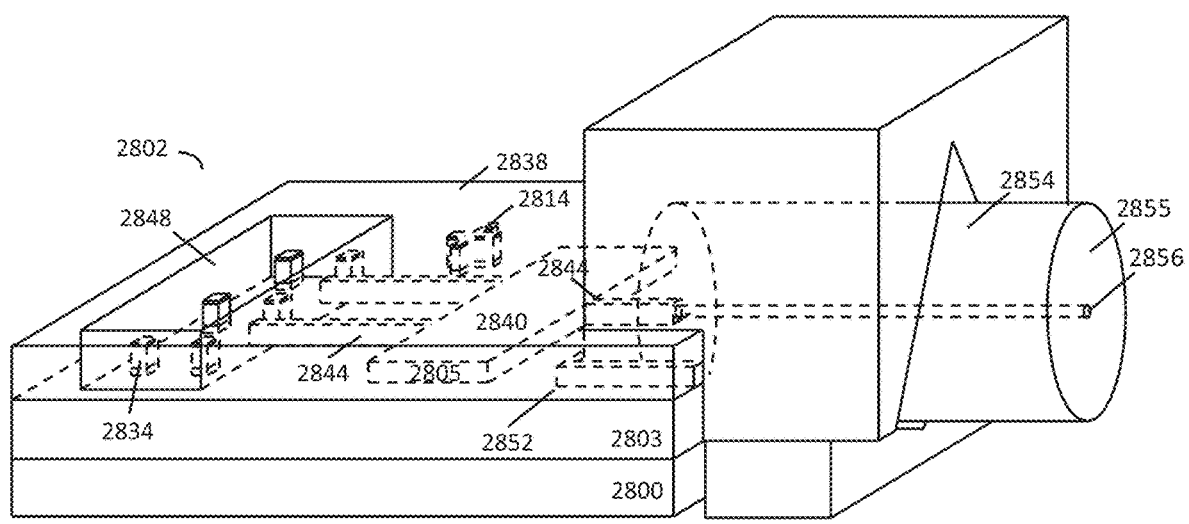

FIG. 28K. Perspective view of an embodiment of an interposer with a mounted portion of fiber cable in a fiber mounting block.

Figure 29A:
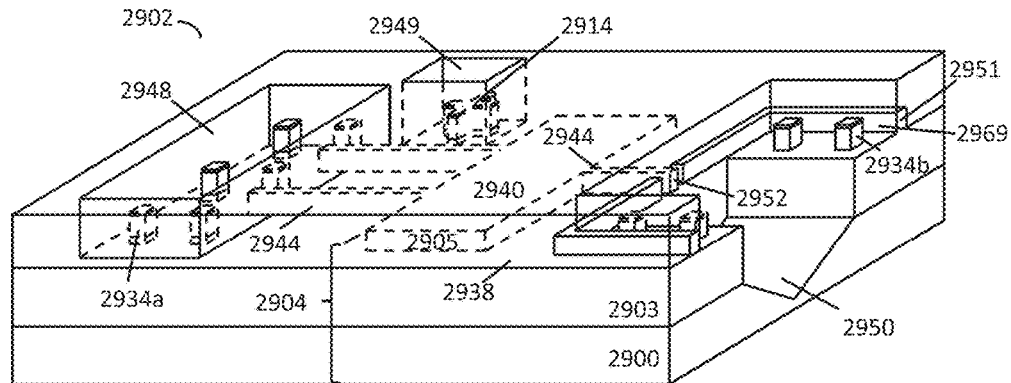

FIG. 29A. Another embodiment of an interposer formed with z-pillars, fiducials and planar waveguides formed from a hard mask layer and that includes a combination of z-pillars and lateral alignment aids for alignment of the mounting block. The z-pillars and lateral alignment aids are formed from the planar waveguide layer for alignment of the core of a fiber optic cable mounted in the fiber optic cable mounting block with waveguides or other optical devices formed on the interposer.

Figure 29B:
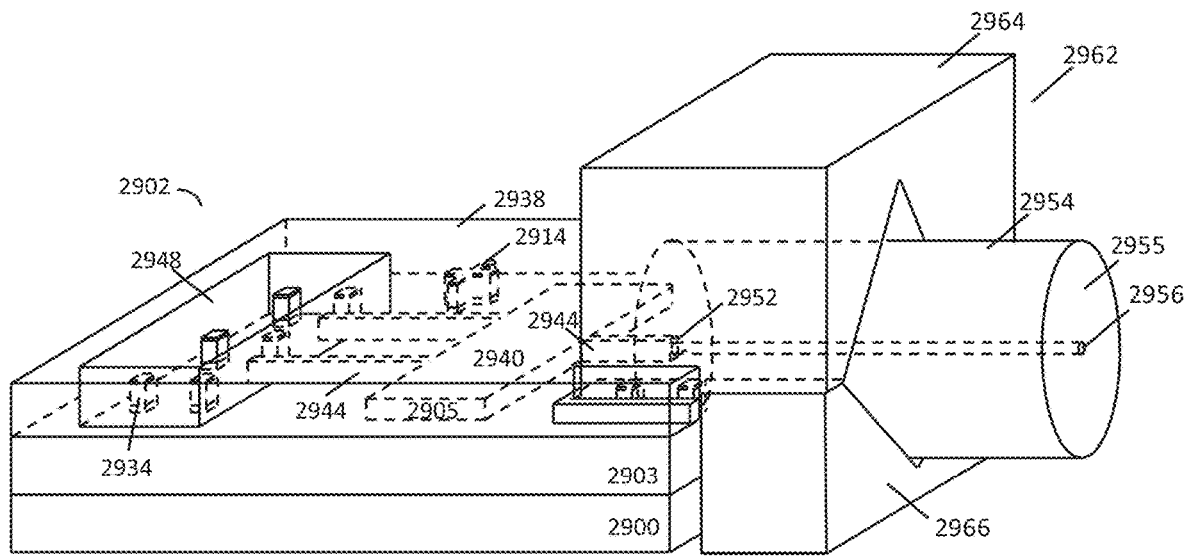

FIG. 29B. Embodiment of an interposer with z-pillars and alignment aid formed from the planar waveguide layer to support the alignment of a fiber optic cable mounting block shown with the fiber optic cable mounting block.

Figure 30A:
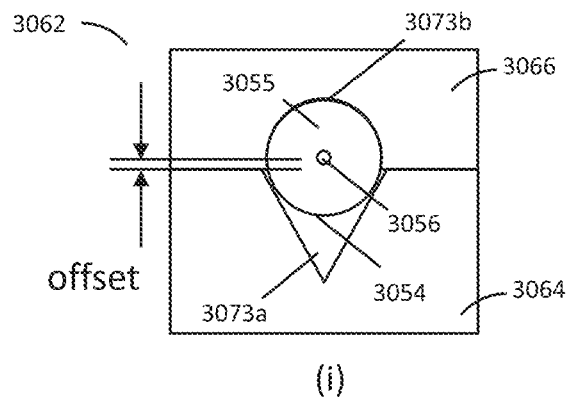
Figure 30A:
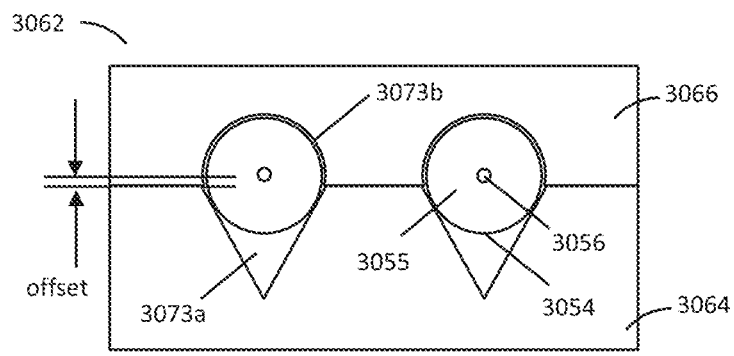
Figure 30A:
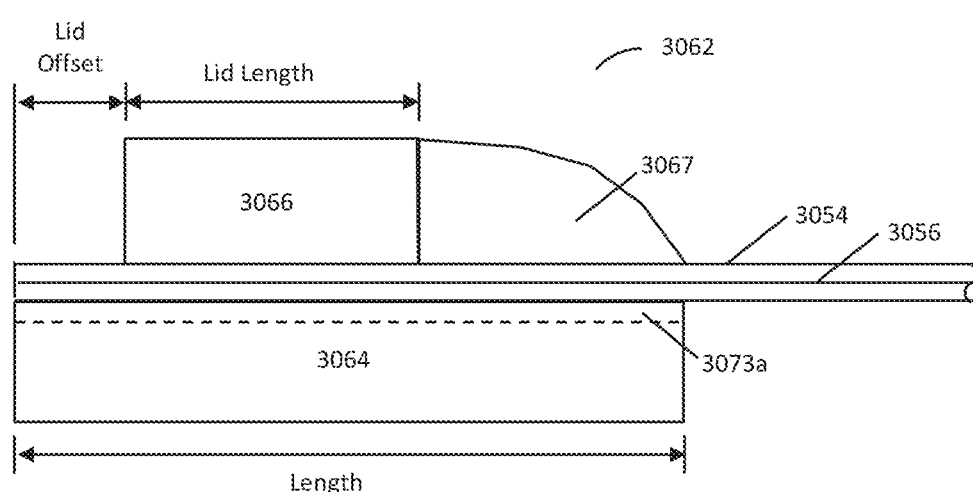

FIG. 30A. Examples of fiber optic cable mounting blocks: (i) end view with a single fiber optic cable, (ii) end view with two fiber optic cables, and (iii) cross section along centerline of a portion of a mounted fiber optic cable.

Figure 30B:
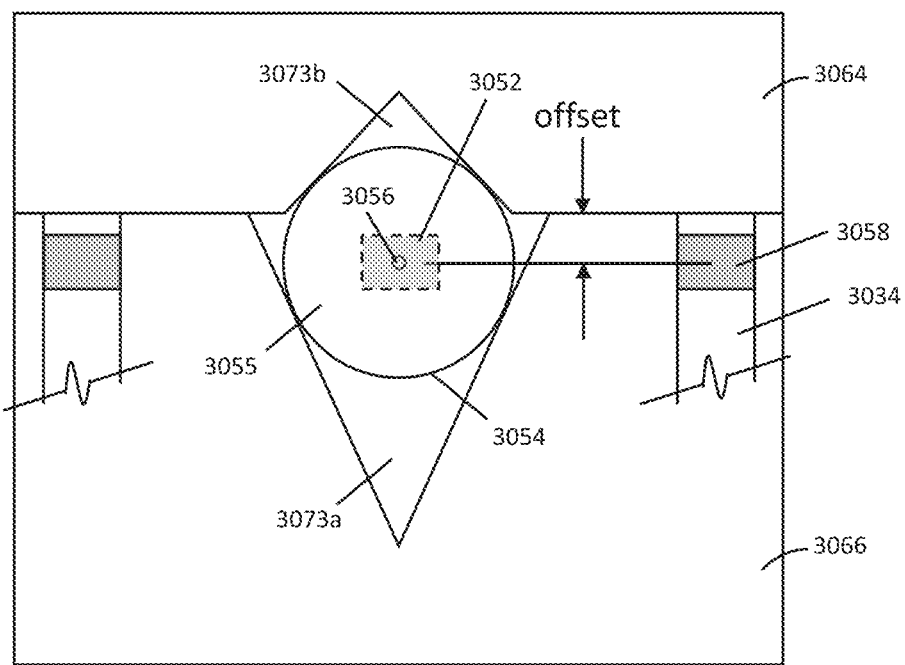

FIG. 30B. Another example of a fiber optic cable mounting block shown in cross section through a single fiber optic cable. The core of the fiber is shown in alignment with a waveguide formed from the planar waveguide layer of the interposer. Portions of z-pillar alignment structures are also shown.

Figure 30C:
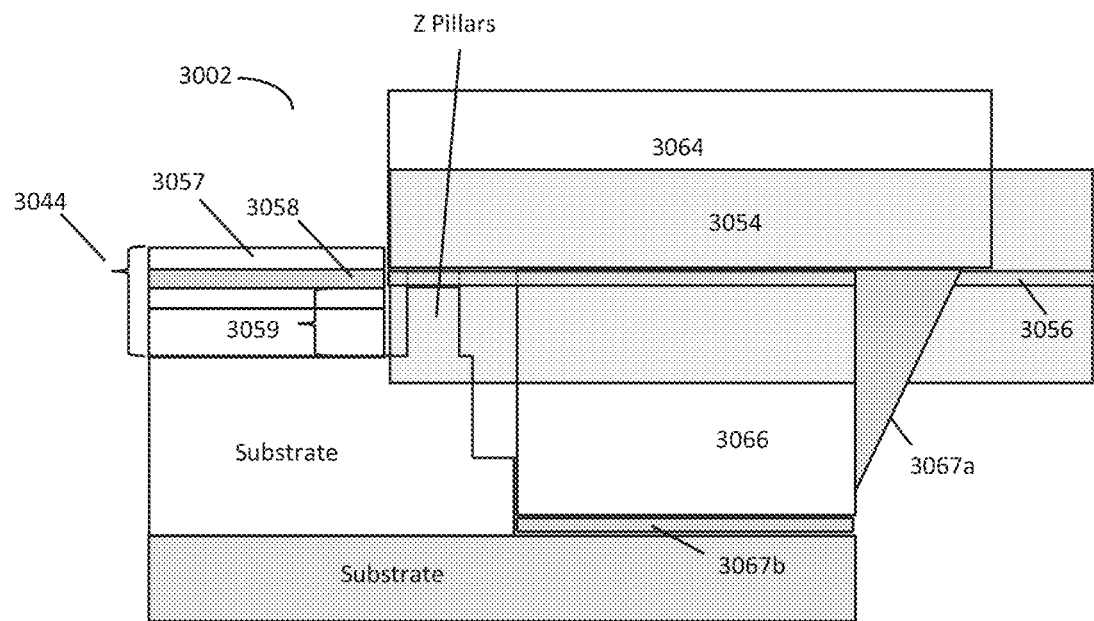
Figure 30C:
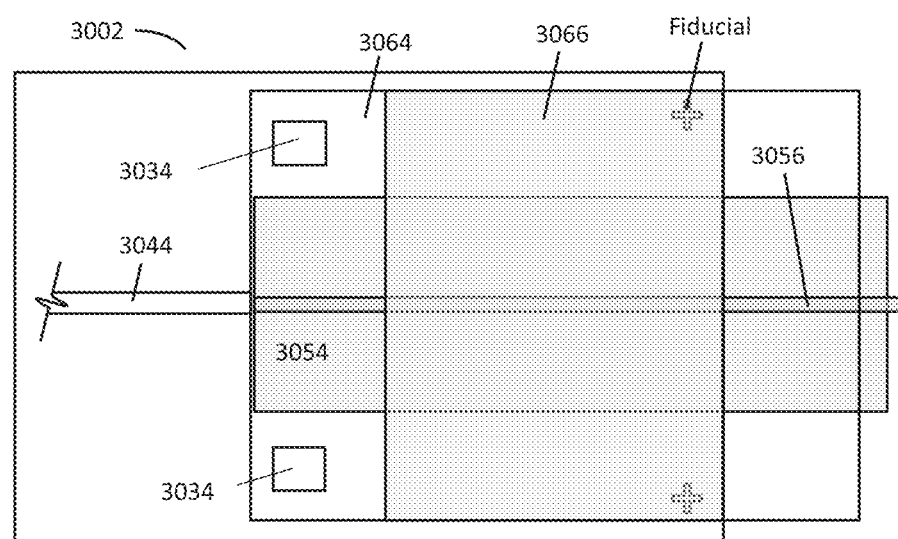

FIG. 30C. (i) Side view and (ii) Top-down view of an embodiment of a fiber optic mounting block on an interposer. Top-down view shows positioning of the z-pillars adjacent to fiber optic cable.

Figure 30D:
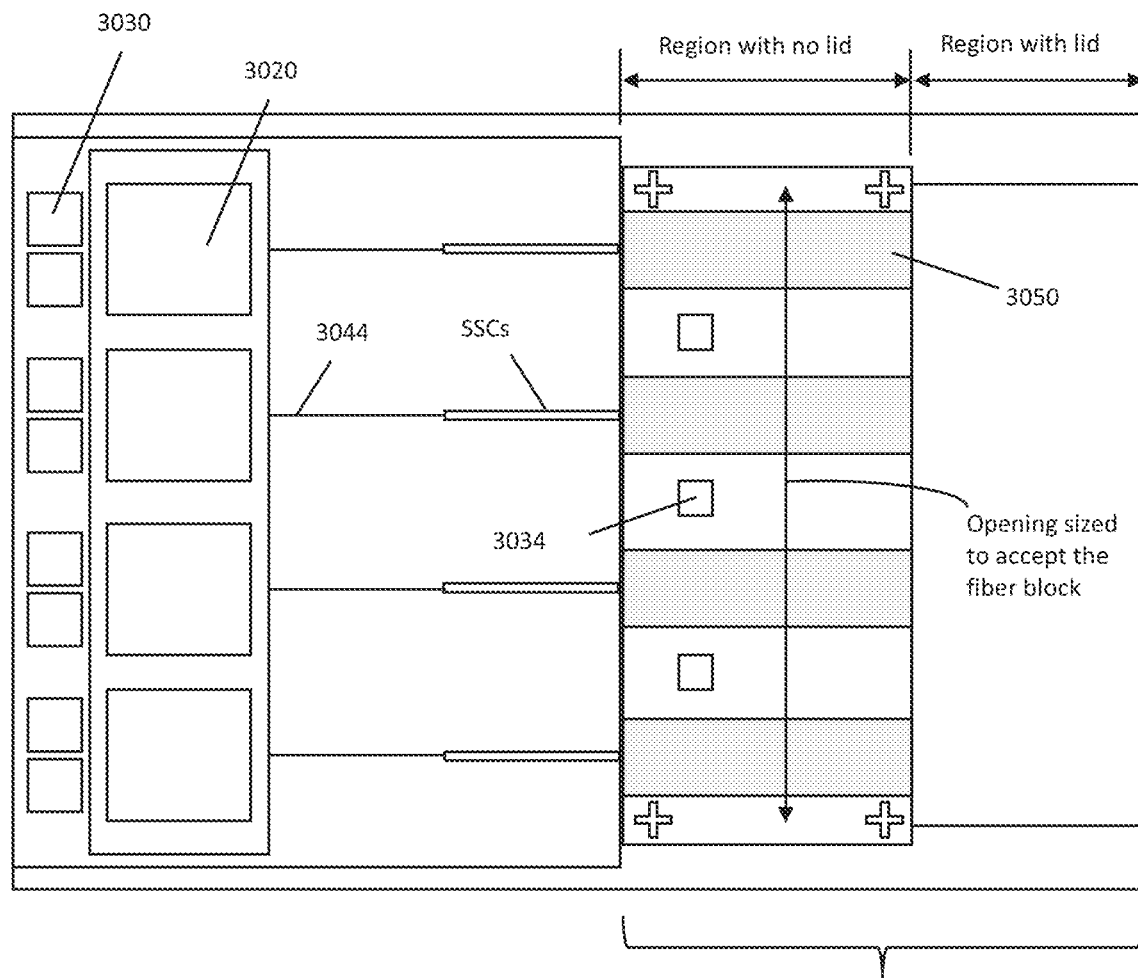

FIG. 30D. Top-down view of an embodiment of an interposer that accommodates a fiber optic mounting block with four fiber optic cables. The positioning of the alignment z-pillars in the embodiment is shown between the fiber optic cables mounted on the substrate.

DETAILED DESCRIPTION

Various embodiments are described herein with reference to the accompanying drawings that are intended to convey the scope of the invention to those skilled in the art. Accordingly, features and components described in the examples of embodiments described herein may be combined with features and components of other embodiments. The present invention is not limited to the relative sizes and spacings illustrated in the accompanying figures. It should be understood that a "layer" as referenced herein may include a single material layer or a plurality of layers. For example, an "insulating layer" may include a single layer of a specific dielectric material such as silicon dioxide, or may include a plurality of layers such as one or more layers of silicon dioxide and one or more other layers such as silicon nitride, aluminum nitride, among others. The term "insulating layer" in this example, refers to the functional characteristic layer provided for the purpose of providing the insulation property, and is not limited as such to a single layer of a specific material. Similarly, an electrical interconnect layer, as used herein, refers to a composite layer that includes both the electrically conductive materials for transmitting electrical signals and the intermetal and other layers required to insulate the electrically conductive materials. An electrical interconnect layer, as described herein may therefore include a patterned layer of electrically conducting material such as copper or aluminum as well as the intermetal dielectric material such as silicon dioxide, and spacer layers above and below the electrically conductive materials, for example, among other layers. Additionally, references herein to a layer formed "on" a substrate or other layer may refer to the layer formed directly on the substrate or other layer or on an intervening layer or layers formed on the substrate or other layer. References to the term "optical" devices, as used herein, may refer to a purely optical device such as a waveguide that does not have an electrical feature and to an optoelectrical device that has both an optical feature and an electrical feature, unless specified otherwise. An optical device, as used herein, is a device such as a waveguide, an arrayed waveguide, a spot size converter, a lens, a grating, among others, and an optoelectrical device is a device such as a laser or a photodetector that includes an optical feature and an electrical feature. In embodiments described herein, the use of the term "optical device" may include both optical devices and optoelectrical devices particularly in the context of the alignment of optical features of optical die that pertains to devices with or without an electrical feature. Like numbers in drawings refer to like elements throughout, and the various layers and regions illustrated in the figures are illustrated schematically.

Embodiments of structures and methodologies are described herein for the formation and utilization of mechanical alignment aids that facilitate the alignment of the optical planes of optical and optoelectrical devices that are combined to form photonic integrated circuits (PICs) and the like. The alignment of the optical planes in these devices is required to facilitate the transference of optical signals between the devices in the PICs.

Alignment features are described in embodiments, herein, that include mechanical alignment aids formed on a substrate of a first optical or optoelectrical device and on a mating device to vertically align a common optical plane between two optical devices. Mechanical alignment aids, as described herein, include vertical alignment pillars, fiducials, lateral constraints, and other alignment aids that are formed on a substrate to facilitate the alignment of the optical pathways of two or more optical devices. Alignment of the optical pathways, in general, is required in PICs to facilitate the transfer of optical signals between devices in an optical circuit.

In an embodiment, a z-pillar is formed on a first optical or optoelectrical device and brought into contact with a mechanical reference surface that is formed on a second optical or optoelectrical die to form and align a common horizontal optical signal plane between the two optical devices. As used herein, the term "z-pillar" is used to describe a structural pillar formed on a substrate or device that is used to establish a reference in the "z" direction, normal to the flat surface plane of the substrate or device as described and referenced herein. The reference height established by a z-pillar, in some embodiments, is the top surface of the z-pillar.

In some embodiments, a fiducial alignment feature is formed on a first optical or optoelectrical device and used to establish a lateral alignment reference to facilitate the placement or alignment of a second optical device that is brought into proximity with the first optical device. The lateral alignment reference provided by the fiducial feature enables the alignment of a common lateral reference plane for the first and second optical or optoelectrical devices to further enable the efficient transfer of optical signals between the two devices. As used herein, a lateral reference is used to describe a reference on a substrate or device that is used to establish a location or relative position in the "x" or "y" directions, perpendicular to the flat surface plane of the substrate or device. Lateral positioning using fiducials is necessary for the placement of devices, for example, particularly in applications that utilize automated die placement.

In other embodiments, one or more z-pillar alignment features are combined with one or more lateral fiducial features to form alignment references in both the vertical and the lateral directions for two optical or optoelectrical devices for which the vertical and lateral optical planes are brought into alignment to enable the efficient transfer of optical signals between the two aligned devices. And in yet other embodiments, the one or more z-pillar alignment features that are combined with one or more lateral fiducial features are further combined with lateral constraints that are formed on one or both of the optical devices for which the vertical and lateral optical planes are brought into alignment to enable the transfer of optical signals between the two aligned devices. The lateral constraints, in embodiments, restrict the lateral movement of the two combined optical or optoelectrical die and maintain the lateral alignment of the optical pathways between the two devices. These lateral constraints, in combination with the vertical alignment constraint that is provided by the one or more z-pillars, provide an effective structure for three-dimensional alignment of the optical pathways between two or more optical devices.

In some embodiments, the intersecting horizontal and vertical propagation planes of one or more optical pathways of a first optical device are aligned with the intersecting horizontal and vertical propagation planes of one or more optical pathways of a second optical device using alignment aids described herein that include the z-pillars, fiducials, and lateral constraints and the first optical device is an interposer that includes a planar waveguide layer and an optional electrical interconnect layer on a substrate. The first optical device, or interposer, in embodiments, further forms a substrate to which the second optical device is mounted or otherwise combined.

In some embodiments, the interposer includes a planar waveguide layer on a substrate. The planar waveguide layer in embodiments, is a layer that includes a waveguide core and one or more of a top cladding layer, a bottom cladding layer, a top spacer layer, a bottom spacer layer, a top buffer layer, and a bottom buffer layer, among other layers. The core layer in some embodiments, is a single waveguide layer. In other embodiments, the core layer is a layered structure of one or more layers that together form the core layer. In some preferred embodiments, the vertical and horizontal planes of two or more optical or optoelectrical devices that are aligned using one or more of the z-pillars, the fiducials, and the lateral constraints, coincide or substantially coincide with the core layer of the planar waveguide layer, with the core layer the preferred propagation path for optical signals within the planar waveguide layer on the interposer.

In embodiments, the first optical device or interposer that includes a planar waveguide layer from which optical waveguides are formed, further includes an electrical interconnect layer that facilitates the transmission of electrical signals between one or more electrical and optoelectrical devices formed within, mounted to, or otherwise combined with the interposer. In some preferred embodiments in which the first optical device is an interposer, a common hard mask and lithographic process is used to pattern the waveguides, the z-pillars, the fiducials, and the lateral constraints. The use of a patterned hard mask and lithographic process, in embodiments, provides a common focal plane for the planar waveguides and for the alignment aids, namely, the z-pillars, the fiducials, and the lateral constraints. In embodiments for which the first device is an interposer, the use of a common focal plane provides a reference plane on the interposer that is used in these embodiments to facilitate the alignment of the optical features of two or more optical or optoelectrical devices or die.

In yet other embodiments, the z-pillars, fiducials, and lateral constraints further formed and integrated as described herein, provide alignment aids that further facilitate the mounting and alignment of one or more optoelectrical die onto the interposer to form all or a portion of a PIC. In some embodiments, in mounting a second optical or optoelectrical device onto a first optical or optoelectrical device that is an interposer, fiducials are used to facilitate the placement of the second optical or optoelectrical die onto the interposer, the top surface of one or more z-pillars on the interposer are used to contact a reference surface on the second die to establish its vertical position on the interposer and to align the optical signal pathways in the vertical direction, and the lateral constraints, in combination with one or more of the vertical surfaces of the z-pillars or other lateral alignment aids, are used to facilitate the lateral alignment of the optical pathways and to provide mechanical stops for these mounted die when brought into their final positioning within the interposer. These lateral constraints, in combination with the vertical alignment provided by the one or more z-pillars, provide a structure and method for three-dimensional alignment between two or more optical devices using the interposer structure and methodology described herein.

In embodiments, a common lithographic patterning step and hard mask are used to pattern the fiducials and the z-pillars, and in some embodiments to pattern the fiducials, the z-pillars, and the lateral constraints, to form a common focal plane on the interposer for these mechanical alignment aids. In yet other embodiments, a common lithographic patterning step and hard mask are used to pattern devices such as waveguides, fiducials and the z-pillars, and in some embodiments to pattern devices such as waveguides, the fiducials, the z-pillars, and the lateral constraints, to form a common focal plane on the interposer for these mechanical alignment aids.

In addition to the mechanical alignment aids that are formed on the interposer, complementary alignment structures are also formed, in embodiments, on the second optical device that includes a vertical reference plane that contacts the top or another horizontal surface of the z-pillars of the interposer. Complementary mechanical alignment structures are additionally formed, in embodiments, to mate with the lateral constraints on the interposer. In an embodiment, for example, one or more triangular-shaped z-pillars are formed on the interposer and positioned such that one or more complementary shaped triangular cavities on the second optoelectrical die, that when mounted on the interposer, restrict and guide the lateral movement of the second die as it is placed and moved into a position of alignment as functionally required by the PIC.

In embodiments, an interposer structure is formed that includes a planar waveguide layer and an electrical interconnect layer on a substrate. The planar waveguide layer is formed on the electrical interconnect layer of the interposer structure and patterned using a first hard mask, such as aluminum. The first hard mask is used, in these and other embodiments, to pattern the planar waveguide layer to form one or more planar waveguides, one or more fiducials, and one or more alignment reference pillars. The alignment reference pillars, as used herein, refer to alignment structures or reference structures that pertain to, contribute to, or somehow enable positioning or alignment of devices or features on the interposer. The alignment reference pillars, in embodiments, provide for or contribute to the alignment of structures or features of the interposer and the optoelectrical die that are integrated or coupled in some way with the interposers. These alignment reference pillars can provide for, or contribute to, the alignment of features in the vertical direction (z-reference), in one or more lateral directions (x-y reference), or both the vertical and one or more lateral directions. Concurrent lithographic patterning of the planar waveguides, the fiducial marks, and the alignment reference pillars on the interposer structure enables the precise lateral positioning of these features in relation to other features on the interposer, and provides practical advantages in the processing steps subsequent to this patterning step. The precise positioning of the alignment fiducials relative to the alignment reference pillars and the patterned planar waveguides, provides the capability for accurate placement of pre-fabricated optoelectrical and optical die onto the interposer when using the fiducials as a placement reference. In general, the accuracy provided by the lithographic patterning process is quite high, and the use of this technique to pattern the hard mask that is used to define the planar waveguides, the fiducials, and the alignment reference pillars ensures that these structures are fabricated with the high degree of accuracy that is provided by the concurrent lithographic patterning of these structures.

In embodiments, the patterned alignment reference pillars are formed in a portion of the interposer within which the optoelectrical and optical die are typically mounted, and provide a reference height to enable the vertical alignment of features of the mounted optoelectrical and optical die with features of the interposer substrate. Precise alignment of laser facets, for example, with the planar waveguides on the interposer is imperative for efficient operation of the PICs formed on the interposer with integrated laser die. In addition to the accurate lateral positioning of the alignment reference pillars formed on the interposer, vertical alignment is also provided in embodiments, to a high degree of accuracy relative to the planar waveguides, since these pillars are formed using the same hard mask at the same vertical height as the planar waveguide of the interposer.

In embodiments, the first hard mask is removed from the patterned waveguides after the planar waveguide layer has been etched, but remains on the fiducial marks and the partially-formed alignment reference pillar features. One or more electrically insulating layers that can include one or more of a spacer layer, a buffer layer, and planarization layer, among others, are formed over the patterned waveguides, the fiducial marks, and the z-reference pillar structures. Coverage of the hard mask patterned, partially-formed pillar structures with the insulating layer results in the formation of buried, partially formed pillar structures that remain patterned with the first hard mask, although buried within the thick insulating structure. In embodiments, a second hard mask is formed over the thick deposited insulating structure to protect the unmasked planar waveguides and allow for the formation of recesses in the interposer structure within which the optoelectrical or optical die are to be mounted. Removal of the hard mask from the planar waveguides formed from the planar waveguide layer and subsequent coverage of the unmasked waveguides with cladding is necessary for optimal propagation of the optical signals through the waveguides. The patterned alignment reference pillars with the buried first hard mask lie within the area of the die within which the recesses are formed. In embodiments, the etching of the thick insulating layer, through open regions defined by the second hard mask, exposes the buried hard-mask-patterned, reference pillars to this etch process and results in the re-exposure of the alignment reference pillars wherein these reference features provide precise lateral positioning as a consequence of having been exposed to the same lithographic patterning steps as the planar waveguides and fiducials and precise vertical positioning as a consequence of having been patterned using the same hard mask as the planar waveguides and fiducials. Thus, precise alignment references are provided, in embodiments, for both lateral and vertical positioning of optoelectrical die onto the interposer.

After formation of the recesses in the thick insulating layers on the interposer, subsequent placement of the pre-formed optoelectrical die into the recesses can be achieved with reference to the buried fiducials that were formed concurrently with the planar waveguides and the alignment reference pillars. Vertical self-alignment of the optoelectrical devices with the planar waveguides within the recesses formed in the interposer is achieved, in embodiments, as a result of the positioning of the pre-formed die over the alignment pillars and the subsequent use of the lateral positioning of the pillars to guide the die into an aligned position. Alignment and positioning of the pre-formed die is further facilitated, in some embodiments, with mechanical alignment aids that are formed on these die.

In addition to the formation of an interposer structure with alignment features, in some embodiments, the structures and methodologies for alignment include the formation and implementation of mechanical alignment features on both the interposers and on the optoelectrical and optical die that are integrated within the interposers. The integration of pre-formed optoelectrical and optical die into interposers, in embodiments, benefits from the inclusion of mechanical alignment features and the associated protocols that enable the utilization of these mechanical alignment features to achieve improved operational performance. In embodiments, mechanical alignment features include the use of mechanical stops that are formed both on interposer substrate in combination with complementary-shaped mechanical stops that are formed on optoelectrical or optical die that are compatible with the alignment structure on the interposer substrates. These complementary mechanical alignment features, in embodiments, are particularly beneficial for providing alignment within the lateral plane of the substrate, herein referred to and referenced as alignment in the "x" and "y" directions. In some embodiments, the lateral x and y alignment features on the interposer are formed by lithographic patterning and subsequent etching of the alignment reference pillars to form nestable shapes in the lateral plane. Compatibly shaped features that are formed on the optoelectrical and optical die enable the alignment of these mechanical alignment features on the die with the nestable features on the interposer to align the die to the interposer.

Features of optoelectrical die that require alignment with mating features on the interposer can include, for example, emitting facets of an optoelectrical device such as a laser or LED, or a portion of a photodiode that receives an optical signal for detection. These features of optoelectrical die can be aligned, for example, with features on the interposer that can include planar waveguides and other optical devices formed on the interposer.

In an embodiment, mechanical alignment aids are formed on an interposer in the form of triangularly-shaped pillars as viewed from a top-down perspective of the interposer. A reference height for these triangular pillars is established by the hard mask layer that is used to pattern these triangular pillars concurrently with one or more planar waveguides and one or more fiducials. A reference height is also provided, as described herein in embodiments, on compatible optoelectrical or optical die. Complementary-shaped triangular cavities that are designed to laterally guide the movement of the optoelectrical or optical die are formed on the optoelectrical or optical die and enable the alignment of optoelectrical, optical, or electrical features on the die with optical or other features on the interposer. In these embodiments, during an assembly process, the triangular-shaped cavity features on the optoelectrical or optical die are firstly placed over the triangular pillars of the interposer, and secondly, once placed, the compatibly shaped features on the interposer and the die allow for the optoelectrical die to be guided into place on the interposer. As the triangular features are brought into alignment in these embodiments, the optical facets or other features of the optoelectrical or optical die are brought into lateral alignment with the optoelectrical or optical facets or other features on the interposer. The vertical alignment of these features is established, in embodiments, with a vertical reference stop on the optoelectrical or optical die that is brought into contact with the top of the alignment reference pillars. In addition to the optical features that are brought into alignment in these embodiments, electrical contacts between the interposer and the mating optoelectrical die can also be brought into alignment or used to facilitate the alignment process. Intentionally misaligned solder connections at placement, as encountered for example in some embodiments, are used to exert a force on the optoelectrical die upon the application of a heat source. The exerted force on the placed die upon heating will act to move the misaligned solder connections into alignment and the alignment features will guide the moving die into a preferred lateral alignment position on the interposer.

In other embodiments, non-triangular-shaped pillars are formed on an interposer, and complementarily-shaped cavity features are formed on optoelectrical or optical die that facilitate the positioning of these die to the interposer and that further facilitate and enable the alignment of optoelectrical, optical, and electrical features on the die with features on the interposer. In these embodiments, alignment pillars that are semi-circular, trapezoidal, hexagonal, or any shape or combination of shapes are formed on the interposer and complementary-shaped cavity features are formed on the optoelectrical or optical die that allow for the alignment of the features formed on these die with the alignment reference pillars formed on the interposer.

In other embodiments, one or more alignment reference pillars are formed on the interposer with one or more complementarily shaped structure formed on the optoelectrical or optical die that are to be aligned with the interposer. In some embodiments, more than one alignment pillar is formed on an interposer and the alignment pillars are the same or similar in shape. In other embodiments, more than one alignment pillar is formed on the interposer and the alignment pillars are not the same shape. In these and other embodiments, complementary-shaped structures are formed on the optoelectrical or optical die that are aligned with the alignment pillars on the interposer.

In some embodiments, a combination of alignment reference pillars is formed on the interposer that provide both a guide for movement into alignment and a hard stop for limiting the overall movement of the die relative to the interposer. And in yet other embodiments, a combination of pillars and complementary-shaped cavity structures are formed on the interposer, and a combination of compatibly-shaped pillars and complementary-shaped cavity structures are formed on the optoelectrical or optical die. And in yet other embodiments, one or more pillars are formed on the optoelectrical die with one or more compatibly shaped cavity features formed on the interposer, and one or more pillars are formed on the interposer with one or more compatibly shaped cavity features on the optoelectrical or optical die.

In addition to the features described in embodiments for aligning optical devices that include optical and optoelectrical devices on interposer-based substrates, alignment structures and methods are described in which v-grooves are formed in alignment with planar waveguides formed from the planar waveguide layer of the interposer and in which fiber optic cable mounting blocks are aligned and mounted to the interposer substrates. Other alignment configurations and structures are also described. Alignment aids that include lateral constraints and lithographic patterning aids that are formed from planar waveguide layers are also described herein.

The alignment of optical or electrical features of an optoelectrical die with optical or electrical features on an interposer is enabled with the formation of complementary-shaped alignment structures on both the interposers and on the optoelectrical and optical die that are mounted to these interposers. The implementation and utilization of these alignment structures enables the alignment of interposer substrates and the die that are integrated with these interposers for the purpose of forming the interposer-based PICs. Simplifications in alignment structures and procedures, in embodiments described herein, allow for passive alignment processes that are economically beneficial over techniques that require active or interactive alignment processes. Additionally, the simplified alignment structures and associated processes can provide further benefit by reducing the optical or electrical losses that result from misaligned or inadequately aligned devices in photonic integrated circuits that utilize these structures. Thusly, the techniques described herein offer technical advantages and economic advantages in the alignment of optical and electrical features of mounted optoelectrical and optical die and the interposers or substrates to which these dice are attached.

Figure 1:
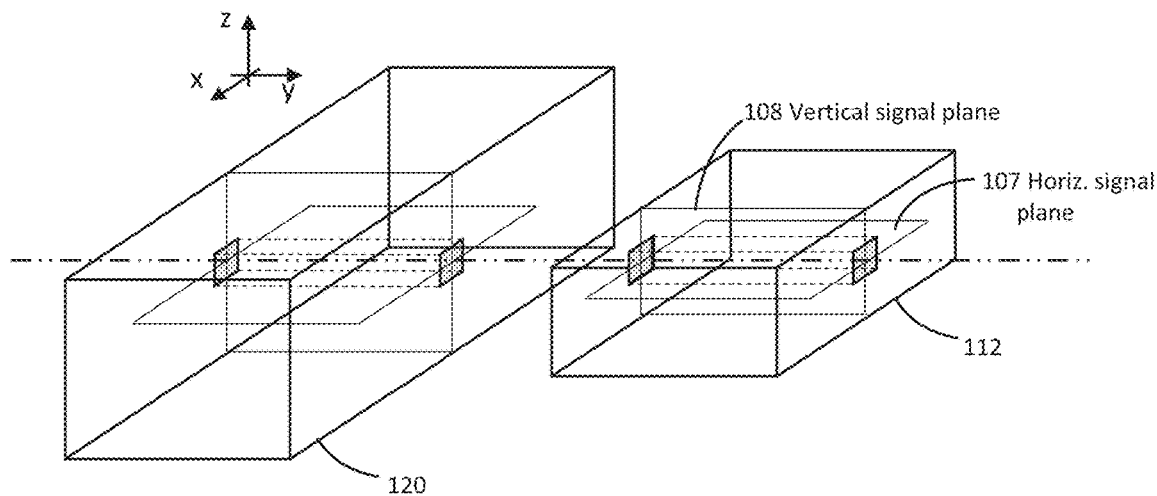
FIG. 1. Schematic drawings of (i) two optical devices with aligned optical signal planes and (ii) two optical devices on a substrate with aligned optical signal planes.
Figure 1:
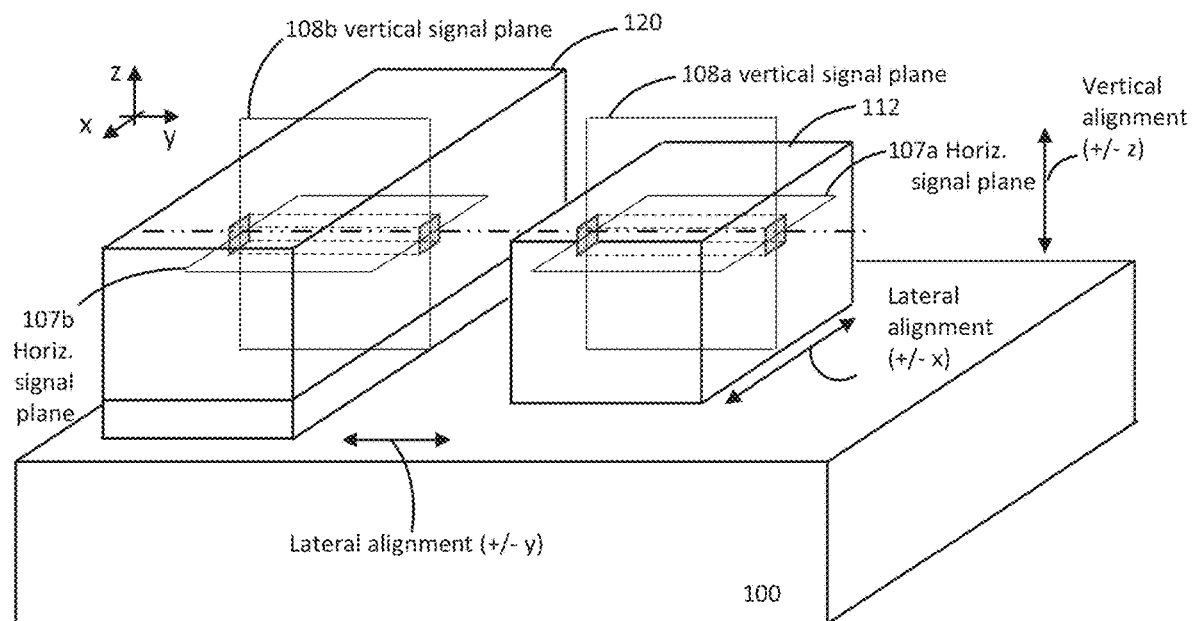

In FIG. 1(*i*), a schematic drawing of two optical or optoelectrical devices is shown with common horizontal optical signal plane 107 and common vertical signal plane 108. Referencing the orthogonal coordinate system shown in FIG. 1(*i*), a horizontal signal plane 107, as described herein, is a geometrical plane parallel to the x-y plane. The vertical position of the horizontal signal plane is determined by its height along the z-axis of the reference coordinate system. Again referencing the orthogonal coordinate system shown in FIG. 1(*i*), a vertical signal plane 108, as described herein, is a geometrical plane that can be parallel to the reference x-z plane or to the reference y-z plane. The x-z and y-z planes, and the planes parallel to these planes are also referenced herein as the lateral alignment planes. FIG. 1(*i*) shows the vertical signal planes 108 of two optical or optoelectrical devices to be in alignment along the x-axis. Two optical devices are said to be in alignment, as referenced herein, when the horizontal signal plane 107 and the vertical signal plane 108 are in alignment. Devices 112, 122 are optical or optoelectrical devices that include an optical element to or from which an optical signal can be emitted by, received by, or propagated through and include emissive devices such as lasers and LEDs, receiving devices such as photodetectors, and passive devices such as waveguides, among many others. Devices 112, 122 are devices, for example, that are used in the formation of photonic integrated circuits (PICs) and may be optical devices such as a waveguide, an arrayed waveguide, a grating, among others, or may be an optoelectrical device such as a laser or photodiode, among other devices, that have both an optical and an electrical feature. In PICs, devices 112, 122 benefit from accurate placement and alignment of the optical features in applications in which efficient optical signal transfer provides improved operation of the PICs that are fabricated from these devices. The effectiveness of an alignment method on the alignment of the optical or optoelectrical devices 112, 120 can be measured, for example, by the loss in signal power or intensity as an optical signal is transferred or otherwise communicated from one to another device in the PIC. And although the effectiveness of the alignment of devices 112, 120 is ultimately measured by the efficiency in the power or signal transfer between devices 112, 120, the use of a power measurement during fabrication of the PICs can require an active alignment method in which the power or optical signal strength is measured during the alignment process to ascertain the optimal positions for peak signal transfer. More preferably, passive techniques and the associated structures used in these methods allow for effective alignment of the optical devices in a PIC without the need for acquiring active measurements and feedback in the alignment process.

An optical device, as referenced herein, is a device that has an optical feature that sends, receives, reflects, transmits, focuses, alters, amplifies, or somehow influences the formation, transmission, propagation, detection, or transfer, or any property of an optical signal. An optoelectrical device, as referenced herein, is a form of optical device with an electrical feature. The electrical feature can be integral to the optoelectrical device or can be a portion of an optoelectrical device that is coupled to one or more other optoelectrical devices to send, receive, reflect, transmit, focus, alter, amplify, or somehow influences the formation, transmission, propagation, detection, or transfer, or any property of an optical signal. Optoelectrical devices such as lasers are used, for example, to form an optical signal from an electrical signal applied to the lasing device. Photodetectors, are used, for example, to convert an optical signal to an electrical signal. These and many other forms of optical and optoelectrical devices can be used in the formation of photonic integrated circuits that benefit from structures and methods that ensure the devices are properly aligned as required by the design and functionality of the circuit. The term "optical devices" as used herein, is intended to include optoelectrical devices, as the alignment techniques described herein pertain to the optical axes and features of either optical or optoelectrical devices.

Referring to FIG. 1(*ii*), optical devices 112, 120 are shown positioned on substrate 100. FIG. 1(*ii*) shows a first optical or optoelectrical device 112 with horizontal optical signal plane 107*a* in alignment with the horizontal optical signal plane 107*b* of a second optical device 120. The alignment of the horizontal signal planes is hereinafter referred to as alignment in the "z" direction as indicated by the reference coordinate frames in FIG. 1(*ii*). Alignment in the "z" direction can be in the "+z" or "−z" direction and can be influenced, for example, by the vertical position of the optical devices on the substrate or a feature on the substrate upon which the devices 112, 120 are mounted, and by the position of the optical signal plane within the optical devices. An aspect of embodiments is to provide structures and methods for aligning the horizontal optical signal planes 107a, 107b of two or more devices 112, 120.

Referring again to FIG. 1(*ii*), a first optical device 112 is shown with vertical optical signal plane 108a in alignment with the horizontal optical signal plane 108b of a second optical device 120. In general, the alignment of the vertical optical signal planes such as vertical optical signal planes 108a, 108b can be made in reference to any lateral plane, but for the purposes of discussion herein, specific reference planes are identified to facilitate illustration of the features of embodiments. Accordingly, the alignment of the vertical optical signal planes 108a, 108b in the horizontal direction as shown in FIG. 1(*ii*) is hereinafter referred to as alignment in the "x" direction as indicated by the reference coordinate frames in FIG. 1(*ii*). Alignment in the "x" direction can be in the "+x" or "−x" direction and can be influenced, for example, by the horizontal placement of the optical devices on the substrate or a feature on the substrate upon which the devices 112, 120 are mounted and by the position of the optical plane within the optical devices. Another aspect of embodiments is to provide structures and methods for aligning the horizontal optical planes 108a, 108b of two or more devices 112, 120.

Referring again to FIG. 1(*ii*), a first optical or optoelectrical device 112 is shown with optical signal planes 107a, 108a in alignment with the optical signal planes 107b, 108b of a second optical or optoelectrical device 120. The spacing between the optical devices 112, 120 or features of these optical devices 112, 120 in the horizontal direction shown in FIG. 1(*ii*) is hereinafter referred to as alignment in the "y" direction as indicated by the reference coordinate frames in FIG. 1(*ii*). Alignment in the "y" direction can be in the "+y" or "−y" direction and can be influenced, for example, by the horizontal placement and position of the optical devices on the substrate or a feature on the substrate upon which the devices 112, 120 are mounted. Yet another aspect of embodiments is to provide structures and methods for accurately spacing the optical devices 112, 120 or features of the optical devices 112, 120.

Fabrication methods and structures are disclosed herein that provide passive alignment of optical features of paired optical devices 112, 120. These fabrication techniques also provide for the precise placement of, and spacing between, the devices and more specifically the optical facets of these devices.

Figure 2:
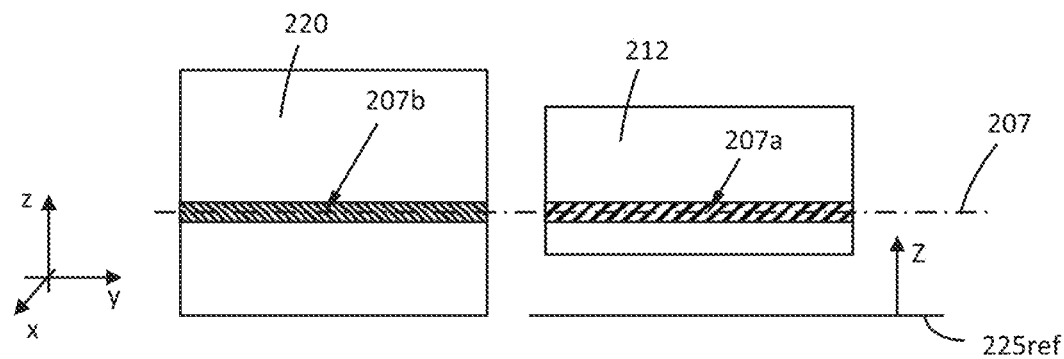
FIG. 2. Schematic drawings of (i) two optical devices shown with aligned optical signal planes in the z-direction and (ii) two optical devices on a substrate shown with aligned optical signal planes in the z-direction (perpendicular to the substrate surface as shown).
Figure 2:
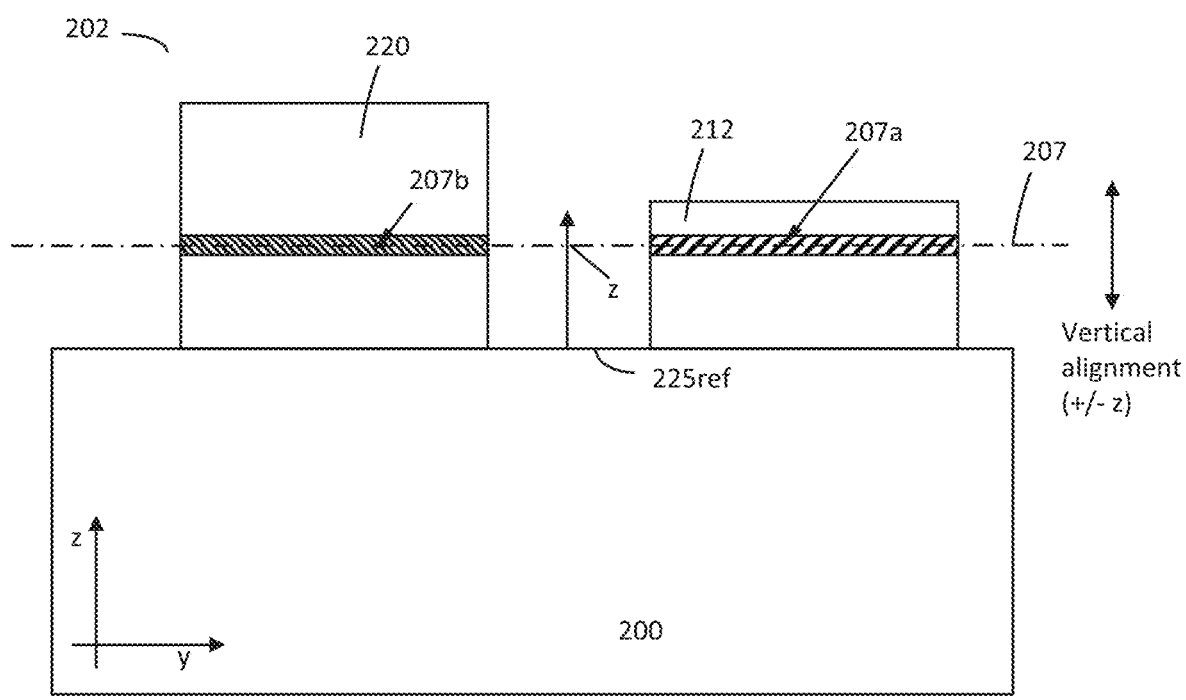

Referring to FIG. 2(*i*), a first optical device 212 is shown in cross section with the vertical optical signal plane 207a and second optical device 220 with corresponding vertical optical signal plane 207b. FIG. 2(*i*) shows the two optical devices 212, 220 with the vertical components of the optical signal planes 207a, 207b in alignment along the z-direction of the reference coordinate system. Also shown in FIG. 2(*i*) is reference plane 225ref. Reference plane 225ref may be, for example, the top surface of a substrate, the top of one or more features formed on a substrate, or other reference plane formed from, or in reference to, a feature on the substrate or device mounted on the substrate.

Referring to FIG. 2(*ii*), a schematic cross-sectional view of vertically aligned optical devices 212, 220 is shown with these devices mounted on substrate 200 with reference plane 225ref to form all or part of a PIC 202. In FIG. 2(*ii*), reference plane 225ref refers to the surface of the substrate 200 and the vertical signal plane 207 of the PIC 202 is shown at a height "z" along the vertical axis from the reference plane 225ref. The conventions and elements shown in FIG. 2 are used to describe similar features and elements in embodiments described herein.

Figure 3:
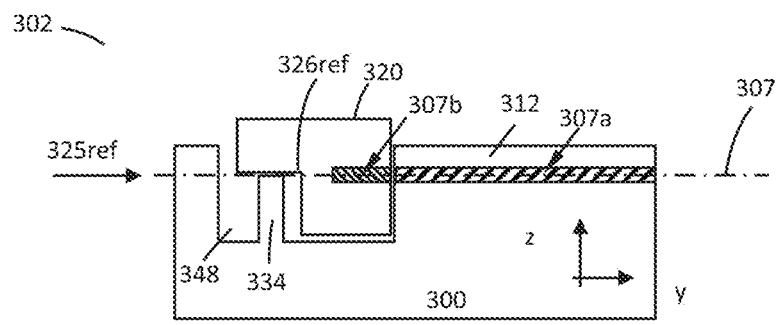
FIG. 3. Schematic drawings of embodiments of two optical devices with aligned optical signal planes shown with mechanical alignment aid, a z-pillar, to facilitate alignment in the vertical direction: (i) without an offset between the top of the z-pillar and the optical axes, and (ii) with an offset between the top of the z-pillar and the optical axis.
Figure 3:
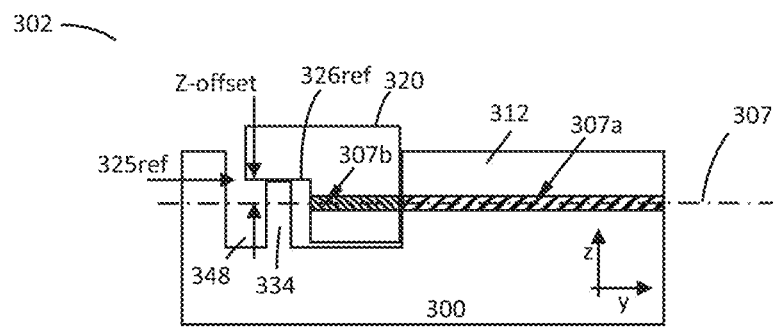

Referring to FIG. 3(*i*), a schematic cross-sectional view of an embodiment that includes vertically aligned optical devices 312, 320 is shown. In this embodiment, optical device 312 is formed from substrate 300 and includes an optical feature with optical axis 307a. Optical device 312 shown in FIG. 3(*i*) is, for example, an optical waveguide, formed within or on substrate 300. The fixed optical axis 307a of the optical device 312 is shown in FIG. 3(*i*) in alignment with the optical axis 307b of the mounted optical device 320. In this embodiment, the vertical positioning of the optical axis 307b of device 320 is determined by the height of pillar 334 upon which the device 320 is mounted, by the vertical position of the 326ref plane of device 320, and by the spacing between the reference plane 326ref and the optical axis 307b of the optical device 320. Pillar 334, hereinafter referred to as a z-pillar, is formed in cavity 348 within substrate 300. A reference plane 325ref is shown in FIG. 3(*i*) that corresponds to the top of the z-pillar 334 and, in the embodiment shown in FIG. 3(*i*), this reference plane also corresponds to the optical axis 307 of PIC 302. In this embodiment, no offset is present between the optical axis 307 and the vertical reference plane 325ref that corresponds to the top of the z-pillar. Additionally, in this embodiment, no offset is present between the reference plane 326ref of the device 320 and the optical axis 307b of the optical device 320. In other embodiments, as presented herein, these reference planes need not be in alignment.

Referring to FIG. 3(*ii*), a schematic cross-sectional view of an embodiment that includes vertically aligned optical devices 312, 320 is shown for which the 325ref plane at the top of the z-pillar 334 is not in alignment with the optical axis 307 of the PIC 302. In this embodiment, the height of the z-pillar is shown to be higher than in the embodiment in FIG. 3(*i*) and this increased height of the z-pillar is required to compensate for the increased distance between the reference plane 326ref and the optical axis 307b of the device 320 in FIG. 3(*ii*). In embodiments, masking layers that are used to pattern the z-pillars may remain in place after etching, for example, that lead to the offset in the optical axes as shown. Differences in the distance between optical axes 307b and the mechanical reference plane 326ref may also lead to an offset between the top surface of the z-pillar and the optical axis 307b of mounted optical devices such as optical device 320.

Figure 4:
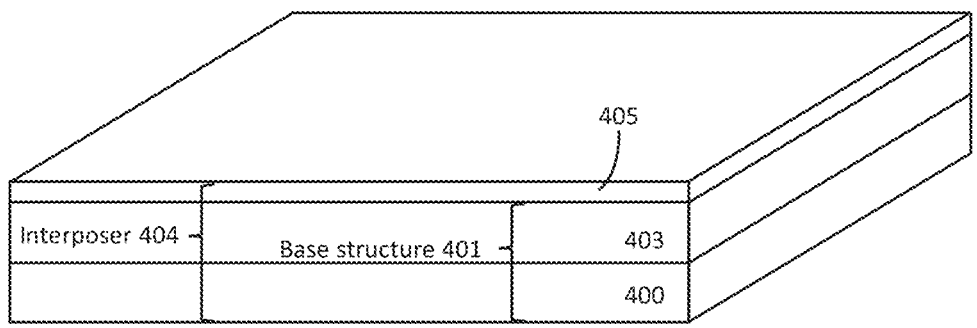
FIG. 4. Schematic drawings of embodiments of an interposer structure that includes a planar waveguide layer on a base structure for a base structure that includes an electrical interconnect layer and a substrate: (i) perspective view, (ii) cross section with detail provided for the planar waveguide layer and the passivation layer, and (iii) cross section with detail provided for the electrical interconnect layer and with a mounted optical device in optical alignment with the planar waveguide layer.
Figure 4:
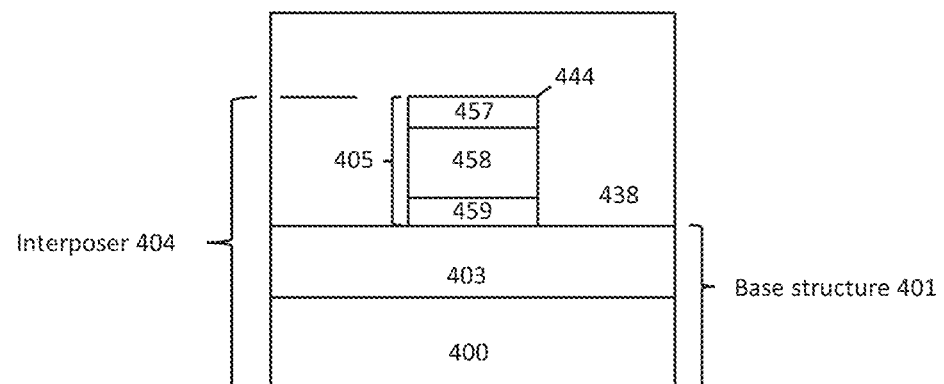
Figure 4:
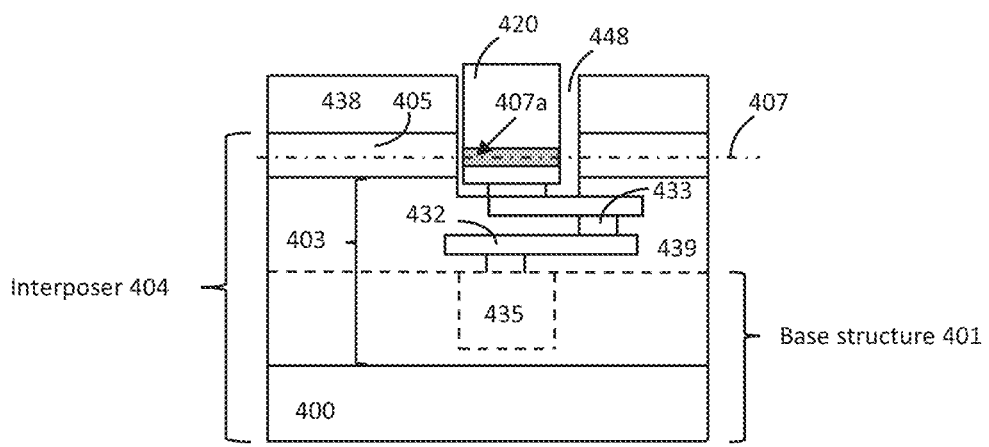

Referring to FIG. 4, an embodiment of an interposer structure is shown. FIG. 4(*i*) shows a schematic perspective drawing of an embodiment of an interposer structure 404 that includes a planar waveguide layer 405 on a base structure 401. The base structure 401 includes an optional electrical interconnect layer 403 and a substrate 400. The interposer structure 404 is used, for example, in full or in part in the fabrication of photonic integrated circuits. In embodiments, substrate 400 is a semiconductor substrate such as a silicon substrate. In some embodiments, substrate 400 includes one or more layers of a semiconductor material such as silicon, indium phosphide, gallium arsenide, or another semiconductor. In other embodiments, a ceramic or insulating substrate is used. In yet other embodiments, a metal substrate is used. And in yet other embodiments, a combination of one or more semiconductor layers, insulating layers, and metal layers are used to form a substrate 400 upon which the optional electrical interconnect layer 403 and the planar waveguide layer 405 are formed. In some embodiments, the electrical interconnect layer 403 is not in direct contact with the substrate but rather an intervening layer is present. Similarly, the planar waveguide layer 405, in some embodiments, is not in direct contact with the underlying electrical interconnect layer 403 but rather an intervening layer or layers may be present.

FIG. 4(ii) shows a schematic cross section of embodiments of a patterned planar waveguide 444 formed from the planar waveguide layer 405 in additional detail. The patterned planar waveguide 444 illustrated in FIG. 4 is a multilayer planar waveguide layer 405 that includes a first dielectric layer 459, a second dielectric layer 458, and a third dielectric layer 457. Each layer in this multilayer structure 405 can include one or more layers. The multilayer structure 405 is formed in the embodiment shown, on the electrical interconnect layer 403. In embodiments, the electrical interconnect layer 403 of the interposer structure is formed on substrate 400 to form base structure 401. The first dielectric layer 459 is one or more of a cladding layer, a spacer layer, and a buffer layer, among other insulating and dielectric layers. The planar waveguide layer 405, in the embodiment shown in FIG. 4, also includes a second dielectric layer 458 on the first dielectric layer 459. The second dielectric layer, in embodiments, is a core layer 458 that forms the primary propagation path for the optical signal 970, for example. The core layer 458, in some embodiments, is a single dielectric layer such as silicon oxynitride, silicon nitride, or silicon dioxide. In other embodiments, the core layer 458 is a multilayered structure that includes one or more layers of, for example, silicon oxynitride, silicon nitride, or silicon dioxide. The third dielectric layer 457 includes one or more of a cladding layer, a spacer layer, and a buffer layer, among other insulating and dielectric layers.

Planar waveguide layer 405 of FIG. 4(ii) includes core layer 458. The core layer 458, in some embodiments, is a layer of dielectric material or a semiconductor material through which optical signals can propagate. The core layer 458, in some embodiments, is a single layer, and in other embodiments includes two or more layers. In some embodiments, the core layer 458 is a superlattice structure that includes a stacked structure of multiple dielectric films. A bottom layer 459 of the planar waveguide layer 405 in some embodiments, is a bottom cladding layer. In other embodiments, the bottom layer 459 is one or more of a cladding layer, a spacer layer, and a buffer layer, among other layers. The bottom layer 459 typically has a lower index of refraction than the core layer 458 to provide containment of optical signals propagating in the waveguides. Spacer layers and buffers layers in the planar waveguide layer provide an isolation function, from the substrate for example, and a spacing function, that enables the alignment of the core layer 458 to align with one or more elements in a PIC. Other embodiments may include other layers in the bottom layer 459. Similarly, a top layer 457 of the planar waveguide layer 405 in some embodiments, is a top cladding layer. In other embodiments, the top layer 457 is one or more of a cladding layer, a spacer layer, and a buffer layer, among other layers. The top layer 457 typically has a lower index of refraction than the core layer 458. Spacer layers and buffers layers in the planar waveguide layer 405 provide an isolation function, from the substrate for example, and a spacing function, that enables the alignment of the core layer 458 to align with one or more elements in a PIC. Other embodiments may include other layers in the top layer 457. The schematic drawing in FIG. 4(ii) also shows a layer 438 that envelops the planar waveguide structure 405. Layer 438, in embodiments, is one or more of a passivation layer, an encapsulation layer, and a planarization layer, among others. Layer 438, for example, in embodiments, is a layer within which cavities or recesses are provided to form receptacles for optical and optoelectrical die that are mounted on the interposer 404 as further described herein.

In embodiments, planar waveguides layer 405 is patterned and formed into planar waveguides 444 and the core 458 of the patterned planar waveguide 444, is aligned with the optical features of an optical or optoelectrical device such that an optical signal is transmitted from the optical feature of the optical or optoelectrical device to the core 458 of the planar waveguide 444 or conversely, is received by the core 458 of the planar waveguide 444 from the optical feature of the optical or optoelectrical device. In an embodiment, an optoelectrical device such as a laser, for example, is used with the planar waveguide, and the emitting portion of the laser is substantially aligned with the core 458 of the planar waveguide layer 405. In this embodiment, the alignment of the core 458 of the planar waveguide layer 405 with the emitting portion of the facet of the laser, enables an optical signal from the laser to be received by the core 458 of the planar waveguide layer 405 for propagation in the PIC within which the laser and the planar waveguide are included. In yet another example, for which the optoelectrical device is a photodetector, alignment of the core 458 of the planar waveguide layer with the edge facet of the photodetector allows for an optical signal from the planar waveguide core 458 to be substantially received by the photodetector. In these and other embodiments, additional devices can be included in the PIC such as lenses, spot size converters, among many others, to facilitate the coupling of optical signals through the PIC. In embodiments described herein, two arbitrary devices are often shown for reference but many devices may be included in the circuit.

Referring to FIG. 4(iii), a cross sectional schematic is shown of an embodiment of interposer 404 with additional detail provided for the optional electrical interconnect layer 403. In the embodiments of the electrical interconnect layer 403 of the interposer structure 404 shown in FIG. 4(iii), conductive interconnects are formed from one or more layers of lateral electrical connections 432 and vertical electrical connections 433. Electrical interconnections 432, 433 are encapsulated in the embodiment shown in FIG. 4(iii) in intermetal dielectric 439. In embodiments, device 420 is mounted to the interposer 404 in a cavity 448 formed in insulating layer 438 and through planar waveguide layer 405. Device 420 is shown, in embodiments, with optical axis in optical alignment with the core of the planar waveguide layer 405. In embodiments, the electrical interconnect layer 403 of the interposer 404 provides electrical interconnectivity between one or more optoelectrical devices mounted on the interposer 404, and to electrical contact pads to provide interconnectivity to sub-mounts and external devices, for example. Optionally, in some embodiments, one or more buried electrical devices 435 can also be interconnected with the interconnects in the electrical interconnect layer 403.

Figure 5A:
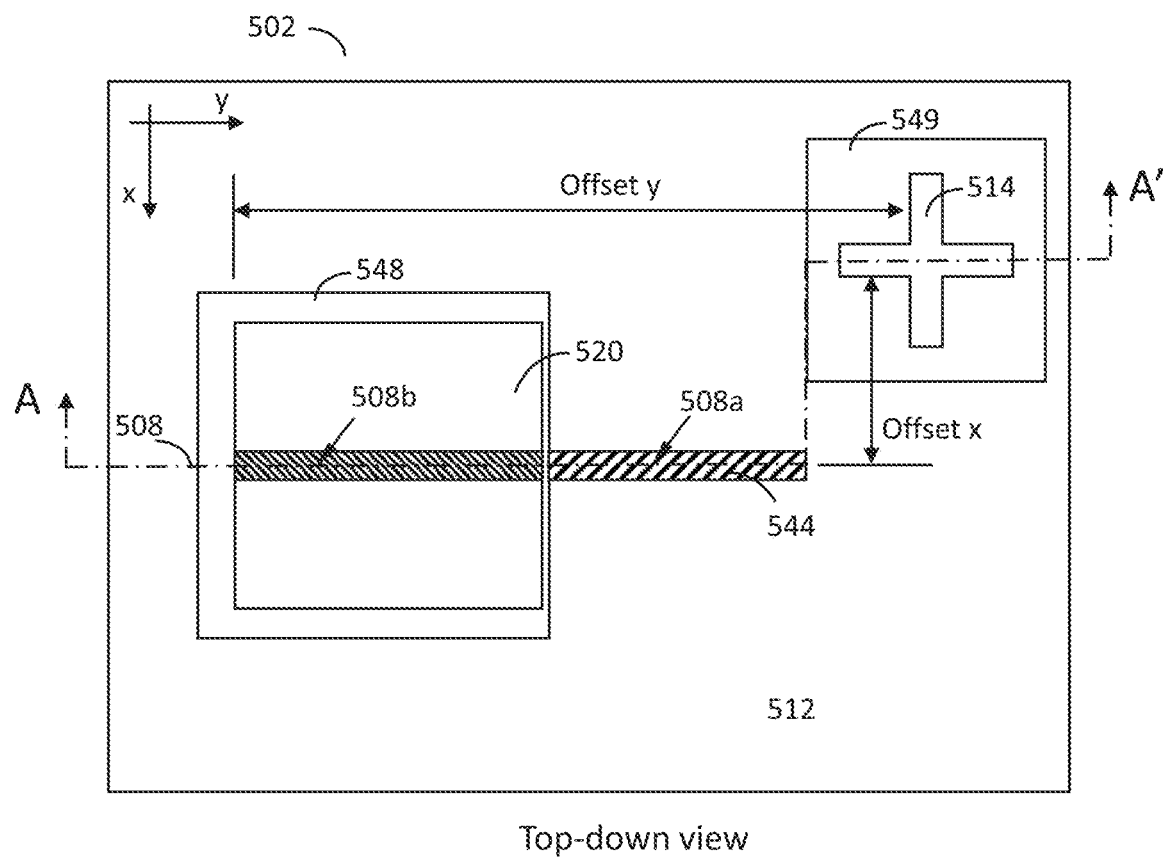
FIG. 5A. Schematic top-down and section drawings of two optical or optoelectrical devices with aligned optical signal planes shown with mechanical alignment aid, a fiducial, to facilitate alignment in the lateral directions.
Figure 5A:
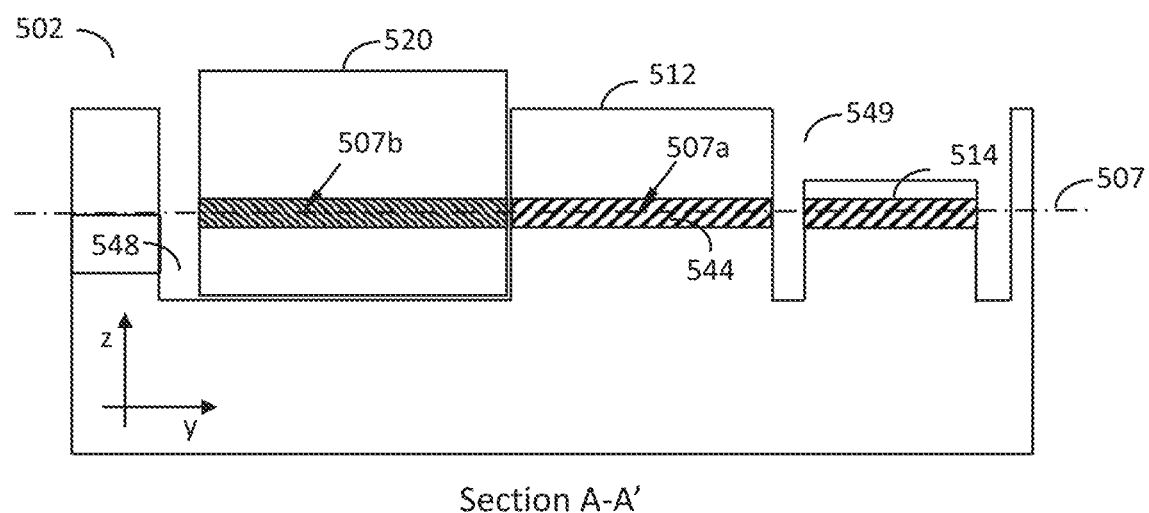
Figure 5B:
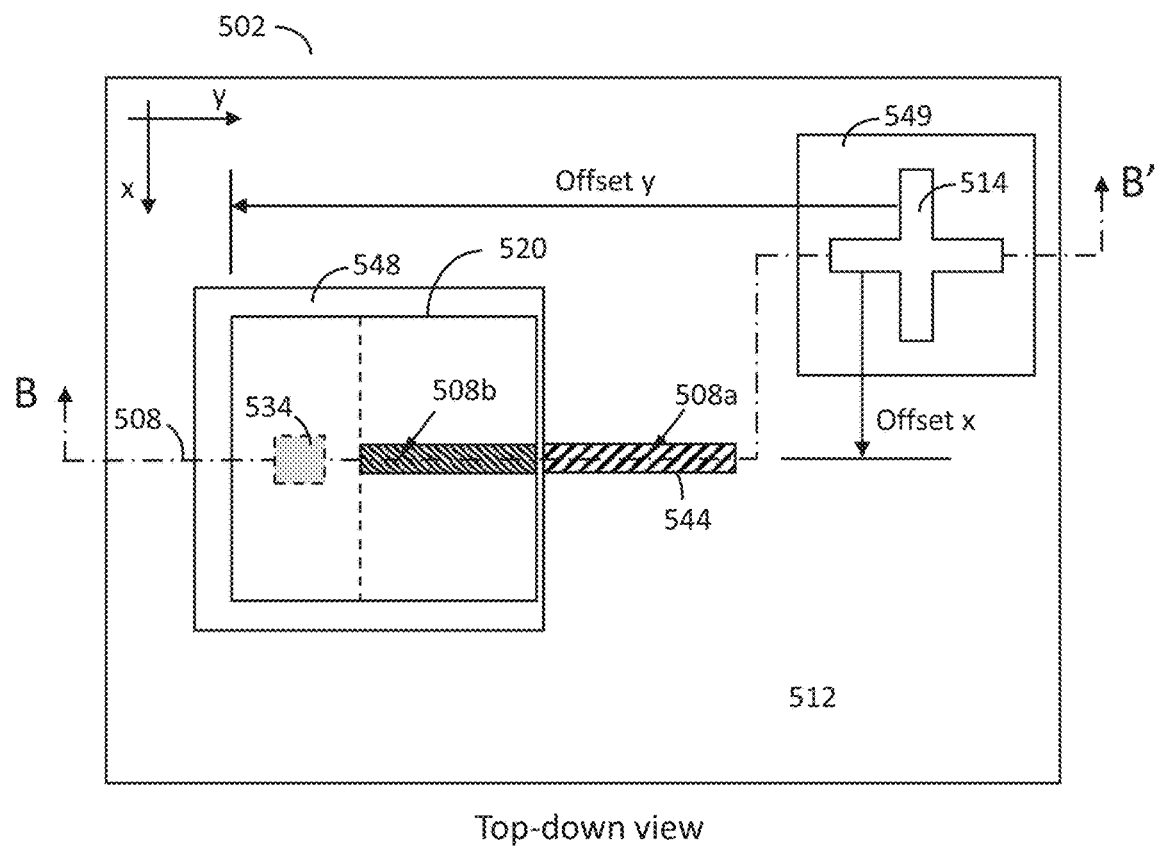
FIG. 5B. Schematic top-down and section drawings of two optical or optoelectrical devices with aligned lateral and vertical optical signal planes shown with a z-pillar mechanical alignment aid and a fiducial to facilitate alignment in the lateral directions.
Figure 5B:
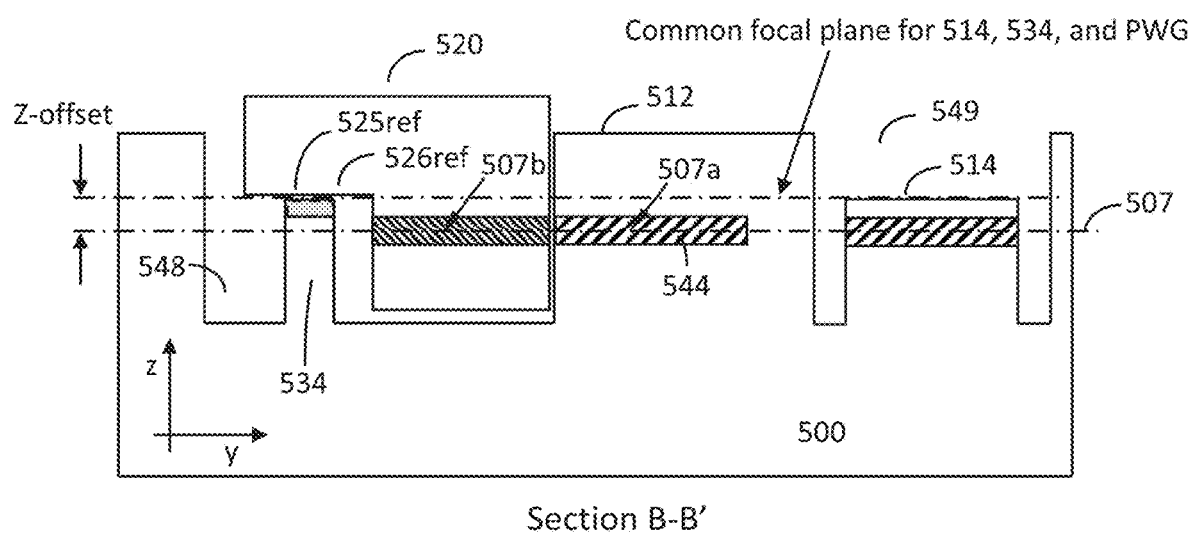
Figure 5C:
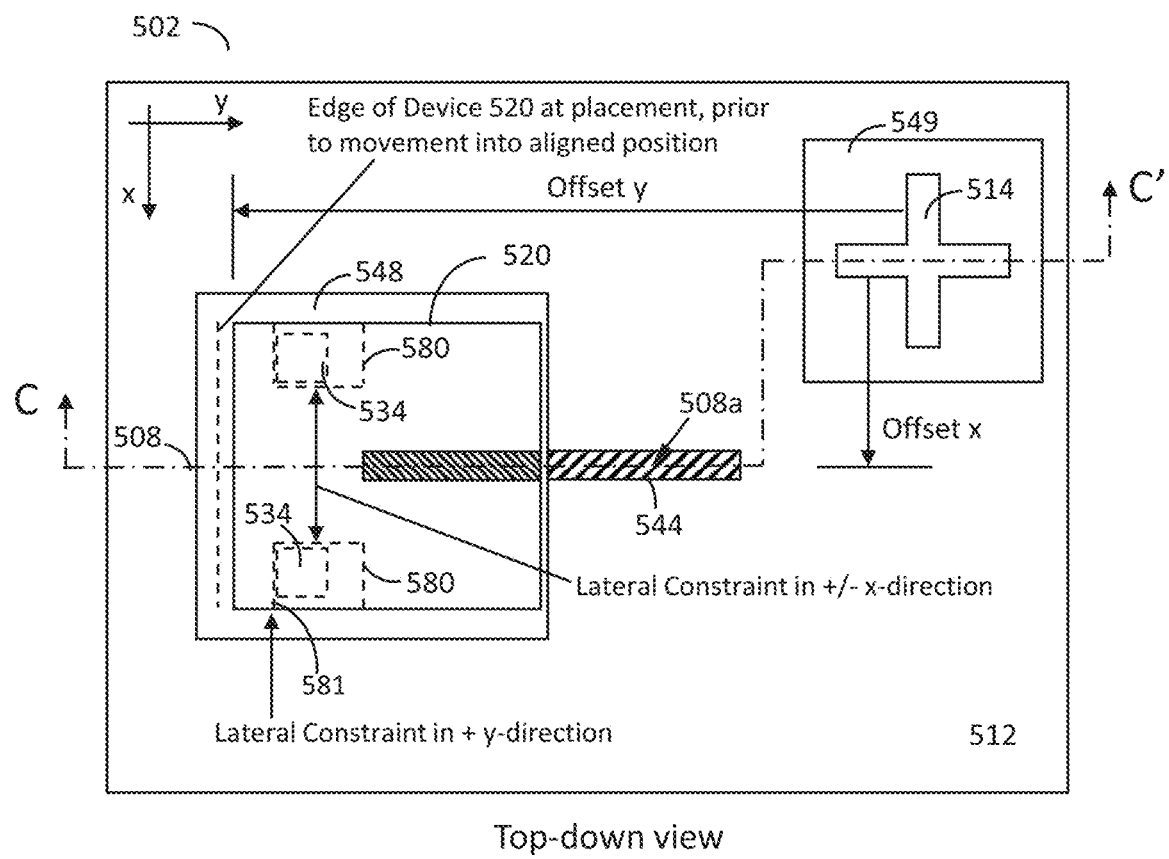
FIG. 5C. Schematic top down and section drawings of two optical or optoelectrical devices with aligned lateral and vertical optical signal planes shown with z-pillar mechanical alignment aids and a fiducial alignment aid to facilitate alignment in the lateral directions.
Figure 5C:
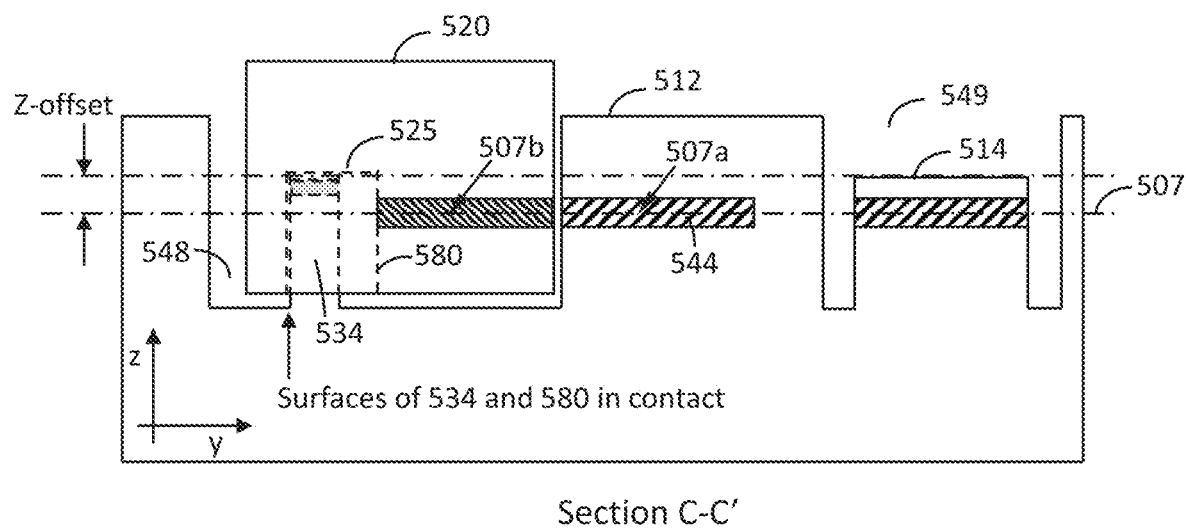

Referring to FIGS. 5A-5C, embodiments of a number of alignment aids are described that are formed in embodiments in the interposer 404 of FIG. 4 in an integrated manner that facilitates alignment of the optical axes of optical devices and device structures formed on an interposer structure. The alignment aids described in FIG. 5 include a fiducial, a z-pillar, and a lateral constraint. In FIG. 5A, a fiducial mark 514 is shown that is used in embodiments to facilitate the lateral positioning of devices and device features on a substrate. Automated positioning and placement apparatus is commonly used to position die for mounting onto a substrate using a fiducial marking for reference before positioning of the die onto the mounting assembly. In FIG. 5B, a z-pillar alignment aid is described that is used in embodiments to facilitate the vertical positioning of devices and device features on a substrate. And in FIG. 5C, a lateral constraint alignment aids are described that are used in embodiments to facilitate a combination of lateral and vertical positioning of devices and device features on a substrate. The structures and methods of formation of these structures are presented herein.

In FIG. 5A, fiducial mark 514 is shown in the top down view and the section A-A' view with two aligned optical devices that include a first optical device 512, namely a planar waveguide formed on an interposer, and a second optical device, namely a discrete optical device 520 that is mounted onto the optical interposer device 512 in cavity 548. Fiducial mark 514 is shown formed in a cavity 549, the formation of which allows for improved visibility of the fiducial 514. The improved visibility of the fiducial 514 with the formation of the cavity 549 provides improved resolution for lateral positioning devices and equipment that are used in the placement of the devices 520 into the cavity 548. Improved resolution is achievable with the capability to achieve optical focus on the exposed fiducial that may not be achievable in structures for which fiducials are buried within other layers and not optically visible. Additionally, fiducials formed at or near the same horizontal plane as the optical axes of devices provide a higher degree of positioning accuracy than fiducials formed at other locations further above, or below, the optical alignment axes. The fiducial 514 is an alignment aid, and in the embodiment shown in FIG. 5A, the fiducial mark 514 provides a reference position in the lateral directions, namely, the x and y directions, as shown in the reference coordinate system in the top-down view of FIG. 5A. In embodiments, the reference position established by any portion of the fiducial is typically, but not necessarily, laterally offset in one or both the x and y directions relative to the position of the optical signal plane 508 and the lateral optical reference planes 508a, 508b of the devices 512, 520. The lateral reference position provided by the fiducial 514, in embodiments, provides a means for accurately placing the optical device 520 into cavity 548 of the optical device 512, and further provides a means for aligning the optical planes 508a, 508b of the two devices 512, 520. Referring to the Top Down View of FIG. 5A, device 520 is positioned onto the device 512 with an offset in the x-direction and in the y-direction relative to the fiducial 514. Placement of devices onto interposers and device submounts using automated placement equipment is well understood in the art of semiconductor device manufacturing. The top down view in FIG. 5A shows the alignment of the vertical planes of the optical signal axes 508a, 508b of the optical devices 512, 520, respectively, after placement of the device 520. Referring to the Section A-A' drawing of FIG. 5A, the fiducial 514 is shown in substantial alignment with the horizontal optical axis 507 of the PIC 502. Also shown in alignment are the horizontal components of the optical signal axes 507a, 507b of the optical devices 512, 520. PIC 502 includes the optical devices 512, 520 and may include additional optical and optoelectrical devices, electrical devices, and other circuit elements. The fiducial is one of a number of alignment aids that are formed in embodiments that are described in conjunction with additional alignment aids further described herein. The fiducial reference is generally an edge reference and as such, the thickness of the hard mask layer will not directly affect the accuracy of the positioning using the fiducial when the edges of the hard mask in close vertical alignment with the layer within which the optical axes reside. If the hard mask has a severely tapered profile at the edge, this taper can affect the resolution of the positioning accuracy when using the fiducial for positioning.

Referring to FIG. 5B, a z-pillar alignment aid is introduced and described. In FIG. 5B, a schematic top down view and cross section view (Section B-B') are shown to illustrate an embodiment in which a z-pillar alignment aid is used in the alignment of two optical devices 512, 520. The aligned horizontal optical planes 507a, 507b, respectively, of devices 512, 520 are shown in optical alignment as facilitated by the z-pillar mechanical alignment aid 534 that is formed in a cavity 548 on device 512. Device 512 in the embodiment shown in FIG. 5B is an optical waveguide formed in the interposer substrate 500. Mechanical alignment aid 534 shown in FIG. 5B is a vertical alignment pillar. In the embodiment shown in FIG. 5B, the top surface of the vertical alignment pillar, or z-reference pillar as described herein, provides a reference height and contact surface upon which a device such as optical device 520 is mounted to provide for alignment of the optical features of at least two devices in at least the vertical direction. In some embodiments, the reference height established by the top surface of the z-pillar 534 has a vertical offset (shown as "z-offset" in Section A-A' of FIG. 5B) from the optical reference planes 507a, 507b of the devices 512, 520. FIG. 5B shows an embodiment with such an offset. In other embodiments, the reference height established by the top surface of the z-pillar 534 is aligned with the optical reference planes 507a, 507b of the devices 512, 520. The bottom surface of the device 520, with vertical reference plane 526ref, forms a surface-to-surface contact with the top surface of the z-pillar 534, which coincides with the horizontal reference plane 525ref of device 512. This surface-to-surface contact provides for the precise alignment of the optical signal planes 507a, 507b between the two devices 512, 520, respectively. In embodiments in which a z-offset is present between the top surface of the z-pillar 534 on device 512 and the optical plane 507a of the PIC 502, a similar z-offset is also provided on the device 520 between the optical plane 507b and the top surface of the z-pillar 534 at the reference plane 525ref. In the top-down view of the embodiment of the alignment aids of the PIC 502 shown in FIG. 5B, a single z-pillar is shown for illustration purposes. Embodiments with more than one z-pillar are described further herein and within the scope of embodiments. The top-down view shows fiducial alignment aid 514 in cavity 549 with offsets to the lateral alignment planes 508a, 508b to facilitate the placement of device 520 into cavity 548 and subsequent alignment of the optical axes 508a, 508b of the devices 512, 520.

Referring to FIG. 5C, a lateral constraint alignment aid is introduced and described. In FIG. 5C, schematic top down view and a cross sectional view (Section C-C') are shown to illustrate an embodiment in which a lateral constraint is used to facilitate the alignment of two optical or optoelectrical devices 512, 520. In the embodiment, the horizontal optical planes 507a, 507b and vertical optical planes 508a, 508b, respectively, are shown in alignment as facilitated by a lateral constraint alignment aid formed in the interposer in combination with the fiducial and z-pillar alignment aids. In the embodiment, a z-pillar mechanical alignment aid 534 that is formed in cavity 548 and a fiducial alignment aid 514 that is formed in a cavity 549 are shown with a lateral constraint alignment aid 581. In the embodiment shown in FIG. 5C, the lateral constraint 581 results from the surface contact that is formed between the sidewall of the z-pillar 534 of the device 512 and the mechanical feature 580 of the device 520. Alignment aid 514 shown in FIG. 5C, namely the fiducial mark, provides a lateral reference position in the x and y directions as shown in the reference coordinate system in the top-down view of FIG. 5C. Furthermore, the fiducial 514 is formed in the same horizontal plane as the z-pillar 534 in the embodiment shown. In embodiments, the reference position established by any portion of the fiducial 514 typically, although not necessarily, is laterally offset in one or both the x and y directions relative to the position of the horizontal optical signal plane 508 and the lateral optical reference planes 508*a*, 508*b* of the devices 512, 520. The lateral reference position provided by the fiducial 514, in embodiments, provides a means for accurately placing the second optical device 520 into cavity 548 of the first optical device 512, and further provides a means for aligning the horizontal optical planes 508*a*, 508*b* of the two devices 512, 520. In the embodiment shown in FIG. 5C, the top surface of the z-pillar 534 provides a contact surface that contacts a reference surface 526ref on the device 520 upon placement into the cavity 548 to establish the height of the optical plane of the device 520. In some embodiments, the reference height established by the top surface of the z-pillar 534 has a vertical offset (shown as "z-offset" in Section A-A' of FIG. 5C) from the optical reference planes 507*a*, 507*b* of the devices 512, 520 as is the case for the embodiment shown in FIG. 5C. A similar z-offset to that provided by the z-pillar is provided in the device 520 to offset the reference surface 526ref from the optical plane 507*b* to enable the alignment of the two optical planes 507*a*, 507*b* of the two devices 512, 520, respectively. In other embodiments, the reference height established by the top surface of the z-pillar is aligned with the optical reference planes 507*a*, 507*b* of the devices 512, 520 although these embodiments are not shown in FIG. 5C. Mechanical aid 534 further forms a portion of a lateral constraint 581 that limits the movement of the optical device in the lateral y-direction as indicated by the reference coordinates shown in FIG. 5C. In embodiments, the device 520 is placed in the recess 548 of the first device 512, and the placement of the device is such that the mounted device 520 does not make contact with the sidewalls of the recess 548 of the first device 512 within which device 520 is placed. To prevent contact with the sidewalls of the recess 548, the device 520 is placed with adequate clearance with the sidewalls of the recess 548 and then moved into position after placement. The lateral constraint alignment aids 581 limit the movement of the second device 520 in at least one of the lateral directions, namely the x and y directions. In the embodiment shown in FIG. 5C, the lateral constraint alignment aids 581 as shown limit the movement in both the x and y directions. Movement of the device 520 in the positive and negative x-directions (as indicated with the reference coordinate system) is limited by the fixed position of the z-pillars and the mechanical recess feature 580 that is formed on the underside of the second device 520. The range of possible movement of the device 520 in the +/−x-directions is limited to the distance between the z-pillars 534 and the feature 580 at placement. Adequate clearance must be provided between the z-pillars spacing and the spacing between the features 580 on the device 520. Movement of the device 520 is further limited in the y direction by the fixed position of the z-pillar as the mechanical recess feature 580 of the device 520 contacts the sidewall of the z-pillar 534 as this device is moved into the aligned position in the y-direction shown in FIG. 5C. Movement in the x-direction, in summary, is constrained motion in that the device 520 is free to move in the +/−x directions within the z-pillar spacing. Movement in the y-direction, in summary, is not initially constrained in that the feature 580 is free to move in either direction (within a small range) at placement but is constrained as the feature 580 is brought into contact with the sidewall of the z-pillar 534. Other embodiments and features of embodiments of lateral constraints are further described herein. The lateral constraint shown in FIG. 5 is a lateral constraint that is used to limit the motion of a mounted device such as the mounted device 520 shown in FIG. 5C. In other embodiments, lateral constraints may be configured to restrict the lateral movement of other devices and can be combined in function with z-pillars to restrict movement laterally and vertically. In some embodiments, the lateral movement of the device 520 is limited by contact to the sidewall of the recess. In other embodiments, the lateral movement of the device 520 is limited by contact of the device with a portion of the cavity wall.

Figure 6:
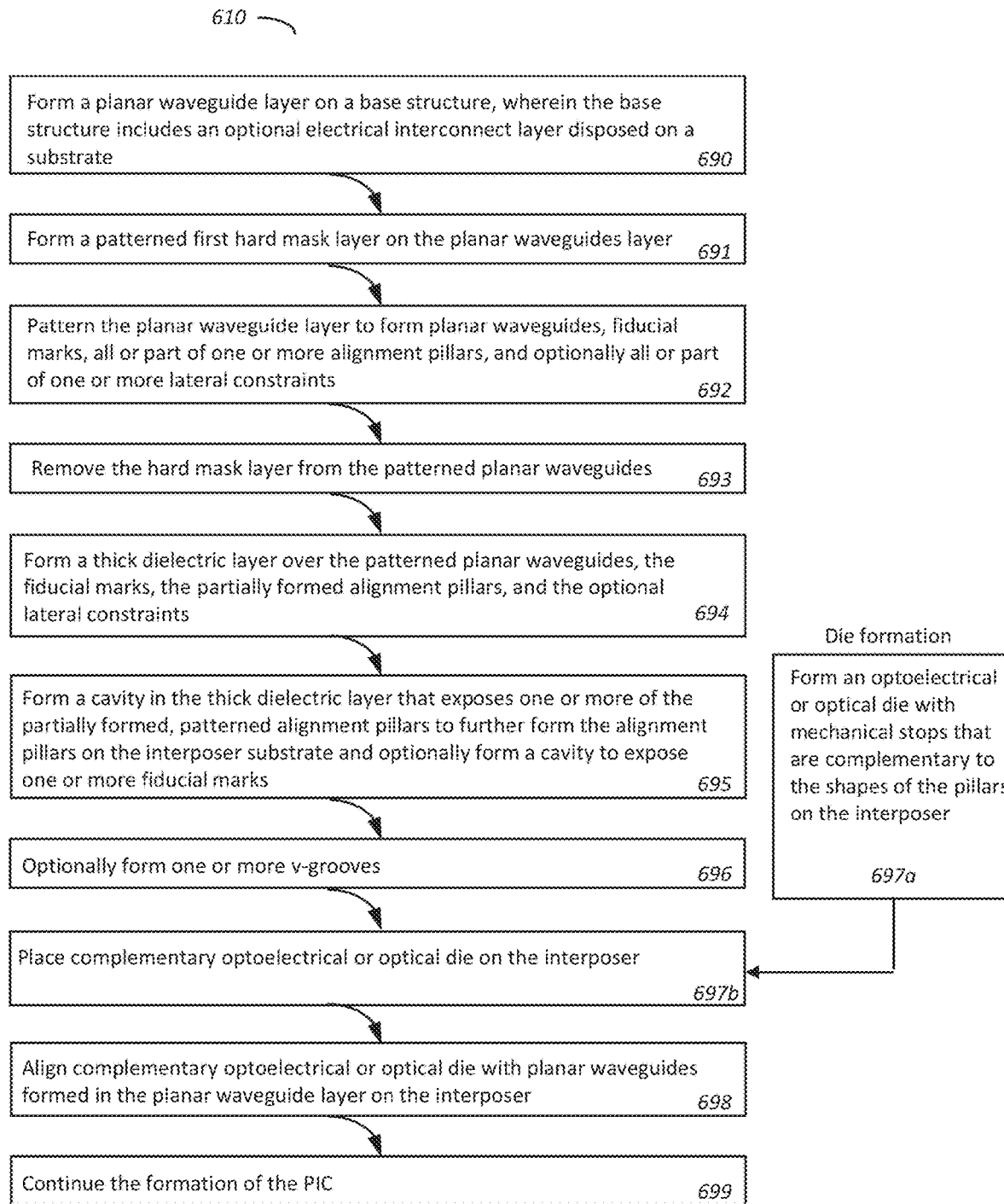
FIG. 6. Embodiment of a method for forming and utilizing patterned alignment features on interposer substrate including die mounting of an optoelectrical die on the interposer. In this embodiment, lateral alignment features are shown for alignment of the core of a fiber optic cable mounted in the v-groove with a planar waveguide formed from the planar waveguide layer of the interposer.
Figure 7A:
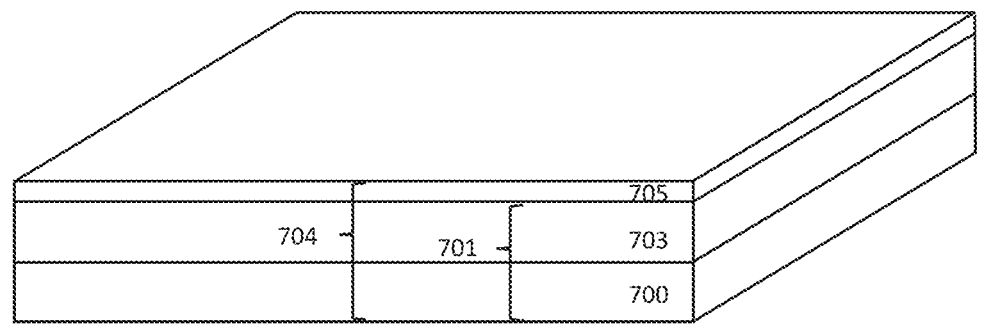
FIG. 7A. Embodiment for a step of forming an interposer substrate.
Figure 7B:
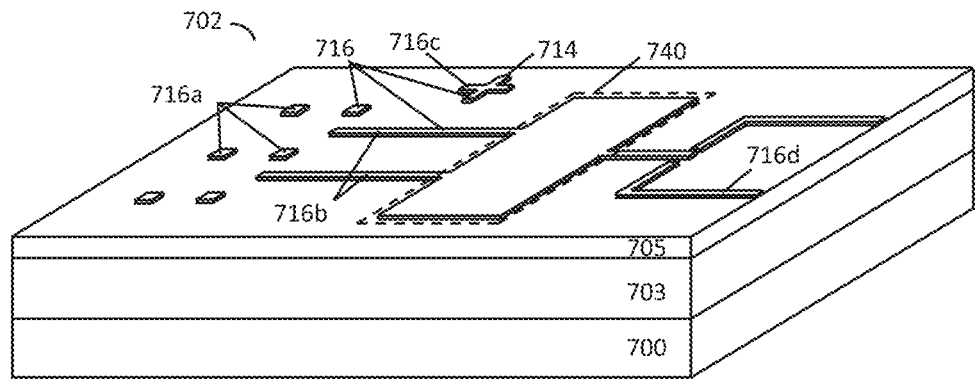
FIG. 7B. Embodiment for a step of forming a patterned hard mask for the formation of planar waveguides, fiducial marks, z-pillars, and lateral alignment aids for the formation and alignment of a v-groove on an interposer structure.
Figure 7C:
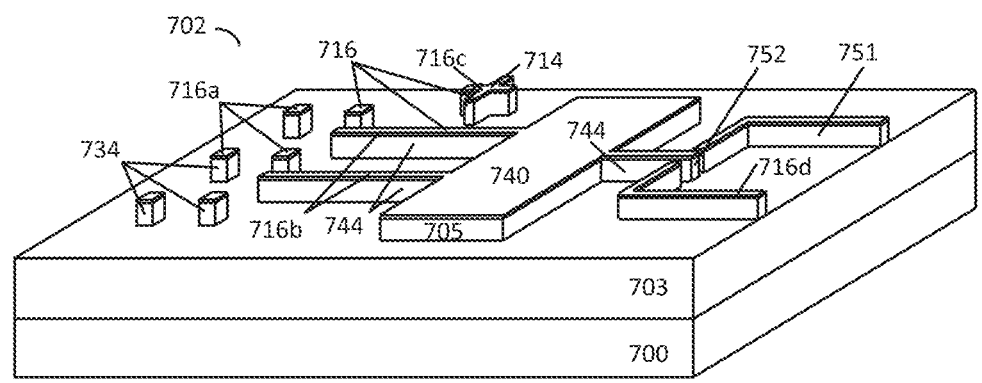
FIG. 7C. Embodiment for a step of patterning the planar waveguides, fiducial marks, v-groove alignment aids, and z-pillars on an interposer structure.
Figure 7D:
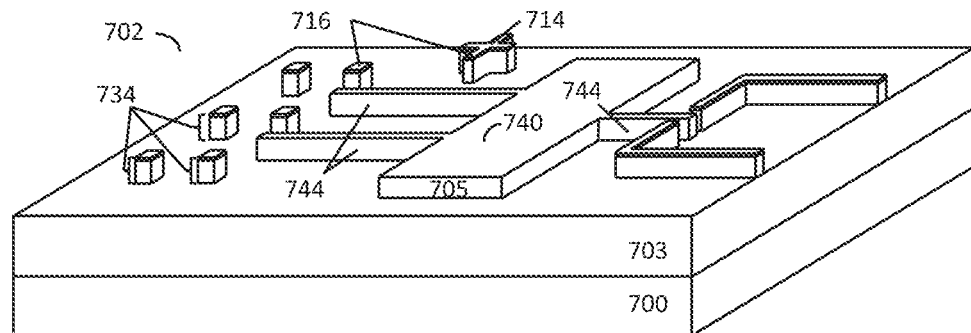
FIG. 7D. Embodiment for a step of removing a hard mask layer from the planar waveguides and optionally from features in the optical device.
Figure 7E:
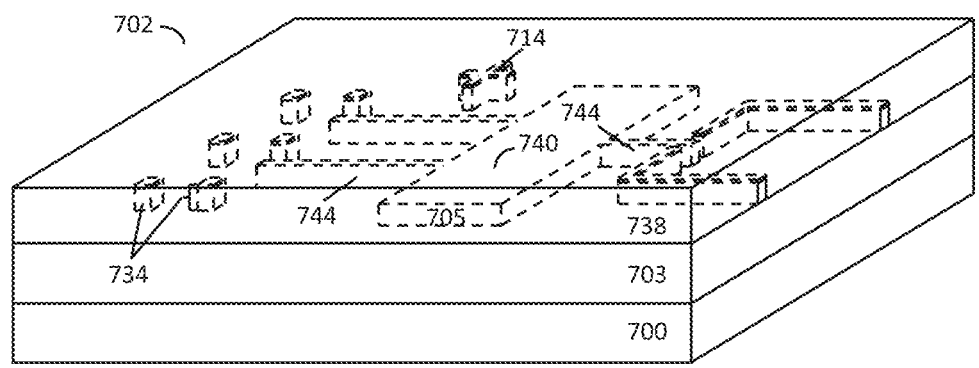
FIG. 7E. Embodiment for a step of forming an insulating layer.
Figure 7F:
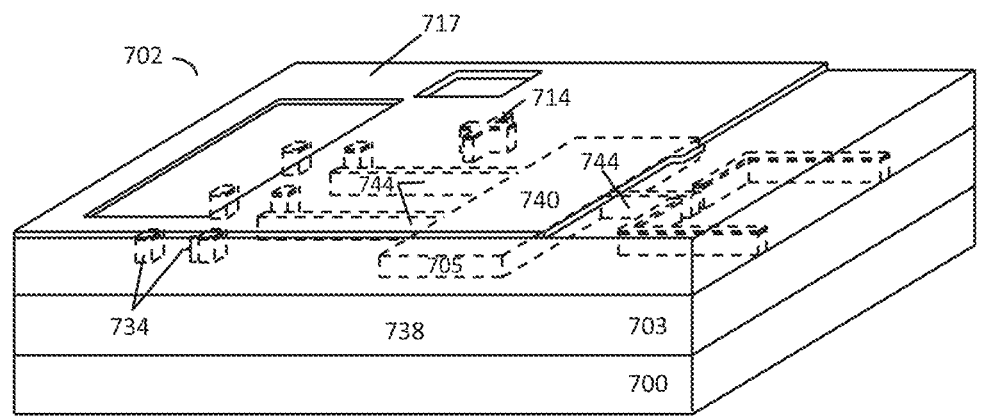
FIG. 7F. Embodiment for a step of forming a patterned hard mask for the cavity formation with z-pillars and for the formation of v-groove alignment aids (optionally exposing the fiducials).
Figure 7G:
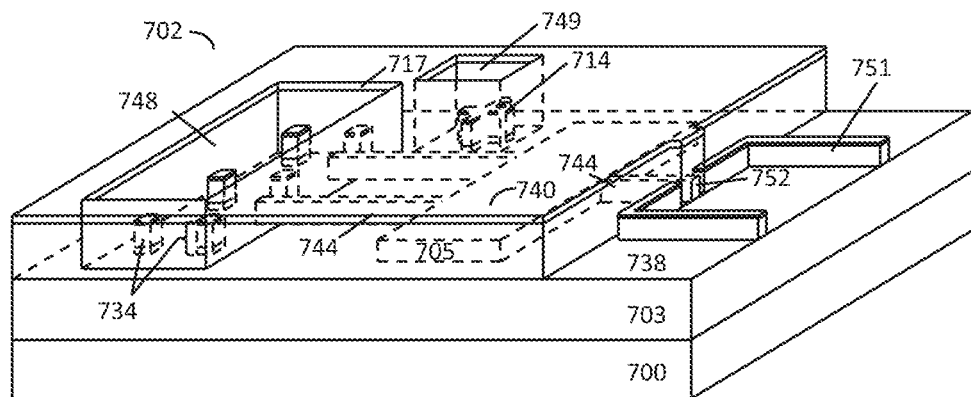
FIG. 7G. Embodiment for a step of patterning the insulating layer to form cavities (with opening to optionally expose fiducials) and to expose the v-groove alignment aids.
Figure 7H:
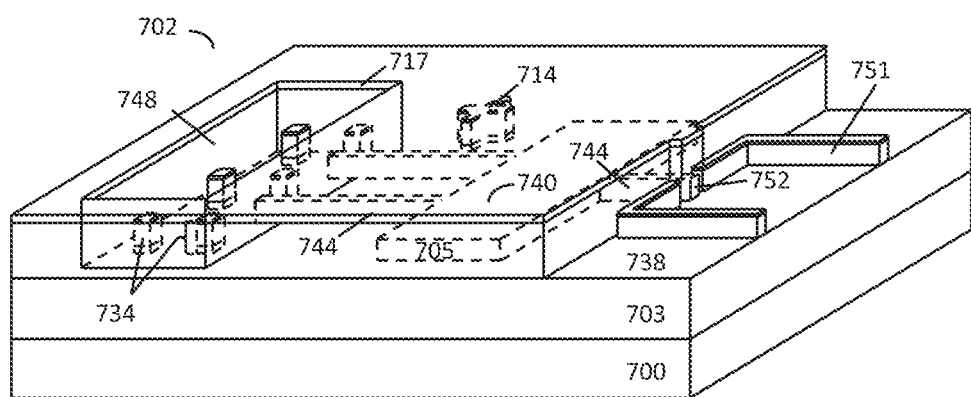
FIG. 7H. An embodiment for a step of patterning the insulating layer to form cavities for which a cavity is not formed to expose the fiducials. The v-groove alignment aids are exposed in this embodiment of the v-groove alignment aids.
Figure 7I:
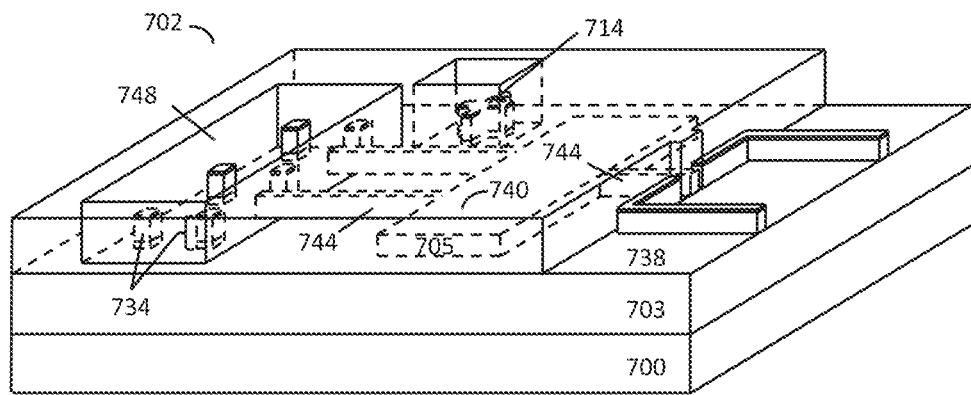
FIG. 7I. Embodiment for a step of removing a hard mask layer after formation of the cavity (embodiments shown in which the fiducials are exposed).
Figure 7J:
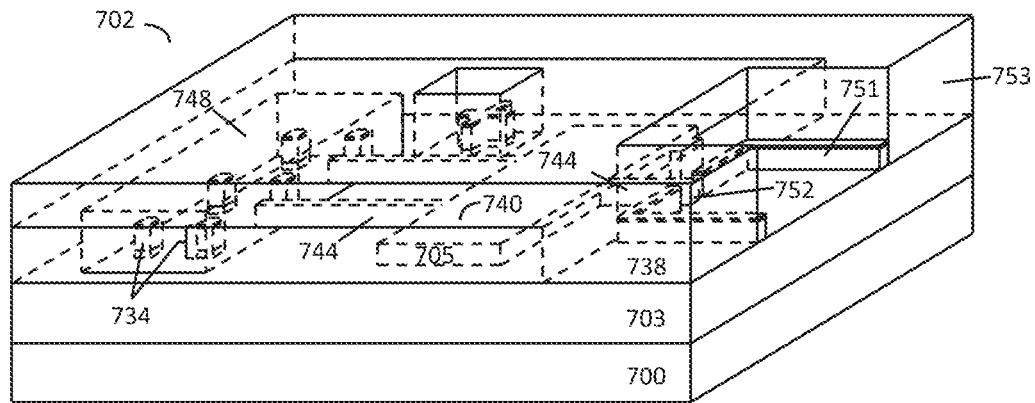
FIG. 7J. Embodiment for a step of forming a mask layer to facilitate formation of one or more v-grooves.
Figure 7K:
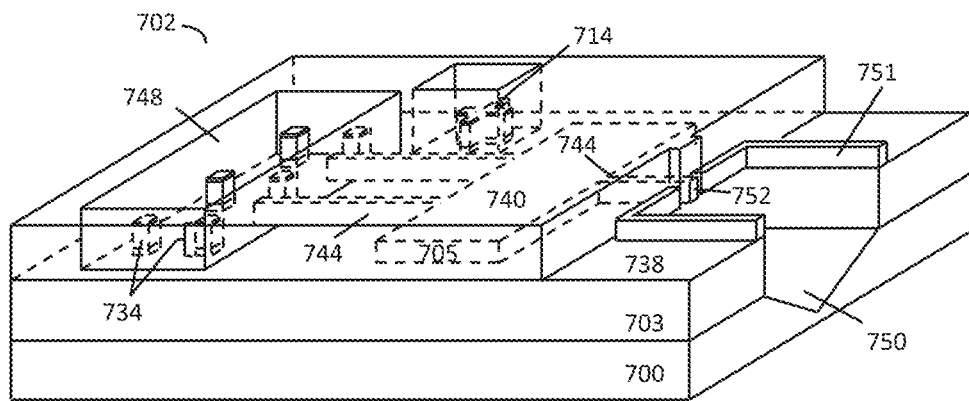
FIG. 7K. Embodiment for a step of forming one or more v-grooves and for removing the mask layer after formation of the v-grooves.
Figure 7L:
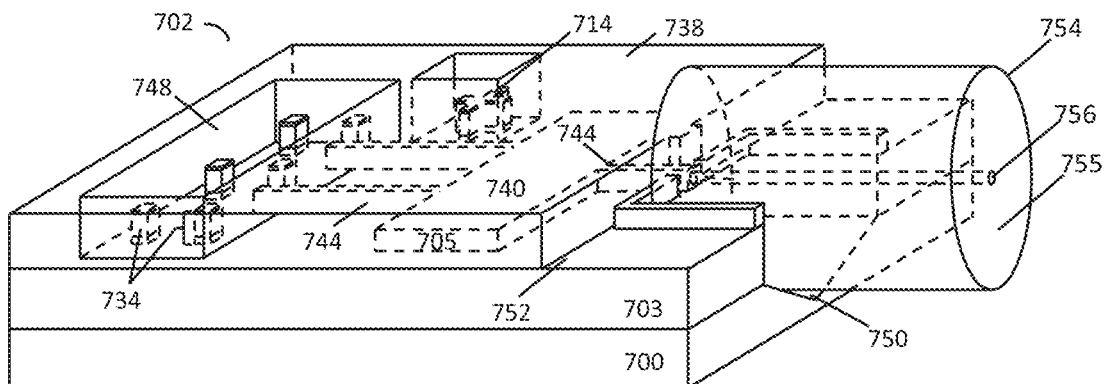
FIG. 7L. Embodiment showing a fiber optic cable positioned in a v-groove.
Figure 7M:
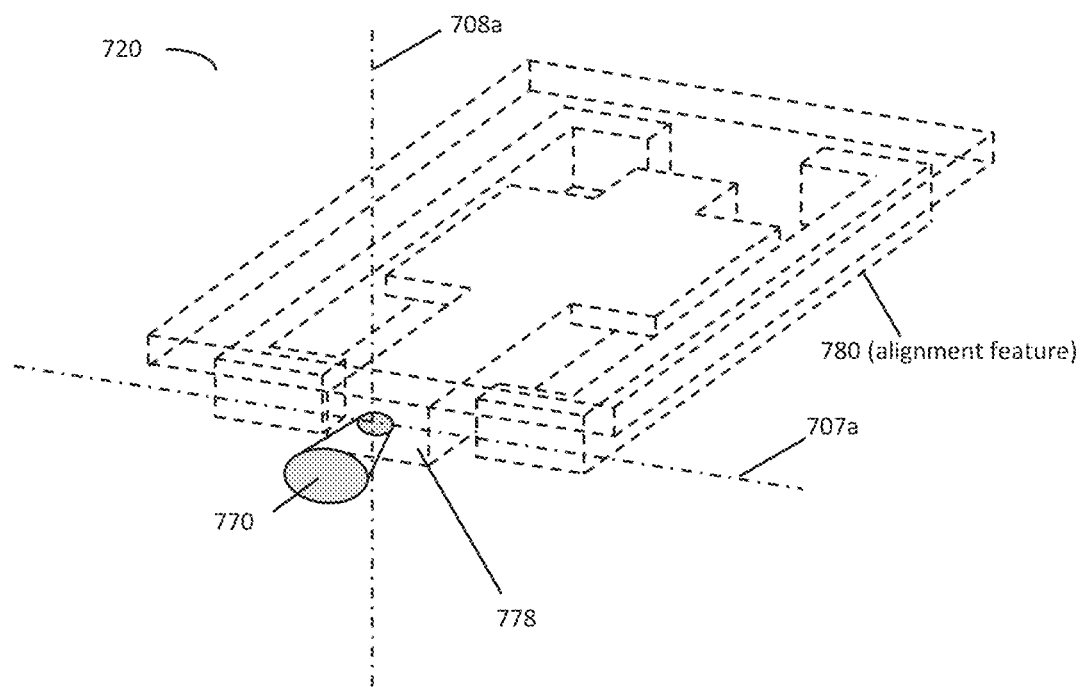
FIG. 7M. Perspective schematic drawing of an embodiment of an optoelectrical device or die with a facet that has an optical axis for alignment with optical devices on an interposer.
Figure 7N:
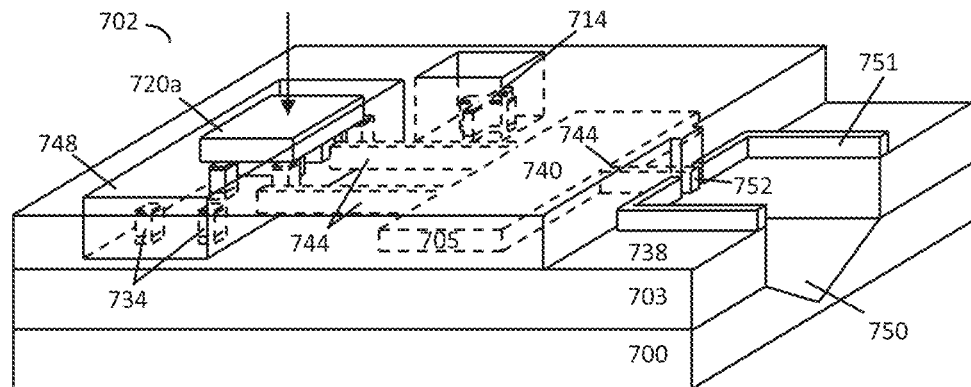
FIG. 7N. Perspective drawing of an embodiment of an interposer structure having hard mask patterned planar waveguides, fiducial marks, z-pillars, and v-groove lateral alignment aids after z-pillar formation in an interposer cavity, and after placement of a first optoelectrical die into the interposer cavity.
Figure 7O:
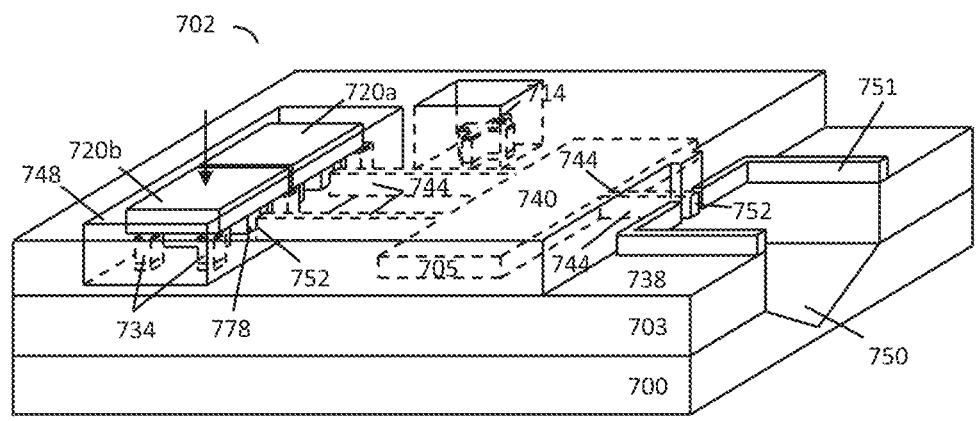
FIG. 7O. Perspective drawing of an embodiment of an interposer structure having hard mask patterned planar waveguides, fiducial marks, z-pillars, and v-groove lateral alignment aids after z-pillar formation in an interposer cavity, and placement of a first and second optoelectrical die into the interposer cavity.
Figure 7P:
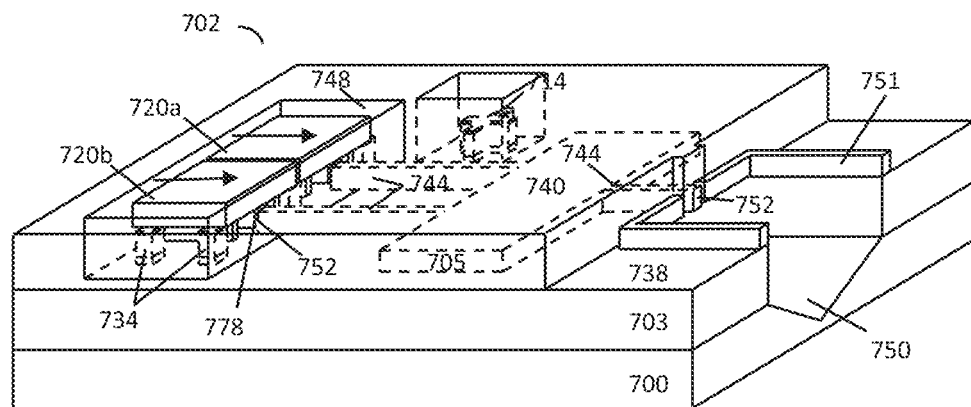
FIG. 7P. Perspective drawing of an embodiment of an interposer structure having hard mask patterned planar waveguides, fiducial marks, z-pillars, and v-groove lateral alignment aids after z-pillar formation in interposer cavity, placement of the first and second optoelectrical die, and after final positioning of a first and second optoelectrical die in an embodiment with two optoelectrical die.

An embodiment of a method of fabrication for z-pillars, fiducials, and lateral constraints are described in the process flow of FIG. 6 and the corresponding sequence of drawings in FIGS. 7A-7P.

Referring to FIG. 6, a process flowchart is shown for the formation of interposer-based PICs with embodiments of the interposer alignment structures, and aspects of embodiments described in this flowchart are illustrated in FIG. 7. In step 690 of process flow 610, a planar waveguide layer 705 is formed on a base structure, wherein the base structure 701 includes an optional electrical interconnect layer 703 on a substrate 700. The planar waveguide layer 705 on base structure 701 forms interposer 704. The electrical interconnect layer 703, as shown in FIG. 7A is formed in some embodiments on a semiconductor substrate 700 such as silicon. Other semiconducting substrates such as indium phosphide, gallium arsenide, or other semiconductors can also be used. In other embodiments, a ceramic or insulating substrate can be used. In yet other embodiments, a metal substrate can be used. And in yet other embodiments, a combination of one or more semiconductor layers, insulating layers, and metal layers are used to form a substrate 700 upon which the optional electrical interconnect layer 703 and the planar waveguide layer 705 are formed. In some embodiments, the electrical interconnect layer 703 is not in direct contact with the substrate but rather an intervening layer is present. Similarly, the planar waveguide layer 705, in some embodiments, is not in direct contact with the underlying electrical interconnect layer 703 but rather an intervening layer or layers may be present.

In hard mask layer formation step 691 of the process flow 610, a patterned hard mask 716 is formed on the planar waveguide layer 705. Hard mask layer 716 includes patterns for the formation of the optical waveguides and all or a portion of the alignment aids from the planar waveguide layer 705. In the embodiment in FIG. 7B, the alignment aids include the fiducial marks 714, the alignment pillars or z-pillars 734, and a v-groove alignment aid 751. Hard mask layer portion 716*a* in FIG. 7B shows a hard mask pattern for an embodiment of a z-pillar. Similarly, hard mask portion 716*b* shows a hard mask pattern for an embodiment of a planar waveguide 744. Hard mask portion 716*c* shows a hard mask pattern for an embodiment of a fiducial mark 714. And hard mask portion 716*d* shows a hard mask pattern for an embodiment of a v-groove alignment aid 751. In the embodiments illustrated in FIGS. 7A-7P, the v-groove alignment aid feature 751 is used to position a v-groove for placement of a fiber optic cable as further described herein.

In some embodiments, as described herein, the v-groove alignment aid 751 functions as a lateral constraint. In the embodiments for the hard mask pattern shown in FIG. 7B, portions of the patterned hard mask include the z-pillar portion 716a, planar waveguide portion 716b, fiducial mark portion 716c, and v-groove alignment aid portion 716d. These portions of the hard mask 716 are used to pattern the z-pillars 734, the planar waveguides 744, the fiducial marks 714, and the v-groove alignment aid or lateral constraint feature 751, respectively, using an etch process to remove the planar waveguide layer 705 from areas not protected by the hard mask layer 716 as shown in FIG. 7C.

Portions of the hard mask layer 716, are also used in some embodiments to form all or a portion of optical devices 740 for embodiments in which the optical devices 740 are formed wholly or in part from the planar waveguide layer 705. Optical devices 740 may be waveguides, gratings, lens, or any device that can be formed from at least a portion of the planar waveguide layer. Alternatively, in other embodiments, optical devices 740 are mounted devices, and not fabricated directly from the planar waveguide layer 705 but added at a later step in the process of forming the PIC 702. Optical device 740 can be one or more of a portion of a device formed from the planar waveguide layer and one or more of a portion of a mounted device.

In some embodiments, the planar waveguide layer 705 is formed of one or more layers of silicon dioxide, silicon nitride, and silicon oxynitride as described herein. To pattern the planar waveguides from such layers using a dry etch process, fluorinated etch chemistries in which one or more commonly utilized gases such as $CF_4$, $CHF_3$, $C_2F_8$, $SF_6$, among others, are used. In embodiments, aluminum or an alloy of aluminum can be used to form the hard mask. Aluminum hard masks are known to exhibit a high resistance to dry etching in fluorinated chemistries and thus the dimensions of the hard mask can be maintained during the etching of the planar waveguide layer 705, in which the fiducial marks 714, the reference pillars, 734, the planar waveguides 744, and the v-groove alignment aid or lateral constraint 751 are formed in Step 692 of process flow 610. A hard mask, as used herein, refers to a non-polymer based masking layer with a material that has a high resistance to the plasma etch, dry etch, or wet etch, used in the patterning of surrounding materials. Aluminum, for example, is an example of a hard mask material in embodiments. Aluminum is a metal layer that has a high resistance to fluorine containing etch chemistries. In other embodiments, other hard masks are used that also exhibit high resistance to the etch chemistry such as Au, Ag, Ni, and Pt. In other embodiments, hard masks layers such as Ti, $TiO_x$, Ta, $TaO_x$, aluminum oxide, silicon nitride, silicon carbide, or a combination of one or more of these materials are used. In some embodiments, oxygen or other oxygen-containing gas is added to the etching chemistry to increase the resistance of the hard mask to the etch chemistry. In yet other embodiments, diluents are added to the fluorinated gas chemistry such as one or more of argon, helium, nitrogen, and oxygen, among others to increase the resistance of the hard mask to the fluorinated etch chemistry. In embodiments, the masking layer typically has a slow rate of removal in comparison to the rate of removal of the planar waveguide layer. Methods for etching of silicon dioxide, silicon nitride, and silicon oxynitride are well understood by those skilled in the art of semiconductor processing, as are methods of increasing the resistance of aluminum hard mask layers and other hard mask layers using fluorinated etch chemistries.

After the patterning 692 of the planar waveguide layer to form the fiducial marks 714, the reference pillars 734, the planar waveguides 744, and the v-groove alignment aids 751, a mask material is formed over portions of the PIC that includes the hard mask patterned features 716. This mask layer is some embodiments, is a photoresist layer. In other embodiments, this mask layer is a hard mask layer. In embodiments, the mask layer is patterned to expose the underlying patterned hard mask layer portion 716b over the patterned waveguides 744 and to protect the patterned hard mask layer portion 716c over the fiducial marks 714, the patterned hard mask layer portion 716a over the reference pillars 734, and optionally the hard mask portion 716d over the v-groove alignment aid 751. Exposure of the hard mask layer portion 716b over the waveguides, however, enables removal 693 in process flow 610 of the hard mask portion 716b from the patterned waveguides 744 without the removal of the hard mask portions 716a, and 716c from the fiducial marks 714 and the z-pillars 734, and optionally from hard mask portion 716d from the v-groove alignment aid 751. In some embodiments, removal of the hard mask portion 716d may be preferred.

A schematic illustration of features of the PIC after removal of the hard mask portion 716b and subsequent removal of the mask layer that is used in embodiments to protect the hard mask portions 716a, 716c, 716d is shown in FIG. 7D. Removal of the hard mask portion 716b from the planar waveguides 744 of the hard mask layer 716 is achieved in some embodiments using a wet etch process that selectively removes the metal or other hard mask with little or no removal of the underlaying planar waveguide layer. Metal etchants, such as those used for the removal of an aluminum hard mask, for example, and that have little or no effect on silicon nitride and silicon dioxide, for example, are well known in the art of semiconductor processing. In other embodiments, a dry etch process is used. A benefit of a wet etch process to remove the hard mask portion 716b from the planar waveguide 744 below includes a high preferential selectivity for etching of the hard mask 716 with minimal removal of the underlying planar waveguides 744.

Upon completion of the removal step 693 of the hard mask portion 716b from the planar waveguides 744, and removal of the mask layer that was used to protect the hard mask portions 716a, 716c, and optionally 716d, a forming step 694 is shown in the process flow 610 to form a thick insulating dielectric layer 738 as illustrated in FIG. 7E. The thick dielectric layer 738 may be one or more layers of silicon dioxide, silicon nitride, or silicon oxynitride, for example, and may include one or more of a planar waveguide cladding layer, a buffer layer, a spacer layer, and a passivation layer, among others. In some embodiments, layer 738 includes a planarization layer and a planarization step is used to planarize the thick dielectric layer 738.

Step 695 of the process flow 610 is a forming step that includes the formation of a cavities 748, 749 in the thick dielectric layer 738. This cavity forming step 695 can include a patterned hard mask forming step as illustrated in FIG. 7F and an etching step as illustrated in FIG. 7G, among others. The hard mask 717 shown in FIG. 7F, is preferably one such as aluminum or from an alloy of aluminum, among others, formed over the insulating layer 738 and patterned using a plasma etch process or a wet chemical etch process to expose the regions of the underlying insulating layer 738 within which cavities 748,749 will be formed. Aluminum and alloys of aluminum, for example, provide a high resistance to fluorinated etchants used to etch insulating layers such as silicon dioxide, silicon nitride, and silicon oxynitride preferably used in layer 738.

In some embodiments, the insulating dielectric layer 738 is formed of one or more layers of silicon dioxide. In some embodiments, the insulating dielectric layer 738 is formed of one or more layers of silicon dioxide, silicon nitride, and silicon oxynitride. To pattern the layer 738 and in some embodiments, all or a portion of the underlying layers below the layer 738 and all or a portion of the electrical interconnect layer using a dry etch process, fluorinated etch chemistries in which one or more commonly utilized gases such as $CF_4$, $CHF_3$, $C_2F_8$, $SF_6$, among others, are used. In embodiments, aluminum or an alloy of aluminum is used to form the hard mask. Aluminum hard masks are known to exhibit a high resistance to dry etching in fluorinated chemistries and thus the dimensions of the hard mask can be maintained during the etching of the dielectric insulating layer 738, in which the reference pillars, the fiducial marks, and other alignment aids are formed in Step 695 of process flow 610. In other embodiments, other hard masks are used that also exhibit high resistance to the etch chemistry such as Au, Ag, Ni, and Pt. In other embodiments, hard masks layers such as Ti, $TiO_x$, Ta, $TaO_x$, aluminum oxide, silicon nitride, silicon carbide, or a combination of one or more of these materials are used. In some embodiments, oxygen or other oxygen-containing gas is added to the etching chemistry to increase the resistance of the hard mask to the etch chemistry. In yet other embodiments, diluents are added to the fluorinated gas chemistry such as one or more of argon, helium, nitrogen, and oxygen, among others to increase the resistance of the hard mask to the fluorinated etch chemistry. In embodiments, the masking layer typically has a slow rate of removal in comparison to the rate of removal of the layer 738. Methods for etching of silicon dioxide, silicon nitride, and silicon oxynitride are well understood by those skilled in the art of semiconductor processing, as are methods of increasing the resistance of aluminum hard mask layers and other hard mask layers using fluorinated etch chemistries.

The effect of the etching step on the formation of the cavity 748,749 is illustrated in FIG. 7G. The z-pillars 734 are shown that result from the exposure of the buried hard mask portion 716a that was formed from the hard mask 716 in cavity 748. Exposed fiducials 714 are also shown that result from the exposure of the buried hard mask portion 716c that was formed from the hard mask 716 in cavity 749.

In some embodiments, it is or may not be preferable or necessary to expose the buried fiducial marks 714 to obtain the improved clarity of the fiducials in subsequent steps in which the fiducials 714 are used in the fabrication of the PIC 702, or for the placement of optical die onto the PIC 702. In these embodiments, the patterning step for the hard mask 717 that is used to expose the areas of the underlying insulating layer 738 to form the cavities 748 will not include an allowance for exposure of the areas of the underlying insulating layer 738 to also form cavities 749 to expose the fiducials 714 within these cavities 749 as illustrated in FIG. 7H. Improved visibility of the fiducials 714 is to be expected upon the formation of the cavity 749, but may not be required in some embodiments. Improved visibility of the fiducials may not be required, for example, in embodiments with thin insulating layers 738, in applications in which the surface of the thick insulating layer 738 remains visibly transparent, and in embodiments in which the contrast between the fiducials and the underlying layers is adequate. Exposure of the fiducials 714 with the formation of cavity 749, in general, provides improved visibility in embodiments for which the cavities 749 are provided since the focal plane of the fiducial 714 is shared with the focal plane of the z-pillars 734 and other alignment aids formed using the hard mask 716. The improved visibility also results from the elimination of the effects that processing steps such as mechanical planarization or other process effects that may increase the opacity of the layer 738 that might limit visibility of a buried fiducial. In the embodiment illustrated in FIG. 7G, the alignment pillars 734 are shown in cavity 748 and the fiducials 714 are shown in cavity 749. In other embodiments, the fiducials 714 are formed in the same cavity 748 as the alignment reference pillars 734. In other embodiments, two or more fiducial marks 714 are formed. In embodiments with two or more fiducial marks 714, one or more fiducial marks 714 may be formed within the cavity 748 and one or more fiducial marks 714 may be formed in a separate cavity 749. In yet other embodiments with two or more fiducial marks 714, multiple cavities 749 are formed with fiducial marks 714. The fiducial marks 714 illustrated herein are shown in the shape of a "+" sign. Other shapes are also used in embodiments. Effective shapes for fiducial marks are well understood by those skilled in the art. Fiducial markings may also be formed using features formed in the hard mask layer that have other structural or photonic functions.

Also shown in the embodiments in FIG. 7G and FIG. 7H, is the v-groove alignment aid 751. This v-groove alignment aid 751 is exposed in these embodiments using the same patterned hard mask 717 and etch process used in the formation of one or more of the cavities 748, 749. An aspect of embodiments is the use of a common lithographic patterning step to define the v-groove alignment aid 751 with the planar waveguide 744 to provide lithographic level of alignment between these features of a PIC using the techniques described herein. The v-groove is used in embodiments to position a fiber optic cable, the core of which is aligned in embodiments with a portion of a planar waveguide 744. And although the patterning of the v-groove alignment aid 751 from the planar waveguide layer, in embodiments, is performed concurrently with the patterning of the fiducials 714, the planar waveguides 744, and the z-pillars 734, the subsequent removal of the oxide 738 to expose the v-groove alignment feature 751 from within the oxide 738 need not be performed concurrently with the formation of the cavities 748, 749.

In the schematic drawing in FIG. 7I, the PIC 702 is shown in embodiments after removal of the hard mask 717 used in the formation of the cavities 748,749 in the insulating layer 738, and removal of the oxide 738 in proximity to the alignment aid 751 as shown, for example, in the FIG. 7I.

Prior to completion of the PIC 702, the v-grooves that are commonly formed on the PIC substrates to accommodate the attachment of fiber optic cables for the delivery and extraction of optical signals from the PIC 702 are typically formed. FIG. 7J and FIG. 7K show an embodiment of a method for forming the v-groove using the alignment aid 751 patterned from the planar waveguide layer 705. Significant advantages to the alignment of the core of the fiber optic cable with waveguide facet 752 of the planar waveguides 744 formed in the planar waveguide layer 705 are enabled with embodiments described herein. The use of the patterned planar waveguide layer 705 to simultaneously form the alignment aid 751 and to form the waveguides 744, provides lithographic-level resolution for the ultimate alignment of the fiber optic core 756 placed within the v-groove alignment aid 751 and the waveguide facet 752 of the planar waveguides 744 to which the core 756 of a fiber optic cable 754 is aligned. In the embodiment shown in FIG. 7J, a patterned PR mask is used to expose the portion of the substrate for the formation of one or more v-grooves in the area of the substrate within the alignment aid 751. This patterned photoresist mask 753 protects at least a portion of the PIC during the formation of the v-grooves 750. The etch process for forming v-grooves is well understood in the art of semiconductor fabrication and is typically formed using a wet etch process.

Referring to FIG. 7K, an embodiment of the PIC 702 is shown after formation of the v-groove 750 and removal of the photoresist mask 753. Surfaces within the v-groove 750 form a contact with the cladding layer 755 of a mounted fiber optic cable 754. FIG. 7L shows the PIC 702 with a portion of a fiber optic cable 754 positioned in the v-groove 750 to illustrate the alignment of the fiber optic cable core 756 with the end facet 752 (shown in FIG. 7K) of the portion of the planar waveguide 744 to which the core 756 is aligned. Alignment of the fiber core 756 with the waveguide facet 752 of the planar waveguide 744 is necessary for efficient transfer of optical signals between these devices.

It should be noted that the v-grooves 750 are typically formed prior to the completion of the PIC fabrication process, and that the fiber optic cables 754 are typically not mounted to the PIC 702 until after the completion of the PIC fabrication process and including the completion of the singulation of the substrate into individual PIC die. The positioning of the fiber optic cable 754 into the v-groove 750, however, is shown in FIG. 7L to illustrate the alignment of the core 756 of the fiber optic cable 754 with the core of the planar waveguide 744 and the benefit of forming the alignment aid 751 lithographically with the planar waveguide 744.

The sequence of drawings in FIGS. 7A-7L illustrate the formation of elements of a self-aligned optoelectrical device structure in an interposer-based PIC 702 and include the z-pillars 734 in cavities 748, the buried planar waveguide structures 744 that terminate at the walls of the cavity 748, and the buried fiducial marks 714. The sequence of drawings in FIGS. 7A-7L also illustrate the formation of an embodiment of a form of v-groove or lateral constraint alignment aid 751 used in the positioning of a v-groove 750 relative to an end facet 752 of a portion of a planar waveguide 744. Upon formation of the elements of the PIC structure 702 as shown, the implementation of the alignment features in embodiments in which optical die are positioned into the PIC 702 are thusly demonstrated in FIG. 7M-7P.

Referring to FIG. 7M, a perspective drawing is shown of an embodiment of an optoelectrical die 720. Optoelectrical die 720 in some embodiments is an optical emitting device such as a laser, or a photodiode, for example. In other embodiments, photoelectrical die 720 is a receiving device such as a photodiode or other form of photodetector. In yet other embodiments, the device 720 is an optical device such as a waveguide or a grating. Examples of waveguide devices include spot size converters and arrayed waveguides, among others. Other examples of waveguide devices include waveguides through which optical signals are propagated, routed, modulated, focused, transformed, or otherwise included in a photonic circuit to receive, direct, modify and carry optical signals within all or a portion of the photonic circuit. In yet other embodiments, the device 720 is an echelle grating or other form of grating. In yet other embodiments, the device 720 is a lens. Device 720 can be any optical or optoelectrical device that can be formed into a die that can be mounted using the alignment features described herein.

Die 720 is shown in FIG. 7M with facet 778. Facet 778 is a surface of the device 720 through which an optical function of the device 720 is accessed or interfaced external to the device 720. Facet 778 for embodiments in which the device 720 is a laser, for example, is the surface through which the optical signal from the laser is emitted. For embodiments in which the device 720 is a photodetector, for example, facet 779 is the surface through which the optical signal is received or otherwise detected. Also shown in FIG. 7M is the optical axes of device 720 that include the horizontal axis 707a and the vertical axis 708a. The axes are shown in the embodiment in FIG. 7M at the center of an optical signal on the facet 778 of device 720 and the alignment of axes such as those shown in FIG. 7M with axes of other devices in PICs are further described herein.

Referring to FIG. 7N, aspects of the process of utilizing the alignment features described herein to place optoelectrical die 720 into the cavities 748 of the PIC 702 and to align the optical and electrical features of the placed optoelectrical die 720 to the optical and electrical circuit features on the PIC 702 are described. FIG. 7N shows a schematic drawing of the interposer-based PIC 702 after placement of a first optoelectrical die 720a. Optoelectrical die 720a is, for example, a laser die. The optoelectrical die 720a can be placed with a high degree of accuracy into the cavity 748 and within the spacing between the alignment reference pillars 734. This high placement accuracy is enabled, in embodiments, as a consequence of having formed the fiducial marks 714 and the z-pillars 734 using the same lithographic process and hard mask 716. Use of the same lithographic process and hard mask 716 for the fiducials 714 and the reference pillars 734 provides for precisely referenced mechanical alignment pillars 734 relative to the fiducial marks 714 for features that are formed from a common planar waveguide layer 705. Maintaining the visibility of the buried fiducials 714 is accomplished in embodiments, for example, with the use of a masking and etch process to expose the buried fiducials 714. In other embodiments, thin transparent insulating films 738 are used over the fiducials 714 to maintain visibility of the fiducial marks 714 in embodiments in which the fiducials 714 and the z-pillars 734 are patterned and formed from the same hard mask layer 716. Maintaining the visibility of the fiducials is beneficial for achieving high resolution in the placement of the optoelectrical die 720 in automated die placement equipment, for example. In the embodiment shown in FIG. 7N, the fiducials have been exposed from within the insulating layer 738 with the formation of the cavity 739.

In the embodiment illustrated in FIG. 7N, placement of a first optoelectrical die 720a is followed by the placement of a second optoelectrical die 720b as illustrated in FIG. 7O. In the embodiment shown in FIG. 7N and FIG. 7O, a cavity 748 is shown for which allowances are made to accommodate two optoelectrical die 720a, 720b. In other embodiments, more than two optoelectrical die 720 are accommodated within a cavity 748 and following placement of the second die 720b, the additional optoelectrical die 720 are positioned within the cavity. In other embodiments, cavity 748 accommodates only a single optoelectrical die 720a and thus only a single optoelectrical die 720a is placed in the cavity 748. In these and other embodiments, the optoelectrical die 720 includes one or more optoelectrical emitting devices such as a laser or an LED, for example, among others, or one or more optoelectrical receiving devices such as a photodetector, for example, among others. In other embodiments, the optoelectrical die 720 includes one or more optoelectrical emitting devices and one or more optoelectrical receiving devices. In other embodiments, the optoelectrical die 720 includes one or more optical devices.

In embodiments, after placement, the optical and electrical features of the optoelectrical die 720a, 720b that have been placed into the cavities 748 require alignment with the optical and electrical features on the interposer-based PIC 702. The arrows shown in FIG. 7P indicate the direction of motion of the optoelectrical die 720, in the embodiment shown, upon initiation of an alignment step in which one or more optical and electrical features are brought into alignment between the optoelectrical die 720 and the optical and electrical features of the interposer-based PIC 702. The positioning of the optoelectrical die 720 over the z-pillars 734 using the fiducial marks 714 for lateral reference provides for the subsequent alignment with the other features and devices formed in the planar waveguide layer 705. The co-formation of the fiducials 714 and the z-pillars 734 from the planar waveguide layer 705 enables precise alignment of the mounted die 720 on the interposer-based PIC 702 with portions of the planar waveguides 744. In the embodiment shown in FIG. 7P, facets 778 of the mounted optoelectrical die 720 are moved into alignment with the facets 752 of the planar waveguides that intersect with the wall of the cavity 748. Additional details are provided herein for the placement, alignment, and associated steps, with additional details on specific aspects of embodiments of the alignment aids on interposer-based PIC devices 702.

Figure 7Q:
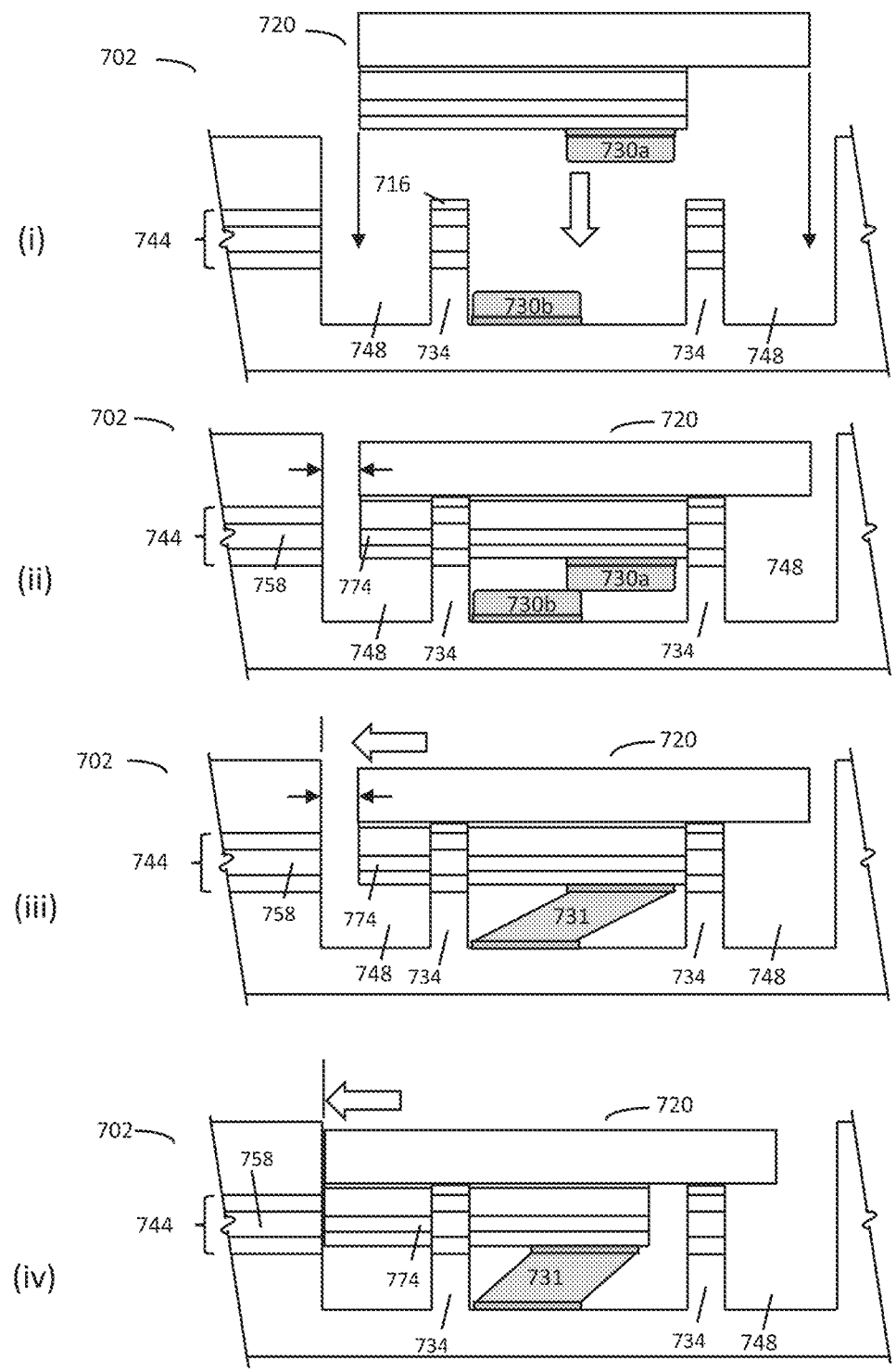
FIG. 7Q. An example alignment process for a die mounted in a cavity on an interposer that includes the following steps: (i) Positioning of an optical device over a cavity in the interposer, (ii) placement of the optical device into the cavity, (iii) lateral alignment of the device in the cavity with initial heating and melting of the solder connection, and (iv) after alignment and contact formation.
Figure 7R:
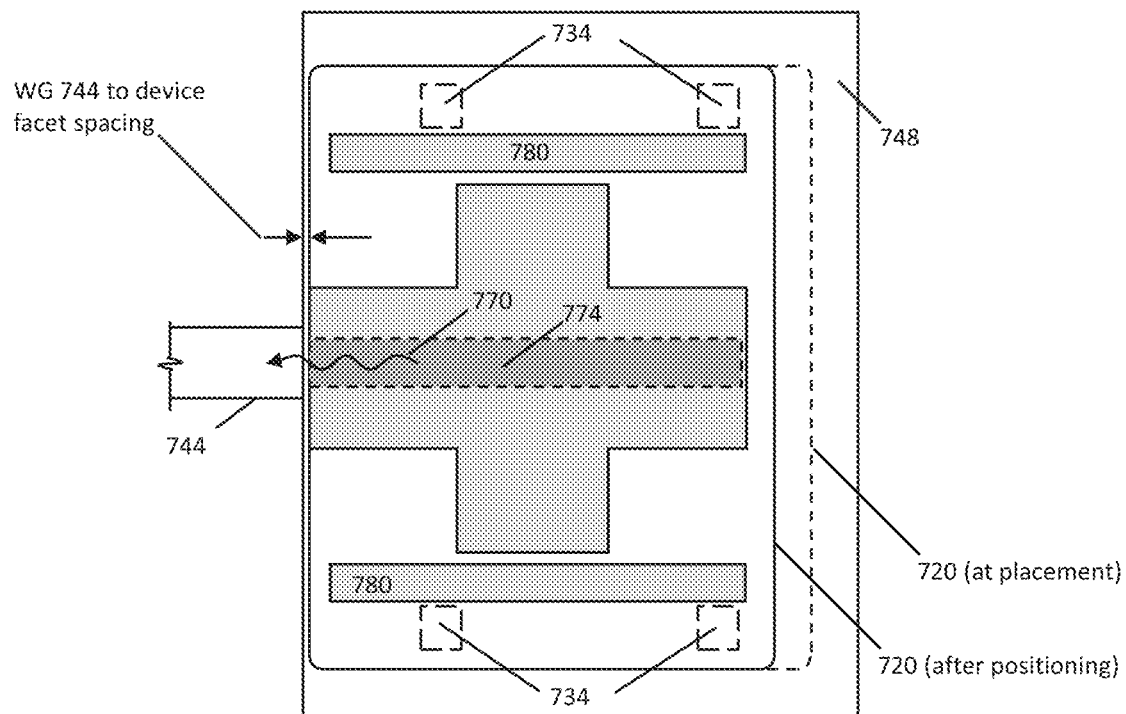
FIG. 7R. (i) Schematic top-down drawing showing the position of a die after placement into a cavity on an embodiment of an interposer with alignment aids and showing the position of the die after alignment and contact formation using solder melting to align the die to the planar waveguide, (ii) schematic side view of the embodiment.
Figure 7R:
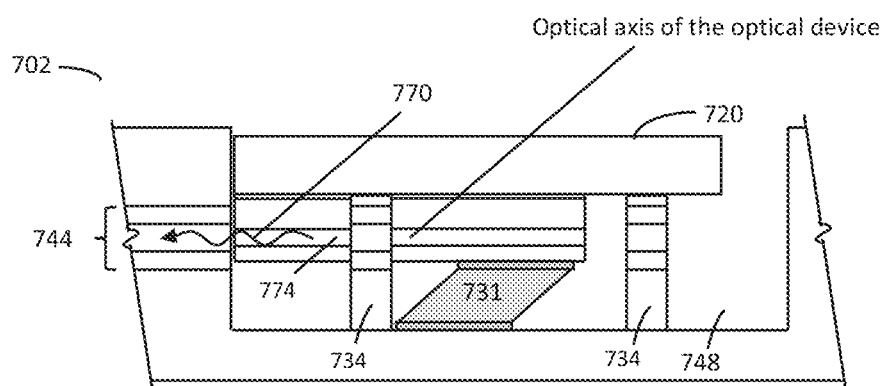

Referring to FIGS. 7Q and 7R, a sequence of drawings is shown that illustrate a method that can be utilized in the alignment of optical and optoelectrical devices in embodiments, as for example, the alignment procedure described for mounted devices 720a and 720b shown in FIGS. 7N-7P.

A lateral force can be formed on mating devices or die by bringing into proximity, pairs of solder contact layers on mating surfaces, and to raise the temperature of the solder until the solder melts, after which surface tension in the liquid solder acts to pull the two contacts toward one another. The lateral force is formed when the solder contact surfaces, misaligned at placement, act to be brought into areal alignment. An approach utilizing this principal is illustrated in FIG. 7Q as it applies to embodiments for bringing the optical and electrical features of the optoelectrical die 720a, 720b, for example, into alignment with optical and electrical features of the interposer-based PIC 702.

In FIG. 7Q(i), a schematic drawing of an embodiment of an optoelectrical device or die 720 is shown with this device 720 positioned over the cavity of an interposer-based PIC 702. Solder layer 730a, formed for example, as shown on an electrical contact of the optoelectrical die 720, is misaligned at placement with solder layer 730b on the mating contact of the interposer-based PIC 702 as the optoelectrical die 720 is placed into the cavity 748. The misaligned solder layer 730a on the optoelectrical die 720 and the solder layer 730b in the interposer cavity 748 are shown in FIG. 7Q(ii) after placement over the z-pillars 734 of the optoelectrical die 720 into the cavity 748 of the interposer, further showing the intentional misalignment of the solder layers after placement. In some embodiments, after one or more die have been placed onto the interposer, a heating source is applied to the structure such that the solder layer 730a and solder layer 730b are raised in temperature above the solder melting temperature. As the solder melts and the solder layer from each contact is combined into a single molten contact 731 as illustrated in FIG. 7Q(iii), the surface tension in the molten solder will cause lateral movement of the optoelectrical die 720 in a direction such that the two misaligned electrical contacts will be brought into further areal alignment which then causes the spacing between the optical features of the optical die 720 and the planar waveguide 744 to be reduced. Movement of the die (in the direction of the large arrow in FIG. 7Q(iii)) is expected to continue, for example, until the motion is blocked by contact between the optoelectrical die 720 with the cavity wall 748, motion is blocked by contact between a feature of the optoelectrical die 720 and an obstacle such as an intentionally positioned stop or lateral constraint on the interposer, until the contacts of the interposer and the optoelectrical die are substantially aligned, or until the heating source is removed. In FIG. 7Q(iv), the movement of the optoelectrical die 720 is shown to have been halted by contact between the wall of the cavity 748 and the substrate of the optoelectrical die 720 after the optical and mechanical features of the optoelectrical die 720 have been brought into alignment with the optical features of the interposer-based PIC 702. The large arrow is shown to have reached the dimension line in the FIG. 7Q(iv). FIGS. 7Q(ii)-7Q(iii) show the core of waveguide 744, for example, with waveguide core 758 in alignment with the optical feature 774 of optical device 720. The optical axis of the device 720 is typically contained with the optical feature 774 of the device 720.

FIG. 7R(i) shows a top-down view and FIG. 7R(ii) shows a cross sectional view of the cross section shown in FIG. 7Q(iv) to further illustrate aspects of the solder melt process in the alignment of the optical features of the optical device 720 with a planar waveguide 744 on the interposer portion of a PIC 720. The top-down view shows the z-pillars 734 on the interposer substrate and the alignment features 780 on the optical die 720 that guide the optical die 720 into the aligned position in the cavity 748 during the alignment process for the alignment process shown in FIGS. 7Q(i)-7Q(iv). Other alignment processes may also be used in other embodiments. The dotted line with label "720 (at placement)" shown in the top-down view in FIG. 7R(i) shows the edge of the die 720 at placement in the embodiments and solid edge labeled "720 (after positioning)" shows the position of the device 720 after alignment.

Alignment of optical features on the optoelectrical die 740 with optical features on the interposer is required in PICs, for example, to ensure that optical signals can be exchanged between the interposer-based PIC 702 and the mounted optoelectrical die 720. Optical signal 770 in FIGS. 7R(i) and FIG. 7R(ii) is shown propagating from the optical feature 774 of device 720, for example, to the core 758 of a planar waveguide 744 on the interposer-based PIC 702. An optical feature on a laser, for example, is the emitting facet of the laser where the optical signal is emitted. An optical feature on a photodetector, in another example, is the facet or surface of the photodetector on which the light is received.

It should be noted that the procedure for alignment utilizing the melting of solder as described in FIG. 7Q can be utilized in embodiments for both optical and optoelectrical devices regardless of whether or not the contact formed with the solder functions as an electrical contact to an underlying electrical interconnect. For optical devices, for example, PICs 702 may be configured with the solder contacts but these contacts may not be used to form an electrical contact for devices that do not have an electrical feature or that require an electrical input or output, as in for example, a grating, a lens, or other optical device. In optoelectrical devices such as a laser or a photodetector, the solder connections described in FIGS. 7Q and 7R are utilized for alignment of the facets of these devices with optical features on the PICs 702 and to form an electrical contact with the underlying electrical interconnects in the electrical interconnect layer 703.

Figure 7S:
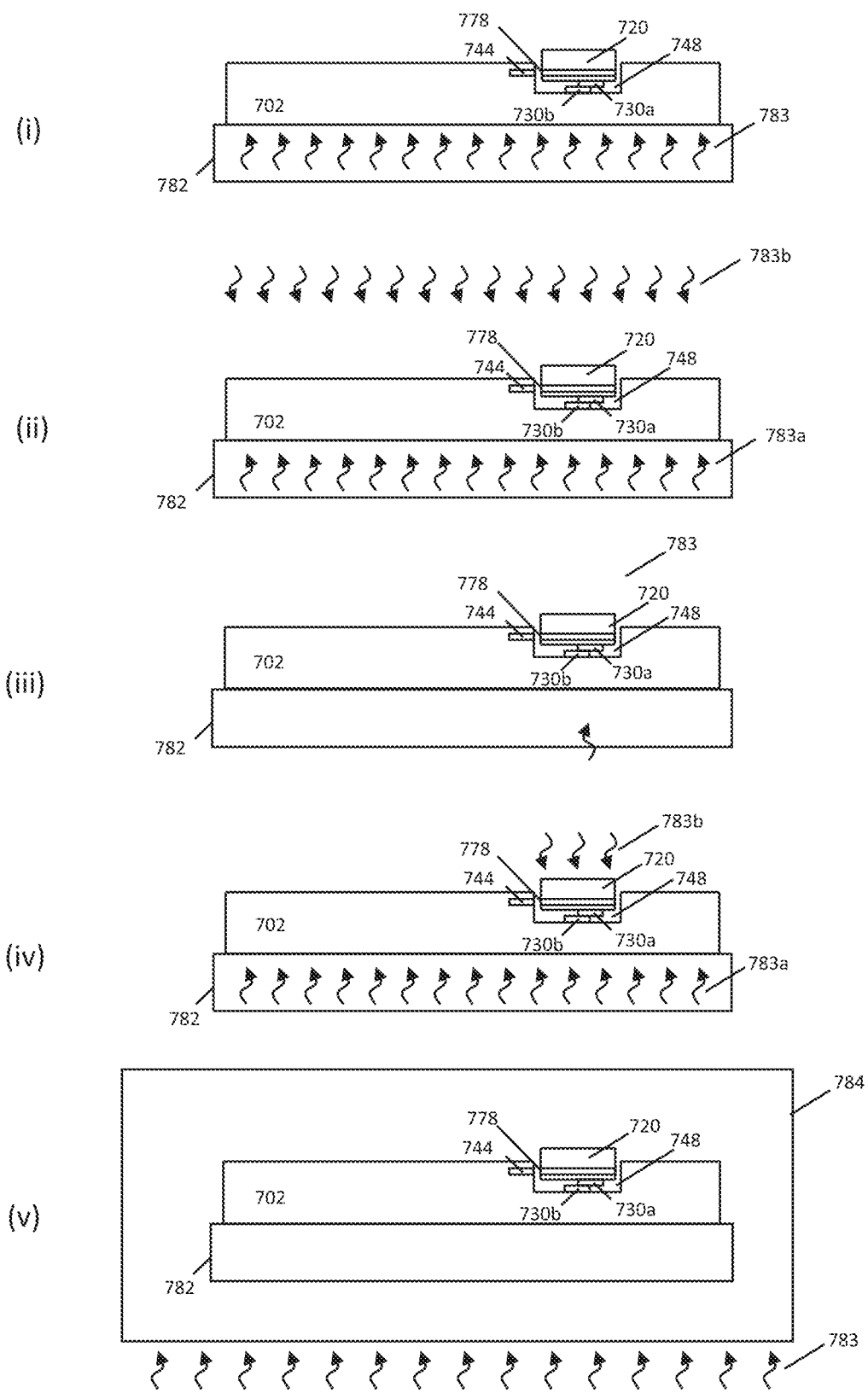
FIG. 7S. Example apparatus for heating of the solder connections between the mounted die and the interposer after placement to melt the solder connections and to align an optical device to optical feature on the interposer (i) heating of the substrate, (ii) heating of the substrate and radiative heating from above the substrate, (iii) laser heating of the solder connection through the substrate, (iv) heating of the substrate and heating of the die, (v) heating of the ambient.

In some embodiments for alignment of devices that utilize the alignment features and methods described herein, a heating source is applied to the one or more of the solder layers 730a, 730b after one or more optoelectrical die 720 have been placed into cavities 748 on the interposer-based PIC 702. This and other examples of embodiments for applying heat to the solder layer 730a and solder layer 730b are further illustrated in FIG. 7S. In FIG. 7S(i), interposer-based PIC 702 with one or more optoelectrical die 720 is positioned on a platen 782 and exposed to a heating source 783. The heating source 783 is used to raise the temperature of the solder layers 730a, 730b. Heating sources 783, as described herein, are any one or more of an electrically resistive heating source, a radiative heat source such as an IR lamp or other photon source, a heated air or other gas source, and one or more lasers, among others. In FIG. 7S(ii), a second heat source 783 is applied over the interposer-based PIC 702 in addition to the heat source 783 positioned below the substrate 702 as shown. In embodiments shown in FIG. 7S(ii), heating is applied to the substrate 702, simultaneously or asynchronistically both below and above the PIC substrate 702. The heating source 730a heats the PIC 702 from below and heating source 730b heats the PIC 702 from above as shown and directly heats the optoelectrical die 720. Embodiments, as illustrated in FIG. 7S include those embodiments in which one of the heat sources 783a, 783b is not present or not active. In yet other embodiments, as shown in FIG. 7S(iii), a local heat source is applied to the optoelectrical die 720 to heat the solder connections 730a, 730b. In these embodiments, heating is provided to one or more optoelectrical die 720 from a localized heat source 783 such as from a laser, or focused optical source. Heating of the solder connections 730a, 730b in these embodiments, are beneficial in that the heating can be performed as the optoelectrical die are being placed on the PIC substrate 702. In some embodiments, a first heating step can be applied to the solder connection forming a temporary bond without a full alignment step. Laser tacking can be performed very quickly, and once all of the devices are tacked into place, an entire substrate with a multitude of tacked die can be heated together to perform the longer alignment step. In embodiments, the time to temporarily position a die in place can be on the order of less than a second to a couple of seconds, whereas the alignment steps can take up to 10 seconds or longer. Tacking the die in place using a tacking configuration, can result in considerable time savings when the alignment steps are performed at the wafer level after a multitude of die have been placed. Post tacking processes benefit from the use of the captured lateral alignment features such as the captured features shown in FIG. 5C, for example, in which the z-pillars on the interposer are surrounded by a recess formed on the attached die. The post tacking heating steps can be performed in all or portions of wafer level heating apparatuses such as those shown in FIGS. 7S(i), 7S(ii), 7S(iv), and 7S(v). In FIG. 7S(iv), embodiments are shown in which a heating source 783a provides heat below the PIC substrate 702 and is combined with a localized heat source 783b. In some embodiments illustrated in FIG. 7S(iv), the heating source 783a raises the temperature of the PIC substrate 702 such that the solder layers 730a, 730b are raised above the melting temperature to initiate the alignment of the optoelectrical die 720. In other embodiments illustrated in FIG. 7S(iv), the heating source 783a does not raise the temperature of the PIC substrate 702 and the solder layers 730a, 730b above the melting temperature but the heating source 783a raises the temperature of the PIC substrate 702 partly and the local heating source 783b is used to provide the additional rise in the temperature above the solder melting temperature. For example, if the melting temperature of the solder layers 730a, 730b is 180° C., the heating source 783a is used in this example to raise the temperature of the platen to 175° C., and the localized heat source 783b is used to further raise the temperature such that the temperature of the solder layers 730a, 730b is above 180° C. required to melt the solder and cause the alignment of the optoelectrical die 720 with the interposer-based PIC 702. And in yet other embodiments, as illustrated in FIG. 7(v), one or more interposer-based PICs 702 are placed into a temperature-controlled environment 784, such as an oven, to raise the temperature of the solder layers 730a, 730b and to cause the alignment of the optoelectrical die 720 with the interposer-based PIC 702.

In some embodiments, the substrate is exposed to a heating source after the placement of the optoelectrical die 720 into the cavity 748. This alignment step can be performed immediately upon placement or after one or more die have been placed, or after all of the die 720 have been placed onto the interposer-based PIC 702. In some embodiments in which the alignment step is performed immediately after placement, the alignment is accomplished, for example, by applying a source of heat to the interposer substrate during the placement process. In other embodiments, a source of heating of the substrate is applied after one or more of the optoelectrical die 720 have been placed onto the interposer. It is advantageous, for example, in some embodiments, to place all of the die onto the interposer substrate, or to place all of one type of optoelectrical die in embodiments for which multiple types of die are placed onto the interposer substrate, and to then apply a heating source to perform an alignment step for all of the die for which alignment is required. In some embodiments for which multiple types of devices are placed into the cavities 748 of the interposer substrate and for which alignment is required, solder layers 730 with a melting temperature that is the same as that used for subsequent layers is used for the first set of devices that are placed and aligned onto the substrate. In other embodiments for which multiple types of devices are placed into the cavities 748 of the interposer substrate and for which alignment is required, a solder layer 730 with a melting temperature that is higher than that used for subsequent layers is used for the first set of devices that are placed and aligned onto the substrate. Use of decreasing solder melting temperatures in subsequent alignment steps can reduce or eliminate the minimize the effect of the heating during subsequent alignment steps on previously aligned optoelectrical die 720.

In some embodiments, many or all of the optoelectrical die 720 are placed into the cavities 748 on the interposer-based substrate 702 prior to heating and then the wafer is heated using one of the heating configurations shown schematically in FIG. 7S(i)-7S(v), or some other heating configuration. In other embodiments, a single optoelectrical die 720 or a small number of optoelectrical die 720 are placed onto the interposer-based PIC 702 and then heated locally using a heating configuration such as the configuration shown in FIGS. 7S(iii) and 7S(iv), for example, or another heating configuration.

In other embodiments, a first set of optoelectrical die 720 with a first solder type with a first melting temperature are placed into the cavities 748 on the interposer-based substrate 702 and then heated to a first temperature to cause the alignment of the electrical and optical features of the optoelectrical die 720 with the optical and electrical features of the interposer-based PIC 702. A second set of optoelectrical die 720 with a second solder type with a second melting temperature are placed into the cavities 748 on the interposer-based substrate 702 and then heated to a second temperature, lower than the first temperature, to cause the alignment of the electrical and optical features of the optoelectrical die 720 with the optical and electrical features of the interposer-based PIC 702. In yet other embodiments, additional sets of optoelectrical devices with additional solder types, each set utilizing a solder with a reduced melting temperature than the prior set, are placed into the cavities 748 of the interposer-based PIC 702 and heated to cause the alignment of the optoelectrical die 720.

Figure 7T:
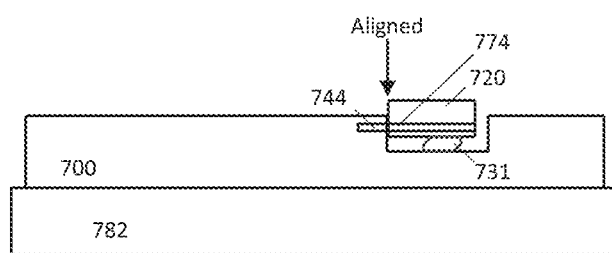
FIG. 7T. Example of an embodiment of a die on an interposer after reflow heating of the solder connections to melt the solder connections to align optoelectrical die to interposer features.

Referring to FIG. 7T, an embodiment of an optoelectrical die 720 on an interposer-based PIC 702 is schematically shown. The embodiment shows one of multiple PIC devices formed on a substrate using semiconductor fabrication methods in which a multitude of devices are formed on a large wafer or substrate using integrated wafer scale processing techniques. In the embodiment shown in FIG. 7T of an optoelectrical die 720 on an interposer substrate, the figure shows a mounted device after heating and melting of the solder layers 730*a*, 730*b* shown in FIG. 7S(i)-7S(v) to form the melded solder connection 731 shown in FIG. 7T. The optical and electrical features of the optoelectrical die 720 have aligned, after the heating and alignment steps, with the optical and electrical features of the interposer-based PIC 702. Note that the mounted optoelectrical die 720 has moved to the left as shown in FIG. 7T, and in this embodiment, has made contact with the wall of the cavity 748. The optical feature of the optoelectrical die 720, such as the emitting facet of a laser for example, is shown aligned with the exposed facet of planar waveguide 744 on the interposer-based PIC 702. In other embodiments, the optical device is aligned when making contact with a lateral constraint.

In some embodiments, placement of the optoelectrical die 720 into the interposer cavities 748 and subsequent heating of the solder layers 730*a*, 730*b* on the PIC interposer substrate 702 is done prior to singulation of the substrate into individual PIC die 702. In other embodiments, placement of the optoelectrical die 720 into the interposer cavities 748 and subsequent heating of the solder layers 730*a*, 730*b* on the PIC interposer substrate 702 is performed after singulation of the substrate into individual die.

Embodiments of the alignment aids described herein can be formed in a range of configurations and can include variations in the quantities, the shapes, the lateral positions, and the vertical positions of these alignment aids. Embodiments showing variations in the quantities and positions of the z-pillar alignment aids is presented in FIG. 8. Further variations in the shape and positioning of some embodiments for the lateral constraint alignment aids are presented in FIGS. 9-10. It should be noted, that additional variations in the shape and positioning of the z-pillars and the lateral alignment aids can be anticipated from the embodiments shown, and that other shapes, positions, and quantities for the z-pillars and the lateral alignment aids remain within the scope of embodiments.

Figure 8A:
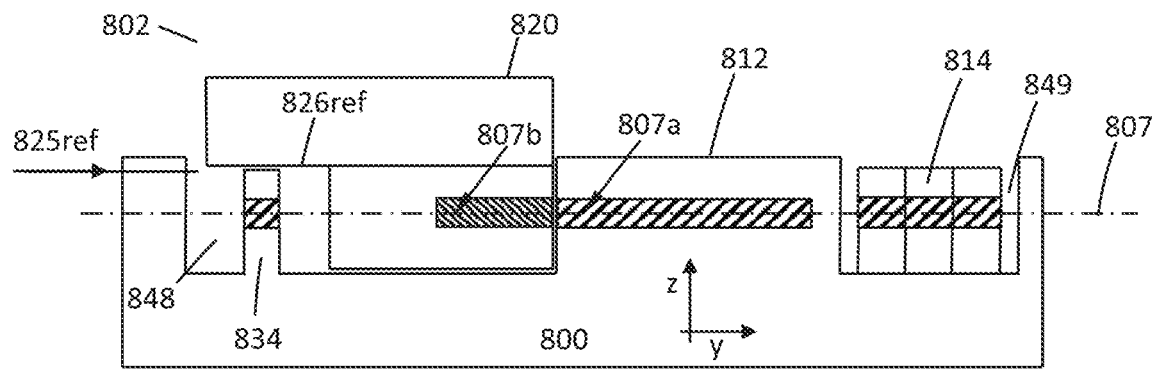
FIG. 8A. Embodiments of two optical or optoelectrical devices with aligned optical signal planes: (i) cross section, (ii) top-down view with single pillar and fiducial, and (iii) top-down view with two pillars and fiducial.
Figure 8A:
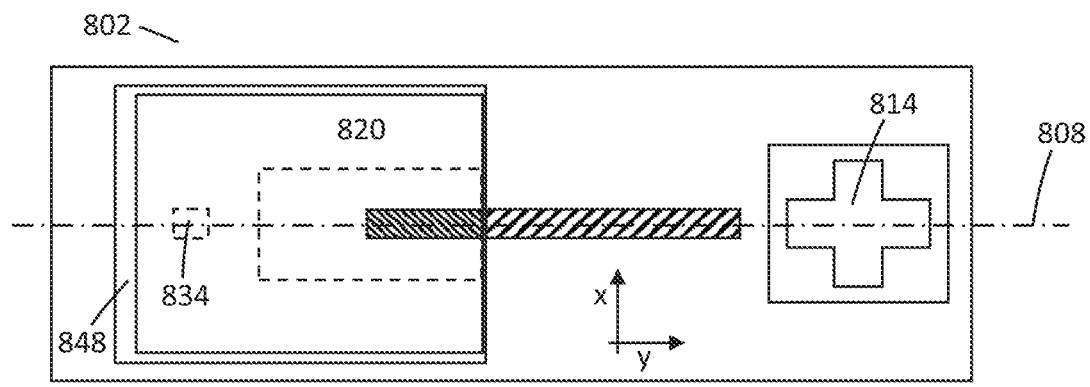
Figure 8A:
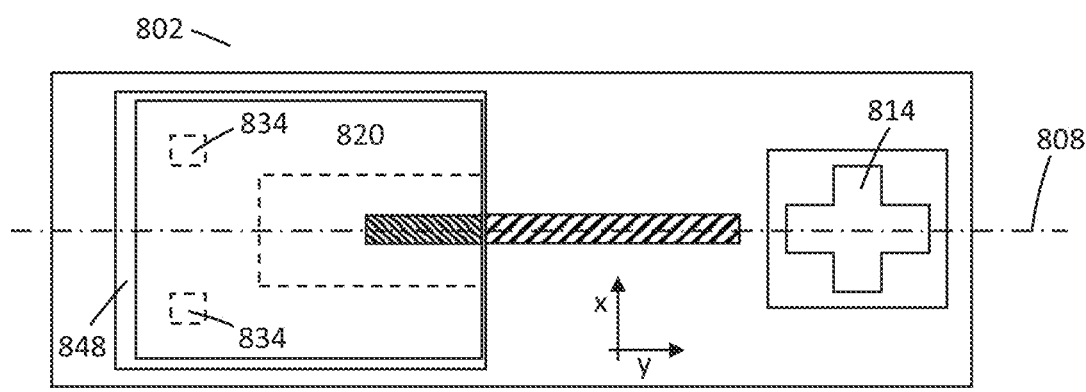
Figure 8B:
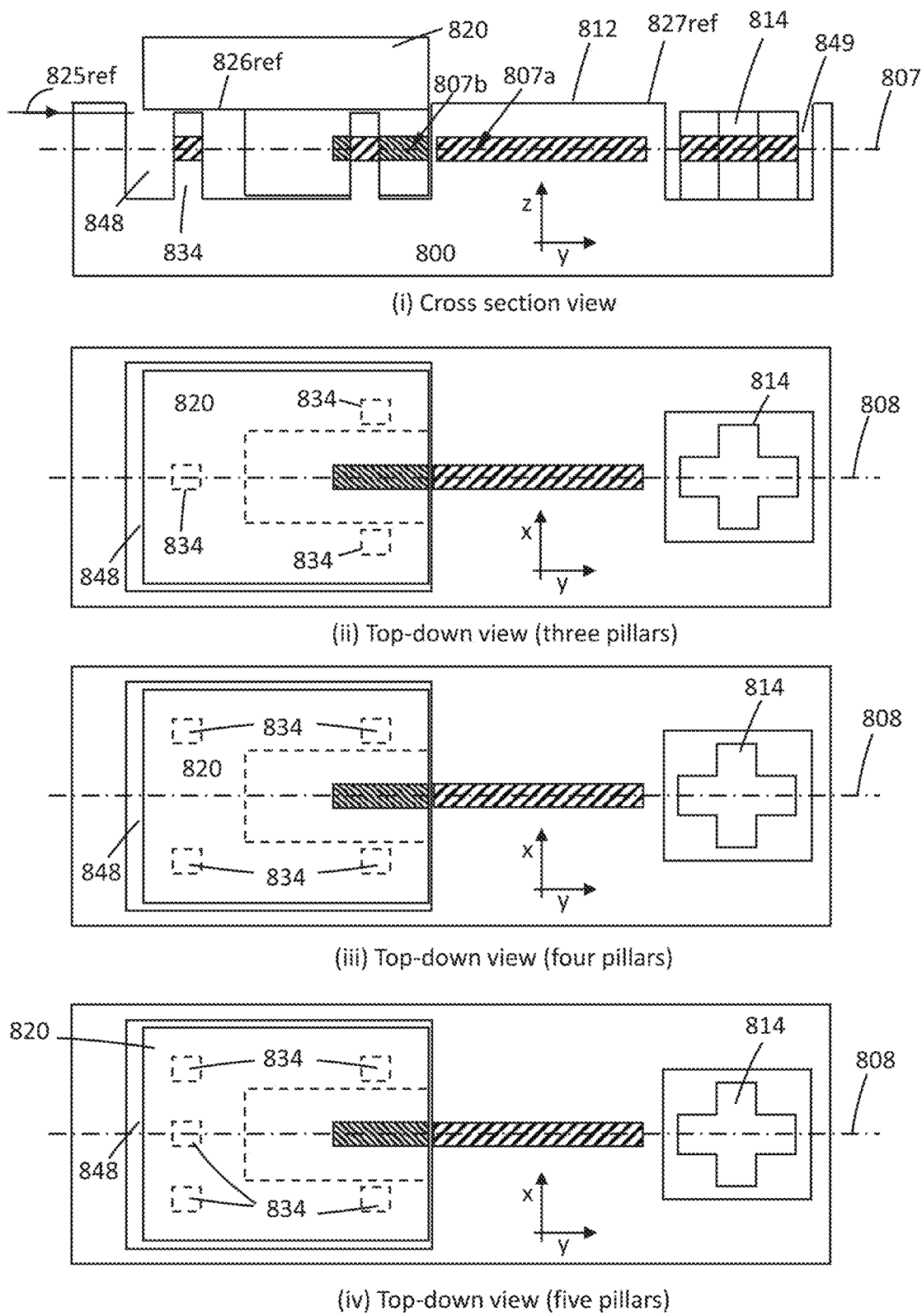
FIG. 8B. Embodiments of two optical or optoelectrical devices with aligned optical signal planes: (i) cross section, (ii) top-down view with three pillars, (iii) top-down view with four pillars, and (iv) top-down view with five pillars.
Figure 8C:
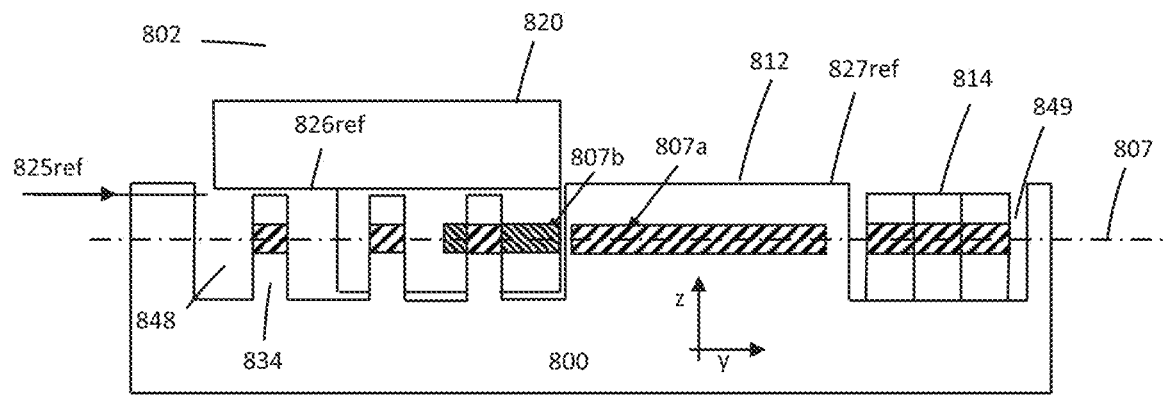
FIG. 8C. Embodiments of two optical or optoelectrical devices with aligned optical signal planes: (i) cross section, (ii) top-down view with six pillars, (iii) top-down view with seven pillars.
Figure 8C:
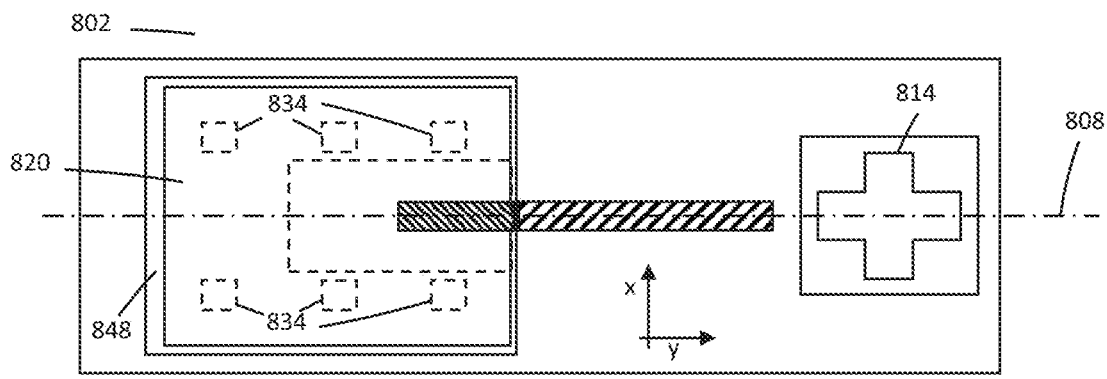
Figure 8C:
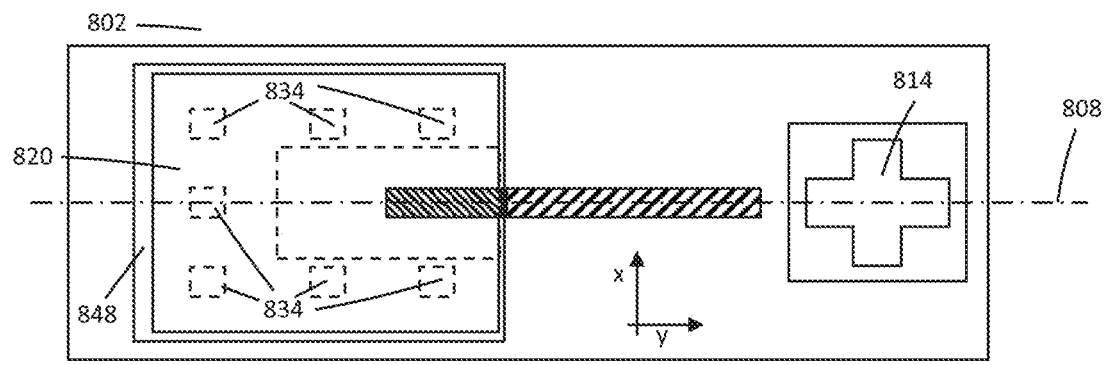

Referring to FIGS. 8A-8C, embodiments in which the quantity and position of z-pillar alignment aids are varied are shown. In FIG. 8A(i), a common cross-sectional schematic view of a PIC 802 is shown with optical device 820 mounted in cavity 848 on optical device 812. The optical device 812 is a buried planar waveguide formed on the substrate 800. The horizontal optical axes 807*a*, 807*b* of these devices 812, 820 are shown in alignment, resulting largely from the contact of the mechanical reference plane 826ref of the optical device 820 with the top of the z-pillar 834, taking into account the offset between the mechanical reference plane 826ref and the optical axis of the device 820. Also shown in FIG. 8A is the fiducial 814 formed in cavity 849. Reference feature 826ref of the device 820 forms a contact with the 825ref feature at the top of the z-pillar 834. An offset is shown between the optical axis 807 of the PIC 802 and the reference features 825ref at the top of the z-pillar and the 826ref of the device 820. The PIC structure in FIG. 8A shows an embodiment, for example, for which the fiducial 814, one or more z-pillars 834, and the planar waveguide layer of device 812 are formed using the same lithographic patterning step and hard mask layer as described in FIG. 6 and FIG. 7.

Referring to FIG. 8A(ii), a top down view of a structure with a single z-pillar 834 is shown. The top down view shows an example of the positioning of a single z-pillar 834. Also shown in the FIG. 8A(ii) is the fiducial 814. The vertical optical axes 808*a*, 808*b* are shown in alignment. Similarly, in FIG. 8A(iii), a top down view of a structure with two z-pillars 834 is shown. The top down view shows an example of the positioning of two z-pillars 834. Also shown in the FIG. 8A(iii) are the fiducial 814 and the aligned vertical optical axes 808*a*, 808*b* of devices 812, 820, respectively. In some embodiments, a greater quantity of alignment pillars can lead to an increase in the stability and integrity of the mounting of the optical devices 820.

Other examples of configurations with variations in the quantities and positions of z-pillars are shown in FIG. 8B. FIG. 8B(i) shows a common cross-sectional schematic for the top-down views shown in FIGS. 8B(ii), 8B(iii), and 8B(iv). The top-down views in FIGS. 8B(ii), 8B(iii), and 8B(iv) show examples of embodiments with three, four, and five z-pillars, respectively. The quantity and positioning of the z-pillars 834 affects the alignment and stability of the devices 820 that are mounted over the z-pillar alignment aids 834. And the number and positioning of the z-pillars can, in general, be influenced by the size and shape of the mounted device 820. Also shown in the FIG. 8A(iii) are the fiducial 814 and the aligned vertical optical axes 808*a*, 808*b* of devices 812, 820, respectively.

And in yet other examples of variations in the quantity and positioning of z-pillars in embodiments is shown in FIGS. 8C(i), 8C(ii), and 8C(iii). In FIG. 8C(i), a common cross-sectional schematic view of PIC 802 for the top-down views shown in FIGS. 8C(ii) and 8C(iii) that show structures with six and seven z-pillar alignment aids, respectively.

In some embodiments, only a single z-pillar 834 is required to achieve substantial alignment between the horizontal optical axes 807*a*, 807*b*. In other embodiments, multiple z-pillars 834 are required. In general, as the quantity of z-pillar alignment aids 834 is increased in support of the device 820, the stability of the device 820 is expected to improve. Too many z-pillars 834, however, can increase the surface resistance required to overcome as the device is moved into final aligned position as described herein.

In addition to the quantity and positioning of the z-pillars 834, additional latitude is provided in the shapes of the z-pillar, resulting in the formation of lateral constraints from the z-pillars, and in the quantity of z-pillars heights that can be provided using embodiments of the structures and techniques described herein. In the following section, examples of embodiments with variations in the shapes of the z-pillar alignment aids and the role of the shape in the formation of lateral constraints is further described.

Figure 9A:
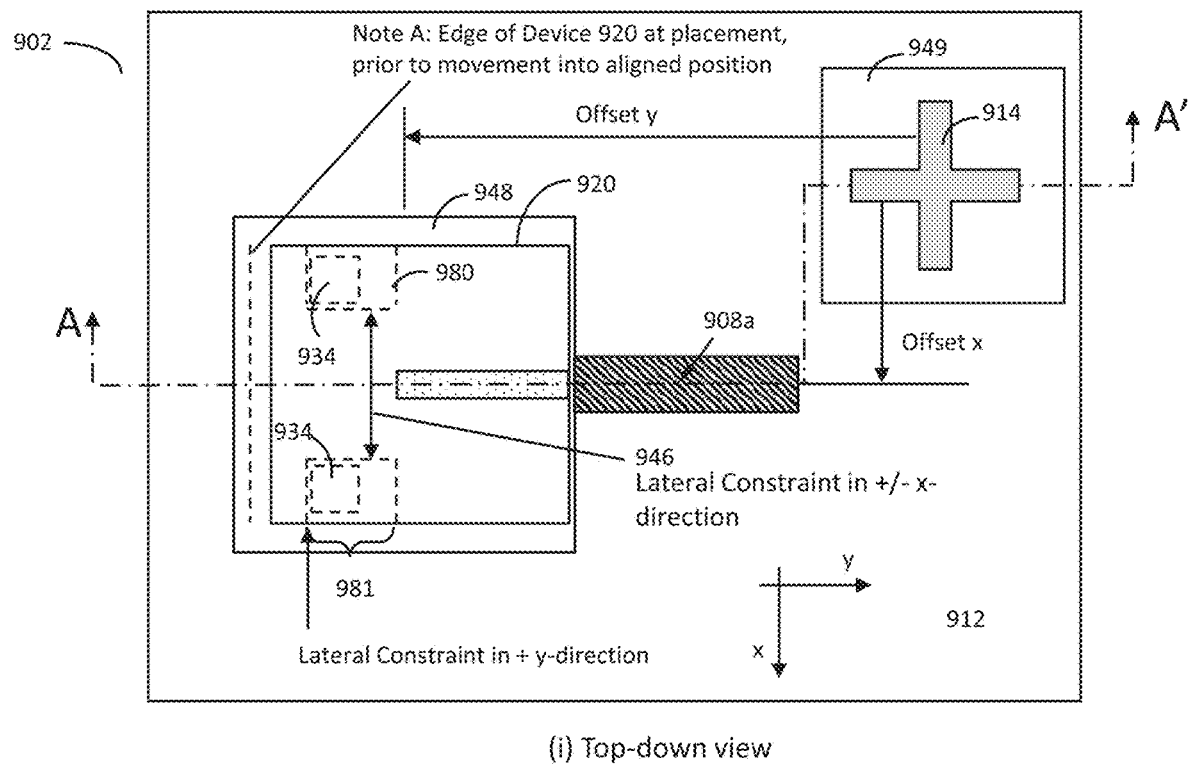
FIG. 9A. Embodiments of two optical or optoelectrical die with aligned optical signal planes shown with z-pillar mechanical alignment aids, a fiducial alignment aid, and lateral constraints: (i) top-down view and (ii) Section A-A'.
Figure 9A:
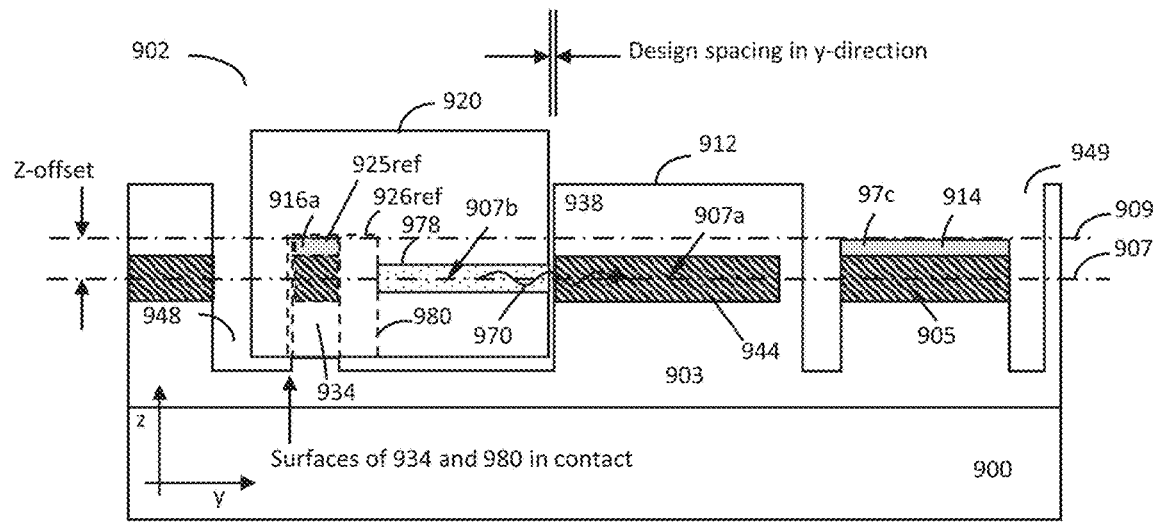

An example of an embodiment of a PIC formed with lateral constraints using the z-pillar alignment aids was previously described in the embodiment in FIG. 5C. Another example embodiment is shown with greater detail in FIG. 9A. In FIG. 9A(i), a top-down view of a PIC 902 shows lateral constraint alignment aids 981 that are also shown in FIG. 9A(ii) in cross section (Section A-A'). In the embodiment shown, the z-pillar alignment aid 934 when combined with a compatible feature 980 on the optical die 920 further forms a lateral constraint alignment aid 981 that constrains the movement of the optical die 920 on the device 912 in the lateral directions, in addition to the vertical alignment feature of the z-pillar 934. In embodiments, the cavity 948 within which optical device 920 mounted is formed in dielectric layer 938 and in some embodiments, may extend into the electrical interconnect layer 903.

In a first lateral direction, the x-direction, the lateral constraint portion of the z-pillar alignment aid 934 facilitates a restriction in the range of positions in the cavity 948 over which the device 920 can occupy. The width of the body 946 of the optical device 920 in combination with the x-direction spacing between the two z-pillars forms a mechanical constraint that restricts the movement of the device 920 in the x-direction. The device 920 is free to move unrestricted between the two z-pillars but cannot move beyond the point in either the +x or −x directions at which contact is made between one of the z-pillars 934 and the body 946 of the device 920. In the x-direction, an alignment is achieved within the tolerances of the placement and clearance between the two z-pillars shown. The label showing the "Lateral constraint in +/−x direction" in the figure shows the width of a mechanical feature on the device 920 that must be positioned between the z-pillars 934. This feature must be small enough to allow clearance for placement of the device 920 into the cavity without inducing a collision between the device 920 and either of the z-pillars 934.

In a second lateral direction, the y-direction, the lateral constraint portion of the z-pillar alignment aids facilitate the guided movement and ultimate spacing between optical devices 912, 920. Upon placement of the device 920, and prior to alignment in the y-direction, the position of the device 920 is indicated by a dotted line in the top-down view of FIG. 9A(i) with label "Note A". Prior to alignment, the feature 980 is not in contact with the z-pillar 934. After alignment, the device 920 is moved into position to the right (+y-direction) until contact is made between the alignment pillar 934 on device 912 and the alignment feature 980 of the device 920 to achieve the y-direction alignment. The spacing between devices in FIG. 9A is denoted as "Design spacing in y-direction". The top-down view in FIG. 9A(i) shows square-shaped z-pillars within rectangular cavities having wall 980. In forming a contact with the wall 980 of device 920, the z-pillar alignment aid 934 restricts the movement in the y-direction. Prior to forming a contact with the wall 980, the device 920 is free to move within the range of motion afforded by the cavity in the device 920. In embodiments, a preferred location is commonly identified for optimal signal transfer between the optical devices 912, 920 and a lateral constraint design is implemented that enables the movement to this preferred position. In FIG. 9A, for example, a preferred design spacing is shown with lateral spacing between devices as indicated by the "design spacing in y-direction." The spacing shown is achieved in the example embodiment as a result of the contact that is formed between the wall 980 of the left side of the cavity in device 920 as shown in FIG. 9A(ii) and the left side of the z-pillar 934 (this location is identified as the "lateral constraint in the +y-direction" in top-down view in FIG. 9A(i). The lithographic level precision resulting from the co-formation of the waveguides 944, the z-pillars 934, and the fiducial 914 yields lithographic level precision in the achievable positioning of the mounted device 920 on the device 912 and the subsequent alignment of the optical axes and spacing of the optical devices 912, 920. In summary, the effective alignment of the two optical devices 912, 920 for optimal signal transfer, for example, requires alignment of the horizontal axes 907a, 907b of the two devices 912, 920, the vertical axes 908a, 908b of the two devices 912, 920, and the spacing between the two device 912, 920. The lateral constraint feature of the z-pillar alignment aids provides a structure and method for achieving such alignment.

It should be noted that the use of the z-pillar alignment aids 934 for alignment of the devices 912, 920 in the z-direction is typically unaffected by the addition of the lateral constraint features of the z-pillars 934. The alignment of the horizontal axes of the optical signal planes are determined in embodiments by the vertical heights of the optical axes of the devices 912, 920. The height of the optical device 920 is determined in the embodiment shown in FIG. 9A by the mechanical feature of the device 920 labeled with reference plane 926ref that forms a contact with the top surface of the z-pillar 934 at the reference plane 925ref. This surface to surface contact provides a high level of accuracy in the ultimate vertical position of the device 920, and subsequently to the alignment of the optical axis 907b of this device 920 with the optical axis 907a of the device 912.

Upon positioning of the body of the device 920 between and over the z-pillars 934, the device 920 is positioned vertically as contact is formed between the top of the z-pillar 934 and the mechanical feature at the reference plane 926ref of device 920. Upon positioning, the movement of device 920 is also constrained in the +x and −x directions as determined by the spacing between the z-pillars in the x-direction and by the width of the portion of the device 920 that resides between the z-pillars. The allowed movement of the device 920 between the z-pillars in the x-direction, in embodiments, is such that the width of the planar waveguide 944 of device 912 is sufficient to receive the optical signal 970 from a sending device such as a laser. Furthermore, upon placement, the device 920 is free to move within a narrow range in the +y and −y directions but is ultimately guided into position in the +y-direction as shown using techniques further described herein until reaching a constrained position as determined by the requirements of the aligned devices. Placement of the device 920 into the cavity is accomplished in embodiments, using offsets, such as offset x and offset y relative to the fiducials to establish the location for placing the device 920 using, for example, automated die placement equipment.

The fiducial 914 in cavity 949 is shown formed at the same focal plane 909 as the top of the z-pillar 934. Portions of the hard mask 916 include the z-pillar portion 916a and the fiducial portion 916c. The planar waveguide portion of the hard mask 916 is removed in embodiments, as was shown in FIG. 7D. Contained within the planar waveguide 944 is optical axis 907a of the device 912, and this optical axis 907a aligns with the optical axis 907b as the device 920 is moved into alignment within the cavity 948. In the embodiment shown in FIG. 9A, optical device 920 may be an emitting device 920, such as a laser. In embodiments that include an emitting device, an optical signal 970 will be emitted from the device 920 and be received by the planar waveguide portion 944 that intersects the cavity 948. An optical signal 970 is shown in FIG. 9A(ii).

Figure 9B:
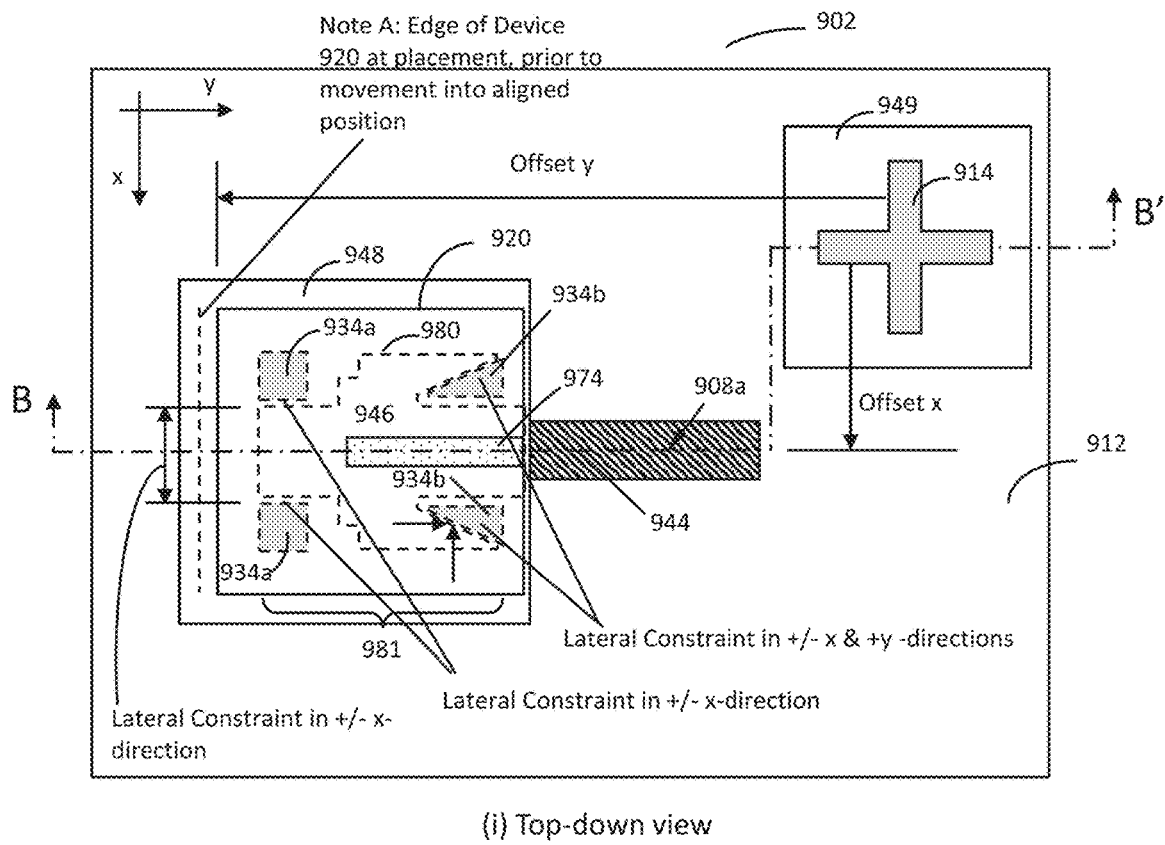
FIG. 9B. Embodiments of two optical or optoelectrical devices with aligned lateral and vertical optical signal planes shown with z-pillar mechanical alignment aids, a fiducial alignment aid, and lateral constraints to facilitate alignment of the optical signal planes in the vertical and lateral directions.
Figure 9B:
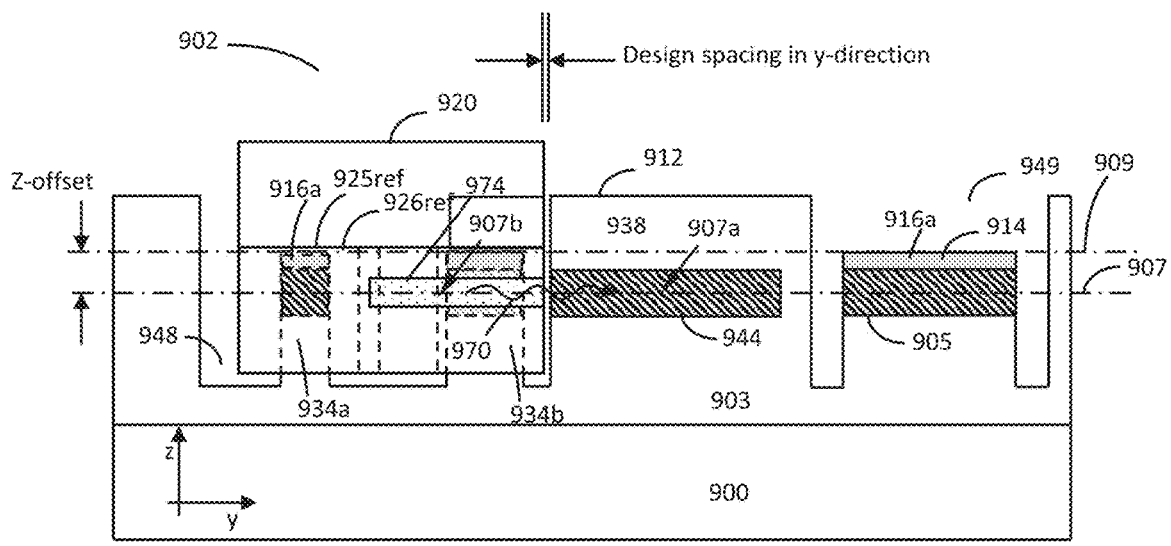

Another example embodiment is shown in FIG. 9B. In FIG. 9B(i), a top-down view of a PIC 902 shows lateral constraint alignment aids 981 that are also shown in FIG. 9B(ii) in cross section (Section B-B'). In the embodiment shown, the z-pillar alignment aid 934 when combined with a compatible feature 980 on the optical die 920 further forms a lateral constraint alignment aid 981 that constrains the movement of the optical die 920 on the device 912 in the lateral directions, in addition to the vertical alignment feature of the z-pillar 934. In embodiments, the cavity 948 within which optical device 920 mounted is formed in dielectric layer 938 and in some embodiments, may extend into the electrical interconnect layer 903.

In a first lateral direction, the x-direction, the lateral constraint portion of the z-pillar alignment aid 934 facilitates a restriction in the range of positions in the cavity 948 over which the device 920 can occupy. The width of the body 946 of the optical device 920 in combination with the x-direction spacing between the two sets of z-pillars 934a, 934b forms a mechanical constraint that restricts the movement of the device 920 in the x-direction. The device 920 is initially free to move unrestricted between the two sets of z-pillars but cannot move beyond the point in either the +x or −x directions at which contact is made between one of the z-pillars 934a, 934b and the body 946 of the device 920. In the x-direction, an alignment is initially achieved within the tolerances of the placement and clearance between the two sets of z-pillars 934a, 934b shown. The label showing the "Lateral constraint in +/−x direction" in the figure shows the width of a mechanical feature on the device 920 that must be positioned between the z-pillars 934. This feature must be small enough to allow clearance for placement of the device 920 into the cavity without inducing a collision between the device 920 and either of the z-pillars 934 during placement and is typically determined by the placement accuracy of the placement equipment.

In a second lateral direction, the y-direction, the lateral constraint portion of the z-pillar alignment aids facilitate the guided movement and ultimate spacing between optical devices 912, 920. Upon placement of the device 920, and prior to alignment in the y-direction, the position of the device 920 is indicated by a dotted line in the top-down view of FIG. 9A(i) with label "Note A". Prior to alignment, the feature 980 is not in contact with the z-pillar 934b. After alignment, the device 920 is moved into position to the right (+y-direction) until contact is made between the alignment pillar 934b on device 912 and the alignment feature 980 of the device 920 to achieve alignment in the y-direction, and as the device is guided into alignment in the y-direction, the triangular shape of the z-pillar 934b will further assert guidance of the device 920 into position in the x-direction. The spacing between devices in FIG. 9A is denoted as "Design spacing in y-direction". The top-down view in FIG. 9B(i) shows square-shaped z-pillars 934a and triangular-shaped z-pillars 934b. In forming a contact with the feature 980 of device 920, the z-pillar alignment aids 934a, 934b restrict the movement in the +x direction, the −x direction and in the +y direction. Prior to forming a contact with the device feature 980, the device 920 is free to move in the +y and −y directions within the spacing between the z-pillars 934a, 934b and the feature 980. In embodiments, a preferred location is commonly identified for optimal signal transfer between the optical devices 912, 920 and a lateral constraint design is implemented that enables the movement to this preferred position. In FIG. 9B(ii), for example, a preferred design spacing is shown with lateral spacing between devices as indicated by the "design spacing in y-direction." The spacing shown is achieved in the embodiment as a result of the contact that is formed between the long edges of the triangular z-pillars 934b and the long edges of the device feature 980 of device 920 that form a contact with the z-pillars 934b as shown in FIG. 9B(i). The lateral constraints are labeled in the FIG. 9B(i) as "lateral constraint in the +/−x & +y-directions" in the top-down view in FIG. 9B(i). The lithographic level precision resulting from the co-formation of the waveguides 944, the z-pillars 934a, 934b shown in FIG. 9B, and the fiducial 914 yields lithographic level precision in the achievable positioning of the mounted device 920 on the device 912 and the subsequent alignment of the optical axes and spacing of the optical devices 912, 920. In summary, the effective alignment of the two optical devices 912, 920 for optimal signal transfer, for example, requires alignment of the horizontal axes 907a, 907b of the two devices 912, 920, the vertical axes 908a, 908b of the two devices 912, 920, and the spacing between the two device 912, 920. The lateral constraint feature of the z-pillar alignment aids provides a structure and method for achieving such alignment.

It should be noted that the use of the z-pillar alignment aids 934 for alignment of the devices 912, 920 in the z-direction is typically unaffected by the addition of the lateral constraint features of the z-pillars 934a, 934b shown in FIG. 9B. The alignment of the horizontal axes of the optical signal planes are determined in embodiments by the vertical heights of the optical axes of the devices 912, 920. The height of the optical device 920 is determined in the embodiment shown in FIG. 9B by the mechanical feature of the device 920 labeled with reference plane 926ref that forms a contact with the top surface of the z-pillar 934a, 934b at the reference plane 925ref. This surface to surface contact provides a high level of accuracy in the ultimate vertical position of the device 920, and subsequently to the alignment of the optical axis 907b of this device 920 with the optical axis 907a of the device 912.

Upon positioning of the body of the device 920 between and over the z-pillars 934a, 934b, the device 920 is positioned vertically as contact is formed between the top of the z-pillars 934a, 934b and the mechanical feature at the reference plane 926ref of device 920. Upon positioning, the movement of device 920 is constrained in the +x and −x directions as determined by the spacing between the z-pillars in the x-direction and by the width of the portion of the device 920 that resides between the z-pillars. Furthermore, upon placement, the device 920 is free to move within a narrow range in the +y and −y directions but is ultimately guided into position in the +y-direction as shown using techniques further described herein until reaching a constrained position as determined by the requirements of the aligned devices. Guided movement in the +y-direction further guides the device 920 into alignment in the +x-direction and in the −x-direction until the ultimate position of the device 920 is established with a high level of precision. In the embodiment shown in FIG. 9B, the transfer of the optical signal 970 is not limited by the lateral positioning of the device 920 relative to the waveguide 944 of device 912 as is the case with the embodiment shown in FIG. 9A. Initial placement of the device 920 into the cavity is accomplished in embodiments, using offsets, such as offset x and offset y relative to the fiducials to establish the location for placing the device 920 using, for example, automated die placement equipment.

The fiducial 914 in cavity 949 is shown formed at the same focal plane 909 as the top of the z-pillars 934a, 934b. Portions of the hard mask 916 include the z-pillar portion 916a and the fiducial portion 916c. The planar waveguide portion of the hard mask 916 is removed in embodiments, as was shown in FIG. 7D. Contained within the planar waveguide 944 is optical axis 907a of the device 912, and this optical axis 907a aligns with the optical axis 907b as the device 920 is moved into alignment within the cavity 948. In the embodiment shown in FIG. 9B, optical device 920 may be an emitting device 920, such as a laser. In embodiments that include an emitting device, an optical signal 970 will be emitted from the device 920 and be received by the planar waveguide portion 944 that intersects the cavity 948. An optical signal 970 is shown in FIG. 9B(ii).

Figure 9C:
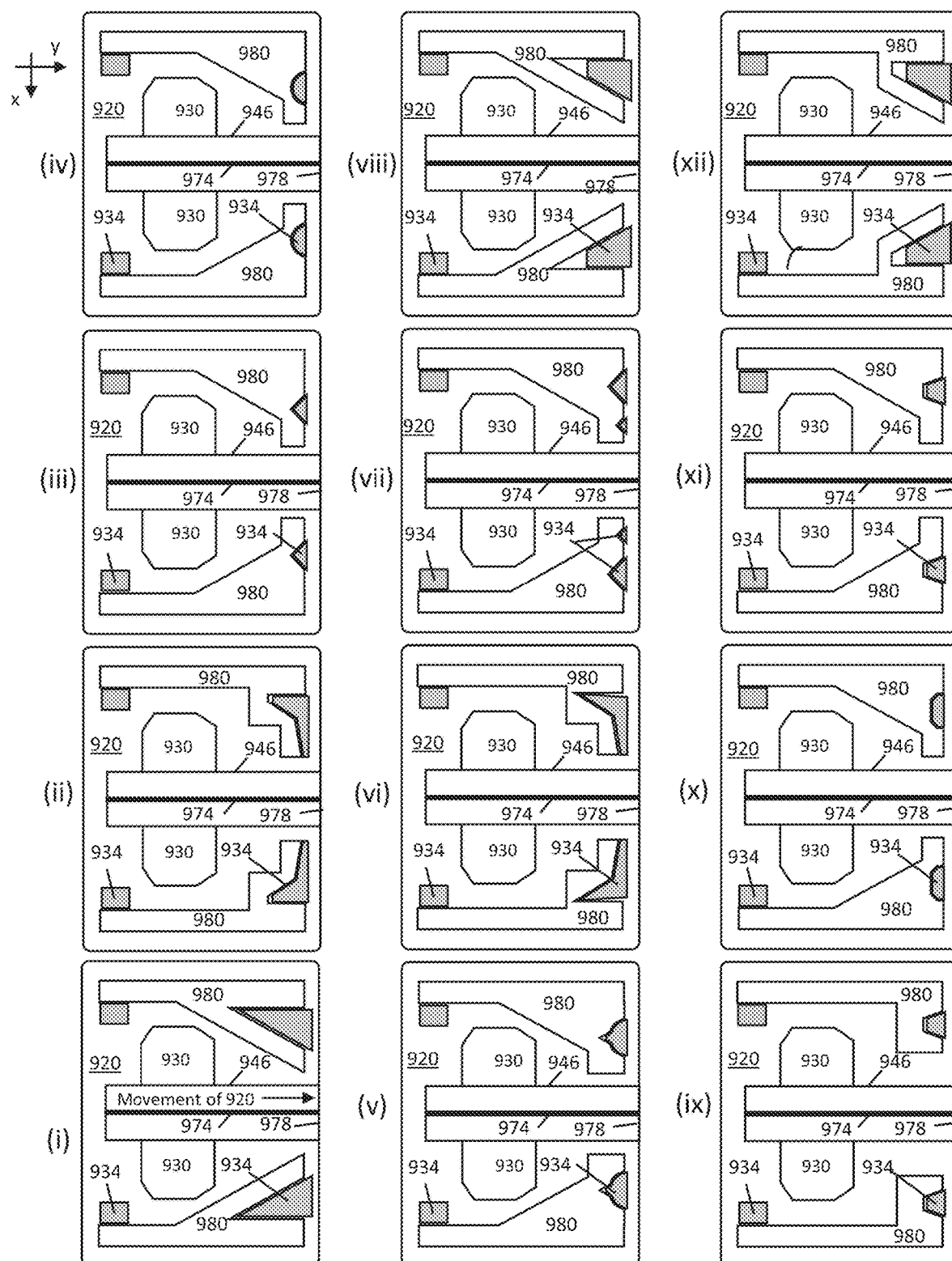
FIG. 9C. (i)-(xii) Top-down views of embodiments of patterned interposer alignment pillars with complementary mechanical alignment aids on optoelectrical die. (Note: shaded areas 934 are shaped z-pillars on the interposer.)

In FIGS. 9A and 9B, two examples of embodiments for lateral constraint alignment aids 981 of PIC 902 are shown. In FIG. 9C, a number of other example embodiments are shown with various configuration in the quantities and shapes of the z-pillars 934 and for complementary mechanical alignment aids 980 formed on embodiments of complementary optical devices 920. The alignment aids shown in FIG. 9C, firstly allow space for positioning of the optical devices 920 into a placement location on a PIC 902, and particularly on some embodiments, into cavities 948 formed on the PIC 902. Secondly, after positioning of the optical device 920 onto the PIC 902, the configurations allow for the guidance of the optical devices 920 into an aligned position on the PIC 902. As the optical devices 920 are guided into position over the embodiments of the z-pillars shown in FIG. 9C, the lateral movement of the devices are constrained to position the device 920 with a high degree of precision. The placement of the optical devices 920 over z-pillar configurations such as those shown in FIG. 9C, enable precise alignment of optical devices when these z-pillar configurations are utilizes in alignment schemes such as those described, for example, in FIGS. 9A and 9B, among others. In FIGS. 9C(i)-9C(xii), optical features 974 are shown in device body 946 with optical facet 978. In addition to the example structures shown in FIG. 9C, other similar structures can also be used and remain within the scope of embodiments.

In FIG. 9C(i), the configuration shown is similar to that described in FIG. 9B. The z-pillar configuration in FIG. 9C(i) includes two square shaped pillars and two triangular shaped pillars. The triangular shaped pillars are aligned with cavities formed in the alignment feature 980 of the optical die 920. The shaded z-pillars 934 in FIG. 9C(i) are formed, for example, on an interposer substrate using the methods described herein. As the device 920 is moved into position over the z-pillars 934, the optical facet 978 of the optical feature 974 of the optical device 920 is moved into a constrained position in the lateral directions. An arrow is shown to indicate the direction of movement for a mounted die 920 over the shaded fixed lateral z-pillar constraints 934 shown. Also shown in the FIG. 9C(i) are the electrical contacts 930. The electrical contacts play a role in the alignment process as further described in more detail herein.

FIG. 9C(ii) to 9C(xii) show additional embodiments for z-pillar shapes and quantities. FIG. 9C are intended to demonstrate a range of shapes and features of z-pillar alignment aids and to demonstrate attributes of these alignment features as utilized for the purpose of providing alignment of optical devices particularly in the lateral directions. The vertical alignment is not, in general, dependent on the shape of the z-pillars 934 in embodiments. The alignment features shown in FIG. 9C are not intended to limit the scope of embodiments. Key attributes for the z-pillar alignment features include those detailed in the descriptions of FIGS. 9A and 9B. In each of the embodiments shown in FIG. 9C, the complementary shapes of the z-pillars 934 of the interposer device structure and the alignment aids 980 of a mounted device 920 provide lateral guidance in both the x and y directions as shown in the reference coordinate system in the upper left hand corner of FIG. 9C and as consistent with the reference coordinates shown in FIGS. 9A and 9B. The lateral guidance in the embodiments shown in FIG. 9C is such to form an aligned optical axis between the device 920 and another device to which the optical axis of the device 920 is to be aligned.

Referring to FIGS. 10A-10C, FIGS. 11A-11C, and FIGS. 12A-12F, additional drawings are provided that illustrate additional details of embodiments. In particular, these figures show additional details of examples of embodiments of alignment aids formed on interposer structures and on complementary optical die that are utilized in embodiments with the alignment aids.

Figure 10A:
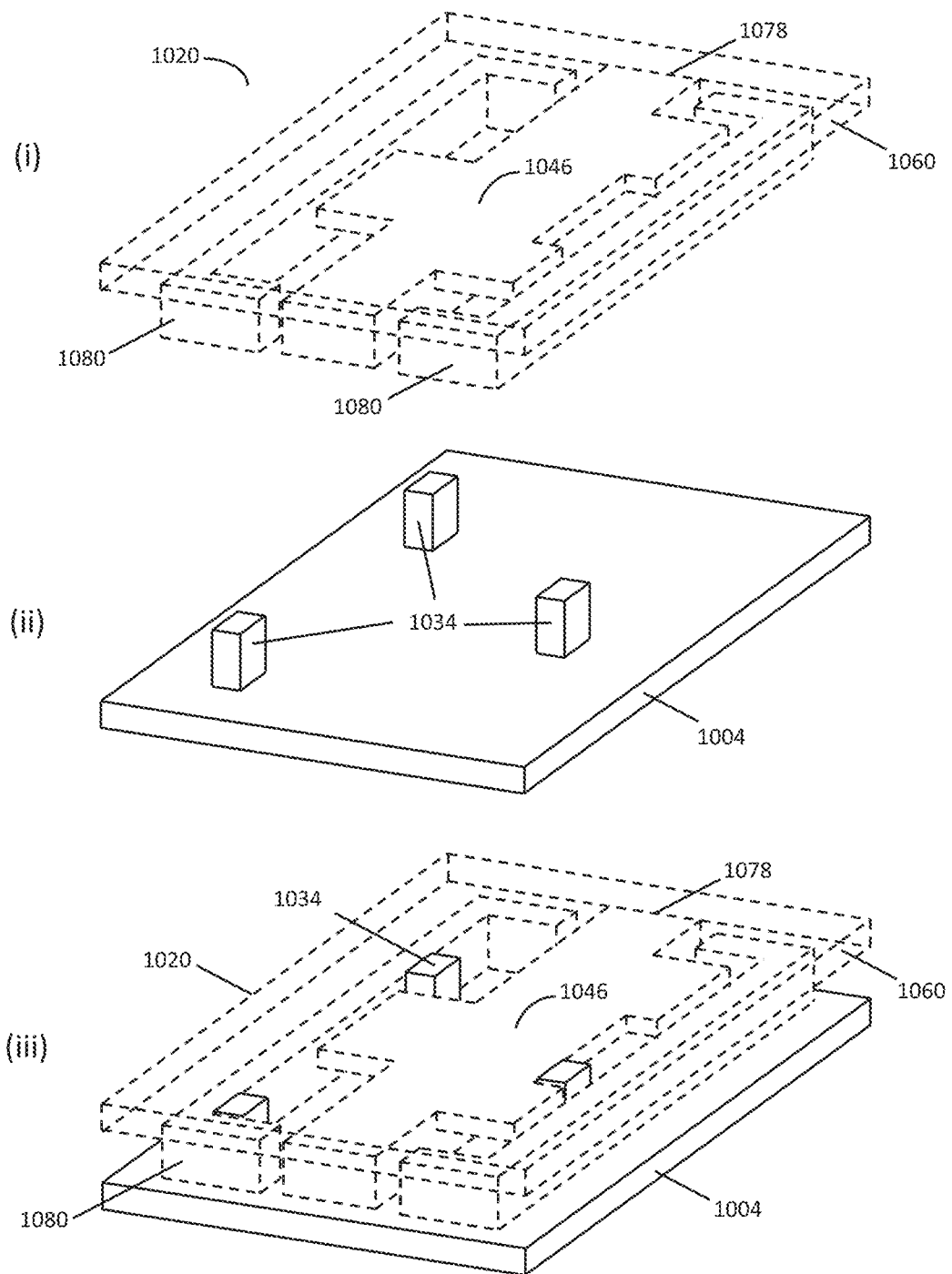
FIG. 10A. Perspective drawings of an embodiment showing (i) optical device with alignment features, (ii) portion of interposer with z-pillar structures, and (iii) optical device with alignment features mounted in portion of the interposer with complementary alignment pillars (solid lines are the interposer substrate with alignment pillars and dotted lines are the mounted optical die with alignment features. In this embodiment, the interposer pillars are positioned within the mechanical features of the optoelectrical die.

In FIG. 10A(i), a perspective drawing is shown of an embodiment of an optical device 1020 with mechanical alignment features 1080. The mechanical alignment features 1080 and the body 1046 of the optical device 1020 are formed on device substrate 1060. The emitting or receiving facet 1078 of the optical device 1020 is also shown. In FIG. 10A(ii), a portion of an interposer 1004 is shown with alignment pillars 1034. In some embodiments, the portion of the interposer 1004 is a portion of a PIC 1002 that is contained within a cavity (e.g, 948). The configuration and arrangement of the z-pillars 1034 are complementary to the mechanical alignment features 1080 of the optical device 1020. In the embodiment in FIG. 10A(iii), the optical device 1080 shown in FIG. 10A(i) is shown mounted in position onto the portion of the interposer 1004 that is shown in FIG. 10A(ii). In FIG. 10A(iii), the hidden and unhidden outlines of the three-dimensional structure of the optical device 1020 are shown with dotted lines, and the unhidden outline of the three-dimensional structure of the portion of the interposer 1004 with z-pillars 1034 to which the device 1020 is mounted is shown with solid lines. Hidden lines for the interposer 1004 and z-pillars 1034 are not shown, although the substrate 1060 of the optical device is shown transparent for clarity. The z-pillars 1034 are shown in recesses formed in the body 1046 of the optical device 1020. In the aligned position shown in FIG. 10A(iii) for device 1020, the z-pillars 1034 are shown in contact with a portion of a mechanical alignment aids 1080, and portions of the body 1046 of the optical device 1020. Additional detail on the alignment of the optical device 1020 on the interposer 1004 is shown in FIG. 10B.

Figure 10B:
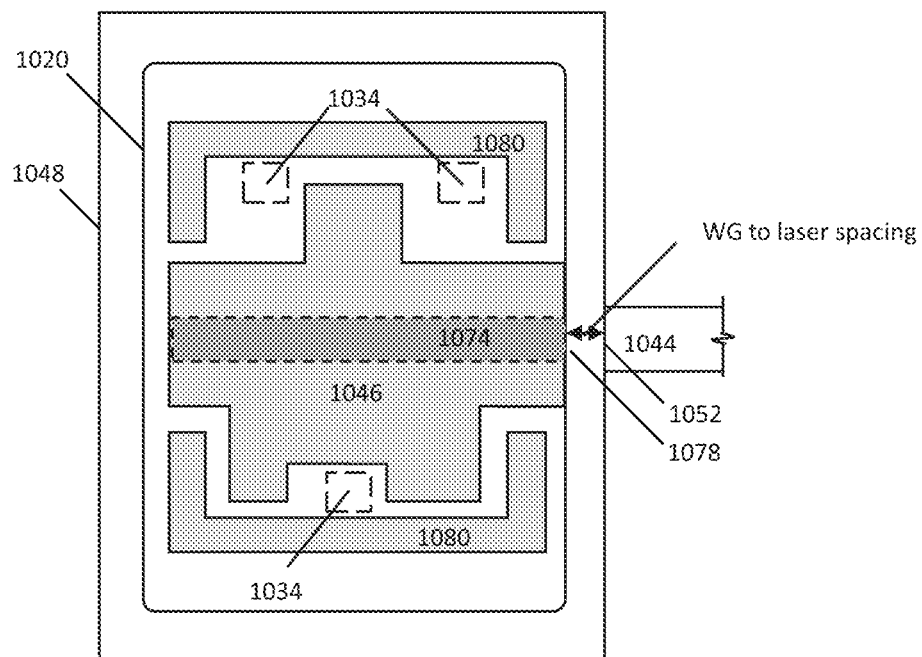
FIG. 10B. An embodiment of an optoelectrical die mounted on an interposer substrate with mechanical alignment pillars formed on the interposer and on the optoelectrical die. In this embodiment, the interposer pillars are positioned within the mechanical features of the optoelectrical die. (i) after placement of the optoelectrical die onto the interposer substrate, prior to final positioning, and (ii) after positioning of the optoelectrical die on the interposer.

In FIG. 10B(i), a top-down view of the optical device 1020 is shown, for example, after placement in cavity 1048 of a portion of an interposer that is used in the formation of a PIC. A portion of a planar waveguide 1044 is shown intersecting the wall of the cavity 1048. Spatial clearance is shown around the z-pillars 1034 to allow for the placement of the device 1020 over the z-pillars 1034 as shown. Facets 1052, 1078 of the planar waveguide 1044 and the optical device 1020, respectively, are shown. Referring to FIG. 10B(ii), the device 1020 is shown moved into an aligned position within the cavity 1048 (in the direction of the large arrow) and in a position for which the facets 1052, 1078 of the planar waveguides 1044 and the optical device 1020, respectively, are in substantial alignment. The right edge of the placement position is shown for reference with dotted lines. The z-pillars 1034 are fixed to the substrate and do not move as the optical device 1020 is moved into the aligned position. The noted "WG-to-device 1020 spacing" is limited in the embodiment shown by the surface contact formed between the z-pillars 1034 and either the mechanical alignment aids 1080, the body 1046 of the device 1020, or both, as shown. With the optical facets 1052, 1074 in close proximity, the optical signals can be transferred with low signal loss between the optical feature 1074 of the optical device 1020 and the planar waveguide 1044.

Figure 10B:
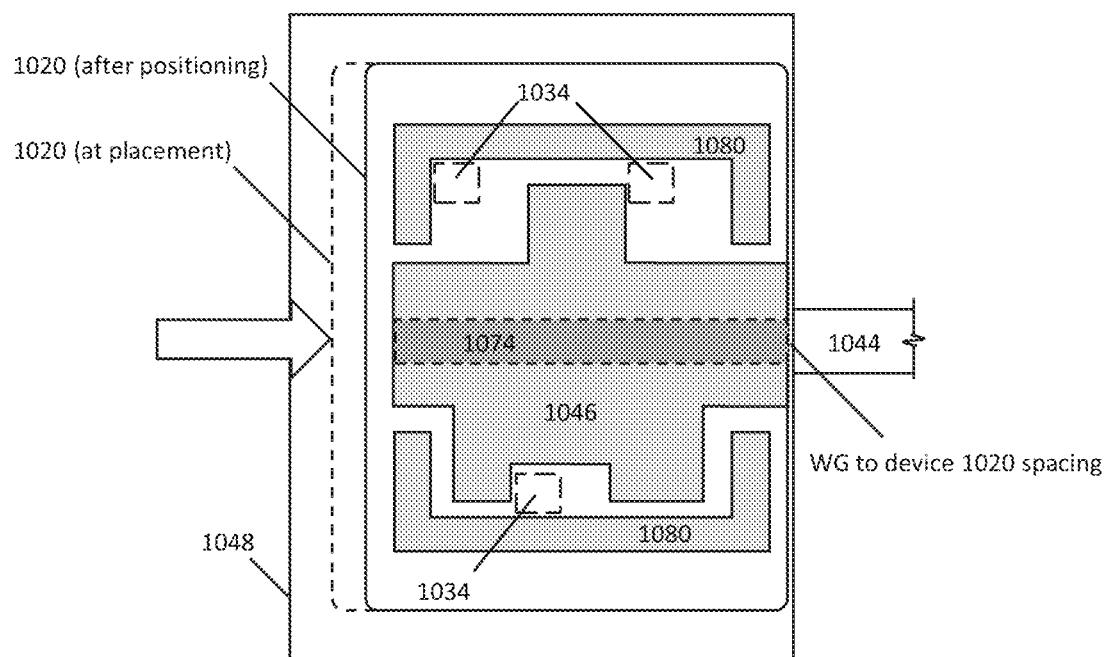
Figure 11A:
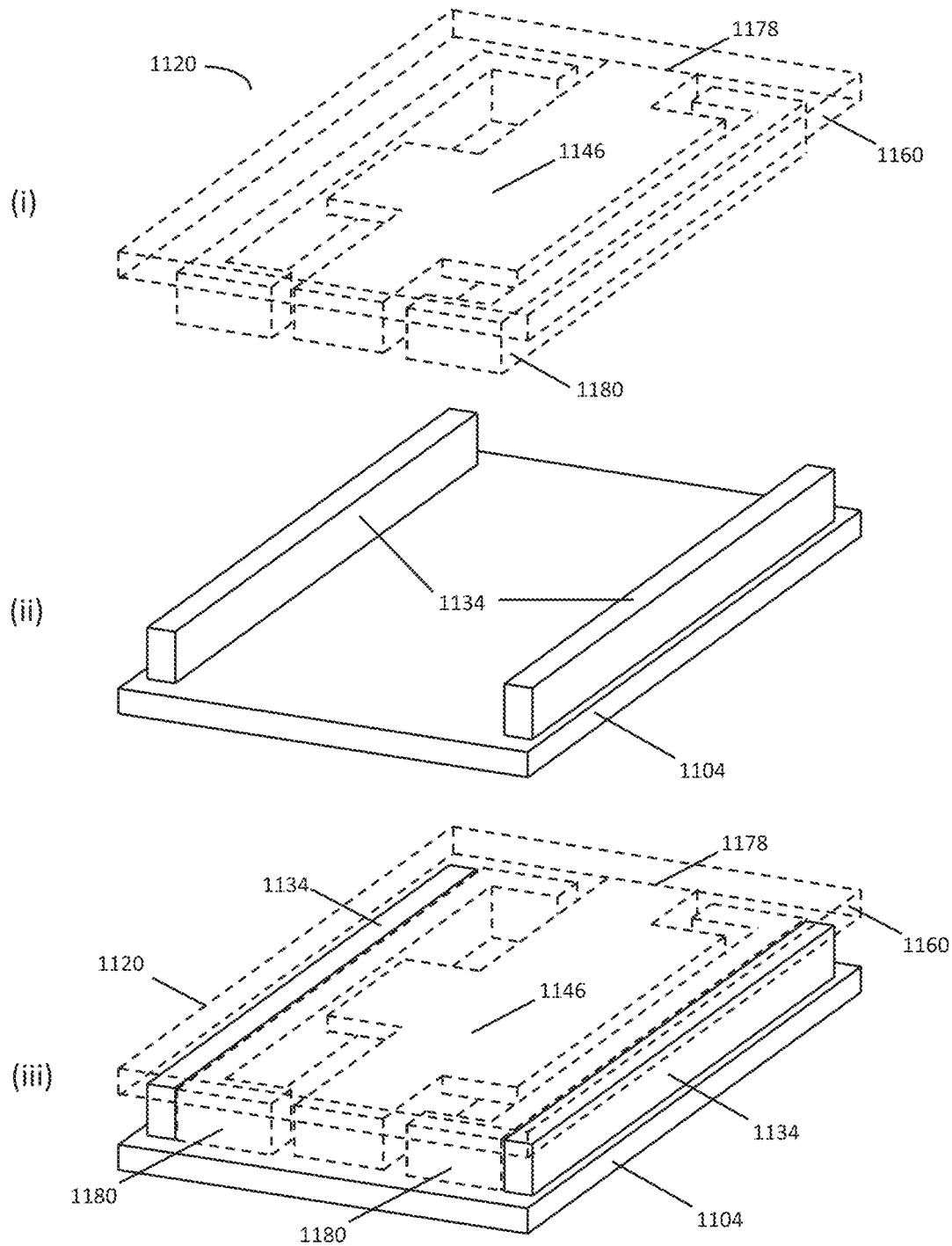
FIG. 11A. Perspective drawings of an embodiment showing (i) optical device with alignment features, (ii) portion of interposer with z-pillar structures, and (iii) optical device with alignment features mounted in portion of the interposer with complementary alignment pillars (solid lines are the interposer substrate with alignment pillars and dotted lines are the mounted optical die with alignment features.
Figure 11B:
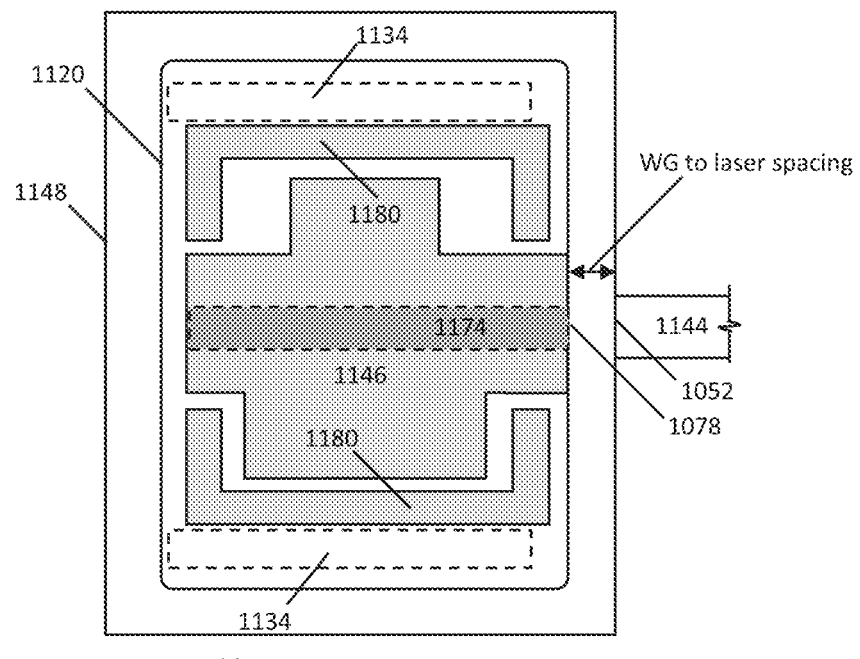
FIG. 11B. An embodiment of an optical device mounted on an interposer substrate with mechanical alignment pillars formed on the interposer and on the optical device. In the embodiment, the interposer pillars are positioned outside of the mechanical features of the optical device: (i) after placement of the optoelectrical die onto the interposer substrate, prior to final positioning, and (ii) after positioning of the optoelectrical die on the interposer substrate.
Figure 11B:
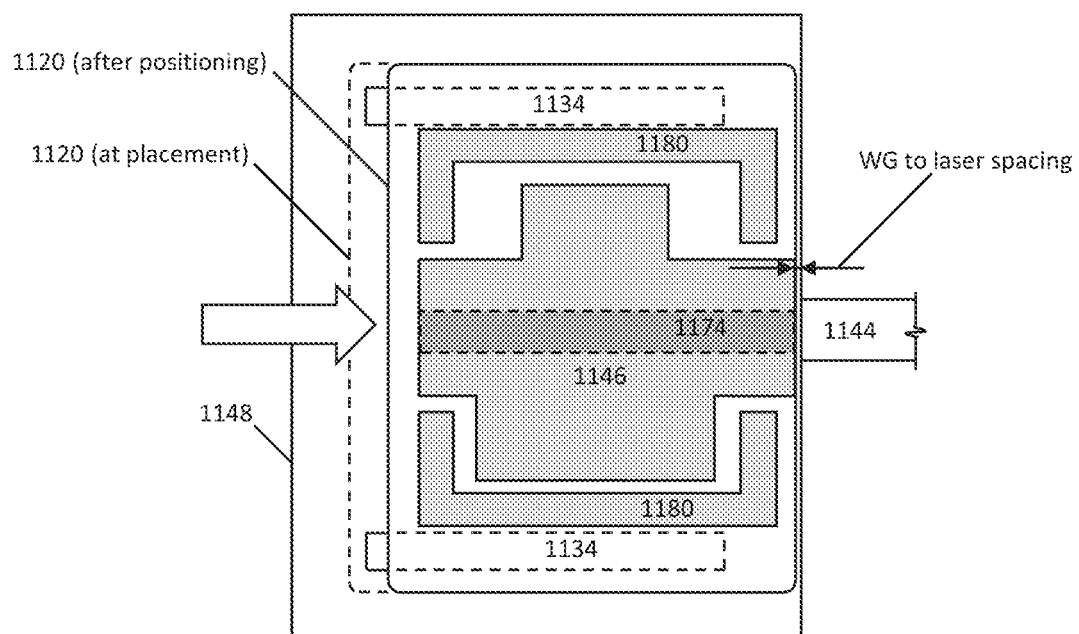
Figure 11C:
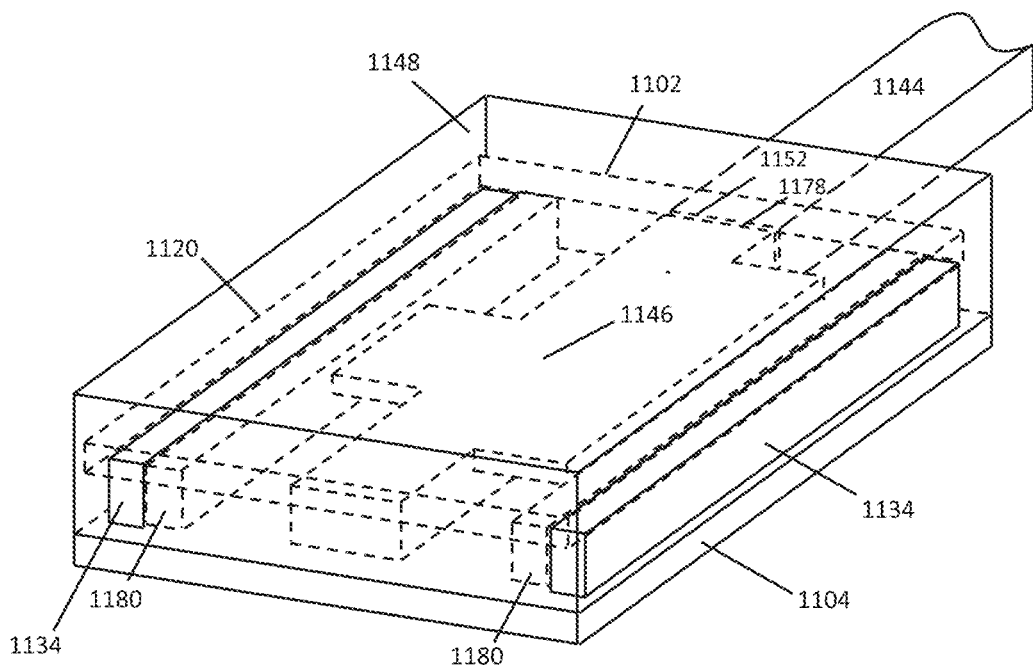
FIG. 11C. Perspective drawing of an embodiment showing an optical device mounted over alignment pillars in an interposer cavity with the optoelectrical device in alignment with a planar waveguide of the interposer (the interposer and cavity are shown in solid lines and the optical device is shown with dotted lines).

Referring to FIGS. 11A-11C, an additional embodiment is shown with a different arrangement of z-pillars 1134 and complementary mechanical alignment aids 1180 from that shown in FIG. 10. In FIG. 11A(i), a perspective drawing is shown of an embodiment of an optical device 1120 with mechanical alignment features 1180. The mechanical alignment features 1180 and the body 1146 of the optical device 1120 are formed on device substrate 1160. The emitting or receiving facet 1178 of the optical device 1120 is also shown. In FIG. 11A(ii), a portion of an interposer 1104 is shown with alignment pillars 1134. In some embodiments, the portion of the interposer 1104 is a portion of a PIC 1102 that is contained within a cavity (e.g, 948). The configuration and arrangement of the z-pillars 1134 are fence-like in this embodiment and complementary to the mechanical alignment features 1180 of the optical device 1120 shown in FIG. 11A(i). In the embodiment shown in FIG. 11A(iii), the optical device 1120 in FIG. 11A(i) is shown mounted in position onto the portion of the interposer 1104 that is shown in FIG. 11A(ii). In FIG. 11A(iii), the hidden and unhidden outlines of the three-dimensional structure of the optical device 1120 are shown with dotted lines, and the unhidden outline of the three-dimensional structure of the portion of the interposer 1104 with z-pillars 1134 to which the device 1120 is mounted is shown with solid lines. Hidden lines for the interposer 1104 and z-pillars 1134 are not shown, although the substrate 1160 of the optical device is shown transparent for clarity. The fence-like z-pillars 1134 are shown in position in FIG. 11A(iii) alongside the mechanical alignment feature 1180 of the optical device 1120. In the aligned position shown in FIG. 11A(iii) for device 1120, the z-pillars 1134 are not shown in contact with a portion of a mechanical alignment aids 1180, or with portions of the body 1146 of the optical device 1120. Additional detail on the alignment of the optical device 1120 on the interposer 1104 is shown in the embodiment in FIG. 11B.

In FIG. 11B(i), a top down view of the optical device 1120 is shown after placement in cavity 1148 of a portion of an interposer that is used in the formation of a PIC. A portion of a planar waveguide 1144 is shown intersecting the cavity wall. Spatial clearance is shown between the z-pillars 1134 and the mechanical alignment aids 1180 of the device 1120 to allow for the placement of the device 1120 between the z-pillars 1134 as shown. Facets 1152, 1178 of the planar waveguide 1144 and the optical device 1120, respectively, are shown. Referring to FIG. 11B(ii), the device 1120 is shown moved into position within the cavity 1148 (in the direction of the large arrow) and in a position for which the facets 1152, 1178 of the planar waveguide 1144 and the optical device 1120, respectively, are in substantial alignment. The right edge of the placement position is shown for reference with dotted lines. The z-pillars 1134 are fixed to the substrate and do not move as the optical device 1120 is moved into position. The noted "WG-to-device 1120 spacing" is limited in the embodiment shown by the surface contact formed between a portion of the optical device 1120 and the wall of the cavity 1148. Allowing the device 1120 to contact the wall, in some embodiments, provides the minimum clearance between the optical facets 1152, 1178 of the optical device 1120 and the planar waveguide 1144, respectively. With the optical facets 1152, 1174 in close proximity, the optical signals can be transferred with low signal loss between the optical feature 1174 of the optical device 1120 and the planar waveguide 1144. In FIG. 11C, the device 1120 is shown in aligned position in cavity 1148 of interposer 1104. A portion of the planar waveguide 1144 that intersects the wall of the cavity 1148 with facet 1178 is shown in substantial alignment with the optical facet 1152 of the optical device 1120.

Figure 12A:
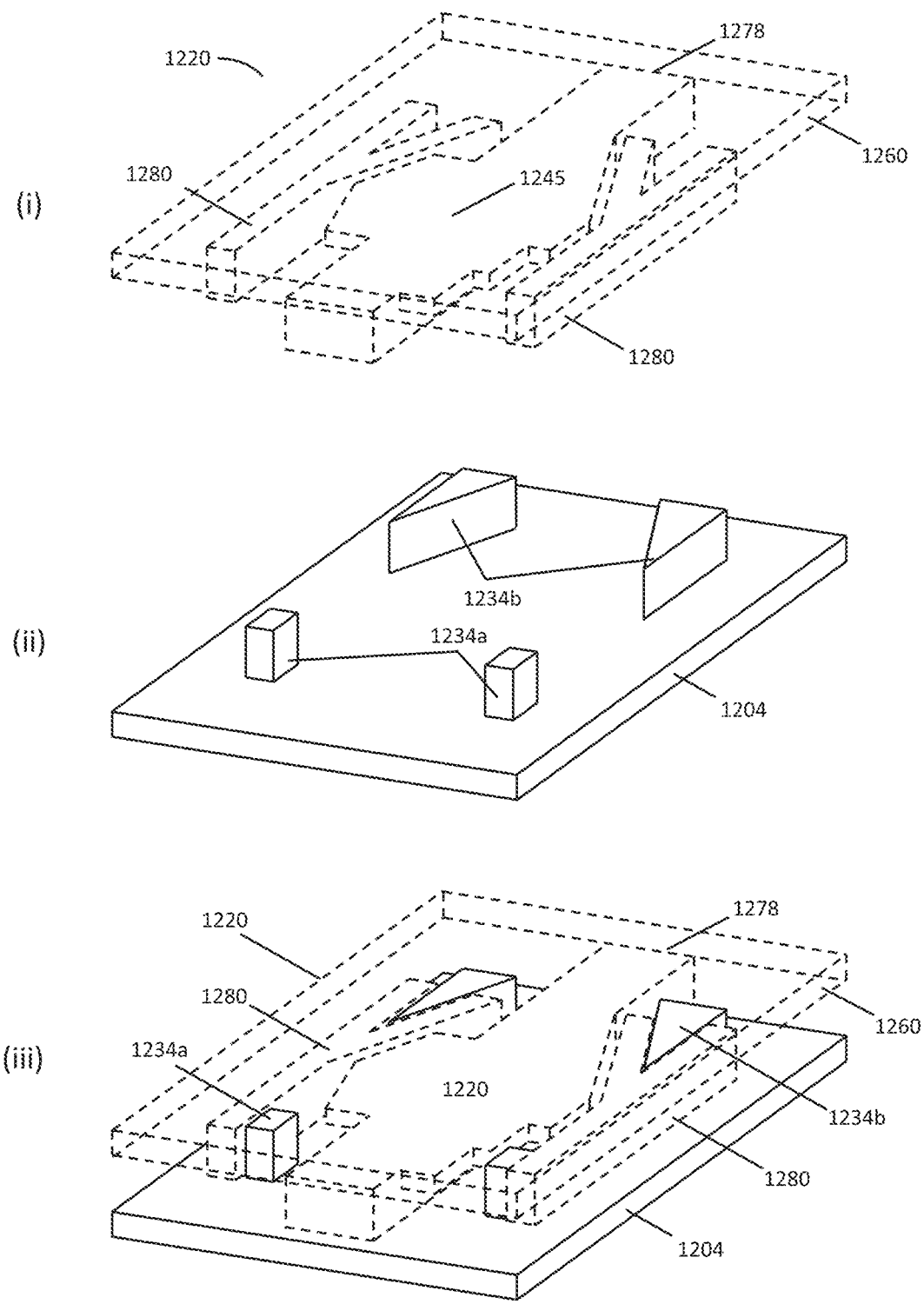
FIG. 12A. Perspective drawings of an embodiment showing (i) optical device with alignment features, (ii) portion of interposer with z-pillar structures, and (iii) optical device with alignment features mounted in portion of the interposer with complementary alignment pillars (solid lines are the interposer substrate with alignment pillars and dotted lines are the mounted optical die with alignment features.

Referring to FIGS. 12A-12F, an example of an embodiment is shown with yet another different arrangement of z-pillars and complementary mechanical alignment aids from that shown in FIG. 10 and FIG. 11. Additional aspects of embodiments are also described. In FIG. 12A(i), a perspective drawing is shown of an embodiment of an optical device 1220 with mechanical alignment features 1280. The mechanical alignment features 1280 and the body 1266 of the optical device 1220 are formed on device substrate 1260. The emitting or receiving facet 1278 of the optical device 1220 is also shown. In FIG. 12A(ii), a portion of an interposer 1204 is shown with alignment pillars 1234. In some embodiments, the portion of the interposer 1204 is a portion of a PIC that is contained within a cavity (e.g, 948). The z-pillars 1234 are configured in the embodiment with two rectangle shaped pillars 1234a (when viewed from top down) and two triangle shaped pillars 1234b (also when viewed from top down). These pillars are arranged as shown in FIG. 12A(ii) to receive the complementary shaped mechanical alignment features 1280 of the optical device 1220 shown in FIG. 12A(i). In FIG. 12A(iii), the optical device 1220 in FIG. 12A(i) is shown mounted in position onto the portion of the interposer 1204 that is shown in FIG. 12A(ii). In FIG. 12A(iii), the hidden and unhidden outlines of the three-dimensional structure of the optical device 1220 are shown with dotted lines, and the unhidden outline of the three-dimensional structure of the portion of the interposer 1204 with z-pillars 1234a, 1234b to which the device 1220 is mounted is shown with solid lines. Hidden lines for the interposer 1204 and z-pillars 1234 are not shown, although the substrate 1260 of the optical device is shown transparent for clarity. The top of the z-pillars 1234a, 1234b form a contact with the substrate 1260 of the device 1220. The triangular z-pillars 1234b are aligned with a triangular cavity in the mechanical alignment feature 1280 and the rectangular z-pillars 1234a are shown in position in FIG. 12A(iii) alongside a straight section of the mechanical alignment feature 1280 of the optical device 1220. In the aligned position shown in FIG. 12A(iii) for device 1220, the z-pillars 1234 are shown in contact with a portion of a mechanical alignment aids 1280 of the optical device 1220. Additional detail on the alignment of the optical device 1220 on the interposer 1204 is shown in the embodiment in FIG. 12B.

Figure 12B:
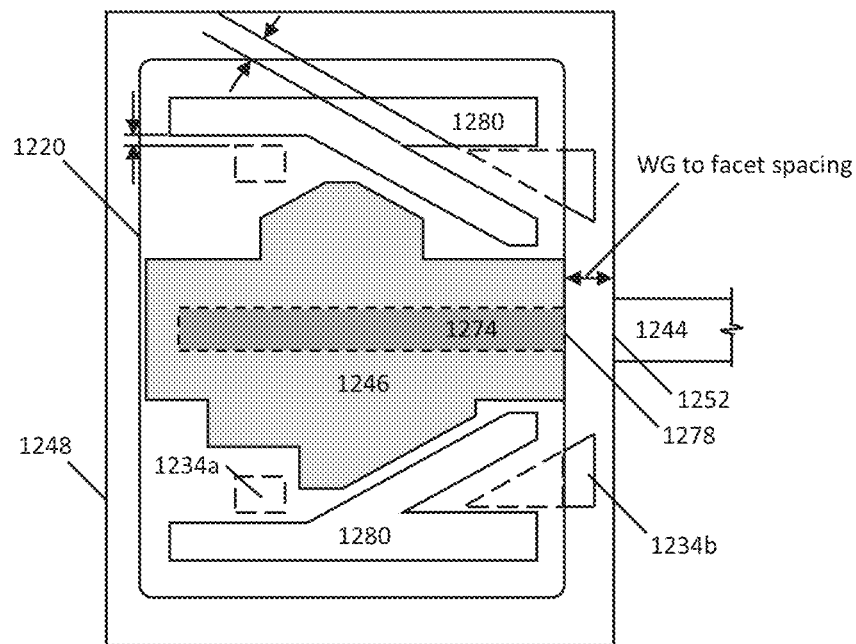
FIG. 12B. An embodiment of an optoelectrical die mounted on an interposer substrate with mechanical alignment pillars formed on the interposer and on the optoelectrical die: (i) after placement of the optoelectrical die onto the interposer substrate, and (ii) after positioning and alignment of the optoelectrical die on the interposer.
Figure 12B:
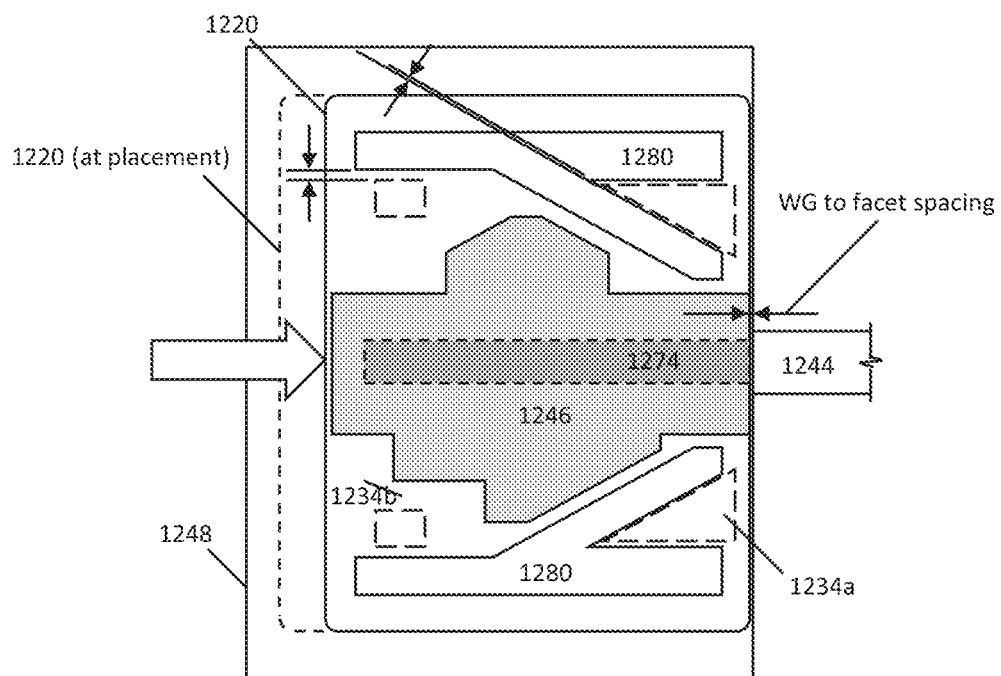

In FIG. 12B(i), a top down view of an embodiment of the optical device 1220 is shown after placement in cavity 1268 of a portion of an interposer that is used in the formation of a PIC. A portion of a planar waveguide 1264 is shown intersecting the cavity wall. Spatial clearance is shown between the z-pillars 1234a, 1234b and the mechanical alignment aids 1280 of the device 1220 to allow for the placement of the device 1220 as shown. Facets 1252, 1278 of the planar waveguide 1264 and the optical device 1220, respectively, are shown. Referring to FIG. 12B(ii), the device 1220 is shown moved into position within the cavity 1268 (in the direction of the large arrow) and in a position for which the facets 1252, 1278 of the planar waveguides 1244 and the optical device 1220, respectively, are in substantial alignment. The right edge of the placement position with label "1220 (at placement)" is shown for reference with dotted lines. The z-pillars 1234a, 1234b are fixed to the substrate and do not move as the optical device 1220 is moved into position. The noted "WG-to-facet 1220 spacing" is limited in the embodiment shown by the surface contact formed between the triangular z-pillars 1234b and the corresponding inside surface of the triangular cavity in the mechanical alignment feature 1280. This contact between the triangular z-pillar 1234b and the feature 1280 sets the minimum distance that can be achieved between the optical facets 1252, 1278 of the optical devices 1220 and the planar waveguide 1244, respectively. With the optical facets 1252, 1274 in close proximity, the optical signals can be transferred with low signal loss between the optical feature 1274 of the optical device 1220 and the planar waveguide 1244.

Figure 12C:
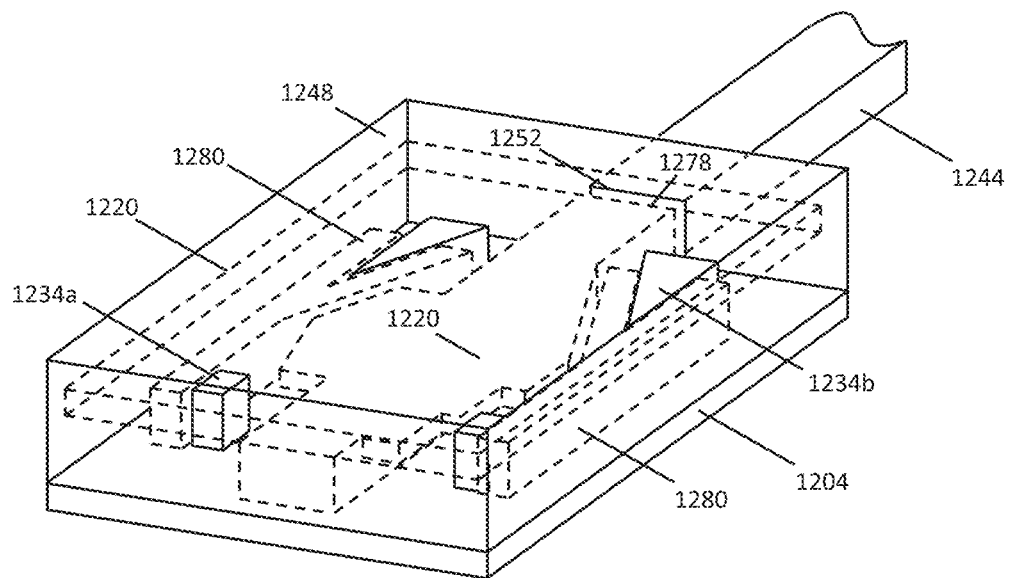
FIG. 12C. Perspective drawing of an embodiment showing the optical features of a mounted optical device with alignment features, aligned with the optical facet of a planar waveguide on the interposer. The optical device is mounted on alignment pillars in the interposer cavity with the optoelectrical device in alignment with the planar waveguide of the interposer (the interposer and cavity are shown in solid lines and the optoelectrical die is shown in dotted lines).
Figure 12D:
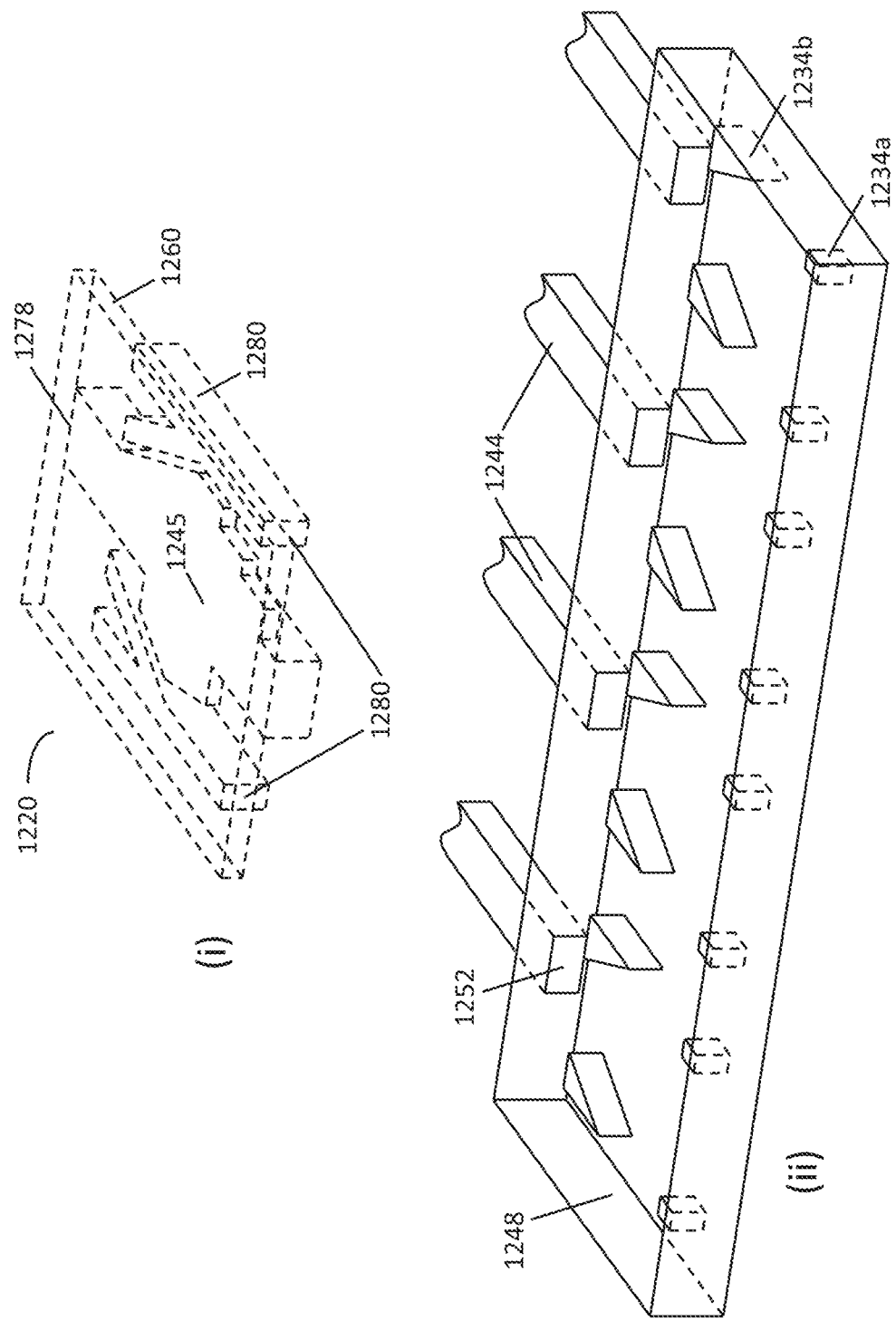
FIG. 12D. Perspective drawings of an embodiment showing (i) a discrete optical device with alignment features that are patterned to align with shaped pillars in the interposer cavity in (ii). Four of the discrete devices depicted in the embodiment shown in (i) can be mounted in the Interposer cavity shown in (ii). Exposed facets of multiple planar waveguides are also shown.
Figure 12D:
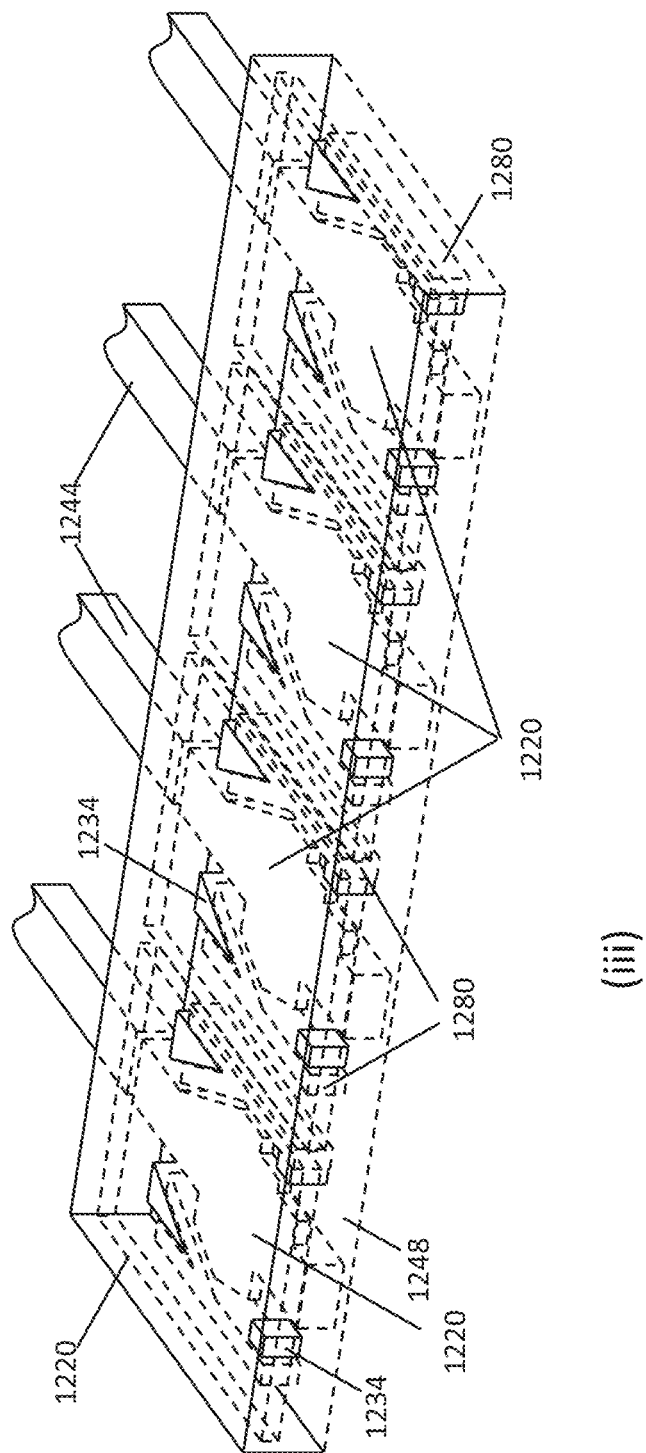
Figure 12E:
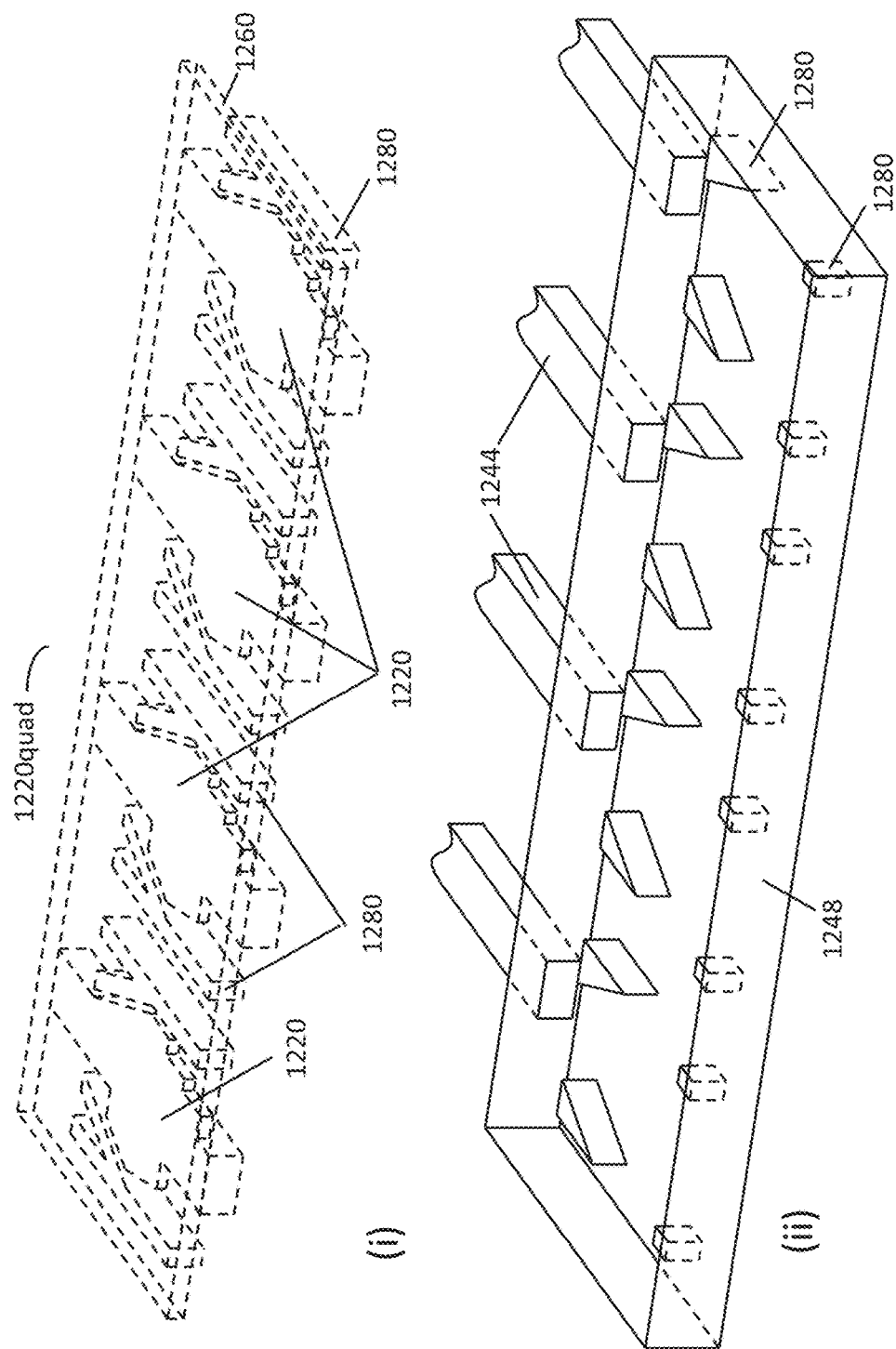
FIG. 12E. Perspective drawings of an embodiment showing (i) an optical die formed with four devices and alignment features that are patterned to align with shaped pillars on an interposer configured as shown in (ii). (ii) an embodiment showing patterned pillars formed in a cavity on an interposer for a multi-device optical die with exposed facets of multiple planar waveguides.
Figure 12E:
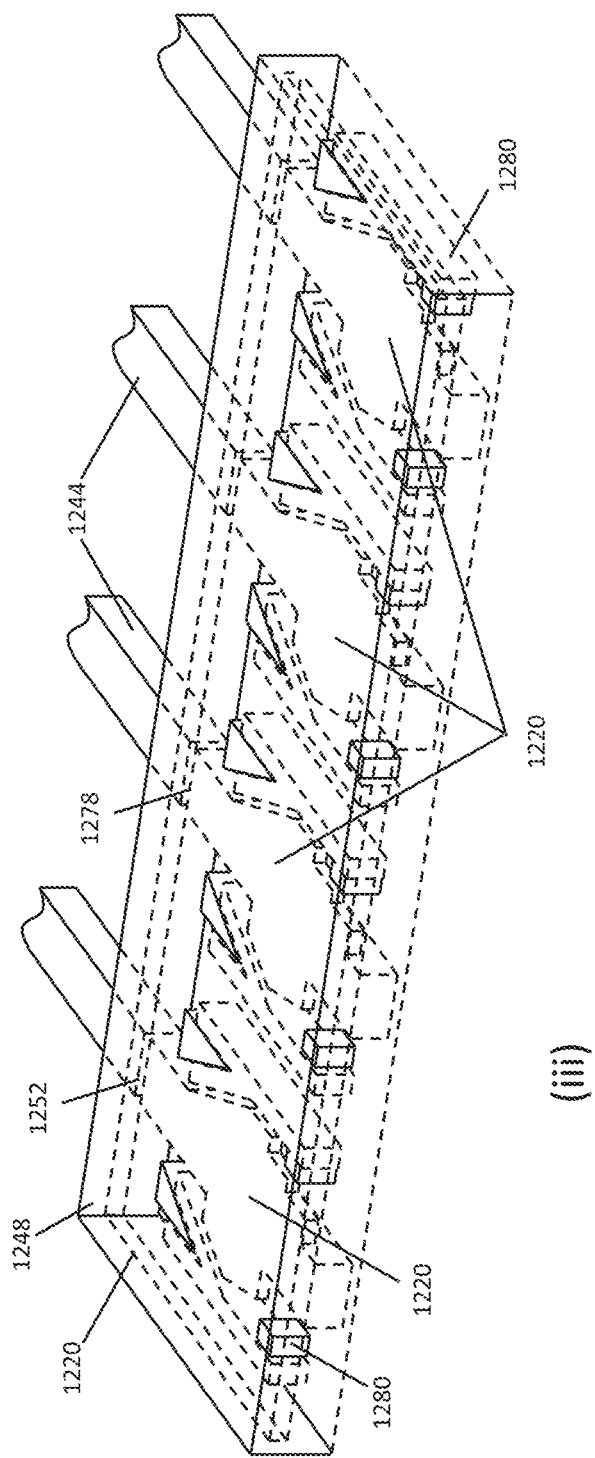
Figure 12F:
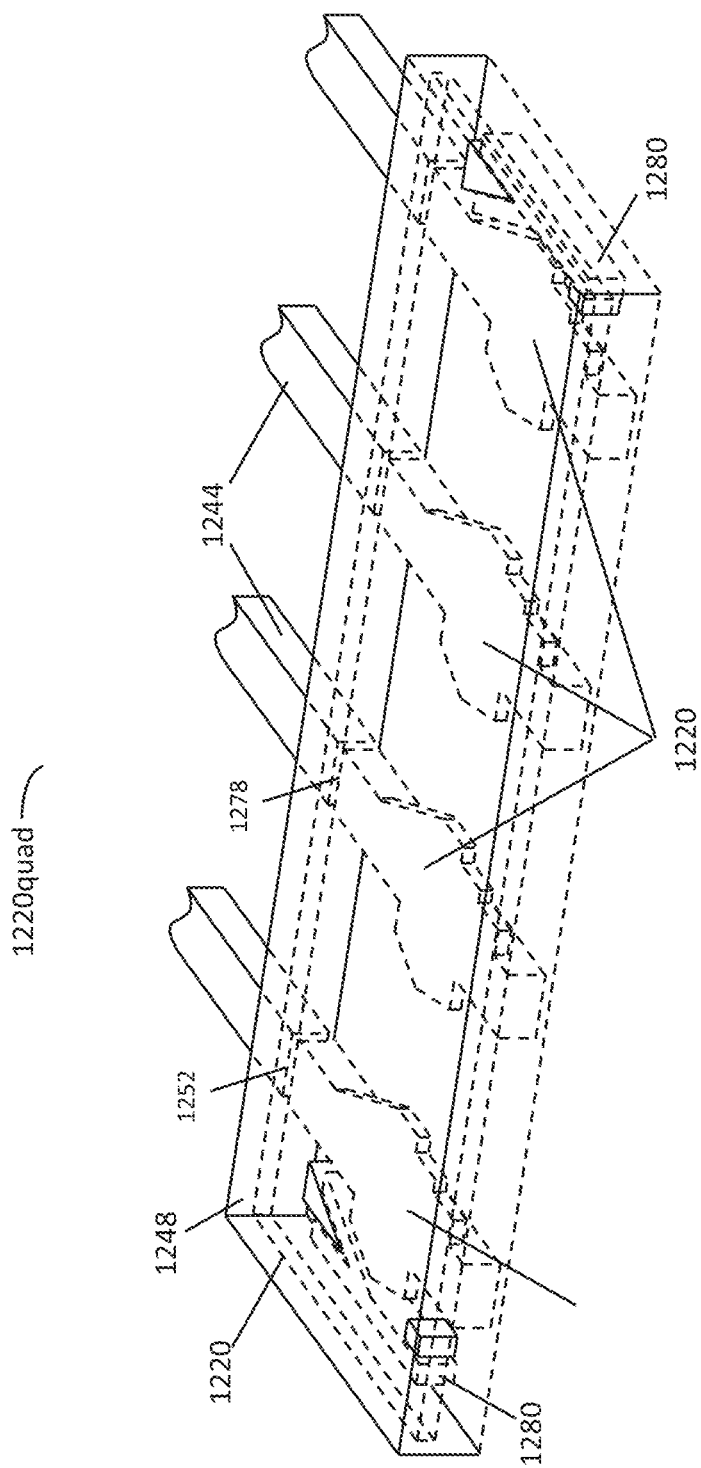
FIG. 12F. Perspective drawing of an embodiment showing a die with four optical devices and with patterned alignment pillars that is mounted in an interposer cavity. The alignment features are shown in the embodiment at the edge of the mounted die and the corresponding locations in the interposer cavity. The emitting or receiving facets of the optoelectrical devices are shown aligned with exposed facets of planar waveguides embedded in the interposer structure (the interposer and cavity are shown in solid lines and the optoelectrical die is shown in dotted lines).

In FIG. 12C, the device 1220 is shown in aligned position in cavity 1248 of interposer 1204. A portion of the planar waveguide 1244 that intersects the wall of the cavity 1248 with facet 1278 is shown in substantial alignment with the optical facet 1252 of the optical device 1220. FIG. 12C shows an embodiment of a single optical device 1220 that is positioned into a cavity 1248 that has a capacity of a single discrete device. In other embodiments, more than one discrete optical device 1220 is positioned into a cavity with a capacity to hold more than one device 1220. In yet other embodiments, the optical device 1220 is an array of two or more devices that can be positioned into cavities that have a capacity of more than one device 1220. FIGS. 12D-12F show drawings of these and related embodiments in more detail.

In FIG. 12D(i), a discrete optical device 1220 is shown with features similar to those described in FIG. 12A(i). In FIG. 12D(ii), a cavity 1248 is shown with a capacity of four optical devices 1220 and that contains z-pillars 1234a, 1234b that are complementary to the mechanical alignment features 1280 of the optical device 1220 shown in FIG. 12D(i). The cavity 1248 in FIG. 12D(ii) shows portions of four planar waveguides 1244 with optical facets 1252 intersecting the wall of the cavity 1248. In FIG. 12D(iii), four discrete devices 1220 are shown positioned in the cavity 1248 in position over the z-pillars 1234a, 1234b and the facets 1278 of which are aligned with the facets 1252 of the planar waveguides 1244.

In FIG. 12E(i), optical device 1220quad is a quad device that includes four devices 1220 formed on a single substrate 1260. Quad devices such as optical device 1220quad shown in FIG. 12E(i) enable more efficient fabrication with the placement and alignment of optical devices onto PICs. Each of the four devices 1220 on the quad substrate shown is a functional device with features similar to those described in FIG. 12A(i). In FIG. 12E(ii), a cavity 1248 is shown with a capacity of one quad device 1220quad (or four discrete optical devices 1220) and that contains z-pillars 1234a, 1234b that are complementary to the mechanical alignment features 1280 of the optical device 1220 shown in FIG. 12E(i). FIG. 12E(ii) shows portions of four planar waveguides 1244 with optical facets 1252 intersecting the wall of the cavity 1248. In FIG. 12E(iii), the quad device 1220quad is shown positioned in the cavity 1248 in position over the z-pillars 1234a,1234b and the facets 1278 of which are aligned with the facets 1252 of the planar waveguides 1244. In the embodiment shown in FIG. 12E, four optical devices 1220 were included on the optical device 1220quad. In other embodiments, two optical devices 1220 are included on a substrate 1260 and placed into a cavity 1248 that has a capacity for mounting two optical devices 1220. In yet other embodiments in which two optical devices 1220 are included on a common substrate 1260, these devices are positioned in a cavity 1248 that has a capacity for a multiple of two devices 1220 including a cavity 1248 that has a capacity for four devices, six devices, eight devices, or any other multiple of two devices. In other embodiments, three optical devices 1220 are included on a substrate 1260 and placed into a cavity 1248 that has a capacity for mounting three optical devices 1220. In yet other embodiments in which three optical devices 1220 are included on a common substrate 1260, these devices are positioned in a cavity 1248 that has a capacity for a multiple of three devices 1220 including a cavity 1248 that has a capacity for six devices, nine devices, twelve devices, or any other multiple of three devices. In yet other embodiments, four optical devices 1220 are included on a substrate 1260 and placed into a cavity 1248 that has a capacity for mounting four optical devices 1220. In yet other embodiments in which four optical devices 1220 are included on a common substrate 1260, these devices are positioned in a cavity 1248 that has a capacity for a multiple of four devices 1220 including a cavity 1248 that has a capacity for eight devices, twelve devices, sixteen devices, or any other multiple of four devices. In yet other embodiments, one or more optical devices are included on a substrate 1260 and placed into a cavity 1248 that has a capacity for multiple devices 1220 and to fully or partially fill the cavity 1248 with the one or more devices. An example embodiment includes a single device formed on a first substrate in combination with two devices formed on a second substrate that are placed in a cavity with a capacity for three devices. Another example embodiment includes a single device formed in a first substrate in combination with three devices formed on a second substrate that are placed in a cavity with a capacity for four devices, Other example embodiments include other quantities of optical devices formed on a first substrate with the same or another quantity of optical devices formed one or more additional substrates to fully or partially fill the cavity on the substrate. In general, in preferred embodiments, the optical device capacity of a cavity matches the number of devices in the cavity.

Referring to FIG. 12F, an embodiment of a quad device 1220quad is shown that has a simplified alignment feature structure in comparison to the optical device 1220quad shown in FIG. 12E. In the embodiment of the device 1220quad shown in FIG. 12F, two sets of z-pillars 1234a, 1234b are provided on the substrate of the quad device as shown in FIG. 12F. In other embodiments, more than two sets of z-pillars are provided on the quad die. In other embodiments, the z-pillars 1234a, 1234b can be provided on a substrate with two optical devices, three optical devices, four optical devices, or any number of optical devices.

In FIG. 12, the examples of embodiments shown are not intended to restrict the scope of embodiments, but rather are intended to illustrate features that are applicable to a wider range and scope of embodiments.

Figure 13A:
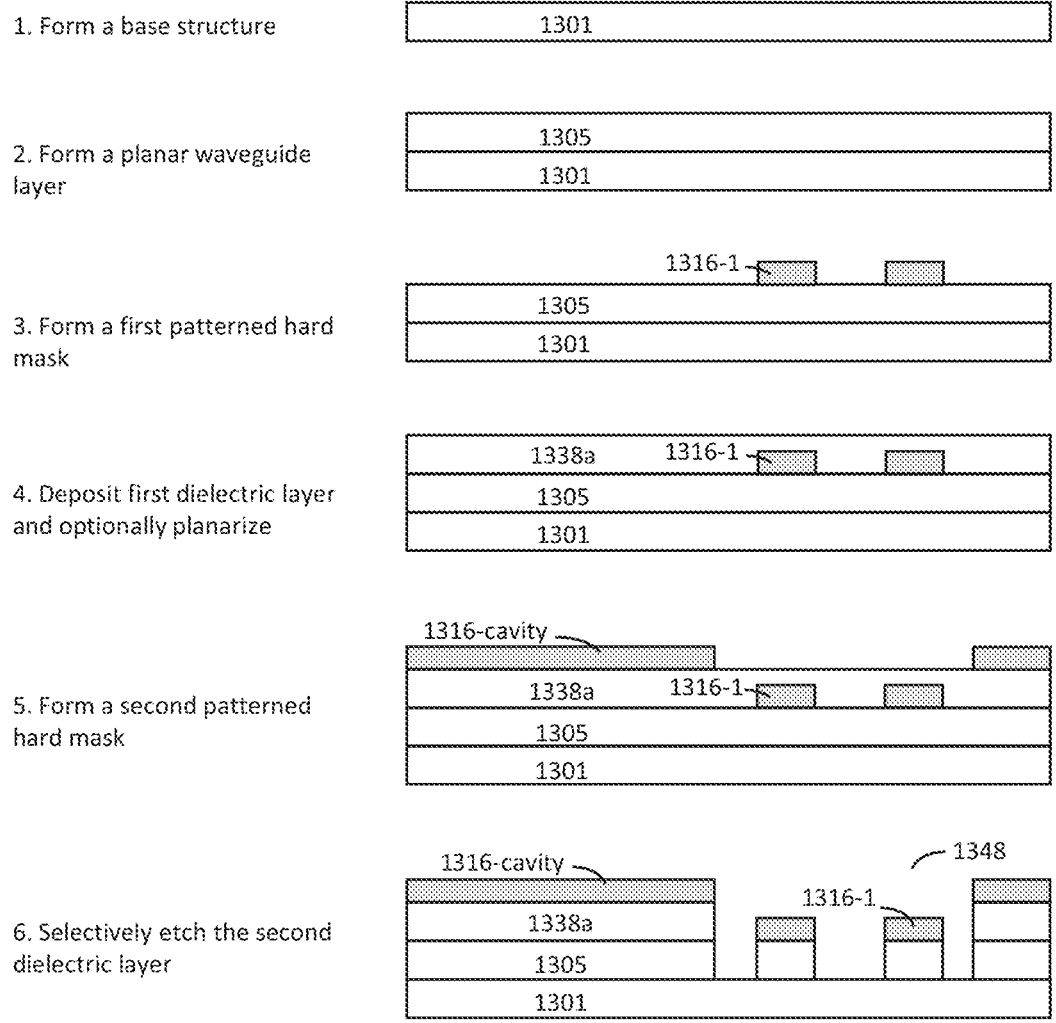
FIG. 13A. Embodiment of a process flow for forming a z-pillar in a cavity.
Figure 13B:
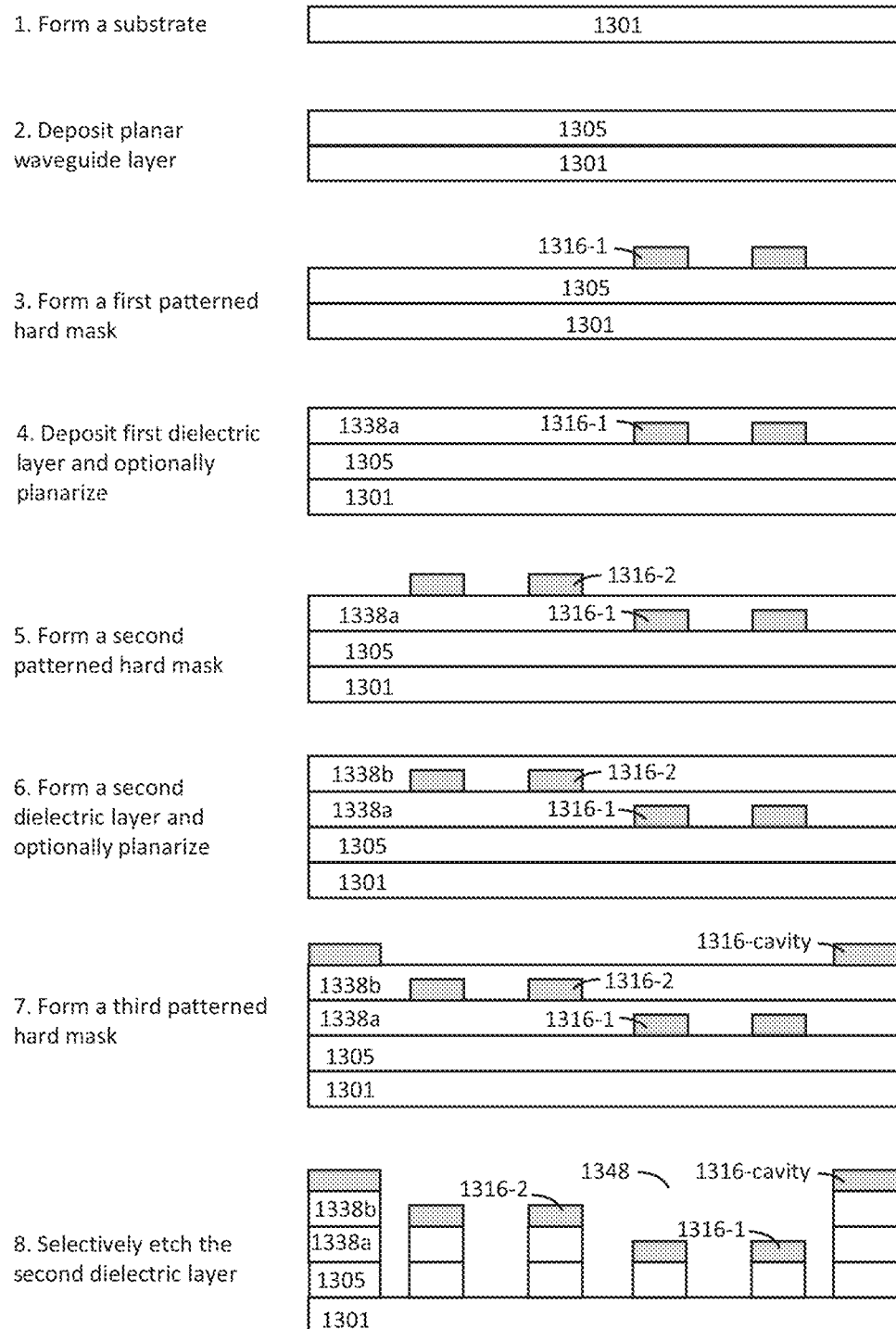
FIG. 13B. Embodiment of a process flow for forming a structure with z-pillars at two heights in a cavity.
Figure 13C:
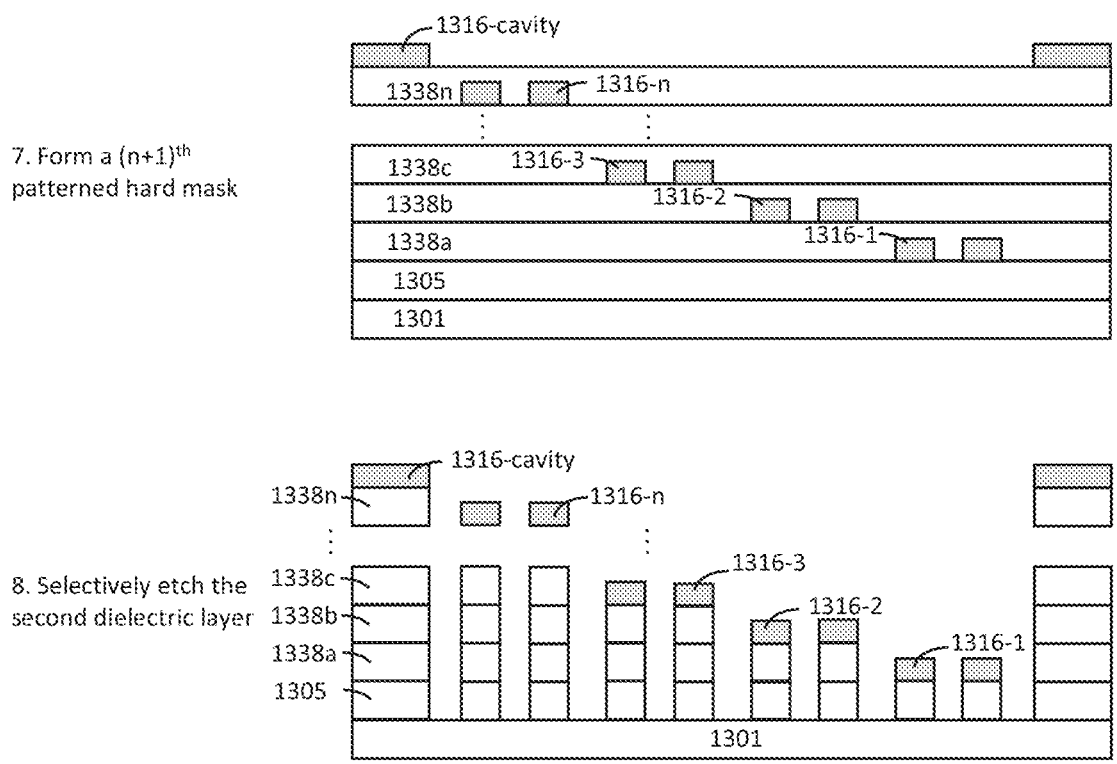
FIG. 13C. Embodiment of a process flow for forming a structure with z-pillars at multiple heights in a cavity.

Referring to FIG. 13A-13C, the process flows for forming z-pillars 1334 at one or more heights within the interposer structure are described.

Referring to FIG. 13A, a sequence of schematic drawings is shown that illustrate an embodiment of a process flow for forming z-pillars at a single height within an interposer structure. In Step 1 of FIG. 13A, an interposer base structure 1301 is formed. Interposer base structure 1301 may include an optional electrical interconnect layer. In Step 2 of FIG. 13A, a planar waveguide layer 1305 is formed on the base structure 1301. In Step 3 of FIG. 13A, a first patterned hard mask 1316-1 is formed on the planar waveguide layer 1305 that includes the pattern required for a first height z-pillar. In Step 4 of FIG. 13A, a first dielectric layer 1338a is formed over the patterned hard mask 1316-1 and optionally planarized. In Step 5, a second patterned hard mask 1316-cavity is formed on the first dielectric layer 1338a. In embodiments, hard mask 1316-cavity is a hard mask patterned for the formation of a cavity in contrast to the numerical hard mask layer designation, such as 1316-1, for which the value '1' corresponds to a $1^{st}$ z-pillar height. In Step 6 of FIG. 13A, the dielectric layer 1338a is etched with a selective process for removal of the dielectric material in the unmasked portions of the layer 1338a and the planar waveguide layer 1305 with little or no etching of the patterned hard masks 1316-1, 1316-cavity to form the z-pillars. In the embodiments shown in FIG. 13A, the z-pillars are formed at a single height. In embodiments, the depth of the etch can extend below the planar waveguide layer 1305.

Referring to FIG. 13B, a sequence of drawings is shown that illustrate an embodiment of a process flow for forming z-pillars with two different heights in an interposer structure. In Step 1 of FIG. 13B, an interposer base structure 1301 is formed. Interposer base structure 1301 may include an optional electrical interconnect layer. In Step 2 of FIG. 13B, a planar waveguide layer 1305 is formed on the base structure 1301. In Step 3 of FIG. 13B, a first patterned hard mask 1316-1 is formed on the planar waveguide layer 1305 that includes the pattern required for a first height z-pillar. In Step 4 of FIG. 13B, a first dielectric layer 1338a is formed over the patterned hard mask 1316-1 and optionally planarized. In Step 5 of FIG. 13B, a second patterned hard mask 1316-2 is formed on the first dielectric layer 1338a that includes the pattern required for a second height z-pillar. In Step 6 of FIG. 13B, a second dielectric layer 1338b is formed over the patterned hard mask 1316-2 and optionally planarized. In Step 7 of FIG. 13B, a third patterned hard mask 1316-cavity is formed on the second dielectric layer 1338b that includes the pattern required for the formation of a cavity 1348 in a portion of the dielectric layers 1338a, 1338b. And in Step 8 of FIG. 13B, the dielectric layers 1338b,1338a and the planar waveguide layer 1305 are etched with a selective process for removing the dielectric material in the layers with a high selectivity etch process with a low or no etch rate for the patterned hard masks 1316-1, 1316-2, 1316-cavity to form the z-pillars. In the embodiment shown in FIG. 13B, the z-pillars are formed at two heights as shown in the cavity 1348 in Step 8 of FIG. 13B. In embodiments, hard mask 1316-cavity is a hard mask patterned for the formation of a cavity 1348 in contrast to the numerical hard mask layer designation, such as 1316-1, 1316-2 for which the values '1' and '2' correspond to a $1^{st}$ z-pillar height and a $2^{nd}$ pillar height, respectively.

Referring to FIG. 13C, a sequence of drawings is shown that illustrate an embodiment of a process flow for forming three or more heights of z-pillars on an interposer substrate. In Step 1 of FIG. 13C, an interposer base structure 1301 is formed. Interposer base structure 1301 may include an optional electrical interconnect layer. In Step 2 of FIG. 13C, a planar waveguide layer 1305 is formed on the base structure 1301. In Step 3 of FIG. 13C, a first patterned hard mask 1316-1 is formed on the planar waveguide layer 1305 that includes the pattern required for a first height z-pillar, and a first dielectric layer 1338a is formed over the patterned hard mask 1316-1 and optionally planarized. In Step 4 of FIG. 13C, a second patterned hard mask 1316-2 is formed on the first dielectric layer 1338a that includes the pattern required for a second height z-pillar, and a second dielectric layer 1338b is formed over the patterned hard mask 1316-2 and optionally planarized. In Step 5 of FIG. 13C, a third patterned hard mask 1316-3 is formed on the second dielectric layer 1338a that includes the pattern required for a third height z-pillar, and a third dielectric layer 1338c is formed over the patterned hard mask 1316-3 and optionally planarized. In Step 6 of FIG. 13C, none, one, or more than one additional patterned hard masks are formed on the third dielectric layer 1338c that includes the pattern required for any additional z-pillars, and additional dielectric layers that are formed over these patterned hard masks and optionally planarized.

In embodiments in which no additional z-pillar heights are required, a fourth patterned hard mask 1316-cavity is formed on the third dielectric layer 1338c that includes the pattern required for the formation of a cavity in a portion of the dielectric layers 1338a, 1338b, 1338c. In these embodiments, in Step 8 of FIG. 13C, the dielectric layers 1338c, 1338b,1338a and the planar waveguide layer 1305 are etched with a selective process for removing the dielectric material in the layers with little or no etching of the patterned hard masks 1316-1, 1316-2, 1316-3, 1316-cavity to form the z-pillars. In this embodiment, z-pillars are formed at three heights in cavity 1348.

In embodiments in which one additional z-pillar height is required, for a total of four z-pillar heights, a fourth patterned hard mask 1316-n, with n=4, is formed on the third dielectric layer 1338c that includes the pattern required for a fourth height z-pillar, and a fourth dielectric layer 1338d is formed over the patterned hard mask 1316-4 and optionally planarized. In these embodiments in which a fourth z-pillar height is formed, after forming the fourth patterned hard mask for the fourth height z-pillar, and after depositing and optionally planarizing a fourth dielectric layer 1338d, a fifth patterned hard mask 1316-cavity is formed on the fourth dielectric layer 1338d that includes the pattern required for the formation of a cavity in a portion of the dielectric layers 1338a, 1338b, 1338c, 1338d. In these embodiments, in Step 8 of FIG. 13C, the dielectric layers 1338d,1338c,1338b,1338a and the planar waveguide layer 1305 are etched with a selective process for removing the dielectric material in the layers with little or no etching of the patterned hard masks 1316-1, 1316-2, 1316-3, 1316-4, 1316-cavity to form the z-pillars at the four heights.

And in embodiments in which more than one additional z-pillar height is required, for a total of more than four z-pillar heights, an nth patterned hard mask 1316-n, where n is the number of z-pillar hard mask layers, is formed on the (n−1)th dielectric layer that includes the pattern required for a nth height z-pillar, and an nth dielectric layer is formed over the patterned hard mask 1316-n and optionally planarized. In these embodiments in which the more than four z-pillar heights are required, after forming the nth patterned hard mask for the nth height z-pillar, and after depositing and optionally planarizing an nth dielectric layer, an (n+1)th patterned hard mask 1316-cavity is formed on the nth dielectric layer that includes the pattern required for the formation of a cavity in a portion of the underlying dielectric layers. In these embodiments, in Step 8 of FIG. 13C, the dielectric layers and the planar waveguide layer 1305 are etched with a selective process for removing the dielectric material in the layers with a low rate of removal of the patterned hard masks 1316-1 to 1316-n to form the multiple height z-pillars. As the thickness of the dielectric material increases with increasing layers, the rate of the extent of the removal of the hard mask can become significant.

In some embodiments, the z-pillars need not be positioned within a cavity. In these embodiments, a hard mask can be formed such that the resulting z-pillars are not formed in a cavity 1348. In FIG. 13D, a sequence of drawings is shown that illustrate an embodiment of a process flow for forming z-pillars at a single height on an interposer without a cavity. In Step 1 of FIG. 13D, an interposer base structure 1301 is formed. Interposer base structure may include an optional electrical interconnect layer. In Step 2 of FIG. 13D, a planar waveguide layer 1305 is formed on the base structure 1301. In Step 3 of FIG. 13D, a first patterned hard mask 1316-1 is formed on the planar waveguide layer 1305 that includes the pattern required for a first height z-pillar. In Step 4 of FIG. 13D, the planar waveguide layer 1305 is etched with a selective process for removing the planar waveguide material in the unmasked portions with little or no etching of the patterned hard mask 1316-1 to form the z-pillars. In the embodiment shown in FIG. 13D, the z-pillars are formed at a single height. In the embodiment shown in FIG. 13D, the planar waveguide layer 1305 can include a dielectric spacer layer, for example, above or below the core of the planar waveguide layer, or both above and below the core of the planar waveguide layer through which optical signals are propagated as described herein.

Figure 13E:
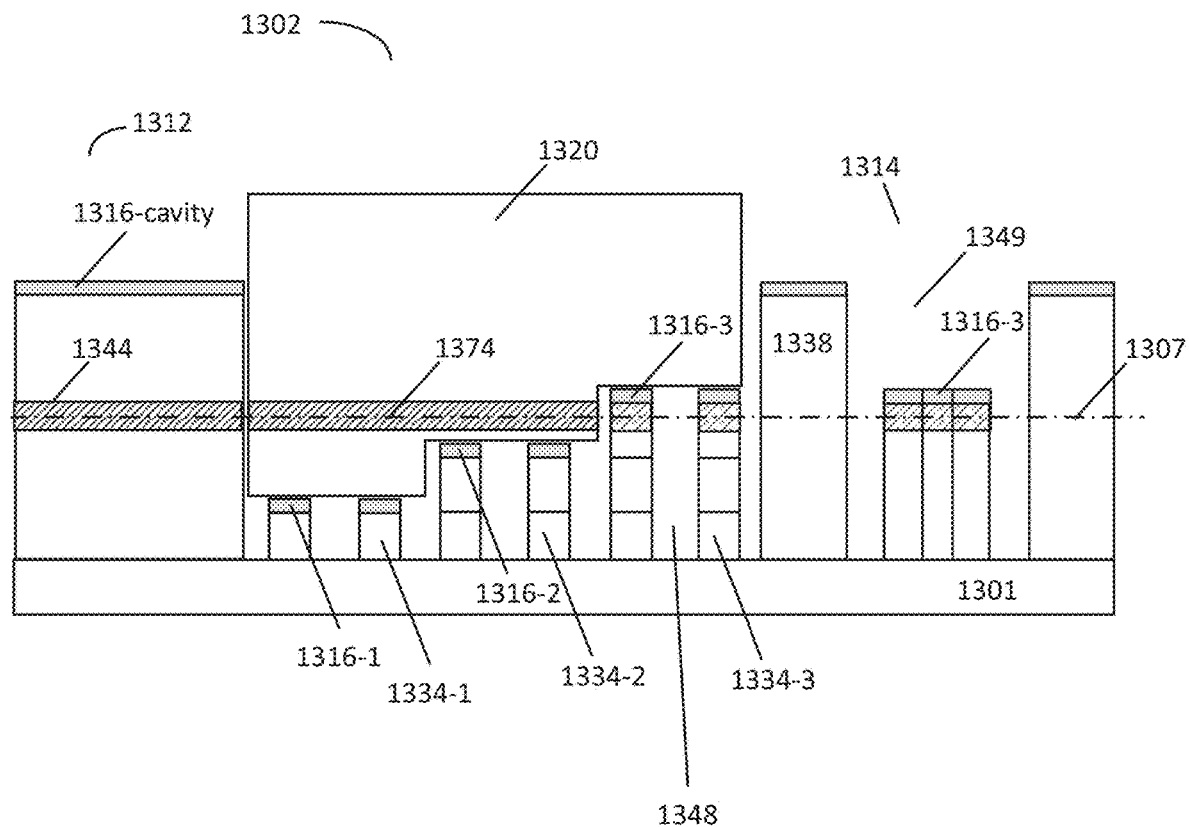
FIG. 13E. Embodiment with z-pillars formed at multiple heights. In this embodiment, the highest z-pillar is formed in alignment (from the same mask layer) as the planar waveguide layer and the fiducial.

Referring to FIG. 13E, an example embodiment of a PIC 1302 is shown that utilizes z-pillar alignment aids 1334-1, 1334-2, 1334-3 that are formed at multiple heights to support a mounted die 1320 on an interposer device 1312. Optical device 1320 is shown supported by z-pillars that have been formed at multiple heights. The optical axis of the optical device 1320 is shown in alignment with the optical device 1312, an interposer with a buried waveguide 1344. The optical axes of the optical waveguide of device 1312, a waveguide formed on the interposer from the planar waveguide layer, and the optical axes of the optical feature 1374 of the optical device 1320 are shown in alignment with optical axis 1307 of the PIC 1302. Four hard mask layers are shown in FIG. 13E that include the hard mask 1316-1 for the first height pillar 1334-1, the hard mask 1316-2 for the second height pillar 1334-2, the hard mask 1316-3 for the third height pillar 1334-3, and the hard mask 1316-cavity used to form the cavities 1348, 1349 for the z-pillars and the fiducials, respectively as shown. The mounted die device 1320 is shown in contact with the three hard mask layers at the top of each of the z-pillars. The same hard mask that is used in the embodiment shown to form the z-pillar 1334-3 is used to pattern the fiducial 1314, and the waveguide 1344. In the embodiment shown in FIG. 13E, a single device 1320 is shown supported by z-pillars of multiple heights. In other embodiments, the z-pillars formed at multiple heights are utilized to provide z-direction alignment of multiple mounted devices 1320. In other embodiments, less than or more than three z-pillar heights can be formed.

The embodiments shown in FIG. 13A-13E illustrate the formation of the z-pillars at one or more heights for the purpose of providing alignment aids for mounted optical devices. FIG. 13E further shows how the use of z-pillars at multiple heights can be utilized in support of an optical device and how the support of an optical device can provide for the alignment of the optical axes of optical devices on a PIC.

Figure 14:
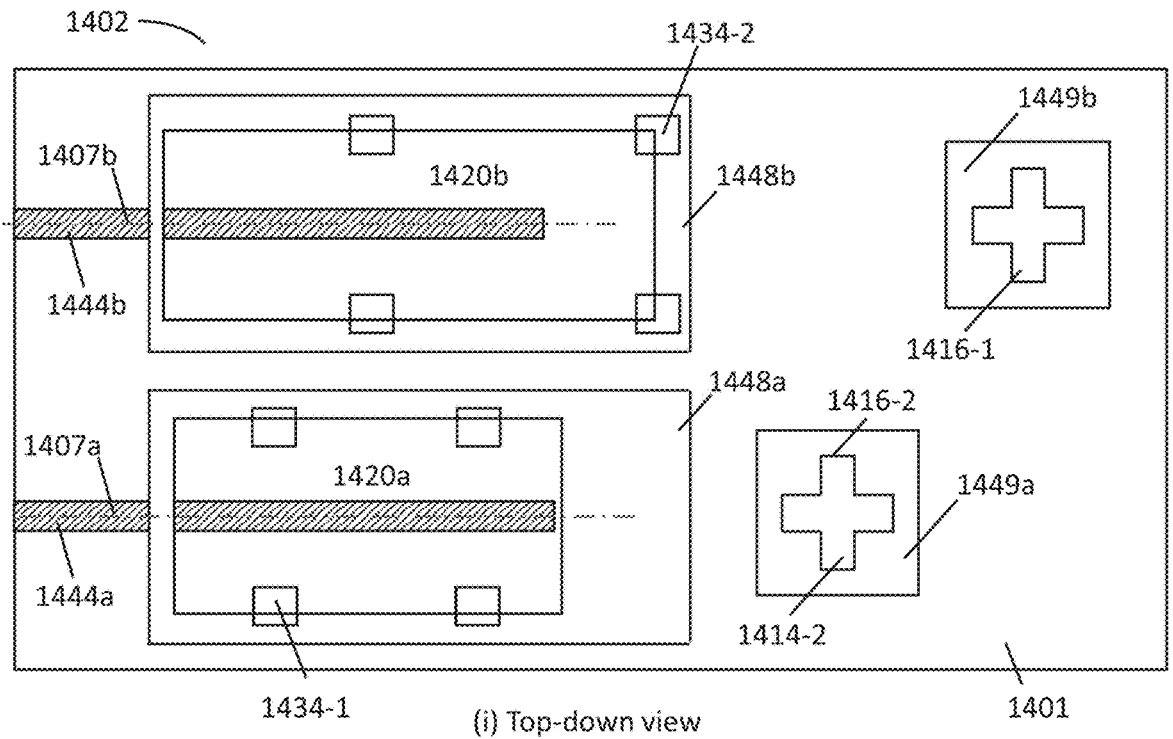
FIG. 14. Embodiment of alignment structure with dual z-pillar heights shown with two planar waveguide layers. Each of the planar waveguide layers is shown in alignment with a z-pillar and a fiducial: (i) top-down, and (ii) side view.
Figure 14:
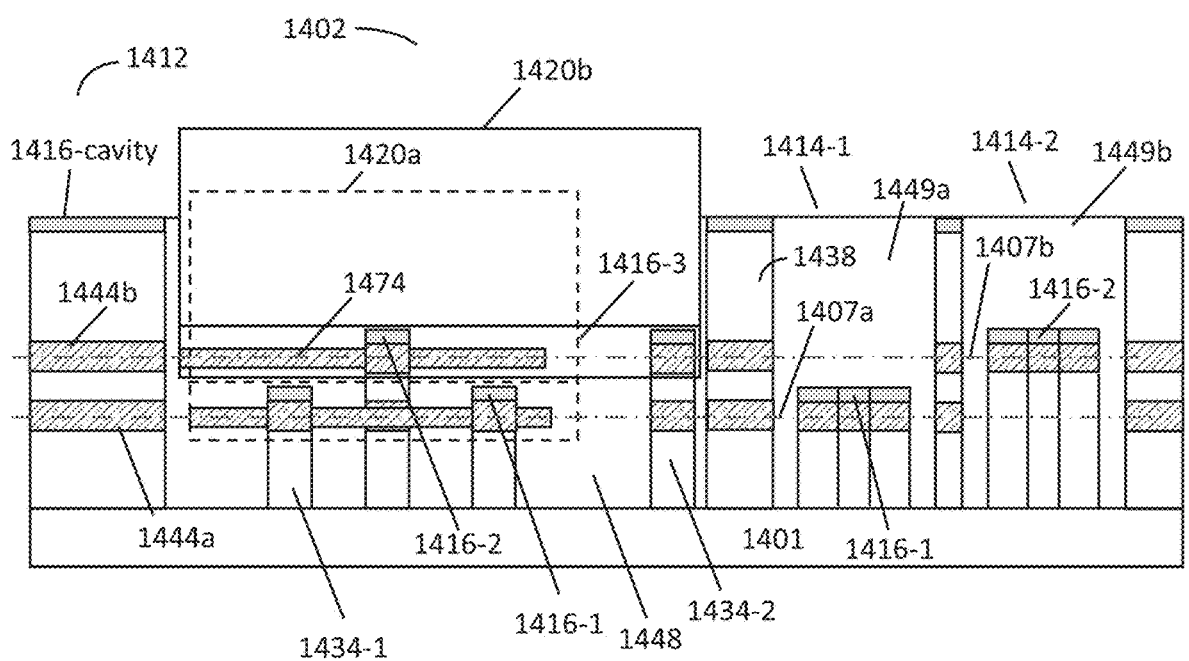

In FIG. 14, an embodiment is shown in which z-pillars, fiducials, and waveguides are formed at multiple heights and for which multiple planar waveguides are formed in a PIC 1402 on an interposer 1401. The schematic top-down drawing in FIG. 14 shows a portion of a PIC 1402 that contains two waveguides 1444a, 1444b. As the side view in FIG. 14 shows, the two waveguides 1444a, 1444b are at different elevations on the interposer. The optical axis 1407a for mounted device 1420a is aligned with planar waveguide 1444a formed from a first planar waveguide layer. Similarly, the optical axis 1474 for mounted device 1420b is aligned with the optical axis 1407b of the planar waveguide 1444b formed from a second planar waveguide layer. In the embodiment shown in FIG. 14, a first hard mask layer 1416-1 includes patterns for forming the planar waveguides 1444a, fiducial 1414-1, and z-pillars 1434-1 at a first height, and a second hard mask 1416-2 for forming the planar waveguides 1444b, fiducial 1414-2, and z-pillars 1434-2 at a second height. Use of multiple planar waveguides with the formation of the alignment features as described herein can enable stacking of photonic integrated circuits on the interposer. Fiducials 1414-1, 1414-2 are formed in cavities 1449a, 1449b respectively. In the embodiment shown, z-pillars 1434-1, 1434-2 are formed in cavity 1448, patterned using mask layer 1416-cavity, upon removal of dielectric layer 1438 and portions of the planar waveguide layers as shown. Planar waveguide layers in embodiments are typically formed as blanket layers on the interposer and the planar devices such as planar waveguides 1444a, 1444b are patterned from these blanket layers. Portions of the planar waveguide layers are also present in the z-pillars and the fiducials as shown unless removed in a prior step.

Referring to FIG. 15A(i), a schematic cross-sectional view of an embodiment that includes a z-pillar alignment aid 1534, the top of which is not in horizontal alignment with the optical axis of the vertically aligned optical devices 1512, 1520. In this embodiment, optical device 1512 is formed on substrate 1500 and includes an optical feature with optical axis 1507a. Optical device 1512 shown in FIG. 15A(i) is, for example, an optical waveguide, formed on the substrate 1500. The fixed optical axis 1507a of the optical device 1512 is shown with offset, namely z-offset 1, from a reference plane 1527ref on the top of the substrate 1500. Optical axis 1507a of device 1512 in FIG. 15A(i) is shown in alignment with the optical axis 1507b of the optical device 1520. The vertical positioning of the optical axis 1507b of device 1520 is determined by the height of pillar 1534 upon which the device 1520 is mounted and by the vertical position of a mechanical plane 1526ref of device 1520 that makes contact with the top of the pillar 1534. The reference plane 1526ref corresponds to a physical surface of device 1520 as shown in FIG. 15A(i). Pillar 1534, hereinafter referred to as a z-pillar 1534, is formed in cavity 1548 within substrate 1500. A reference plane 1525ref is shown in FIG. 15A(i) that corresponds to the top of the z-pillar 1534 of the substrate 1500. In the embodiment in FIG. 15A(i), the reference plane 1525ref of the substrate 1500 is shown in alignment with the reference plane 1526ref of the device 1520, and a second offset, namely z-offset 2, is shown between the reference planes 1525ref, 1526ref and the optical axis 1507 of PIC 1502.

Referring to FIG. 15A(ii), a schematic cross-sectional view of an embodiment that includes a z-pillar alignment aid 1534, the top of which is not in horizontal alignment with the optical axis of the vertically aligned optical devices 1512, 1520 vertically aligned devices 1512, 1520 is shown. In this embodiment, optical device 1512 is formed on substrate 1500 and includes an optical feature with optical axis 1507a. Optical device 1512 shown in FIG. 15A(ii) is, for example, an optical waveguide, formed on the substrate 1500. The fixed optical axis 1507a of the optical device 1512 is shown with offset, namely z-offset 1, from a reference plane 1527ref taken, for example in FIG. 15A(ii), between a reference plane on the substrate, such as the top surface of the substrate 1500, and the optical device 1512. Optical axis 1507*a* of device 1512 in FIG. 15A(ii) is shown in alignment with the optical axis 1507*b* of the optical device 1520. The vertical positioning of the optical axis 1507*b* of device 1520 is determined by the height of pillar 1534 upon which the device 1520 is mounted and by the vertical position of the 1526ref plane of device 1520 that makes contact with the top of the pillar 1534. The reference plane 1526ref corresponds to a physical surface of device 1520 as shown in FIG. 15A(ii) that makes contact with the top of the pillar 1534. Pillar 1534, hereinafter referred to as a z-pillar 1534, is formed in the embodiment shown in FIG. 15A(ii) on the substrate 1500. A reference plane 1525ref is shown in FIG. 15A(ii) that corresponds to the top of the z-pillar 1534 of the substrate 1500. In the embodiment shown in FIG. 15A(ii), the reference planes 1525ref of the substrate 1500 and the reference plane 1527ref below the device 1512 are shown in alignment with the reference plane 1526ref of the device 1520, and a single offset, namely z offset 1, from this common reference plane to the optical axis 1507 is utilized in the formation of the PIC 1502.

The embodiments shown in FIG. 15A demonstrate the implementation of z-pillar alignment aids for which the top of the z-pillar is not in alignment with the optical axis of the PIC. Use of z-pillar alignment aids enable the formation of reference surfaces to which optoelectrical die can be mounted and enable other aspects of the interposer substrate to be implemented. In addition to the vertical positioning features provided by the z-pillar alignment aids, lateral features are provided in some embodiments to limit lateral movement upon placement of optoelectrical die onto the z-pillars. Also, metal or electrical contact pads, for example, can be positioned in proximity to the z-pillar alignment aids to which optical or optoelectrical devices can be mounted. In embodiments, for example, optical and optoelectrical devices can be secured in place using solder to secure these devices in place after placement and alignment for both optical and optoelectrical devices. In embodiments that utilize optoelectrical devices, the solder connections would secure the devices into place and provide electrical contact to the underlying electrical interconnect layer of the interposer base structure. In embodiments in which optical devices without an electrical feature or function, the solder connections could be used to secure the devices into place without the requirement for electrical connection to the underlying electrical interconnect layer. Use of the solder connections to secure the optical and optoelectrical devices into place in PICs is described in more detail herein.

Referring to FIG. 15B, schematic cross-sectional views of embodiments that include optical devices 1512, 1520 with vertically aligned optical axes 1507*a*, 1507*b*, respectively, are shown. In these embodiments, optical devices 1512 are formed on substrates 1500 and include an optical feature with optical axis 1507*a*. Optical devices 1512 shown in the embodiments in FIG. 15B are, for example, optical devices such as lasers, optical detectors, and waveguides, among others, that are mounted on the substrate 1500. The devices 1512 shown in FIG. 15B are mounted on various configurations of z-pillars 1534 formed on the substrates 1500 that facilitate the alignment of the devices 1512 particularly in the vertical direction, but not limited to alignment in the vertical direction. The optical axis 1507*a* of the optical devices 1512 are shown in alignment with the optical axis 1507*b* of the optical devices 1520 to form the aligned optical axis 1507 of the PIC 1502. Optical devices 1520 in the embodiments shown in FIG. 15B are also mounted on various configurations of z-pillars 1534. The optical axes 1507 of the PIC 1502 are shown in the various configurations of FIG. 15B with an offset to the top of one or more z-pillars 1534 formed on the substrates 1500. In FIG. 15B(i), each of the z-pillars 1534 for optical devices 1512, 1520 that are formed on the substrate 1500 are formed with a common offset between the top of the z-pillar 1534 and the optical axis 1507 of the PIC 1502. The common offset in the embodiment in FIG. 15B(i) results from the common z-pillar height of this embodiment. In the embodiment shown in FIG. 15B(ii), the z-pillars 1534*a* for optical devices 1512 are formed with an offset (z-offset 1) between the top of the z-pillar 1534*a* and the PIC optical axis 1507 that differs from the offset (z-offset 2) between the top of the z-pillars 1534*b* of the optical device 1520 and the PIC optical axis 1507. The different offsets between the optical axis 1507 and the tops of the z-pillars 1534*a*, 1534*b* result from the different z-pillar heights that are used for the two devices 1512,1520 shown in FIG. 15B(ii). In the embodiment shown in FIG. 15B(iii), z-pillars 1534*a*,1534*b* for optical device 1512 and optical device 1520 are formed both with an offset, z-offset 1, and an offset, z-offset 2, between the tops of the z-pillar 1534*a*,1534*b* and the PIC optical axis 1507. In the embodiment shown in FIG. 15B(iii), the two different offsets that are shown result from the use of the two z-pillar heights for support within each of the two optical devices 1512,1520. In other embodiments, more than two offsets between the tops of the pillars 1534 and the optical axis of the PIC may be used if additional z-pillar heights are utilized within a device mounting scheme. In the embodiment shown in FIG. 15B (iv), z-pillars 1534*a* for optical device 1512 are formed both with a single offset, z-offset 1, between the tops of the z-pillar 1534*a* and the PIC optical axis 1507 and the optical device 1520 is formed both with an offset, z-offset 1, and an offset, z-offset 2, between the tops of the z-pillar 1534*a*, 1534*b* and the PIC optical axis 1507. In FIGS. 15B(i)-15B (iv), reference plane 1525ref is shown at the top of the z-pillar 1534 with the smallest offset to the PIC optical axis 1507.

Referring to FIG. 15C, schematic cross-sectional views of additional embodiments that include devices 1512, 1520 with vertically aligned optical axes 1507*a*, 1507*b*, respectively, are shown. In these embodiments, optical devices 1512 are formed on substrates 1500 and includes an optical feature with optical axis 1507*a*. Optical devices 1512 shown in the embodiments in FIG. 15C are, for example, optical devices such as lasers, optical detectors, and waveguides, among others, that are mounted on a substrate 1500. The devices 1512 shown in FIG. 15C are mounted on various configurations of z-pillars 1534 formed in cavities 1548 in the substrates 1500 that facilitate the alignment of the devices 1512 particularly in the vertical direction, but not limited to alignment in the vertical direction. The optical axis 1507*a* of the optical devices 1512 are shown in alignment with the optical axis 1507*b* of the optical devices 1520 to form the optical axis 1507 of the PIC 1502. Optical devices 1520 in the embodiments shown in FIG. 15C are also mounted on various configurations of z-pillars 1534. The optical axes 1507 of the PIC 1502 are shown in the various configurations of FIG. 15C with an offset to the top of one or more z-pillars 1534 formed in the cavities 1548 in the substrates 1500. In the embodiment shown in FIG. 15C(i), z-pillars 1534 for optical devices 1512, 1520 are shown and each of the z-pillars is formed in a cavity 1548 in the substrate 1500. The z-pillars 1534 are formed with a common offset, namely z-offset 1, between the top of the z-pillar 1534 and the optical axis 1507 of the PIC 1502. Similarly, in the embodiment shown in FIG. 15C(ii), z-pillars 1534 for optical devices 1512,1520 are also shown for which each of the z-pillars 1534 is formed in a cavity 1548 in the substrate 1500, and for which the z-pillars 1534 are formed with a common offset, namely z-offset 1, between the top of the z-pillar 1534 and the optical axis 1507 of the PIC 1502. In the embodiment shown in FIG. 15C(ii), a third optical device, a waveguide 1544, is formed on the substrate 1500 with a second offset, namely z-offset 2, to the reference plane 1527ref at the top of the substrate. Optical waveguides 1544 provide a propagation pathway for optical signals that are transferred between optical devices 1512, 1520 that are generally more focused and less lossy than in air, and commonly preferred for many applications in PICs. Embodiments in FIG. 15C(ii), FIG. 15C(iii), and FIG. 15C(iv) are shown with various example configurations with waveguides present between optical devices 1512, 1520 and with various configurations of z-pillars formed in cavities 1548. Cavities 1548 formed in the interposer provide unique benefits in the formation of PICs in that the formation and alignment of the waveguides 1544 and the z-pillars 1534 can provide improved alignment integrity with reduced transmission losses between the optical devices 1512,1520 and between the waveguides as further described herein. The waveguide 1544 shown in the embodiment in FIG. 15C(ii) is a waveguide that is formed on the substrate 1500. In the embodiment shown in FIG. 15C(iii), the waveguide 1544 is formed within the substrate 1500 and in this embodiment, the z-pillars 1534 for optical devices 1512, 1520, formed in cavities 1548, are also shown for which each of the z-pillars 1534 are formed with a common offset, namely z-offset 1, between the top of the z-pillar 1534 and the optical axis 1507 of the PIC 1502. Alternatively, in the embodiment shown in FIG. 15C(iv), waveguide 1544 is formed within the substrate 1500 and in this embodiment, the z-pillars 1534*a* for optical device 1520 are shown with a first offset, namely z-offset 1, between the top of the z-pillar 1534 and the optical axis 1507 of the PIC 1502, and z-pillars 1534*b* for optical device 1512 are shown with a second offset, namely z-offset 2, between the top of the z-pillars 1534*b* and the optical axis 1507 of the PIC 1502.

In embodiments, the waveguide 1544 is an optical pathway for an optical signal. In other embodiments, the waveguide 1544 is an optical device such as an arrayed waveguide or other form of optical device. An in yet other embodiments, the waveguide 1544 is one or more waveguides and optical devices used in the formation of the PIC 1502.

It should be noted that the various configurations of z-pillar heights shown in FIG. 15B can also be combined with the configurations of cavities and waveguides 1544 shown in FIG. 15C. The embodiment shown in FIG. 15C(iii) can be formed, for example, with one or more z-pillars 1534*a* supporting device 1512 that have a first offset between the top of the z-pillar 1534*a* and the optical axis 1507 of the PIC 1502 and with one or more z-pillars 1534*b* supporting device 1512 that have a second offset between the top of the z-pillar 1534 and the optical axis 1507 of the PIC 1502. This embodiment can be compared to the non-cavity containing case described in the embodiment shown in FIG. 15B(iii). In the embodiment shown in FIG. 15B(iii), two different offsets are shown. In other embodiments, more than two offsets between the tops of the pillars 1534 and the optical axis 1507 of a PIC 1502 may be used in PICs 1502 formed with cavities 1548. And in yet other embodiments, one or more devices have a single offset between the top of the z-pillars 1534 and the optical axis 1507 of the PIC 1502 and one or more devices have two or more offsets between the top of the z-pillars 1534 and the optical axis 1507 of the PIC 1502. In FIGS. 15C(i)-15C(iv), reference plane 1525ref is shown at the top of the z-pillar 1534 with the smallest offset to the PIC optical axis 1507, and reference planes 1526ref are reference surfaces formed on the optical devices 1512, 1520 that contact the top of the z-pillars 1534.

Referring to a FIG. 15D(i), a schematic cross-sectional view of an embodiment that includes vertically aligned devices 1512, 1520 is shown for which the surfaces of these devices coincident with the reference planes 1526ref form a contact with the bottom surface of the cavity 1548 in contrast with embodiments in which the contact is made at the top of the z-pillar 1534. Vertical alignment in embodiments such as those provided in FIG. 15D(i) is determined wholly or in part by the depth of the cavity 1548 and the offset, namely z-offset 1, between the optical axis of the optical device 1512, 1520 and the contact surface of these devices 1512, 1520 coincident with the reference planes 1526ref. A waveguide 1544 is shown in the embodiment in FIG. 15D(i) between the aligned devices 1512, 1520. The optical axis of the waveguide 1544 is in alignment with the optical axes 1507*a*, 1507*b*, respectively, of the optical devices 1512, 1520, which are aligned with the optical axis 1507 of the PIC 1502. A second offset is shown, namely z-offset 2, which is the distance between the optical axis 1507 of the PIC 1502, and the substrate upon which the optical waveguide 1544 is formed.

In FIG. 15D(ii), a schematic cross-sectional view of an embodiment that includes vertically aligned devices 1512, 1520 is shown for which the surfaces of these devices coincident with the reference planes 1526ref form a contact with the bottom surface of the cavity 1548 in contrast with embodiments in which the contact is made at the top of the z-pillar 1534. The waveguide 1544 between the optical devices 1512, 1520 is formed within the substrate 1500. Vertical alignment in embodiments such as those provided in FIG. 15D(ii) is determined wholly or in part by the depth of the cavity 1548 and the offset, namely z-offset 1, between the optical axis of the optical device 1512, 1520 and the contact surface of these devices 1512, 1520 coincident with the reference planes 1526ref. The waveguide 1544 shown in the embodiment in FIG. 15D(i) between the aligned devices 1512, 1520 is formed within the substrate 1500. The optical axis of the waveguide 1544 is in alignment with the optical axes 1507*a*, 1507*b*, respectively, of the optical devices 1512, 1520, which are aligned with the optical axis 1507 of the PIC 1502. A second offset is shown, namely z-offset 2, which is the distance between the optical axis 1507 of the PIC 1502, and the substrate within which the optical waveguide 1544 is formed.

Referring to a FIG. 15E, schematic cross-sectional views of embodiments that includes aligned devices 1512, 1520 is shown in which an optical device, namely the optical device 1512 shown in FIG. 15E, is an optical device mounted at an edge formed in the substrate 1500. Optical devices, such as fiber optic cable mounting blocks, for example, are mounted at an edge formed on the substrate 1500 of a PIC 1502 to provide a means to couple optical signals between PICs and optical cables that enable transmission from and delivery to the PICs. Optical device 1512 is shown mounted at an edge formed on the substrate 1500 with an offset, z-offset 1 between the optical axis 1507*a* of device 1512 and a first reference plane 1526ref-a, and an offset, z-offset 2 between the optical axis 1507*a* of device 1512 and a second reference plane 1526ref-b as shown in FIG. 15E(i). The second offset, namely z-offset 2, shown in FIG. 15E(i) is optionally included to provide, for example, improved mechanical stability of the mounting of device 1512 on substrate 1500. The optical axis 1507a of the optical device 1512 mounted at the edge of the substrate 1500 is shown in alignment with the optical axis 1507b of the optical device 1520 also mounted on the substrate 1500. The alignment of the optical axes 1507a, 1507b of the optical devices 1512, 1520 facilitates the efficient transmission of optical signals between these devices. Optical device 1520 is shown mounted on z-pillar 1534 in cavity 1548 with an offset, namely z-offset 3, between the top of the z-pillar 1534 and the optical axis 1507b. In other embodiments, the z-pillars 1534 are formed without a cavity 1548 as, for example, the embodiments shown in FIG. 15B. In yet other embodiments, the z-pillars 1534 are formed without a cavity and the one or more z-pillars are formed with one or more offsets from the optical axis 1507 of the PIC 1502. In yet other embodiments, one or more z-pillars 1534 are formed with one or more offsets from the optical axis 1507 within a cavity 1548, such as those shown in FIG. 15C, in combination with optical devices mounted at the edge of the substrate 1500, such as the optical device 1512 shown in FIG. 15E(i). And in yet other embodiments, waveguides 1544 or other optical devices are present between the devices 1512, 1520.

Referring to FIG. 15E(ii), optical device 1512 is a fiber optic cable mounting block 1512 with mounted fiber optic cable 1554. The fiber optic cable mounting block 1512 is shown in the embodiment mounted in contact with z-pillar 1534 and on the surfaces of the mounting block 1512 coincident with the reference planes 1526ref-a, 1526ref-b of the mounting block 1512. An optical fiber mounting block such as that depicted in the embodiments shown in FIG. 15E(ii) is a mounting block used, for example, in PIC applications to attach a fiber optic cable to a substrate. The fiber optic cable mounting block 1512, shown in the embodiment forms a contact with z-pillar 1534 and optionally with a ledge 1553 formed in the substrate 1500 to provide vertical alignment of the optical plane of the fiber core 1556 of the fiber optic cable 1554 and the optical plane 1507 of the PIC 1502, and to provide mechanical stability to the union of the mounting block 1512 and the substrate 1500. In the embodiment shown, a projection of the z-pillar 1534 is shown (with dotted vertical lines) supporting the fiber optic cable mounting block 1512 in FIG. 15E(ii) since the z-pillars 1534 are not in the same cross-sectional plane, in general, as the core 1556 of the fiber optic cable 1554 but rather the z-pillars 1534 are positioned offset from the fiber optic core 1556. A single z-pillar 1534 is shown in FIG. 15E(ii). In other embodiments, two or more z-pillars 1534 are present to support the fiber optic cable mounting block 1512. The fiber optic cable mounting block 1512 is shown with a portion of a fiber optic core 1556 and the fiber cladding 1555 of the fiber optic cable 1554. A perspective drawing of the fiber optic cable mounting block is shown in FIG. 15E(iii). The alignment of the optical axis 1507a of the fiber mounting block 1520 with the optical axis of the PIC 1502 to which the fiber optic mounting block is attached, facilitates the efficient transmission of optical signals between the optical fiber core 1556 of the optical fiber cable 1554 and other components in the PIC 1502, such as optical device 1520 as shown in FIG. 15E(i) and FIG. 15E(ii).

In the embodiments shown in FIG. 15E(ii), optical device 1512 is aligned with the optical axis 1507b of the optical device 1520 to form all or part of a PIC 1502. The optical axis 1507a is offset with z-offset 1 from the mounting surface coincident with the reference plane 1526ref-a of the fiber optic cable mounting block 1512. A second offset, namely z-offset 2, shown in FIG. 15E(ii) is optionally provided, for example, to contribute to improved mechanical stability of the mounted device 1512.

FIG. 15E(iii) shows an example embodiment of a fiber optic cable mounting block 1562 such as, for example, the mounting block 1512. The mounting block 1562 has base 1564 and lid 1566. Lid 1566, in this embodiment clamps or otherwise holds fiber optic cable 1554 to the base 1564. In the embodiment shown in FIG. 15E, a portion of a fiber optic cable 1564 is shown. Fiber optic cables 1554 are used in embodiments to transfer information between modes in a fiber optic network, for example, and the fiber optic cables, in embodiments, would be sufficient in length to transfer information a connected node or nodes.

Referring to FIG. 15E(iv), an embodiment is shown in which the z-pillar 1534 supporting the fiber mounting block 1512 is formed in a cavity 1548. Formation of the z-pillar 1534 in cavity 1548 allows for accommodation of devices and alignment of devices into the depth of the substrate 1500. In embodiments, for example, in which device 1512, such as the mounting block shown in FIG. 15E(iv), among others, requires alignment with a device 1520 such as a planar waveguide, the formation of a z-pillar 1534 in the cavity 1548 enables lowering of the fiber core 1556 while also enabling the co-formation of the z-pillar 1534 and the planar waveguide core as further described herein. In FIG. 15E(iv), the device 1520 is a planar waveguide.

Referring to FIG. 15E(v), the embodiment shown shows the optical axis 1507a of a fiber optic cable mounting block 1512 in alignment with the optical axis 1507b of device 1520. In this embodiment, the z-pillars 1534 of both the devices 1512, 1520 are formed in cavities 1548 allowing for the co-formation of the z-pillars 1534a and 1534b at the same height, or for the formation of z-pillars 1534a, 1534b at different heights as shown.

Referring to FIG. 15F, embodiments are shown in which two optical devices are shown with aligned optical signal planes 1507a, 1507b. Device 1512 is, for example, a ball lens. In these embodiments, the ball lens 1512 is shown in alignment with optical device 1520. Device 1520 is shown mounted on the z-pillar 1534 formed in cavity 1548. The optical signal plane is shown with an offset, namely z-offset as shown in the figure, between the optical axis 1507 and the mounting reference plane 1526ref of the device 1520, coincident with the reference plane 1525ref at the top of the z-pillar 1534. The embodiment shown in FIG. 15F(i) is shown without a planar waveguide between the two optical devices 1512, 1520 and the embodiment shown in FIG. 15F(ii) is shown with a planar waveguide between the two optical devices 1512, 1520.

Referring to FIG. 16, a PIC structure 1602 is shown for which the layers used in the formation of the planar waveguide are used in the formation of a portion of the z-pillar 1634. FIG. 16 shows a cross-hatched portion of the device 1612 that forms the planar waveguide layer 1644 and a similar corresponding cross-hatched layer at the same height in the z-pillar 1634 just below the hard mask 1616. The co-formation of the z-pillar 1634 with the planar waveguide structure 1644 provides for an improvement in the integrity of the reference heights between the top of the z-pillar 1634 and the core of the planar waveguide 1644. This improvement in the integrity of the alignment between the top of the z-pillar 1634 and the planar waveguide occurs as a result of linking the heights of the planar waveguide and the z-pillar heights to one another and not to a structure that is formed or dependent on the height of the bottom of the cavity. Variations in the thickness of the underlying layers below the cavity upon which the z-pillars are formed are present in both the layers underlying the planar waveguide 1644 on the base structure 1601 and the layers underlying the cavity 1648 and are thus compensated for in a structure that is formed using the layers up to and including the layers used in the formation of the waveguide 1644. Also shown in FIG. 16 is the optical feature 1674 of a mounted optical device 1620 in alignment with the optical axis 1607 of the PIC 1602. Fiducial 1614 may be, but is not necessarily, aligned horizontally with the optical axis 1607 in the embodiment shown in FIG. 16 and is used in embodiments as an alignment aid for placement and alignment of devices such as mounted device 1620 onto the PIC 1602.

Referring to FIG. 17, a PIC structure 1702 is shown for which the layers used in the formation of the planar waveguide are used in the formation of a portion of the z-pillar 1734 and in the formation of the fiducial 1714. FIG. 17 shows a cross-hatched portion of the device 1712 that forms the planar waveguide layer 1744, a similar corresponding cross-hatched layer at the same height in the z-pillar 1734 just below the hard mask 1716, and another cross-hatched layer at the same height in the fiducial mark 1714. The cross-hatched layer shown in FIG. 17 is formed in embodiments, for example, from the planar waveguide layer of the interposer. (See layer 405 for example in FIG. 4.) The co-formation of the z-pillar 1734 and the fiducial 1714 with the planar waveguide structure 1744 of device 1712 provides for an improvement in the integrity of the reference heights between the top of the z-pillar 1734 and the core of the planar waveguide 1744, and an increase in the placement and alignment precision that is achievable using the fiducial 1714 for lateral alignment. This improvement in the integrity of the alignment between the top of the z-pillar 1734 and the planar waveguide occurs as a result of linking the heights of the planar waveguide and the z-pillar heights to one another and not to a structure that is formed or dependent on the height of the bottom of the cavity. Furthermore, the improvement in the integrity of the lateral alignment occurs as a result of the improvement in optical resolution achievable between the z-pillars 1734 and the fiducials 1714 since these structures are formed at the same height using the same hard mask layer 1716 and thus have the same focal length when viewed from above. Fiducial 1714 is formed in cavity 1749 in dielectric layer 1738 to provide optical visibility when view from above. Variations in the thickness of the underlying layers below the cavity upon which the z-pillars 1734 are formed are present in both the layers underlying the planar waveguide 1744 on the base structure 1701 and the layers underlying the cavity 1748, as is the case in the embodiments shown in FIG. 16, and are thus compensated for in a structure that is formed using the layers up to and including the layers used in the formation of the waveguide 1744. Also shown in FIG. 17 is the optical feature 1774 of a mounted optical device 1720 in alignment with the optical axis 1707 of the PIC 1702. Fiducial 1714 is shown in horizontal alignment with the optical axis 1707 in the embodiment shown in FIG. 17 and is used in embodiments as an alignment aid for placement and alignment of devices such as mounted device 1720, among other devices, onto the PIC 1702.

Referring to FIG. 18, additional embodiments are shown for which the z-pillars and fiducials are formed concurrently and at the same height in the interposer structure and other additional embodiments are also shown for which the z-pillars, fiducials, and planar waveguides are formed concurrently and at the same height in the interposer structure using, for example, the planar waveguide layer 405 as shown in FIG. 4 and a patterned hard mask layer such as hard mask layer 714 shown in FIG. 7D in which a portions of the hard mask 716a,716b, 716c are used to define the z-pillars 734, the planar waveguides 744, and the fiducial 714, respectively, for the patterning of the planar waveguide layer 705 portion of the z-pillars 734, the planar waveguides 744, and the fiducial 714.

Referring to FIG. 18A(i), an embodiment is shown for which an offset, "z-offset", is provided between the top surface of the hard mask 1816 at the tops of the z-pillar 1834 and fiducial 1814, and the optical axis 1807 of the PIC 1802. Multiple mounted devices 1820a, 1820b are shown mounted on the z-pillar alignment aids 1834 in FIG. 18A(i) along with optical device 1812, a planar waveguide, for example. The offset, "z-offset" shown in FIG. 18A(i) is largely a consequence of the finite thickness of the hard mask 1816. A mechanical reference plane 1826ref is formed on the mounted devices 1820a, for example, and surface to surface contact is formed between this mechanical reference plane 1826ref and the top surface of the z-pillar structure 1834 at the reference plane 1825ref. Exposure of the fiducial 1814 with the formation of cavity 1849 provides optical visibility to the fiducial 1814 for optical alignment equipment used in the placement of devices, for example, onto the PIC 1802. FIG. 18A(ii) shows a similar embodiment to that shown in FIG. 18A(i) with the exception that the devices 1820a, 1820b are not placed in cavities 1848 and the fiducial is not formed in a cavity 1849.

Referring to FIG. 18B, a PIC 1802 is shown that includes a mounted device 1820 that is mounted on z-pillar alignment aids 1834 and a device 1812 that is formed on the base structure 1801. In embodiments, the device 1820 may be an optical device or optoelectrical device as described herein. The device 1812, in embodiments is a waveguide, a lens, a grating, or other optical device that can be fabricated on the substrate and that incorporates within it the planar waveguide layer (such as layer 405, for example, shown in FIG. 4.) Device 1812 may be formed from growth processes, for example, such as a chemical vapor deposition or other form of deposition process or a combination of film formation processes. The optical axis of the PIC 1807 is shown to be aligned through the device 1812, the z-pillars 1834 that are used in supporting device 1820, and the fiducial 1814. An offset, "z-offset" is shown between the top of the hard mask 1816 at the top of the z-pillar, for example, and the optical axis 1807 of the PIC 1802. A mechanical reference plane 1826ref is shown on the mounted devices 1820 and surface to surface contact is formed between this mechanical reference plane 1826ref and the top surface of the z-pillar structure 1834 at the reference plane 1825ref. Fiducial 1814 is optically visible for optical alignment equipment used in the placement of devices, for example, onto the PIC 1802. Other embodiments within the scope of embodiments are formed such that the fiducial 1814 is formed in a cavity such as cavity 1849 in FIG. 18A(i). It should be noted that although the portion of the fiducial 1814 is formed from the planar waveguide layer (hatched portion of the fiducial 1814 shown in FIG. 18B), the use of the fiducial 1814 is typically limited to that of an alignment aid, and does not, in general function as an optical device or as a part of an optical device. The use of the fiducial as all or a part of an optical device is not precluded in any way in the embodiments described herein, however.

Referring to FIG. 18C, additional embodiments are shown for which z-pillars and fiducials are formed concurrently and for which optical devices are mounted on the z-pillar alignment aids, and for which the optical propagation path 1807 for the PIC 1802 is formed above the planar waveguide layer (e.g., 405). Referring to FIGS. 18C(i) and 18C(ii), PICs 1802 are shown for which an offset, "z-offset", is provided between the optical axes 1807a, 1807b of mounted optical devices 1812, 1820 and the top surface of the top surface of the z-pillar 1834. Z-pillar alignment aids 1834 are formed in cavities 1848 that are formed in base structure 1801 in FIG. 18C(i) and without cavities on the base structure 1801 in 18C(ii). The offset, "z-offset" shown in FIG. 18C(i) is the distance above the top of the z-pillar 1834 at which an optical signal laterally propagates between devices 1812, 1820 in the embodiment shown. The optical feature of device 1820 is located at this "z-offset" distance from the mechanical reference plane 1826ref that corresponds in the figure with the mechanical feature of the device 1820 (or 1812) that forms a surface to surface contact with the top of the z-pillar 1834. The horizontal plane of the optical features of the devices in FIG. 18C correspond to the horizontal optical plane through or from which the optical signal 1807b is generated, received, or otherwise propagated in the device 1820. This horizontal plane is formed at a distance corresponding to the "z-offset" distance shown in FIG. 18C and determines the height at which the optical signal propagates through the PIC. The mechanical reference plane 1826ref is formed on the mounted devices 1820a, for example, and surface to surface contact is formed between this mechanical reference plane 1826ref and the top surface of the z-pillar structure 1834 at the reference plane 1825ref. Exposure of the fiducial 1814 with the formation of cavity 1849 provides optical visibility to the fiducial 1814 for optical alignment equipment used in the placement of devices, for example, onto the PIC 1802. The common focal plane that is shared between the z-pillars 1834 and the fiducial 1814 provides optimal resolution between these features during automated placement of mounted devices such as optical devices 1812, 1820. FIG. 18C(ii) shows a similar embodiment to that shown in FIG. 18C(i) with the exception that the devices 1812, 1820 are not placed in cavities 1848 and the fiducial is not formed in a cavity 1849.

Referring to FIG. 18D, additional embodiments are shown for which z-pillar alignment aids are formed at multiple heights with the fiducials formed and at the same height as one or more of the z-pillars. In the embodiments shown in FIG. 18D, the fiducials and the z-pillars at least one of the heights are formed concurrently and at the same height in the interposer structure using, for example, the planar waveguide layer 405 as shown in FIG. 4 and a patterned hard mask layer such as hard mask layer 714 shown in FIG. 7D in which a portions of the hard mask 716a,716b, 716c are used to define the z-pillars 734, the planar waveguides 744, and the fiducial 714, respectively, for the patterning of the planar waveguide layer 705 portion of the z-pillars 734, the planar waveguides 744, and the fiducial 714.

Referring to FIG. 18D(i), an embodiment is shown for which a first offset, "z-offset 1", is provided between the top surface of one or more z-pillars 1834a and the fiducial 1814, and the optical axis 1807b of the PIC 1802. At least one mounted device 1820 is shown mounted on the z-pillar alignment aids 1834a in FIG. 18D(i) with this first offset, namely "z-offset 1". A second optical device 1812 with optical axis 1807a is mounted on one or more z-pillars 1834b at a different height than z-pillars 1834a. The optical axis 1807a of device 1812 is shown in alignment with the optical axis of device 1807b and in alignment with the optical axis 1807 of the PIC 1802 of FIG. 18D(i). A second offset, namely "z-offset 2" is provided between the top surface of one or more z-pillars 1834b and the optical axis 1807b of the PIC 1802. A mechanical reference plane 1826ref is formed on the mounted devices 1820 and on device 1812, for example, and surface to surface contact is formed between this mechanical reference plane 1826ref and the top surface of the z-pillar structure 1834a, 1834b. In FIG. 18D(i), the top surface of the first z-pillar 1834a is shown at the mechanical reference plane 1825ref. Mechanical reference plane 1825ref is a reference plane that corresponds, in the embodiment in FIG. 18D(i) with the top of the z-pillar 1834a. Similar embodiments to the embodiment shown in FIG. 18D(i) are also shown in FIGS. 18D(ii) and 18D(iii) which show other configurations of z-pillar arrangements at multiple heights, and with the corresponding z-offsets for each of the z-pillar heights shown relative to the optical axis 1807. In FIG. 18D(ii), the z-pillar alignment aids 1834a, 1834b are shown at multiple heights within each of the two aligned optical devices 1812, 1820 and in FIG. 18D(iii), the z-pillar alignment aids 1834a are shown the same height for optical device 1820 and the alignment aids 1834a, 1834b are shown at multiple heights for the optical device 1812. In FIGS. 18D(i)-18D(iii), the height and structure of the z-pillar alignment aid 1834a corresponds to the height and structure of the fiducial 1814 in these embodiments. An additional feature to note in FIG. 18D is that the optical axes 1807a, 1807b of the devices 1812, 1820 are also in alignment with the optical axis formed with the planar waveguide layer (layer 405, for example) in the z-pillar 1834a and in the fiducial 1814.

Referring to FIG. 18E, additional embodiments are shown for which z-pillar alignment aids are formed concurrently with a fiducial, and for which one of the mounted devices is a lens. Lenses are commonly used in PICs to provide focus to an optical signal in a PIC. In FIG. 18E, optical device 1812 is shown as a lens, and in particular a ball lens. Three configurations are shown in FIG. 18E for a ball lens on a PIC that use z-pillar alignment aids 1834 in support of a mounted optical device 1820, and a fiducial that is concurrently formed with one or more z-pillars 1834. In the embodiments shown in FIG. 18E(i), the fiducials 1814 and the z-pillars 1834 are formed at the same height in the interposer structure using, for example, layers that include the planar waveguide layer 405 as shown in FIG. 4 and a patterned hard mask layer such as hard mask layer 714 shown in FIG. 7D in which a portions of the hard mask 716a,716c are used to define the z-pillars 734 and the fiducial 714, respectively. In the embodiment shown in FIG. 18E(i), a planar waveguide section is not shown but may be present on or within another portion of the PIC 1802. The alignment of the heights of the fiducial 1814, formed in cavity 1849, and the z-reference pillar 1834 ensures that these features lie in the same focal plane for optimal resolution in placement and alignment operations that require movements in reference to the fiducial and placement in reference to the z-pillars, for example, in embodiments.

In the embodiment in FIG. 18E(i), an offset, namely "z-offset", is provided between the top surface of the one or more z-pillars 1834 and the optical axes 1807b of the mounted optical device 1820. The optical device 1820 has mechanical reference plane 1826ref that forms a surface to surface contact with the top of the z-pillar 1834. A second device 1812 is a ball lens that is mounted in the embodiment in a recess 1837. The optical axis 1807a of the ball lens 1812 in FIG. 18E(i) is also offset a distance "z-offset" from the mechanical reference plane 1825ref at the top of the pillar 1834. The optical axis 1807a of device 1812 is shown in alignment with the optical axis of device 1807b and in alignment with the optical axis 1807 of the PIC 1802 of FIG. 18E(i). Referring to FIG. 18E(ii), an embodiment is shown that is similar to the embodiment shown in FIG. 18E(i) with the addition of a planar waveguide 1844 on the base structure 1801. In this embodiment, the fiducial 1814, the z-pillar 1834, and the planar waveguide 1844 are patterned from the same hard mask layer (See FIG. 7D, for example) and in part from the same planar waveguide layer (see layer 405, for example, in FIG. 4). The optical axis of the planar waveguide layer, the cross-hatched layer in FIGS. 18E(i)-18(iii), is aligned with the optical axis 1807a of the ball lens 1812 and the optical axis 1807b of the mounted optical device 1820 as shown in FIG. 18E(ii). FIG. 18E(iii) shows a similar configuration to that in FIG. 18E(ii) but with a shortened planar waveguide device 1844 between the ball lens and device 1820. The shortened length of the planar waveguide 1844 may also be an optical device such as an isolator or other optical device.

In FIGS. 18A-18E, embodiments are shown that demonstrate a range of implementations available with the various configurations of the alignment aids that include the z-pillars and the fiducials, and various integration schemes that can be implemented in embodiments for which these alignment aids are formed together with a planar waveguide layer of a planar waveguide-based device and in other embodiments for which these alignment aids are formed independently of planar waveguide-based devices.

Referring to FIG. 19, an additional drawing of an embodiment is provided that shows the portions of the planar waveguide layer (e.g, layer 405 shown in FIG. 4) that reside within the various alignment aids. FIG. 19 also provides a summary of some key features of some embodiments. The planar waveguide layer is shown in FIG. 19 as the cross-hatched layer within the z-pillar 1934 and the fiducial 1914 alignment aids. This layer is also present in the waveguide 1944 of the optical device 1912. Optical device 1912 in FIG. 19 is a buried waveguide structure on the interposer base structure 1901. The cross-hatched layer is formed from the same planar waveguide layer (e.g, layer 405) and patterned using the same hard mask layer in the embodiment shown in FIG. 19. The cross-hatched portions of the z-pillar 1934 and the fiducial 1914 are portions of these structures that are formed from the planar waveguide layer. Device 1920 is mounted on z-pillar 1934 and a contact is formed between the mechanical reference surface formed on the device 1920 and the top of the z-pillar 1934 in the embodiment shown. This surface to surface contact establishes the resulting height of the optical feature 1974 and the optical axis 1907b of the optical device 1920. An optical feature 1974 of an optical device 1920 is, for example, a laser cavity and facet for a laser or a receiving volume and facet for a photodetector. Optical feature 1974 may be any of a number of other optical features for other optical devices that can be utilized in a PIC. The optical feature 1974 is typically the portion of the device 1920, 1912 through which the optical signal propagates and is typically aligned with the optical axis 1907b. The optical axis 1907b of the device 1920 is aligned with the optical axis 1907a of the device 1912. Optical axes 1907a, 1907b in alignment form all or part of the optical axis 1907 of the PIC 1902. The fiducial 1914 is formed in cavity 1949 using hard mask 1916-cavity at the same focal plane, in the embodiment shown, as the z-pillar 1934. A common hard mask 1916 is used to pattern the planar waveguide 1944, and the z-pillar 1934 and fiducial 1914 alignment aids using a process sequence as described, for example, in FIG. 7. A lateral constraint alignment aid 1981 is also shown in FIG. 19. Lateral constraint alignment aids are described in detail herein.

Referring to FIG. 20, an additional embodiment of an additional alignment aids that is formed using the processing methods and techniques described herein is described. In FIG. 20(i), a cross-section view of a portion of a PIC structure 2002 is shown in which an optical fiber cable 2054 is mounted in a v-groove 2050. The fiber optic cable 2054 includes the core 2056 and cladding 2055. The core 2056 is aligned with the core of a planar waveguide 2044 formed on the base structure 2001. The fiducial 2014 is shown formed in cavity 2049 in dielectric layer 2038. In FIG. 20(ii), alignment aid 2045 is shown. Alignment aid 2045 is a form of lateral constraint that is used to position the fiber optic cable and is patterned from the planar waveguide structure 2044. The planar waveguide layers 2044 are typically deposited in a blanket layer that can be patterned with an additional pattern required to provide feature 2045 that surrounds one or more locations for the v-groove 2050. Use of a portion of the planar waveguide layers to identify the location of the v-groove 2050 has a particular benefit in the interposer structure described herein that is specific to its integration with other structures that utilize the planar waveguide layers such as the planar waveguide structures 2044. The core 2056 of the optical fiber cable 2054, in practice, must be aligned with the waveguide 2044 of the PIC 2002. The formation of the planar waveguides 2044 and the alignment structures 2045 that are used to align the optical fiber cable core 2056 provide a high level of precision in the fabrication of these two structures in embodiments that use the same masking layer and process to form theses structures. In the embodiment shown in FIG. 20, the fiducial 2014 is also shown to be formed from the same planar waveguide layers that are used in the formation of the planar waveguide 2044 and the v-groove alignment feature 2045.

Referring to FIG. 21, an additional embodiment of an additional alignment aid that is formed using the processing methods and techniques described herein is shown. In FIG. 21(i), a cross-sectional view of a portion of a PIC structure 2102 is shown in which an optical fiber cable 2154 is mounted in a fiber optic cable mounting block 2162. The fiber optic cable mounting block 2162 includes a base 2164 and a lid 2166. In the embodiment shown in the cross-sectional view of FIG. 21(i), a portion of the optical fiber cable 2154 is mounted in a v-groove 2150 in the base structure 2101. In other embodiments that utilize the fiber optic cable mounting block, the v-groove is not provided. In embodiments that do not include the v-groove 2150 for the fiber optic cable, alignment of the cable is provided by the alignment of the fiber optic cable block using the alignment aid described herein. Referring again to FIG. 21 that shows an embodiment that includes the v-groove 2105 and the fiber optic cable mounting block 2162, the fiber optic cable 2154 that is mounted in the v-groove 2150 includes the core 2156 and cladding 2155. The core 2156 is aligned with the core of a planar waveguide 2144 formed on the base structure 2101. The fiducial 2114, shown in cross section in FIG. 21(i) and in the top-down view of FIG. 21(ii), is formed in cavity 2149 in dielectric layer 2138. In the top-down view in FIG. 21(ii), alignment aid 2145 is shown with the z-pillar alignment aids 2134 and the fiducial 2114. A projection of the z-pillar alignment aid is shown in the cross-sectional view in FIG. 21. Alignment aid 2145 is a form of lateral constraint that is used to position the fiber optic cable mounting block 2162 that is patterned from the planar waveguide structure 2144. The planar waveguide layers 2144 are typically deposited in a blanket layer that is patterned with an additional pattern to provide feature 2145 surrounding one or more locations for the fiber mounting block 2162. Use of a portion of the planar waveguide layers to identify the location of the fiber mounting block 2162 has a particular benefit in the interposer structure described herein that is specific to its integration with other structures that utilize the planar waveguide layers such as the planar waveguide structures 2144. The core 2156 of the optical fiber cable 2154, in practice, must be aligned with the waveguide 2144 of the PIC 2102. The formation of the planar waveguides 2144 and the alignment structures 2145 that are used to align the optical fiber cable mounting block 2162 provides a high level of precision in the fabrication and alignment of these two structures in embodiments that use the same masking layer and process to form these structures. The precision is provided, in embodiments, since these patterned features are formed using the same lithographic patterning step. Lithographic level alignment is typically within tenths of a micron and less for the types of lithographic processes used in photonic integrated circuits. The combination of the fiducial 2114, the z-pillar 2134, and the lateral constraint alignment aid 2145 in the embodiment shown in FIG. 21 provides enhanced alignment features that are specific to the interposer structure described herein.

Referring to FIG. 22, an additional embodiment of the alignment aids shown in FIG. 21 for the edge mounted fiber optic cable block 2160 are shown in conjunction with the z-pillar 2234 and lateral constraint alignment aids 2281 for a mounted device 2220 on PIC 2202. In FIG. 22(*i*), a cross-sectional view of a portion of a PIC structure 2202 is shown in which an optical fiber cable 2254 is mounted in a fiber optic cable mounting block 2262. The fiber optic cable mounting block 2262 includes a base 2264 and a lid 2266. In the embodiment shown in the cross-sectional view of FIG. 22(*i*), a portion of the optical fiber cable 2254 is mounted in a v-groove 2250 in the base structure 2201. In other embodiments that utilize the fiber optic cable mounting block, the v-groove 2250 is not provided. In embodiments that do not include the v-groove 2250 for the fiber optic cable, alignment of the cable is provided by the alignment of the fiber optic cable block 2262 using the alignment aid 2245 described herein or other constraining features. Referring again to FIG. 22 that shows an embodiment with the v-groove 2205 and the fiber optic cable mounting block 2262, the fiber optic cable 2254 that is mounted in the v-groove 2250 includes the core 2256 and cladding 2255. The core 2256 is aligned with the optical feature 2274 of a mounted optical device 2220. The mounted device 2220 with optical feature 2274 is mounted over z-pillar alignment aids 2234 formed in the cavity 2248 in the dielectric layer 2238 on base structure 2201. The fiducial 2214, shown in cross section in FIG. 22(*i*) and in the top-down view of FIG. 22(*ii*), is formed in cavity 2249 in dielectric layer 2238. In the top-down view in FIG. 22(*ii*), alignment aid 2245 is shown with the z-pillar alignment aids 2234 and the fiducial 2214. A projection of the z-pillar alignment aid 2234 that supports the fiber optic cable mounting block 2262 is shown in the cross-sectional view in FIG. 22. Alignment aid 2245 is a form of lateral constraint that is patterned from the planar waveguide structure and is used to position the fiber optic cable mounting block 2262. The planar waveguide layers are typically deposited in a blanket layer that is patterned with an additional pattern to provide feature 2245 surrounding one or more locations for the fiber mounting block 2262. Planar waveguides (e.g, 2144) are not shown in the embodiment in FIG. 22 but the same layers that are used in the fabrication of the planar waveguide are used in the formation of the z-pillars 2234 and the fiducials 2214 and the alignment aids 2245. The optical axis 2207 of the PIC 2202 is shown in alignment for the fiber optic cable core 2256 and the optical feature 2274 of the mounted device 2220. Use of a portion of the planar waveguide layers to identify the location of the fiber mounting block 2262 has a particular benefit in the interposer structure described herein that is specific to its integration with other structures that utilize the planar waveguide layers such as the z-pillar alignment aids that support the mounted device 2220. The core 2256 of the optical fiber cable 2254, in practice, must be aligned with the optical feature 2274 of the device 2220 that is mounted on the z-pillar alignment aids 2234. The z-pillar alignment aids 2234, and particularly the z-pillar alignment aids in embodiments with lateral constraint features such as the lateral constraint feature 2281 shown in FIG. 22, used in conjunction with the alignment structures 2245 that are used to align the optical fiber cable mounting block 2262, provide a high level of precision in the fabrication and alignment of these two structures in embodiments that use the same masking layer and process to form these structures. The precision is provided, in embodiments, since these patterned features are formed using the same lithographic patterning step. Lithographic level alignment is typically within tenths of a micron and less for the types of lithographic processes used in photonic integrated circuits. The combination of the fiducial 2214, the z-pillar 2234, and the lateral constraint alignment aid 2245 in the embodiment shown in FIG. 22 provides enhanced alignment features that are specific to the interposer structure described herein. The alignment in the z-direction, for the fiber cable mounting block 2262 and hence the core 2256 of the mounted fiber optic cable 2254, can be quite accurate since the z-pillars for the mounted device 2220 and the fiber optic mounting block 2262 are formed using the same hard mask and film structure. Similarly, the alignment in the lateral directions, can also be quite accurate since the z-pillars 2234 portion of the lateral constraint feature 2281 for the mounted device 2220 is formed using the same lithographic patterning step as the lateral constraint alignment features 2245.

Referring to FIGS. 23-30, a number of process flows and process flow sequences are described for embodiments that utilize fiber optic cable mounting blocks and other alignment aids. FIGS. 23 and 24 show a process flow diagram and a sequence of drawings, respectively, that illustrate the steps in the process flow for an embodiment that utilizes a fiber optic cable mounting block without the use of z-pillars or lateral constraints derived from the planar waveguide layer to align the fiber optic cable mounting block. FIGS. 25 and 26 show a process flow diagram and a sequence of drawings, respectively, that illustrate the steps in the process flow for an embodiment that utilizes a fiber optic cable mounting block with the use of z-pillars to support the fiber optic cable mounting block. This embodiment does not use a lateral constraint alignment feature derived from the planar waveguide layer for the mounting block alignment. FIGS. 27 and 28 show a process flow diagram and a sequence of drawings, respectively, that illustrate the steps in the process flow for an embodiment that utilizes a fiber optic cable mounting block with the use of a lateral constraint alignment feature derived from the planar waveguide layer but does not use z-pillars to support the fiber optic cable mounting block.

Referring to FIGS. 23 and 24, a process flow diagram and a sequence of drawings, respectively, are shown that illustrate the steps in the process flow for an embodiment that utilizes a fiber optic cable mounting block. In the embodiments described in FIGS. 23 and 24, unlike some other embodiments for which fiber optic cable mounting blocks are utilized, z-pillars are not used to support the fiber optic cable mounting block and additionally, the lateral constraint alignment feature derived from the planar waveguide layer is not used to provide lateral alignment of the fiber optic cable mounting block.

Referring to FIG. 23, a process flowchart is shown for the formation of interposer-based PICs with embodiments of the interposer alignment structures, and aspects of embodiments described in this flowchart are illustrated in FIG. 24. In step 2390 of process flow 2310, a planar waveguide layer 2405 is formed on a base structure, wherein the base structure 2401 includes an optional electrical interconnect layer 2403 on a substrate 2400. The planar waveguide layer 2405 on base structure 2401 forms interposer 2404. The electrical interconnect layer 2403, as shown in FIG. 24A is formed in some embodiments on a semiconductor substrate 2400 such as silicon. Indium phosphide, gallium arsenide, or other semiconductor substrates can also be used. In yet other embodiments, a ceramic or insulating substrate is used. In yet other embodiments, a metal substrate is used. And in yet other embodiments, a combination of one or more semiconductor layers, insulating layers, and metal layers are used to form a substrate 2400 upon which the optional electrical interconnect layer 2403 and the planar waveguide layer 2405 are formed. In some embodiments, the electrical interconnect layer 2403 is not in direct contact with the substrate but rather an intervening layer is present. Similarly, the planar waveguide layer 2405, in some embodiments, is not in direct contact with the underlying electrical interconnect layer 2403 but rather an intervening layer or layers may be present. In some embodiments, a semiconductor layer or substrate is mounted on a metal layer or substrate to form a composite substrate.

In hard mask layer formation step 2391 of the process flow 2310, a hard mask 2416 is formed on the planar waveguide layer 2405. Hard mask layer 2416 includes patterning for the formation of the optical waveguides and all or a portion of the alignment aids that are formed from the planar waveguide layer 2405. In the embodiments in FIG. 24B, the hard mask layer includes patterns for alignment aids that include fiducial marks and the alignment pillars or z-pillars. In the embodiments shown in FIGS. 24B, hard mask layer portion 2416a shows a hard mask pattern for an embodiment of a z-pillar alignment aid which is shown after the hard mask patterning step in FIG. 24B; Similarly, hard mask portion 2416b shows a hard mask pattern for an embodiment of a planar waveguide 2444 which is shown after patterning in FIG. 24B. Hard mask portion 2416c shows a hard mask pattern for an embodiment of a fiducial mark alignment aid which is shown after hard mask patterning in FIG. 24B. In summary, in the embodiment shown in FIG. 24B, portions of the patterned hard mask include the z-pillar portion 2416a, planar waveguide portion 2416b, fiducial mark portion 2416c. These portions of the hard mask 2416 are used to pattern the z-pillars 2434, the planar waveguides 2444, and the fiducial marks 2414, respectively, using an etch process to remove the planar waveguide layer 2405 from areas not protected by the hard mask layer 2416 as shown in FIG. 24C.

Portions of the hard mask layer 2416, are also used in some embodiments to form all or a portion of optical devices 2440 for embodiments in which the optical devices 2440 are formed wholly or in part from the planar waveguide layer 2405. Optical devices 2440 may be waveguides, gratings, lens, or any device that can be formed from at least a portion of the planar waveguide layer. Alternatively, in other embodiments, optical devices 2440 are mounted devices, and not fabricated directly from the planar waveguide layer 2405 but added at a later step in the process of forming the PIC 2402. Optical device 2440 can be one or more of a portion of a device formed from the planar waveguide layer and one or more of a portion of a mounted device.

In some embodiments, the planar waveguide layer 2405 is formed of one or more layers of silicon dioxide, silicon nitride, and silicon oxynitride as described herein. To pattern the planar waveguides from such layers using a dry etch process, fluorinated etch chemistries in which one or more commonly utilized gases such as $CF_4$, $CHF_3$, $C_2F_8$, $SF_6$, among others, are used. In embodiments, aluminum or an alloy of aluminum is used to form the hard mask. Aluminum hard masks are known to exhibit a high resistance to dry etching in fluorinated chemistries and thus the dimensions of the hard mask can be maintained during the etching of the planar waveguide layer 2405, in which the fiducial marks 2414, the reference pillars, 2434, the planar waveguides 2444 are formed in Step 2392 of process flow 2310. In other embodiments, other hard masks are used that also exhibit high resistance to the etch chemistry such as Au, Ag, Ni, and Pt. In other embodiments, hard masks layers such as Ti, $TiO_x$, Ta, $TaO_x$, aluminum oxide, silicon nitride, silicon carbide, or a combination of one or more of these materials are used. In some embodiments, oxygen or other oxygen-containing gas is added to the etching chemistry to increase the resistance of the hard mask to the etch chemistry. In yet other embodiments, diluents are added to the fluorinated gas chemistry such as one or more of argon, helium, nitrogen, and oxygen, among others to increase the resistance of the hard mask to the fluorinated etch chemistry. In embodiments, the masking layer typically has a slow rate of removal in comparison to the rate of removal of the planar waveguide layer. Methods for etching of silicon dioxide, silicon nitride, and silicon oxynitride are well understood by those skilled in the art of semiconductor processing, as are methods of increasing the resistance of aluminum hard mask layers and other hard mask layers using fluorinated etch chemistries.

After the patterning 2392 of the hard mask layer and planar waveguide layer to form the fiducial marks 2414, the reference pillars 2434, the planar waveguides 2444, a mask material is formed over portions of the PIC that includes the hard mask patterned features 2416a-2416c. This mask layer is some embodiments, is a photoresist layer. In other embodiments, this mask layer is a hard mask layer. In embodiments, the mask layer is patterned to expose the underlying patterned hard mask layer portion 2416b over the patterned waveguides 2444 and to protect the patterned hard mask layer portion 2416c over the fiducial marks 2414 and the patterned hard mask layer portion 2416a over the reference pillars 2434. Exposure of the hard mask layer portion 2416b over the waveguides, however, enables removal 2393 in process flow 2310 of the hard mask portion 2416b from the patterned waveguides 2444 without the removal of the hard mask portions 2416a and 2416c from the fiducial marks 2414 and the z-pillars 2434.

A schematic illustration of features of the PIC after removal of the hard mask portion 2416b and subsequent removal of the mask layer that is used in embodiments to protect the hard mask portions 2416a, 2416c is shown in FIG. 24D. Removal of the hard mask portion 2416b (see FIG. 24C) from the planar waveguides 2444 of the hard mask layer 2416 is achieved in some embodiments using a wet etch process that selectively removes the metal or other hard mask with little or no removal of the underlaying planar waveguide layer. Metal etchants, such as those used for the removal of an aluminum hard mask, for example, and that have little or no effect on waveguide fabricated from silicon nitride and silicon dioxide, for example, are well known in the art of semiconductor processing. In other embodiments, a dry etch process is used. A benefit of a wet etch process to remove the hard mask portion 2416b from the planar waveguide 2444 below includes a high preferential selectivity for etching of the hard mask 2416b with minimal removal of the underlying planar waveguides 2444.

Upon completion of the removal step 2393 of the hard mask portion 2416b from the planar waveguides 2444, and removal of the photoresist mask layer that was used to protect the hard mask portions 2416a and 2416c, a forming step 2394 is shown in the process flow 2310 to form a thick insulating dielectric layer 2438 as illustrated in FIG. 24E. The thick dielectric layer 2438 may be one or more layers of silicon dioxide, silicon nitride, or silicon oxynitride, for example, and may include one or more of a planar waveguide cladding layer, a buffer layer, a spacer layer, and a passivation layer, among others. In some embodiments, layer 2438 includes a planarization layer, and a planarization step is used to planarize the thick dielectric layer 2438 after this layer is formed.

Step 2395 of the process flow 2310 is a forming step that includes the formation of cavities 2448, 2449, 2469 in the thick dielectric layer 2438. This cavity forming step 2395 includes a patterned hard mask forming step as illustrated in FIG. 24F and an etching step as illustrated in FIG. 24G, among others. The hard mask 2417 shown in FIG. 24F, is preferably one such as aluminum or from an alloy of aluminum, among others, formed over the insulating layer 2438 and patterned using a plasma etch process or a wet chemical etch process to expose the portions of the underlying insulating layer 2438 within which cavities 2448,2449 is formed, and to expose the portions of the underlying insulating layer 2438 within which cavity 2469 is formed. Aluminum and alloys of aluminum, provide a high resistance to fluorinated etchants used to etch insulating layers such as silicon dioxide, silicon nitride, and silicon oxynitride preferably used in layer 2438. An embodiment of the effect of the etching step on the formation of the cavities 2448, 2449,2469 is illustrated in FIG. 24G. The z-pillars 2434 are shown that result from the exposure of the buried hard mask portion 2416a that was formed from the hard mask 2416 in cavity 2448. Exposed fiducials 2414 are also shown that result from the exposure of the buried hard mask portion 2416c that was formed from the hard mask 2416 in cavity 2449. Cavity 2469 is shown having been formed at the edge of the PIC 2402. In practice, the cavity 2469 is formed prior to singulation of the substrate into individual die, and thus the cavity is not cleaved as shown.

In some embodiments, it is or may not be preferable or necessary to expose the buried fiducial marks 2414 to obtain the improved clarity of the fiducials in subsequent steps in which the fiducials 2414 are used in the fabrication of the PIC 2402, or for the placement of optical die onto the PIC 2402. In these embodiments, the patterning step for the hard mask 2417 that is used to expose the areas of the insulating layer 2438 to form the cavities 2448 will not include an allowance for exposure of the areas of the insulating layer 2438 to also form cavities 2449 to expose the fiducials 2414 within these cavities 2449 as illustrated in FIG. 24G. Improved visibility of the fiducials 2414 is to be expected upon the formation of the cavity 2449, but may not be required in some embodiments. Improved visibility of the fiducials may not be required, for example, in embodiments with thin insulating layers 2438, in applications in which the surface of the thick insulating layer 2438 remains visibly transparent, and in embodiments in which the contrast between the fiducials and the underlying layers is adequate. Exposure of the fiducials 2414 with the formation of cavity 2449, in general, provides improved visibility in embodiments for which the cavities 2449 are provided since the focal plane of the fiducial 2414 is shared with the focal plane of the z-pillars 2434 and other alignment aids formed using the hard mask 2416 in these embodiments. The improved visibility also results from the elimination of deleterious effects that processing steps such as mechanical planarization may have on increasing the opacity of the layer 2438 that might limit the visibility of a buried fiducial. In the embodiment illustrated in FIG. 24G, the alignment pillars 2434 are shown in cavity 2448 and the fiducials 2414 are shown in cavity 2449. In other embodiments, the fiducials 2414 are formed in the same cavity 2448 as the alignment reference pillars 2434. In other embodiments, two or more fiducial marks 2414 are formed. In embodiments with two or more fiducial marks 2414, one or more fiducial marks 2414 may be formed within the cavity 2448 and one or more fiducial marks 2414 may be formed in a separate cavity 2449. In yet other embodiments with two or more fiducial marks 2414, multiple cavities 2449 are formed with fiducial marks 2414. The fiducial marks 2414 illustrated herein are shown in the shape of a "+" sign. Other shapes are also used in embodiments. Effective shapes for fiducial marks are well understood by those skilled in the art.

In the schematic drawing in FIG. 24H, the PIC 2402 is shown in embodiments after removal of the hard mask 2417 used in the formation of the cavities 2448,2449 in the insulating layer 2438.

Fiber optic cables for the delivery and extraction of optical signals from the PICs are typically formed in v-grooves at the edges of the PIC substrates. In optional forming step 2396, one or more v-grooves 2450 are formed in the PIC to accommodate the fiber optic cable attachment. It should be noted that the v-grooves 2450 are typically formed prior to the completion of the PIC fabrication process, and that the fiber optic cables 2454 are typically not mounted to the PIC 2402 until after the completion of the PIC fabrication process and including the completion of the singulation of the substrate into individual PIC die. The positioning of the fiber optic cable 2454 into the v-groove 2450, however, is shown in FIG. 24I to illustrate the alignment of the core 2456 of the fiber optic cable 2454 with the core of the planar waveguide 2444.

In the embodiments shown in FIG. 24, the alignment and attachment of fiber optic cables 2454 in embodiments is further facilitated with the use of fiber optic cable mounting blocks 2462. Fiber optic cable mounting blocks 2462 enable accurate alignment of the core 2456 of the optical fiber cables 2454 with a facet 2452 of a planar waveguide 2444 on the PIC 2402. FIG. 24I shows an embodiment of a PIC 2402 with a fiber optic cable 2454 positioned in a v-groove 2450 without the fiber optic mounting block 2462 in place and FIG. 24J shows the embodiment of PIC 2402 with the fiber optic cable 2454 positioned in a fiber optic cable mounting block 2462. The fiber optic cable mounting block 2462 facilitates the alignment and attachment of the fiber optic cable 2454 to the interposer, and in embodiments is held in place in some embodiments with an adhesive or an epoxy.

It should also be noted that although fiber optic cables are used to facilitate the transfer of optical signals to and from PICs, the use of the alignment techniques described herein is not limited by the presence or lack of a fiber attachment method in embodiments, such as a v-groove or a method for attachment of a fiber optic cable mounting block.

Significant advantages to the alignment of the core of the fiber optic cable 2454 with the facet 2452 of the planar waveguides 2444 formed in the planar waveguide layer 2405 are enabled with embodiments described herein. In the embodiment shown in FIG. 24I, a patterned PR mask is used, for example, to expose the portion of the substrate for the formation of one or more v-grooves. In embodiment in which a photoresist mask is used to expose the locations for the v-grooves, this patterned photoresist mask protects a least a portion of the PIC during the formation of the v-grooves 2450. The etch process for forming v-grooves is well understood in the art of semiconductor fabrication and is typically formed using a wet etch process.

Referring to FIG. 24J, an embodiment of the PIC 2402 is shown after formation of the v-groove 2450 and with a fiber optic mounting block 2462 in place at the edge of the PIC substrate (after cleaving). Surfaces within the v-groove 2450 form a contact with the cladding layer 2455 of a mounted fiber optic cable 2454. FIG. 24J shows the PIC 2402 with a portion of a fiber optic cable 2454 positioned in the v-groove 2450 and in the fiber optic cable mounting block 2462 to illustrate the use of these alignment features to align the core 2456 of the fiber optic cable 2454 with the end facet 2452 (shown in FIG. 24G) of the portion of the planar waveguide 2444 to which the core 2456 is aligned. Alignment of the fiber core 2456 with the waveguide facet 2452 of the planar waveguide 2444 is beneficial for efficient transfer of optical signals between these devices.

The sequence of drawings in FIGS. 24A-24H illustrate the formation of elements of a self-aligned optoelectrical device structure in an interposer-based PIC 2402 and include the z-pillars 2434 in cavities 2448, the buried planar waveguide structures 2444 that terminate at the walls of the cavity 2448, and the buried fiducial marks 2414. The sequence of drawings in FIGS. 24A-24H also illustrate the formation of an embodiment of a form of v-groove and cavity for the mounting of a fiber optic cable mounting block 2462 used to facilitate the mounting of the fiber optic cable 2454 and the alignment of the core 2456 of the fiber optic cable 2454 with the end facet 2452 of a portion of a planar waveguide 2444. Upon formation of the elements of the PIC structure 2402 as shown, the alignment features in example embodiments in which optical die are positioned into the PIC 2402, as described herein and in FIGS. 7M-7P, can be implemented. Additional embodiments of the use of the alignment aids in the attachment and alignment of fiber optic cables are provides herein.

Referring to FIGS. 25 and 26, a process flow diagram and a sequence of drawings, respectively, are shown that illustrate the steps in the process flow for an embodiment that utilizes additional embodiments for using a fiber optic cable mounting block to mount a fiber optic cable to the PIC that further includes the use of z-pillars to support the fiber optic cable mounting block, in addition to the z-pillars used in the support and alignment of mounted optical devices elsewhere in the PIC.

Referring to FIG. 25, a process flowchart is shown for the formation of interposer-based PICs with embodiments of the interposer alignment structures, and aspects of embodiments described in this flowchart are illustrated in FIG. 26. In step 2590 of process flow 2510, a planar waveguide layer 2605 is formed on a base structure, wherein the base structure 2601 includes an optional electrical interconnect layer 2603 on a substrate 2600. The planar waveguide layer 2605 on base structure 2601 forms interposer 2604. The electrical interconnect layer 2603, as shown in FIG. 26A is formed in some embodiments on a semiconductor substrate 2600 such as silicon, indium phosphide, gallium arsenide, or some other semiconductor. In other embodiments, a ceramic or insulating substrate is used. In yet other embodiments, a metal substrate is used. And in yet other embodiments, a combination of one or more semiconductor layers, insulating layers, and metal layers are used to form a substrate 2600 upon which the optional electrical interconnect layer 2603 and the planar waveguide layer 2605 are formed. In some embodiments, the electrical interconnect layer 2603 is not in direct contact with the substrate but rather an intervening layer is present. Similarly, the planar waveguide layer 2605, in some embodiments, is not in direct contact with the underlying electrical interconnect layer 2603 but rather an intervening layer or layers may be present. In some embodiments, a semiconductor layer or substrate is mounted on a metal layer or substrate to form a composite substrate.

In hard mask layer formation step 2591 of the process flow 2510, a patterned hard mask 2616 is formed on the planar waveguide layer 2605. Hard mask layer 2616 includes patterning for the formation of the optical waveguides and all or a portion of the alignment aids that are formed from the planar waveguide layer 2605. In the embodiments in FIG. 26B, the hard mask layer includes patterns for alignment aids that include fiducial marks and alignment pillars or z-pillars. In the embodiments shown in FIGS. 26B, hard mask layer portions 2616a and 2616d show hard mask patterns for an embodiment of a z-pillar alignment aids which are shown after the hard mask patterning step in FIG. 26B; Similarly, hard mask portion 2616b shows a hard mask pattern for an embodiment of a planar waveguide 2644 which is shown after patterning in FIG. 26B. Hard mask portion 2616c shows a hard mask pattern for an embodiment of a fiducial mark alignment aid which is shown after hard mask patterning in FIG. 26B. In summary, in the embodiment shown in FIG. 26B, portions of the patterned hard mask include the z-pillar portions 2616a, 2616d, planar waveguide portion 2616b, and fiducial mark portion 2616c. These portions of the hard mask 2616 are used to pattern the z-pillars used to support and align mounted optical devices and further to facilitate the alignment and attachment of fiber optic cable mounting blocks, and to pattern the planar waveguides 2644 and the fiducial marks 2614 using an etch process to remove the planar waveguide layer 2605 from areas not protected by the hard mask layer 2616 as shown in FIG. 26C.

Portions of the hard mask layer 2616, are also used in some embodiments to form all or a portion of optical devices 2640 for embodiments in which the optical devices 2640 are formed wholly or in part from the planar waveguide layer 2605. Optical devices 2640 may be waveguides, gratings, lens, or any device that can be formed from at least a portion of the planar waveguide layer. Alternatively, in other embodiments, optical devices 2640 are mounted devices, and not fabricated directly from the planar waveguide layer 2605 but added at a later step in the process of forming the PIC 2602. Optical device 2640 can be one or more of a portion of a device formed from the planar waveguide layer and one or more of a portion of a mounted device.

In some embodiments, the planar waveguide layer 2605 is formed of one or more layers of silicon dioxide, silicon nitride, and silicon oxynitride as described herein. To pattern the planar waveguides from such layers using a dry etch process, fluorinated etch chemistries in which one or more commonly utilized gases such as $CF_4$, $CHF_3$, $C_2F_8$, $SF_6$, among others, are used. In embodiments, aluminum or an alloy of aluminum is used to form the hard mask. Aluminum hard masks are known to exhibit a high resistance to dry etching in fluorinated chemistries and thus the dimensions of the hard mask can be maintained during the etching of the planar waveguide layer 2605, in which the fiducial marks 2614, the reference pillars, 2634, the planar waveguides 2644 are formed in Step 2592 of process flow 2510. In other embodiments, other hard masks are used that also exhibit high resistance to the etch chemistry such as Au, Ag, Ni, and Pt. In other embodiments, hard masks layers such as Ti, $TiO_x$, Ta, $TaO_x$, aluminum oxide, silicon nitride, silicon carbide, or a combination of one or more of these materials are used. In some embodiments, oxygen or other oxygen-containing gas is added to the etching chemistry to increase the resistance of the hard mask to the etch chemistry. In yet other embodiments, diluents are added to the fluorinated gas chemistry such as one or more of argon, helium, nitrogen, and oxygen, among others to increase the resistance of the hard mask to the fluorinated etch chemistry. In embodiments, the masking layer typically has a slow rate of removal in comparison to the rate of removal of the planar waveguide layer. Methods for etching of silicon dioxide, silicon nitride, and silicon oxynitride are well understood by those skilled in the art of semiconductor processing, as are methods of increasing the resistance of aluminum hard mask layers and other hard mask layers using fluorinated etch chemistries.

After the patterning 2592 of the planar waveguide layer to form the fiducial marks 2614, the reference pillars 2634, the planar waveguides 2644, a mask material is formed over portions of the PIC that includes the hard mask patterned features 2616a-2616d. This mask layer is some embodiments, is a photoresist layer. In other embodiments, this mask layer is a hard mask layer. In embodiments, the mask layer is patterned to expose the underlying patterned hard mask layer portion 2616b over the patterned waveguides 2644 and to protect the patterned hard mask layer portion 2616c over the fiducial marks 2614 and the patterned hard mask layer portion 2616a2616d over the reference pillars 2634. Exposure of the hard mask layer portion 2616b over the waveguides, however, enables removal 2593 in process flow 2510 of the hard mask portion 2616b from the patterned waveguides 2644 without the removal of the hard mask portions 2616a and 2616c from the fiducial marks 2614 and the z-pillars 2634.

A schematic illustration of features of the PIC after removal of the hard mask portion 2616b and subsequent removal of the mask layer that is used in embodiments to protect the hard mask portions 2616a, 2616c, 2616d is shown in FIG. 26D. Removal of the hard mask portion 2616b (see FIG. 26C) from the planar waveguides 2644 of the hard mask layer 2616 is achieved in some embodiments using a wet etch process that selectively removes the metal or other hard mask with little or no removal of the under-laying planar waveguide layer. Metal etchants, such as those used for the removal of an aluminum hard mask, for example, and that have little or no effect on waveguide fabricated from silicon nitride and silicon dioxide, for example, are well known in the art of semiconductor processing. In other embodiments, a dry etch process is used. A benefit of a wet etch process to remove the hard mask portion 2616b from the planar waveguide 2644 below includes a high preferential selectivity for etching of the hard mask 2616b with minimal removal of the underlying planar waveguides 2644.

Upon completion of the removal step 2593 of the hard mask portion 2616b from the planar waveguides 2644, and removal of the photoresist mask layer that was used to protect the hard mask portions 2616a, 2616c, and 2616d, a forming step 2594 is shown in the process flow 2510 to form a thick insulating dielectric layer 2638 as illustrated in FIG. 26E. The thick dielectric layer 2638 may be one or more layers of silicon dioxide, silicon nitride, or silicon oxynitride, for example, and may include one or more of a planar waveguide cladding layer, a buffer layer, a spacer layer, and a passivation layer, among others. In some embodiments, layer 2638 includes a planarization layer, and a planarization step is used to planarize the thick dielectric layer 2638 after this layer is formed.

Step 2595 of the process flow 2510 is a forming step that includes the formation of cavities 2648, 2649, 2669 in the thick dielectric layer 2638. This cavity forming step 2595 includes a patterned hard mask forming step as illustrated in FIG. 26F and an etching step as illustrated in FIG. 26G, among others. The hard mask 2617 shown in FIG. 26F, is preferably one such as aluminum or from an alloy of aluminum, among others, formed over the insulating layer 2638 and patterned using a plasma etch process or a wet chemical etch process to expose the portions of the underlying insulating layer 2638 within which cavities 2648,2649 is formed, and to expose the portions of the underlying insulating layer 2638 within which cavity 2669 is formed. Aluminum and alloys of aluminum, provide a high resistance to fluorinated etchants used to etch insulating layers such as silicon dioxide, silicon nitride, and silicon oxynitride preferably used in layer 2638. An embodiment of the effect of the etching step on the formation of the cavities 2648, 2649,2669 is illustrated in FIG. 26G. The z-pillars 2634 are shown that result from the exposure of the buried hard mask portion 2616a that was formed from the hard mask 2616 in cavity 2648 and hard mask portion 2616d that was formed from the hard mask 2616 in cavity 2669. Exposed fiducials 2614 are also shown that result from the exposure of the buried hard mask portion 2616c that was formed from the hard mask 2616 in cavity 2649. Cavity 2669 is shown having been formed at the edge of the PIC 2602. In practice, the cavity 2669 is formed prior to singulation of the substrate into individual die, and thus the cavity is not yet cleaved as shown.

In some embodiments, it is or may not be preferable or necessary to expose the buried fiducial marks 2614 to obtain the improved clarity of the fiducials in subsequent steps in which the fiducials 2614 are used in the fabrication of the PIC 2602, or for the placement of optical die onto the PIC 2602. In these embodiments, the patterning step for the hard mask 2617 that is used to expose the areas of the insulating layer 2638 to form the cavities 2648 will not include an allowance for exposure of the areas of the insulating layer 2638 to also form cavities 2649 to expose the fiducials 2614 within these cavities 2649 as illustrated in FIG. 26G. Improved visibility of the fiducials 2614 is to be expected upon the formation of the cavity 2649, but may not be required in some embodiments. Improved visibility of the fiducials may not be required, for example, in embodiments with thin insulating layers 2638, in applications in which the surface of the thick insulating layer 2638 remains visibly transparent, and in embodiments in which the contrast between the fiducials and the underlying layers is adequate. Exposure of the fiducials 2614 with the formation of cavity 2649, in general, provides improved visibility in embodiments for which the cavities 2649 are provided since the focal plane of the fiducial 2614 is shared with the focal plane of the z-pillars 2634 and other alignment aids formed using the hard mask 2616 in these embodiments. The improved visibility also results from the elimination of deleterious effects that processing steps such as mechanical planarization may have on increasing the opacity of the layer 2638 that might limit the visibility of a buried fiducial. In the example embodiment illustrated in FIG. 26G, the alignment pillars 2634 are shown in cavity 2648 and the fiducials 2614 are shown in cavity 2649. In other embodiments, the fiducials 2614 are formed in the same cavity 2648 as the alignment reference pillars 2634. In other embodiments, two or more fiducial marks 2614 are formed. In embodiments with two or more fiducial marks 2614, one or more fiducial marks 2614 may be formed within the cavity 2648 and one or more fiducial marks 2614 may be formed in a separate cavity 2649. In yet other embodiments with two or more fiducial marks 2614, multiple cavities 2649 are formed with fiducial marks 2614. The fiducial marks 2614 illustrated herein are shown in the shape of a "+" sign. Other shapes are also used in embodiments. Effective shapes for fiducial marks are well understood by those skilled in the art.

In the schematic drawing in FIG. 26H, the PIC 2602 is shown in embodiments after removal of the hard mask 2617 used in the formation of the cavities 2648,2649 in the insulating layer 2638.

Fiber optic cables for the delivery and extraction of optical signals from the PICs are typically formed in v-grooves at the edges of the PIC substrates. In optional forming step 2596, one or more v-grooves 2650 are formed in the PIC to accommodate the fiber optic cable attachment. It should be noted that the v-grooves 2650 are typically formed prior to the completion of the PIC fabrication process, and that the fiber optic cables 2654 are typically not mounted to the PIC 2602 until after the completion of the PIC fabrication process and including the completion of the singulation of the substrate into individual PIC die. PIC die are typically processed at the wafer level, common in semiconductor fabrication, and then diced into individual discrete PIC devices 2602. The positioning of the fiber optic cable 2654 into the v-groove 2650, however, is shown in FIG. 26I to illustrate the alignment of the core 2656 of the fiber optic cable 2654 with the core of the planar waveguide 2644.

In the embodiments shown in FIG. 26, the alignment and attachment of fiber optic cables 2654 in embodiments is further facilitated with the use of fiber optic cable mounting blocks 2662. Fiber optic cable mounting blocks 2662 enable accurate alignment of the core 2656 of the optical fiber cables 2654 with a facet 2652 of a planar waveguide 2644 on the PIC 2602. FIG. 26I shows an embodiment of a PIC 2602 with a fiber optic cable 2654 positioned in a v-groove 2650 without the fiber optic mounting block 2662 in place and FIG. 26J shows the embodiment of PIC 2602 with the fiber optic cable 2654 positioned in a fiber optic cable mounting block 2662. The fiber optic cable mounting block 2662 facilitates the alignment and attachment of the fiber optic cable 2654 to the interposer, and in embodiments is held in place in some embodiments with an adhesive or an epoxy.

It should also be noted that although fiber optic cables are used to facilitate the transfer of optical signals to and from PICs, the use of the alignment techniques described herein is not limited by the presence or lack of a fiber attachment method in embodiments, such as a v-groove or a fiber optic cable mounting block.

Significant advantages to the alignment of the core of the fiber optic cable 2654 with the facet 2652 of the planar waveguides 2644 formed in the planar waveguide layer 2605 are enabled with embodiments described herein. In the embodiment shown in FIG. 26I, a patterned PR mask is used, for example, to expose the portion of the substrate for the formation of one or more v-grooves. In embodiment in which a photoresist mask is used to expose the locations for the v-grooves, this patterned photoresist mask protects a least a portion of the PIC during the formation of the v-grooves 2650. The etch process for forming v-grooves is well understood in the art of semiconductor fabrication and is typically formed using a wet etch process.

Referring to FIG. 26J, an embodiment of the PIC 2602 is shown after formation of the v-groove 2650 and with a fiber optic mounting block 2662 in place at the edge of the PIC substrate (after cleaving). Surfaces within the v-groove 2650 form a contact with the cladding layer 2655 of a mounted fiber optic cable 2654. FIG. 26J shows the PIC 2602 with a portion of a fiber optic cable 2654 positioned in the v-groove 2650 and in the fiber optic cable mounting block 2662 to illustrate the use of these alignment features to align the core 2656 of the fiber optic cable 2654 with the end facet 2652 (shown for example, in FIG. 26G) of the portion of the planar waveguide 2644 to which the core 2656 is aligned. Alignment of the fiber core 2656 with the waveguide facet 2652 of the planar waveguide 2644 is beneficial for efficient transfer of optical signals between these devices. Alignment of the fiber optic cable 2654 with a facet 2652 of a planar waveguide 2644 on the PIC is facilitated with the presence of the z-pillars in the cavity 2669. Referring to FIG. 26K, end views of embodiments are shown in which the z-pillars are used as an alignment aid for aligning a fiber optic cable mounting block 2662. The top surface of the z-pillar alignment aids in FIG. 26K(i) are shown in contact with the base 2664 of the fiber optic cable mounting block 2662. In embodiments, the heights of the z-pillars 2634 and the dimensions of the fiber optic cable mounting block components including the base 2664, the lid 2666, and including the dimensions of the v-grooves in the base 2664 and the lid 2666 are such that alignment between the fiber optic cable core 2655 and the end facet (e.g, facet 2652) of a planar waveguide 2644 is achieved to facilitate the transfer of optical signals between the core 2655 and a waveguide 2644. Referring to FIG. 26K(ii), another embodiment is shown in which the fiber optic cable mounting block has notched feature 2671 to provide a lateral constraint alignment feature to constrain movement in the x-direction as shown (see reference coordinate system in FIG. 26K(ii).) Notch 2671 and z-pillar 2634 in FIG. 26K(ii) further facilitate the alignment between the core 2655 of the fiber optic cable 2654 and the facet of a planar waveguide 2644 on PIC 2602. In other embodiments, the notch 2671 in the fiber optic cable mounting block 2662 is formed to accommodate lateral constraint in both the x- and y-directions, as for example, feature 581 in FIG. 5C.

The sequence of drawings in FIGS. 26A-26K illustrate the formation of elements of a self-aligned optoelectrical device structure in an interposer-based PIC 2602 and include the z-pillars 2634 in cavities 2648, 2649, 2669, the buried planar waveguide structures 2644 that terminate at the walls of the cavity 2648, and the buried fiducial marks 2614. The sequence of drawings in FIGS. 26A-26K illustrate the formation of an embodiment of z-pillars in conjunction with a v-groove and cavity for the mounting of a fiber optic cable mounting block 2662 used to facilitate the mounting of the fiber optic cable 2654 and to facilitate the alignment of the core 2656 of the fiber optic cable 2654 with the end facet 2652 of a portion of a planar waveguide 2644. Upon formation of the elements of the PIC structure 2602 as shown, the alignment features in example embodiments in which optical die are positioned into the PIC 2602, as described herein and in FIGS. 7M-7P, can be implemented. Additional embodiments of the use of the alignment aids in the attachment and alignment of fiber optic cables are provides herein.

Referring to FIGS. 27 and 28, a process flow diagram and a sequence of drawings, respectively, are shown that illustrate the steps in the process flow for an embodiment that utilizes a fiber optic cable mounting block with the use of a lateral constraint alignment feature derived from the planar waveguide layer. In this embodiment, as described in FIG. 27 and FIGS. 28, z-pillar alignment aids are not included for the fiber optic cable mounting block.

Referring to FIG. 27, a process flowchart is shown for the formation of interposer-based PICs with embodiments of the interposer alignment structures, and aspects of embodiments described in this flowchart are illustrated in FIG. 28. In step 2790 of process flow 2710, a planar waveguide layer 2805 is formed on a base structure, wherein the base structure 2801 includes an optional electrical interconnect layer 2803 on a substrate 2800. The planar waveguide layer 2805 on base structure 2801 forms interposer 2804. The electrical interconnect layer 2803, as shown in FIG. 28A is formed in some embodiments on a semiconductor substrate 2800 such as silicon, indium phosphide, gallium arsenide, or some other semiconductor. In other embodiments, a ceramic or insulating substrate is used. In yet other embodiments, a metal substrate is used. And in yet other embodiments, a combination of one or more semiconductor layers, insulating layers, and metal layers are used to form a substrate 2800 upon which the optional electrical interconnect layer 2803 and the planar waveguide layer 2805 are formed. In some embodiments, the electrical interconnect layer 2803 is not in direct contact with the substrate but rather an intervening layer is present. Similarly, the planar waveguide layer 2805, in some embodiments, is not in direct contact with the underlying electrical interconnect layer 2803 but rather an intervening layer or layers may be present. In some embodiments, a semiconductor layer or substrate is mounted on a metal layer or substrate to form a composite substrate.

In hard mask layer formation step 2791 of the process flow 2710, a hard mask 2816 is formed on the planar waveguide layer 2805. Hard mask layer 2816 includes patterning for the formation of the optical waveguides and all or a portion of the alignment aids that are formed from the planar waveguide layer 2805. In the embodiments in FIG. 28B, the hard mask layer includes patterns for alignment aids that include fiducial marks, the alignment pillars or z-pillars, and v-groove alignment aids. In the embodiments shown in FIGS. 28B, hard mask layer portion 2816*a* shows a hard mask pattern for an embodiment of a z-pillar alignment aid which is shown after the hard mask patterning step in FIG. 28B; Similarly, hard mask portion 2816*b* shows a hard mask pattern for an embodiment of a planar waveguide 2844 which is shown after patterning in FIG. 28B. Hard mask portion 2816*c* shows a hard mask pattern for an embodiment of a fiducial mark alignment aid which is shown after hard mask patterning in FIG. 28B. And hard mask portion 2816*d* shows a hard mask pattern for an embodiment of a v-groove alignment aid 2851 which is shown after hard mask patterning in FIG. 28B. In the embodiment in FIG. 28, the v-groove alignment aid feature 2851 is used to position a v-groove for placement of a fiber optic cable as further described herein. In some embodiments, as described herein, the v-groove alignment aid 2851 functions as a lateral constraint. For the hard mask in the embodiment shown in FIG. 28B, portions of the patterned hard mask include the z-pillar portion 2816*a*, planar waveguide portion 2816*b*, fiducial mark portion 2816*c*, and v-groove alignment aid portion 2816*d*. These portions of the hard mask 2816 are used to pattern the z-pillars 2834, the planar waveguides 2844, the fiducial marks 2814, and the v-groove alignment aid 2851, respectively, using an etch process to remove the planar waveguide layer 2805 from areas not protected by the hard mask layer 2816 as shown in FIG. 28C.

Portions of the hard mask layer 2816, are also used in some embodiments to form all or a portion of optical devices 2840 for embodiments in which the optical devices 2840 are formed wholly or in part from the planar waveguide layer 2805. Optical devices 2840 may be waveguides, gratings, lens, or any device that can be formed from at least a portion of the planar waveguide layer. Alternatively, in other embodiments, optical devices 2840 are mounted devices, and not fabricated directly from the planar waveguide layer 2805 but added at a later step in the process of forming the PIC 2802. Optical device 2840 can be one or more of a portion of a device formed from the planar waveguide layer and one or more of a portion of a mounted device.

In some embodiments, the planar waveguide layer 2805 is formed of one or more layers of silicon dioxide, silicon nitride, and silicon oxynitride as described herein. To pattern the planar waveguides from such layers using a dry etch process, fluorinated etch chemistries in which one or more commonly utilized gases such as $CF_4$, $CHF_3$, $C_2F_8$, $SF_6$, among others, are used. In embodiments, aluminum or an alloy of aluminum is used to form the hard mask. Aluminum hard masks are known to exhibit a high resistance to dry etching in fluorinated chemistries and thus the dimensions of the hard mask can be maintained during the etching of the planar waveguide layer 2805, in which the fiducial marks 2814, the reference pillars, 2834, the planar waveguides 2844, and the v-groove alignment aid or lateral constraint 2851 are formed in Step 2792 of process flow 2710. In other embodiments, other hard masks are used that also exhibit high resistance to the etch chemistry such as Au, Ag, Ni, and Pt. In other embodiments, hard masks layers such as Ti, $TiO_x$, Ta, $TaO_x$, aluminum oxide, silicon nitride, silicon carbide, or a combination of one or more of these materials are used. In some embodiments, oxygen or other oxygen-containing gas is added to the etching chemistry to increase the resistance of the hard mask to the etch chemistry. In embodiments, the masking layer typically has a slow rate of removal in comparison to the rate of removal of the planar waveguide layer. In yet other embodiments, diluents are added to the fluorinated gas chemistry such as one or more of argon, helium, nitrogen, and oxygen, among others to increase the resistance of the hard mask to the fluorinated etch chemistry. Methods for etching of silicon dioxide, silicon nitride, and silicon oxynitride are well understood by those skilled in the art of semiconductor processing, as are methods of increasing the resistance of aluminum hard mask layers and other hard mask layers using fluorinated etch chemistries. Other waveguide materials are used in other embodiments.

After the patterning 2792 of the fiducial marks 2814, the reference pillars 2834, the planar waveguides 2844, and the v-groove alignment aids 2851, a mask material is formed over portions of the PIC that includes the hard mask patterned features 2816*a*-2816*d*. This mask layer is some embodiments, is a photoresist layer. In other embodiments, this mask layer is a hard mask layer. In embodiments, the mask layer is patterned to expose the underlying patterned hard mask layer portion 2816b over the patterned waveguides 2844 and to protect the patterned hard mask layer portion 2816a over the reference pillars 2834, the patterned hard mask layer portion 2816c over the fiducial marks 2814, and optionally protect the hard mask portion 2816d over the v-groove alignment aid 2851. Exposure of the hard mask layer portion 2816b over the waveguides, however, enables removal 2793 in process flow 2710 of the hard mask portion 2816b from the patterned waveguides 2844 without the removal of the hard mask portions 2816a and 2816c from the fiducial marks 2814 and the z-pillars 2834, and optionally from hard mask portion 2816d from the v-groove alignment aid 2851. In some embodiments, removal of the hard mask portion 2816d is preferred.

A schematic illustration of features of the PIC after removal of the hard mask portion 2816b and subsequent removal of the mask layer that is used in embodiments to protect the hard mask portions 2816a, 2816c, 2816d is shown in FIG. 28D. Removal of the hard mask portion 2816b (see FIG. 28C) from the planar waveguides 2844 of the hard mask layer 2816 is achieved in some embodiments using a wet etch process that selectively removes the metal or other hard mask with little or no removal of the underlaying planar waveguide layer. Metal etchants, such as those used for the removal of an aluminum hard mask, for example, and that have little or no effect on waveguide fabricated from silicon nitride and silicon dioxide, for example, are well known in the art of semiconductor processing. In other embodiments, a dry etch process is used. A benefit of a wet etch process, such as a phosphoric acid-based chemistry, to remove the hard mask portion 2816b from the planar waveguide 2844 below includes a high preferential selectivity for etching of the hard mask 2816b with minimal removal of the underlying planar waveguides 2844.

Upon completion of the removal step 2793 of the hard mask portion 2816b from the planar waveguides 2844, and removal of the photoresist mask layer that was used to protect the hard mask portions 2816a and 2816c, and optionally 2816d, a forming step 2794 is shown in the process flow 2710 to form a thick insulating dielectric layer 2838 as illustrated in FIG. 28E. The thick dielectric layer 2838 may be one or more layers of silicon dioxide, silicon nitride, or silicon oxynitride, for example, and may include one or more of a planar waveguide cladding layer, a buffer layer, a spacer layer, and a passivation layer, among others. In some embodiments, layer 2838 includes a planarization layer, and a planarization step is used to planarize the thick dielectric layer 2838 after this layer is formed.

Step 2795 of the process flow 2710 is a forming step that includes the formation of cavities 2848, 2849, 2869 in the thick dielectric layer 2838. This cavity forming step 2795 includes a patterned hard mask forming step as illustrated in FIG. 28F and an etching step as illustrated in FIG. 28G, among others. The hard mask 2817 shown in FIG. 28F, is preferably one such as aluminum or from an alloy of aluminum, among others, formed over the insulating layer 2838 and patterned using a plasma etch process or a wet chemical etch process to expose the portions of the underlying insulating layer 2838 within which cavities 2848,2849 is formed, and to expose the portions of the underlying insulating layer 2838 within which cavity 2869 is formed. Aluminum and alloys of aluminum, provide a high resistance to fluorinated etchants used to etch insulating layers such as silicon dioxide, silicon nitride, and silicon oxynitride preferably used in layer 2838. The effect of the etching step on the formation of the cavities 2848,2849,2869 is illustrated in the embodiment shown in FIG. 28G. The z-pillars 2834 are shown that result from the exposure of the buried hard mask portion 2816a that was formed from the hard mask 2816 in cavity 2848. Exposed fiducials 2814 are also shown that result from the exposure of the buried hard mask portion 2816c that was formed from the hard mask 2816 in cavity 2849. Cavity 2869 is shown having been formed at the edge of the PIC 2802. In practice, the cavity 2869 is formed prior to singulation of the substrate into individual die, and thus the cavity is not yet cleaved as shown but rather is shown as the singulated device will appear after singulation.

In some embodiments, it is or may not be preferable or necessary to expose the buried fiducial marks 2814 to obtain the improved clarity of the fiducials in subsequent steps in which the fiducials 2814 are used in the fabrication of the PIC 2802, or for the placement of optical die onto the PIC 2802. In these embodiments, the patterning step for the hard mask 2817 that is used to expose the areas of the insulating layer 2838 to form the cavities 2848 will not include an allowance for exposure of the areas of the insulating layer 2838 to also form cavities 2849 to expose the fiducials 2814 within these cavities 2849 as illustrated in FIG. 28G. Improved visibility of the fiducials 2814 is to be expected upon the formation of the cavity 2849, but may not be required in some embodiments. Improved visibility of the fiducials may not be required, for example, in embodiments with thin insulating layers 2838, in applications in which the surface of the thick insulating layer 2838 remains visibly transparent, and in embodiments in which the contrast between the fiducials and the underlying layers is adequate. Exposure of the fiducials 2814 with the formation of cavity 2849, in general, provides improved visibility in embodiments for which the cavities 2849 are provided since the focal plane of the fiducial 2814 is shared with the focal plane of the z-pillars 2834 and other alignment aids formed using the hard mask 2816 in these embodiments. The improved visibility also results from the elimination of deleterious effects that processing steps such as mechanical planarization may have on increasing the opacity of the layer 2838 that might limit the visibility of a buried fiducial. In the example embodiment illustrated in FIG. 28G, the alignment pillars 2834 are shown in cavity 2848 and the fiducials 2814 are shown in cavity 2849. In other embodiments, the fiducials 2814 are formed in the same cavity 2848 as the alignment reference pillars 2834. In other embodiments, two or more fiducial marks 2814 are formed. In embodiments with two or more fiducial marks 2814, one or more fiducial marks 2814 may be formed within the cavity 2848 and one or more fiducial marks 2814 may be formed in a separate cavity 2849. In yet other embodiments with two or more fiducial marks 2814, multiple cavities 2849 are formed with fiducial marks 2814. The fiducial marks 2814 illustrated herein are shown in the shape of a "+" sign. Other shapes are also used in embodiments. Effective shapes for fiducial marks are well understood by those skilled in the art.

Also shown in the embodiments in FIG. 28G and FIG. 28H, is the v-groove alignment aid 2851. This v-groove alignment aid 2851 is exposed in these embodiments using the same patterned hard mask 2817 and etch process used in the formation of one or more of the cavities 2848, 2849. An aspect of embodiments is the use of a common lithographic patterning step to define the v-groove alignment aid 2851 with the planar waveguide 2844 to provide lithographic level of alignment between these features of a PIC using the techniques described herein. The v-groove is used in embodiments to position a fiber optic cable such that the core is aligned in embodiments with a portion of a planar waveguide 2844. And although the patterning of the v-groove alignment aid 2851 from the planar waveguide layer, in embodiments, is performed concurrently with the patterning of the fiducials 2814, the planar waveguides 2844, and the z-pillars 2834, the subsequent removal of the oxide 2838 to expose the v-groove alignment feature 2851 from within the oxide 2838 need not be performed concurrently with the formation of the cavities 2848, 2849.

In the schematic drawing in FIG. 28H, the PIC 2802 is shown in embodiments after removal of the hard mask 2817 used in the formation of the cavities 2848,2849 in the insulating layer 2838, and removal of the oxide 2838 in proximity to the alignment aid 2851 as shown, for example, in the FIG. 28H.

Fiber optic cables for the delivery and extraction of optical signals from the PICs are typically formed in v-grooves at the edges of the PIC substrates. In optional forming step 2796, one or more v-grooves 2850 are formed in the PIC to accommodate the fiber optic cable attachment. It should be noted that the v-grooves 2850 are typically formed prior to the completion of the PIC fabrication process, and that the fiber optic cables 2854 are typically not mounted to the PIC 2802 until after the completion of the PIC fabrication process and including the completion of the singulation of the substrate into individual PIC die.

In the embodiments shown in FIG. 28, the alignment and attachment of fiber optic cables 2854 in embodiments is further facilitated with the use of fiber optic cable mounting blocks 2862. Fiber optic cable mounting blocks 2862 enable accurate alignment of the core 2856 of the optical fiber cables 2854 with a facet 2852 of a planar waveguide 2844 on the PIC 2802. The embodiments shown in FIG. 28 include provisions for the fiber optic cable mounting block and v-grooves.

Prior to completion of the PIC 2802, the v-grooves that are commonly formed on the PIC substrates to accommodate the attachment of fiber optic cables for the delivery and extraction of optical signals from the PIC 2802 are typically formed. FIG. 28I and FIG. 28J show an embodiment in which a v-groove is formed in conjunction with an alignment aid 2851 patterned from the planar waveguide layer 2805.

Significant advantages to the alignment of the core of the fiber optic cable 2854 with the facet 2852 of the planar waveguides 2844 formed in the planar waveguide layer 2805 are enabled with embodiments described herein. The use of the patterned planar waveguide layer 2805 to simultaneously form the alignment aid 2851 and to form the waveguides 2844, provides lithographic-level resolution for the ultimate alignment of the fiber optic core 2856 placed within the v-groove alignment aid 2851 and the waveguide facet 2852 of the planar waveguides 2844 to which the core 2856 of a fiber optic cable 2854 is aligned. In the embodiment shown in FIG. 28I, a patterned PR mask is used, for example, to expose the portion of the substrate for the formation of one or more v-grooves in proximity with an alignment aid 2851. In embodiment in which a photoresist mask is used to expose the locations for the v-grooves, this patterned photoresist mask protects a least a portion of the PIC during the formation of the v-grooves 2850. The etch process for forming v-grooves is well understood in the art of semiconductor fabrication and is typically formed using a wet etch process.

Referring to FIG. 28J, an embodiment of the PIC 2802 is shown after formation of the v-groove 2850 and removal of the photoresist mask 2853 used in the formation of the v-groove. Surfaces within the v-groove 2850 form a contact with the cladding layer 2855 of a mounted fiber optic cable 2854.

FIG. 28K shows the PIC 2802 with a portion of a fiber optic cable 2854 positioned in the v-groove 2850 and in the fiber optic cable mounting block 2862 to illustrate the use of these alignment features to align the core 2856 of the fiber optic cable 2854 with the end facet 2852 (shown in FIG. 28G) of the portion of the planar waveguide 2844 to which the core 2856 is aligned. Alignment of the fiber core 2856 with the waveguide facet 2852 of the planar waveguide 2844 is beneficial for efficient transfer of optical signals between these devices. The fiber optic cable mounting block 2862 facilitates the alignment and attachment of the fiber optic cable 2854 to the interposer, and in embodiments is held in place with an adhesive or an epoxy, for example.

It should also be noted that although fiber optic cables are used to facilitate the transfer of optical signals to and from PICs, the use of the alignment techniques described herein is not limited by the presence or lack of a fiber attachment method in embodiments, such as a v-groove or a method for attachment of a fiber optic cable mounting block.

The sequence of drawings in FIGS. 28A-28K illustrate the formation of elements of a self-aligned optoelectrical device structure in an interposer-based PIC 2802 and include the z-pillars 2834 in cavities 2848, the buried planar waveguide structures 2844 that terminate at the walls of the cavity 2848, the fiducial marks 2814, and the fiber optic cable block alignment aids 2851. The sequence of drawings in FIGS. 28A-28K also illustrate the formation of an embodiment of a v-groove for the alignment and mounting of a fiber optic cable in conjunction with the mounting block 2862. The mounting block 2862 is used in embodiments to facilitate the mounting of the fiber optic cable 2854 and the alignment of the core 2856 of the fiber optic cable 2854 with the end facet 2852 of a portion of a planar waveguide 2844. Upon formation of the elements of the PIC structure 2802 as shown, the alignment features in example embodiments in which optical die are positioned into the PIC 2802, as described herein and in FIGS. 7M-7P, can be implemented. Additional embodiments of the use of the alignment aids in the attachment and alignment of fiber optic cables are provides herein.

In FIGS. 23-28, a number of process flows and process flow sequences are described for embodiments that utilize fiber optic cable mounting blocks and other alignment aids that include: (1) an embodiment that does not use z-pillars or a lateral constraint derived from the planar waveguide layer as shown in in FIGS. 23 and 24, (2) an embodiment that does include z-pillars to support alignment of the fiber optic cable mounting block but that does not include a lateral constraint alignment feature derived from the planar waveguide layer as shown in FIGS. 25 and 26, and (3) an embodiment that does not include the z-pillars but does include the lateral constraint alignment feature derived from the planar waveguide layer as shown in FIGS. 27 and 28. The example embodiments shown in FIGS. 23-28 illustrate various configurations of alignment aids used in support of the fiber optic cable mounting blocks on interposer substrates. Further variations in the utilization and implementation of the various alignment aids described herein should be evident to those skilled in the art.

One such embodiment that includes both the z-pillars 2934b and an alignment aid 2951 formed from the planar waveguide layer 2905 that contributes to the alignment of the fiber optic cable mounting block 2962 and, more specifically, to the alignment of the fiber optic core 2956 of a fiber cable 2954 mounted within the fiber optic mounting block 2962 to a facet 2952 of a planar waveguide 2944 on an interposer-based PIC is shown in FIG. 29A and FIG. 29B. In FIG. 29B, the fiber optic cable mounting block is shown and includes the base 2964 and the lid 2966 within which the fiber cable is mounted.

FIG. 29A also shows PIC 2902 with z-pillar alignment aids 2934a in cavity 2948 and fiducial 2914 in cavity 2949. Planar waveguides 2944 intersect with the walls of cavity 2948 for so that the optical features of optical die mounted within the cavities 2948 can be aligned with the optical facets of the portions of the planar waveguides 2944 that intersect with the cavities 2948. In the embodiment shown in FIG. 29A and FIG. 29B, the z-pillars 2948b are formed using the same hard mask layer as the hard mask used to form the z-pillars 2948a. In other embodiments, different hard mask patterning steps are used to form the z-pillars 2934a and the z-pillars 2948b. Significant improvements in the degree of precision within with the various features of the PIC 2902 can be aligned are achieved in embodiments for which the planar waveguides 2944, the z-pillars 2934a, 2934b, the fiducials 2914, and the alignment aid 2951 are formed from a common planar waveguide layer 2905 of the interposer 2904. The formation of each of the alignment aids from the same planar waveguide layer 2905 provides lithographic level alignment accuracy in the positioning of these alignment aids and to the devices, die, mounting blocks, and other components of PICs for embodiments that includes alignment aids described herein.

The embodiment of the PIC 2902 shown in FIG. 29A includes patterning steps for the formation of planar waveguides 2944, the fiducial marks 2914 in cavity 2949, z-pillar alignment aids 2934 formed in cavity 2948, z-pillar alignment aids formed for the alignment of a fiber optic cable mounting block in a cavity 2969, and alignment aid 2951, a feature patterned from planar waveguide layer 2905 that can form a lateral constraint to restrict lateral movement of a mounted fiber optic cable mounting block and can form all or part of a etch mask for the formation of a cavity 2969 within which all or part of a fiber optic cable mounting block can be mounted. Alignment aid 2951 is formed from the planar waveguide layer 2905 using a lithographic patterning process to pattern a hard mask. The hard mask pattern used to protect the alignment aid 2951 during an etch step, in some embodiments, is removed with the removal of the portion of the hard mask used to pattern the planar waveguides 2944. In other embodiments, the hard mask used to protect the alignment aid 2951 during an etch step is not removed with the removal of the portion of the hard mask used to pattern the planar waveguides 2944 but rather is left in place with the other portions of the hard mask that are left in place after the patterning of the planar waveguide layer 2905, including the z-pillar mask portions, and the fiducial mask portions of the hard mask.

Referring to FIGS. 30A and 30B, additional details of embodiments of fiber optic cable mounting blocks that could be used, for example, in the embodiments described in FIGS. 23-29 are shown. In FIG. 30A(i), an end view of an embodiment of a fiber optic cable mounting block 3062 that holds a single fiber optic cable 3054 is shown and in FIG. 30A(ii), is a similar view of an embodiment of a fiber optic cable mounting block 3062 that holds two fiber optic cables 3054 is shown. Fiber optic cable 3054 resides in recess 3073a in the base 3064 of the fiber optic cable mounting block 3062 and in recess 3073b in the lid 3066 of the fiber optic cable mounting blocks 3062 shown in FIGS. 30A(i) and 30A(ii). In these embodiments, the recess 3073a shown in the base 3064 are a v-groove feature. In other embodiments, the recess 3073a is rectangular in shape. And in yet other embodiments, the recess is semicircular in shape or another shape. And in yet other embodiments, the recess 3073a may not be present. In the embodiments shown in FIGS. 30A(i) and 30A(ii), the recess 3073b shown in the lid 3066 is a semicircular feature. In other embodiments, the recess 3073b shown in the lid 3066 is a v-groove feature. In other the embodiments, the recess 3073b is rectangular in shape. And in yet other embodiments, the recess 3073b is another shape. And in yet other embodiments, the recess 3073b may not be present. In embodiments, the recesses 3073a, 3073b provide containing function and an aligning function, among other potential functions. The containing function holds, clamps, or otherwise fixes the fiber optic cable in a position that allows for accurate alignment for the fiber core 3056 at, for example, a reference distance from the interface of the lid 3066 and the base 3064. The reference distance, "offset" in the embodiments in FIGS. 30A(i) and 30A(ii), shows the distance from the interface between the lid 3066 and the base 3064 of the fiber optic cable mounting block 3062 to the horizontal center of the core 3056 of the mounted fiber optic cable 3054. The aligning function of the fiber optic cable mounting blocks 3062 provides accurate positioning of the core 3056 of the fiber optic cable 3054 within the v-groove 3073a, 3073b or other shaped recesses in the base 3064 and the lid 3066. The aligning function of the fiber optic cable mounting blocks 3062 also provides accurate positioning of the core 3056 of the fiber optic cable 3054 relative to one or more of the length, width, and depth of the fiber optic cable mounting blocks 3062 such that the core 3056 can be positioned onto the PIC 3002, for example, on the z-pillars (e.g, 2964), in the fiber cable mounting block cavity (e.g, 2969), in contact with a fiber optic cable mounting v-groove (e.g, 2850), in conjunction with an alignment aid (e.g, 2951) formed from the planar waveguide layer (e.g, 2905), or in combination with one or more of these alignment aids or other alignment aid formed on the PIC.

In FIG. 30A(iii), a cross section is shown of fiber optic cable mounting block 3062 that shows the cross section of the optical fiber 3056. The fiber optic cable mounting block 3062 is typically configured with an offset, denoted "lid offset" to accommodate the z-pillars in embodiments in which z-pillars are utilized to align or contribute to the alignment of the fiber optic cable mounting block 3062, and one or more of the lid 3066, base 3064, and fiber may be held in place with epoxy 3067.

FIG. 30B shows additional detail in the positioning of a fiber cable 3054 within a fiber optic cable mounting block 3062 in an embodiment used with z-pillars 3054 to illustrate the alignment of the grooves 3073a, 3073b. Z-pillars 3054 are formed for example, in a cavity such as the cavity 2969 shown in FIG. 29B to facilitate wholly, or in part, the alignment of a fiber optic cable mounting block 3062. Z-pillars 3054 shows core layer 3058 that is formed from a portion of the planar waveguide layer (e.g, 405). In embodiments, although the optic signals in PICs in embodiments do not necessarily propagate in any portion of the z-pillars (although not precluded from doing so), optical signals do propagate in portions of the planar waveguide layer from which the planar waveguides and other optical features are formed. Thus, in FIG. 30B, the alignment of the core 3056 of the fiber optic cable 3054 is shown in alignment with the planar waveguide layer core 3058 present in the z-pillars 3054, and with the planar waveguide facet 3052 also formed from the planar waveguide layer (e.g, 405) shown in the background. In embodiments, optical signals can be transferred to, or from, or both to and from, the core 3056 of the fiber cable 3054 and the facet 3052 of a planar waveguide 3044.

It should be noted that in embodiments, the lid 3066 of the fiber optic cable block 3062 typically, although not necessarily, forms the contact with the substrate to which the fiber optic cable mounting block 3062 is attached as shown in FIG. 30C. This figure shows a (i) cross section and (ii) top down view of an embodiment of a portion of a PIC 3002 for which the fiber optic cable mounting block 3062 is aligned with the planar waveguide core 3058 of planar waveguide 3044. Planar waveguide layer 3044 also includes base layer 3059 and top layer 3057 (as described in FIG. 4, for example). The fiber optic core mounting block 3062 includes the base 3064 and the lid 3066. Epoxy 3067a is utilized, for example, to hold together the lid 3066 and base 3064 and to hold fiber optic cable 3054 in the block 3062. The lid 3066 is adhered to the substrate with an epoxy layer 3067b. In FIG. 30C(ii), the top-down view further shows an example position of the z-pillar 3054, offset as shown from the fiber cable so that the z-pillars form a contact with the base 3064 of the mounting block 3062. Fiducials to facilitate the placement and alignment of the fiber mounting block 3062 are also shown.

The embodiments of the fiber optic cable blocks 3062 shown in FIGS. 30A(i) and 30A(ii) are shown in configurations to include one or two fiber optic cables 3054, respectively. Other embodiments are configured to hold three or more fiber optic cables 3054. In other embodiments, more than two fiber optic cables are included in the fiber optic mounting block 3062. In other embodiments, four fiber optic cables 3054 are accommodated in the fiber optic cable mounting block 3062. And in yet other embodiments, three or more fiber optic cables 3064 are mounted in the fiber optic cable mounting block 3062.

In FIG. 30D, an embodiment is shown for a PIC 3002 that is configured for a fiber optic cable mounting block 3062 with four mounted fiber optic cables 3064 (not shown). This figure illustrates a PIC 3002 with waveguides 3044 in alignment with the v-grooves 3050 formed in the substrate of the PIC 3002. Spot size converters (SSCs) have been formed between the planar waveguides 3044 and the mounting location for the fiber optic cable mounting block 3062. Also shown in the PIC 3002 are locations for the mounting or formation of laser devices 3020 and the electrical contact pads 3030 that form electrical contacts for the laser devices 3020. In FIG. 30D, four mounted fiber optic cables are provided in the embodiment for the fiber mounting block. In other embodiments, other quantities of fibers may be mounted in the fiber mounting block. And in yet other embodiments, allowances for the positioning and mounting of multiple fiber mounting blocks can be made on an interposer substrate.

The foregoing descriptions of embodiments have been presented for purposes of illustration and description and are not intended to be exhaustive or to limit embodiments to the forms disclosed. Modifications to, and variations of, the disclosed embodiments will be readily apparent to those skilled in the art, and the general principles defined herein may be applied to other embodiments without departing from the spirit and scope of the embodiments disclosed herein. Thus, embodiments should not be limited to those specifically described herein but rather are to be accorded the widest scope consistent with the principles and features disclosed herein.

What is claimed is:

1. A structure comprising
a substrate;
a first optical component on the substrate,
wherein the first optical component comprises a first optical axis;
a first alignment aid element comprising a first outer surface parallel to a lateral surface of the substrate,
wherein the first outer surface is separated by a first distance with the first optical axis;
wherein the first alignment aid element is configured for aligning a second optical component with the first optical component in a first direction perpendicular to the lateral surface,
a second alignment aid element comprising a pattern on a second surface parallel to the lateral surface,
wherein the second surface is in a vicinity of the first optical axis in the first direction,
wherein the pattern is configured for laterally aligning a second optical component with the substrate;
a third alignment aid element comprising a third surface not parallel to the lateral surface,
wherein the third surface is configured to constrain or guide movements of the second optical component in a second direction parallel to the lateral surface.

2. A structure as in claim 1, further comprising
a fourth alignment aid element comprising an alignment constraint for laterally aligning an optical fiber,
wherein the alignment constraint is configured to align an optical axis of the optical fiber with the first optical axis in a lateral direction.

3. A structure as in claim 1,
wherein the first alignment aid element comprises the third alignment aid element, with the first alignment aid element comprising a pillar comprising the first outer surface as a top surface and the third surface as a side surface.

4. A structure as in claim 1,
wherein the third surface is configured to establish a limit for the second optical component to travel in the second direction to be within an alignment tolerance.

5. A structure as in claim 1,
wherein the first distance is configured to match with a second distance between a fourth outer surface and a second optical axis of the second optical component in a third direction perpendicular to the second outer surface.

6. A structure as in claim 1,
wherein the third surface is configured to constrain or guide movements of the second optical component in the third direction to a final alignment position.

7. A structure as in claim 1,
wherein the third distance is configured for a precision placement of the second optical component on the first alignment aid element for aligning the second optical axis of the second optical component with the first optical axis of the first optical component in the third direction with a placement accuracy of a lithographic process.

8. A structure comprising
a substrate;
a first optical component on the substrate,
wherein the first optical component comprises a first optical axis;
a first alignment aid element comprising a first outer surface parallel to a lateral surface of the substrate, wherein the first outer surface is separated by a first distance with the first optical axis in a first direction perpendicular to the lateral surface, wherein the first distance is configured to match with a second distance between a second outer surface and a second optical axis of a second optical component in a second direction perpendicular to the second outer surface, wherein the first alignment aid element is configured for aligning the second optical component with the first optical component in the first direction, characterized by aligning the first optical axis with the second optical axis in the first direction, when the second component is assembled on the substrate with the first outer surface contacting with the second outer surface, wherein the first alignment aid element further comprises a third surface not parallel to the lateral surface, wherein the third surface is configured to constrain or guide movements of the second optical component in a third direction parallel to the lateral surface;

a second alignment aid element comprising a pattern on a second surface parallel to the lateral surface, wherein the second surface is in a vicinity of the first optical axis in the first direction, wherein the pattern is configured for aligning the second optical axis of the second optical component with the first optical axis of the first optical component in the third direction.

9. A structure as in claim 8, wherein the pattern is separated by a third distance with the first alignment aid element in a third direction parallel to the lateral surface, wherein the third distance is configured for a precision placement of the second optical component on the first alignment aid element with a placement accuracy of a lithographic process during the alignment of the second optical axis with the first optical axis.

10. A structure comprising
a substrate;
a first optical component on the substrate,
wherein the first optical component comprises a first optical axis;
a first alignment aid element comprising a first outer surface parallel to a lateral surface of the substrate,
wherein the first outer surface is separated by a first distance with the first optical axis in a first direction perpendicular to the lateral surface, wherein the first distance is configured to match with a second distance between a second outer surface and a second optical axis of a second optical component in a second direction perpendicular to the second outer surface, wherein the first alignment aid element is configured for aligning the second optical component with the first optical component in the first direction, characterized by aligning the first optical axis with the second optical axis in the first direction, when the second component is assembled on the substrate with the first outer surface contacting with the second outer surface;

a second alignment aid element comprising a fiducial pattern on a second surface parallel to the lateral surface, wherein the second surface is in a vicinity of the first optical axis in the first direction, wherein the fiducial pattern is separated by a third distance with the first alignment aid element in a third direction parallel to the lateral surface, wherein the third distance is configured for a precision placement of the second optical component on the first alignment aid element for aligning the second optical axis of the second optical component with the first optical axis of the first optical component in the third direction with a placement accuracy of a lithographic process;

a third alignment aid element comprising a third surface not parallel to the lateral surface, wherein the third surface is configured to constrain or guide movements of the second optical component in the third direction during a soldering aligning process.

11. A structure as in claim 10,
wherein the substrate comprises an interconnection layer disposed on a base structure,
wherein the interconnection layer comprises at least an electrical interconnection line,
wherein the base structure comprises an electrical device comprising an electrical terminal connected to the electrical interconnection line.

12. A structure as in claim 10,
wherein the first or second optical component comprises a waveguide, an optical device, an optoelectric device, or a ball lens.

13. A structure as in claim 10,
wherein an optical facet of the first optical component contacts an optical facet of the second optical component.

14. A structure as in claim 10,
wherein the first alignment aid element comprises the third alignment aid element, with the first alignment aid element comprising a pillar comprising the first outer surface as a top surface and the third surface as a side surface.

15. A structure as in claim 10,
wherein the first alignment aid element comprises a top layer comprising an etch selectivity as compared to other layers of the first optical component.

16. A structure as in claim 10,
wherein the first alignment aid element comprises a top layer comprising Al, AlOx, Au, Ag, Ni, Pt, Ti, TiOx, Ta, TaOx, while other layers of the first optical component comprise a silicon dioxide, silicon nitride, or silicon oxynitride material.

17. A structure as in claim 10,
wherein the first alignment aid element and the second alignment aid element comprise a top hard mask layer formed at a same time with top surfaces of the hard mask layer being the first outer surface and the second surface.

18. A structure as in claim 10,
wherein the third surface is configured to establish a limit for the second optical component to travel in the second direction to be within an alignment tolerance of less than 2 microns.

19. A structure as in claim 10,
wherein the third surface is separated with a fifth surface of the second optical component by a distance less than 1 micron.

20. A structure as in claim 10,
a fourth alignment aid element comprising an alignment constraint for laterally aligning an optical fiber, wherein the alignment constraint is configured to align an optical axis of the optical fiber with the first optical axis in a lateral direction,
wherein the fourth alignment aid element comprises a v-groove alignment aid disposed along the optical fiber.

* * * * *